US012538929B2

United States Patent
Raj et al.

(10) Patent No.: US 12,538,929 B2
(45) Date of Patent: Feb. 3, 2026

(54) PRODUCTION OF LACTASE ENZYMES USING ALTERED REGULATION STRAINS

(71) Applicant: Chr. Hansen A/S, Hoersholm (DK)

(72) Inventors: Hans Raj, Hoersholm (DK); Charlotte Elisabeth Grüner Schöller, Virum (DK); Kim Ib Soerensen, Hoersholm (DK); Johannes Maarten Van Den Brink, Herlev (DK); Ahmad Zeidan, Hoersholm (DK); Martin Holm Rau, Hoersholm (DK); Paula Gaspar, Hoersholm (DK); George Nabin Baroi, Hoersholm (DK)

(73) Assignee: Chr. Hansen A/S, Hoersholm (DK)

( * ) Notice: Subject to any disclaimer, the term of this patent is extended or adjusted under 35 U.S.C. 154(b) by 769 days.

(21) Appl. No.: 17/638,155

(22) PCT Filed: Aug. 27, 2020

(86) PCT No.: PCT/EP2020/073985
§ 371 (c)(1),
(2) Date: Feb. 24, 2022

(87) PCT Pub. No.: WO2021/037986
PCT Pub. Date: Mar. 4, 2021

(65) Prior Publication Data
US 2022/0304323 A1 Sep. 29, 2022

(30) Foreign Application Priority Data
Aug. 30, 2019 (EP) .................................... 19194678

(51) Int. Cl.
*A23C 9/12* (2006.01)
*C12N 9/12* (2006.01)
*C12N 9/38* (2006.01)

(52) U.S. Cl.
CPC .......... *A23C 9/1206* (2013.01); *C12N 9/1205* (2013.01); *C12N 9/2471* (2013.01); *C12Y 207/01002* (2013.01); *C12Y 302/01023* (2013.01); *C12Y 302/01108* (2013.01)

(58) Field of Classification Search
None
See application file for complete search history.

(56) References Cited

U.S. PATENT DOCUMENTS

| | | | |
|---|---|---|---|
| 11,044,920 B2 | 6/2021 | Johansen et al. | |
| 11,076,609 B2 | 8/2021 | Johansen et al. | |
| 11,525,129 B2 * | 12/2022 | Raj | ................ C12Y 302/01023 |
| 12,215,367 B2 * | 2/2025 | Raj | ....................... C12N 9/2471 |
| 2015/0086675 A1 | 3/2015 | Johansen et al. | |
| 2020/0260750 A1 | 8/2020 | Buchhorn et al. | |
| 2021/0355471 A1 | 11/2021 | Raj et al. | |
| 2022/0061348 A1 | 3/2022 | Johansen et al. | |

FOREIGN PATENT DOCUMENTS

| | | | |
|---|---|---|---|
| WO | WO-2013/160413 A1 | 10/2013 | |
| WO | WO-2017/103051 A1 | 6/2017 | |
| WO | WO-2018/189224 A1 | 10/2018 | |
| WO | WO-2019/122365 A1 | 6/2019 | |

OTHER PUBLICATIONS

Chica et al. Curr Opin Biotechnol. Aug. 2005; 16(4):378-84. (Year: 2005).*
Singh et al. Curr Protein Pept Sci. 2017, 18, 1-11 (Year: 2017).*
Deutscher, Josef et al.; "Protein kinase-dependent HPr/CcpA interaction links glycolytic activity to carbon catabolite repression in Gram-positive bacteria"; Molecular Microbiology (1995) 15(6); pp. 1049-1053.
Mahalakshmi, S. et al.; "Fermentative production of lactase from Lactobacillus amylophilus GV6"; Journal of Scientific & Industrial Research, vol. 72; Sep.-Oct. 2013; pp. 548-552.
Sørensen, Kim I. et al.; "Enhancing the Sweetness of Yoghurt through Metabolic Remodeling of Carbohydrate Metabolism in *Streptococcus thermophilus* and *Lactobacillus delbrueckii* subsp. *bulgaricus*"; Applied and Environmental Microbiology, vol. 82, No. 12; Jun. 2016; pp. 3683-3692.
Van Den Bogaard, Patrick T.C. et al.; "Control of Lactose Transport, ß-Galactosidase Activity, and Glycolysis by CcpA in *Streptococcus thermophilus*: Evidence for Carbon Catabolite Repression by a Non-Phosphoenolpyruvate-Dependent Phosphotransferase System Sugar"; Journal of Bacteriology, vol. 182, No. 21; Nov. 2000; pp. 5982-5989.
Van Den Bogaard, Patrick T.C.; "Catabolite control of sugar metabolism in *Streptococcus thermophilus*"; Ph.D. Thesis; Wageningen University; Wageningen, The Netherlands; Oct. 28, 2002; 164 pages.

* cited by examiner

Primary Examiner — Christian L Fronda
(74) Attorney, Agent, or Firm — Yoshimi D. Barron

(57) ABSTRACT

The present invention relates to new improved methods for expressing native lactases in their native hosts. Methods for homologous as well as heterologous expression of lactase in lactic acid bacteria with altered expression dynamics are comprised by present invention.

Figure 1:
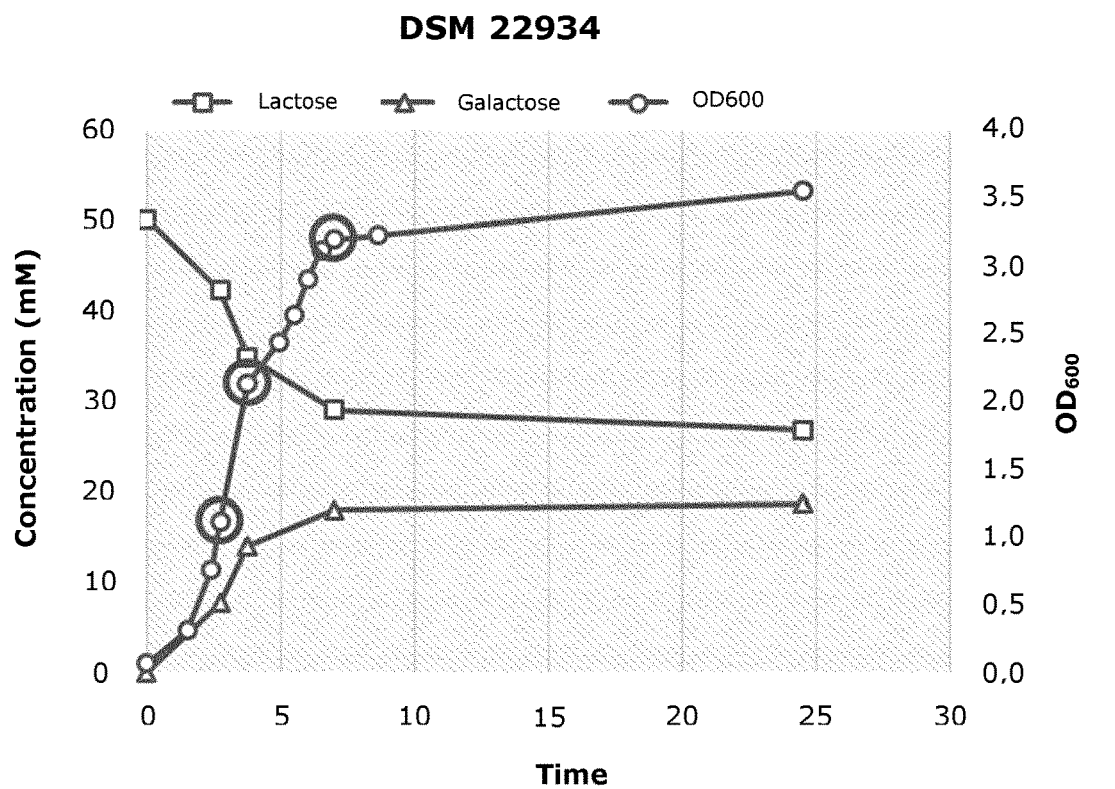
Figure 1:
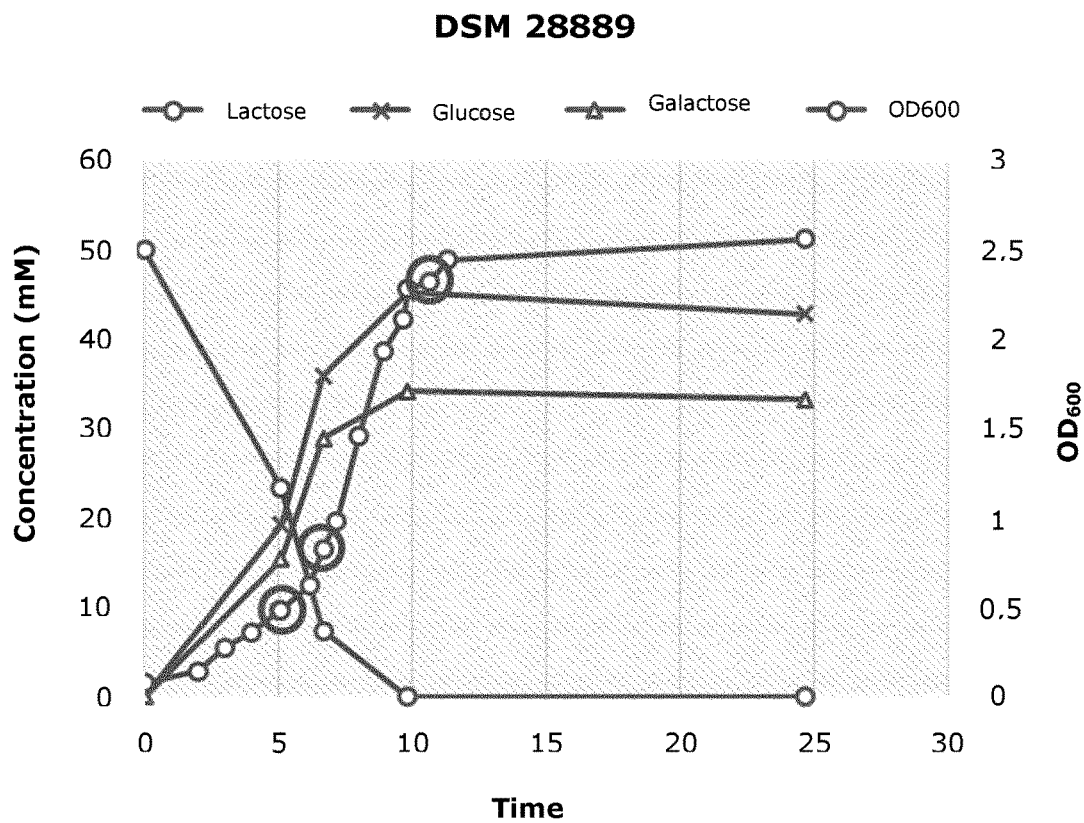

12 Claims, 3 Drawing Sheets
Specification includes a Sequence Listing.

SEQUENCE LISTING

```
<160> NUMBER OF SEQ ID NOS: 38

<210> SEQ ID NO 1
<211> LENGTH: 1049
<212> TYPE: PRT
<213> ORGANISM: Bifidobacterium adolescentis

<400> SEQUENCE: 1

Met Ala Asp Thr Ala Glu Leu Ala Ile Val His Ala Thr Thr Ala Ser
1               5                   10                  15

Ala Ser Trp Leu Thr Asp Pro Thr Val Phe Ala Ala Asn Arg Lys Pro
                20                  25                  30

Ala His Ser Ser His Arg Tyr Val Ile Gly Glu Thr Ser Glu Pro Lys
            35                  40                  45

Gln Ser Leu Asp Gly Glu Trp Lys Val Arg Ile Glu Gln Ala Arg Asn
        50                  55                  60

Val Asp Val Glu Ser Ala Pro Phe Ala Ala Val Asp Phe Glu Asp Gly
65                  70                  75                  80

Asp Phe Gly Ala Ile Glu Val Pro Gly His Leu Gln Met Ala Gly Tyr
                85                  90                  95

Leu Lys Asn Lys Tyr Val Asn Ile Gln Tyr Pro Trp Asp Gly His Glu
                100                 105                 110

Asp Pro Gln Ala Pro Asn Ile Pro Glu Asn Asn His Val Ala Ile Tyr
            115                 120                 125

Arg Arg Arg Phe Ala Leu Asp Ala Gln Leu Ala Arg Thr Leu Glu Asn
        130                 135                 140

Asp Gly Thr Val Ser Leu Thr Phe His Gly Ala Ala Thr Ala Ile Tyr
145                 150                 155                 160

Val Trp Leu Asp Gly Thr Phe Val Gly Tyr Gly Glu Asp Gly Phe Thr
                165                 170                 175

Pro Ser Glu Phe Asp Val Thr Glu Ala Leu Arg Asn Gly Asn Gly Asn
                180                 185                 190

Ala Ala Asp Ser Pro Glu Ala Glu His Thr Leu Thr Val Ala Cys Tyr
```

-continued

```
                195                 200                 205
Glu Tyr Ser Ser Ala Ser Trp Leu Glu Asp Gln Asp Phe Trp Arg Leu
210                 215                 220
His Gly Leu Phe Arg Thr Val Glu Leu Ala Ala Gln Pro His Thr His
225                 230                 235                 240
Val Glu Thr Val Gln Leu Glu Ala Asp Tyr Thr Ala Ala Asp Thr Ala
                245                 250                 255
Gly Thr Ala Asp Thr Ala Glu Leu Asn Ala Ala Leu Thr Leu Arg Asn
                260                 265                 270
Ser Ala Asp Ala Met Thr Ile Glu Ser Thr Leu Arg Asp Gly Asp Gly
                275                 280                 285
Asn Val Val Trp Glu Ser Thr Gln Ala Cys Asn Gly Glu Ile Ala Leu
290                 295                 300
Asn Ser Gly Lys Met Thr Asn Ile Ala Pro Trp Ser Ala Glu Ser Pro
305                 310                 315                 320
Thr Leu Tyr Thr Leu Thr Val Arg Val Val Gly His Asp Gly Ala Ile
                325                 330                 335
Ile Glu Thr Val Thr Gln Lys Ile Gly Phe Arg Thr Phe Arg Ile Glu
                340                 345                 350
Asn Gly Ile Met Thr Leu Asn Gly Lys Arg Ile Val Phe Lys Gly Ala
                355                 360                 365
Asp Arg His Glu Phe Asp Ala Lys Arg Gly Arg Ala Ile Thr Arg Glu
370                 375                 380
Asp Met Leu Ser Asp Val Val Phe Cys Lys Arg His Asn Ile Asn Ala
385                 390                 395                 400
Ile Arg Thr Ser His Tyr Pro Asn Gln Glu Tyr Trp Tyr Asp Leu Cys
                405                 410                 415
Asp Glu Tyr Gly Leu Tyr Leu Ile Asp Glu Thr Asn Met Glu Thr His
                420                 425                 430
Gly Thr Trp Val Ala Asn Asn Val Glu Arg Pro Glu Asp Gly Ile Pro
                435                 440                 445
Gly Ser Arg Pro Glu Trp Glu Gly Ala Cys Val Asp Arg Ile Asn Ser
                450                 455                 460
Met Met Arg Arg Asp Tyr Asn His Pro Ser Val Leu Ile Trp Ser Leu
465                 470                 475                 480
Gly Asn Glu Ser Ser Ala Gly Glu Val Phe Arg Ala Met Tyr Arg His
                485                 490                 495
Ala His Thr Ile Asp Pro Asn Arg Pro Val His Tyr Glu Gly Ser Val
                500                 505                 510
His Met Arg Glu Phe Glu Asp Val Thr Asp Ile Glu Ser Arg Met Tyr
                515                 520                 525
Ala His Ala Asp Glu Ile Glu Arg Tyr Leu Asn Asp Gly Ser Pro Ala
                530                 535                 540
His Thr Asp Gly Pro Lys Lys Pro Tyr Ile Ser Cys Glu Tyr Met His
545                 550                 555                 560
Ala Met Gly Asn Ser Cys Gly Asn Met Asp Glu Tyr Thr Ala Leu Glu
                565                 570                 575
Arg Tyr Pro Met Tyr Gln Gly Gly Phe Ile Trp Asp Phe Ile Asp Gln
                580                 585                 590
Ala Ile Glu Thr Lys Leu Pro Asp Gly Thr Thr Arg Met Cys Tyr Gly
                595                 600                 605
Gly Asp Phe Gly Asp Arg Pro Ser Asp Tyr Glu Phe Ser Gly Asp Gly
                610                 615                 620
```

```
Leu Leu Phe Ala Asp Arg Thr Pro Ser Pro Lys Ala Gln Glu Val Lys
625                 630                 635                 640

Gln Leu Tyr Ala Asn Val Lys Ile Val Val Ser Val Asp Glu Ala Arg
            645                 650                 655

Ile Thr Asn Asp Asn Leu Phe Val Ser Thr Gly Asp Tyr Arg Phe Val
            660                 665                 670

Leu Arg Ile Leu Ala Asp Gly Lys Pro Val Trp Ser Thr Thr Arg Arg
            675                 680                 685

Phe Asp Val Ala Ala Gly Glu Ser Ala Ser Phe Glu Val Asp Trp Pro
        690                 695                 700

Val Asp Asp Tyr Arg Ser Asn Ala Glu Glu Leu Val Leu Glu Val Ser
705                 710                 715                 720

Gln Gln Leu Gly Asn Ala Cys Asp Trp Ala Pro Ala Gly Tyr Glu Leu
                725                 730                 735

Ala Phe Gly Gln Cys Val Val Ala Gly Ala Lys Thr Thr Ala Asp Ala
            740                 745                 750

Val Asp Ala Ala Gly Ala Pro Ala Asp Gly Thr Val Thr Leu Gly Arg
            755                 760                 765

Trp Asn Ala Gly Val Arg Gly Gln Gly Arg Glu Ala Leu Phe Ser Arg
770                 775                 780

Thr Gln Gly Gly Met Val Ser Tyr Thr Phe Gly Glu Arg Glu Phe Val
785                 790                 795                 800

Leu Arg Arg Pro Ser Ile Thr Thr Phe Arg Pro Leu Thr Asp Asn Asp
                805                 810                 815

Arg Gly Ala Gly His Ala Phe Glu Arg Ala Ala Trp Ala Val Ala Gly
            820                 825                 830

Lys Tyr Ala Arg Cys Val Asp Cys Ala Ile Ala Asn Arg Gly Glu Asn
            835                 840                 845

Ala Val Glu Ala Thr Tyr Thr Tyr Glu Leu Ala Ile Pro Gln Arg Thr
850                 855                 860

Lys Val Thr Val Arg Tyr Val Ala Asp Thr Ala Gly Leu Val Ser Leu
865                 870                 875                 880

Asp Val Glu Tyr Pro Gly Glu Lys Asn Gly Asp Leu Pro Thr Ile Pro
                885                 890                 895

Ala Phe Gly Ile Glu Trp Ala Leu Pro Val Glu Tyr Ala Asn Leu Arg
            900                 905                 910

Phe Tyr Gly Ala Gly Pro Glu Glu Thr Tyr Ala Asp Arg Arg His Ala
            915                 920                 925

Lys Leu Gly Val Trp Ser Thr Thr Ala Gly Asp Asp Cys Ala Pro Tyr
            930                 935                 940

Leu Leu Pro Gln Glu Thr Gly Asn His Glu Asp Val Arg Trp Ala Glu
945                 950                 955                 960

Ile Thr Asp Asp Ser Gly His Gly Val Arg Val Lys Arg Gly Ala Gly
                965                 970                 975

Ala Lys Pro Phe Ala Met Ser Leu Leu Pro Tyr Ser Ser Thr Met Leu
            980                 985                 990

Glu Glu Ala Leu His Gln Asp Glu Leu Pro Lys Pro Arg His Met Phe
            995                 1000                1005

Leu Arg Leu Leu Ala Ala Gln Met Gly Val Gly Gly Asp Asp Ser Trp
    1010                1015                1020

Met Ser Pro Val His Glu Gln Tyr Gln Leu Pro Ala Asp Gln Pro Leu
1025                1030                1035                1040
```

```
Ser Leu Asn Val Gln Leu Lys Leu Phe
                1045
```

```
<210> SEQ ID NO 2
<211> LENGTH: 625
<212> TYPE: PRT
<213> ORGANISM: Lactobacillus sakei

<400> SEQUENCE: 2

Met Gln Pro Asn Ile Gln Trp Leu Asp Thr Pro Ala Val Phe Arg Val
1               5                   10                  15

Gly Gln Leu Pro Ala His Ser Asp His Arg Tyr Tyr Ala Thr Leu Ala
            20                  25                  30

Glu Met Ala Gln Gln Ser Ser Phe Glu Gln Ser Leu Asn Gly Thr
        35                  40                  45

Trp Gln Phe His Tyr Ser Val Asn Ala Ala Ser Arg Pro Lys Ser Phe
    50                  55                  60

Tyr Glu Leu Ala Phe Asp Ala Gln Asp Phe Glu Pro Ile Thr Val Pro
65                  70                  75                  80

Gln His Ile Glu Leu Ala Gly Tyr Glu Gln Leu His Tyr Ile Asn Thr
                85                  90                  95

Met Tyr Pro Trp Glu Gly His Tyr Tyr Arg Arg Pro Ala Phe Ser Thr
            100                 105                 110

Ser Asp Asp Lys Gln His Leu Gly Met Phe Ser Glu Ala Asp Tyr Asn
        115                 120                 125

Pro Val Gly Ser Tyr Leu His His Phe Asp Leu Thr Pro Ala Leu Arg
    130                 135                 140

Asn Gln Arg Val Ile Ile Arg Phe Glu Gly Val Gln Ala Met Tyr
145                 150                 155                 160

Val Trp Leu Asn Gly Gln Phe Ile Gly Tyr Ala Glu Asp Ser Phe Thr
                165                 170                 175

Pro Ser Glu Phe Asp Leu Thr Pro Tyr Leu Lys Glu Thr Asp Asn Cys
            180                 185                 190

Leu Ala Val Glu Val His Lys Arg Ser Ser Ala Ala Phe Ile Glu Asp
        195                 200                 205

Gln Asp Phe Phe Arg Phe Phe Gly Ile Phe Arg Asp Val Lys Leu Leu
    210                 215                 220

Ala Lys Pro Arg Thr His Leu Glu Asp Leu Trp Val Ile Pro Glu Tyr
225                 230                 235                 240

Asp Val Val Gln Gln Thr Gly Gln Val Lys Leu Arg Leu Gln Phe Ser
                245                 250                 255

Gly Asp Glu Asn Arg Val His Leu Arg Ile Arg Asp Gln His Gln Ile
            260                 265                 270

Ile Leu Thr Ala Asp Leu Thr Ser Ala Ala Gln Val Asn Gly Leu Tyr
        275                 280                 285

Lys Met Pro Glu Leu Val Gln Ala Trp Ser Asn Gln Thr Pro Asn Leu
    290                 295                 300

Tyr Thr Leu Glu Leu Glu Val Val Asp Gln Ala Gly Glu Thr Ile Glu
305                 310                 315                 320

Ile Ser Gln Gln Pro Phe Gly Phe Arg Lys Ile Glu Ile Lys Asp Lys
                325                 330                 335

Val Met Leu Leu Asn Gly Lys Arg Leu Val Ile Asn Gly Val Asn Arg
            340                 345                 350

His Glu Trp His Pro Glu Thr Gly Arg Thr Ile Thr Ala Glu Asp Glu
        355                 360                 365
```

```
Ala Trp Asp Ile Ala Cys Met Gln Arg Asn His Ile Asn Ala Val Arg
        370                 375                 380

Thr Ser His Tyr Pro Asp Arg Leu Ser Phe Tyr Asn Gly Cys Asp Gln
385                 390                 395                 400

Ala Gly Ile Tyr Met Met Ala Glu Thr Asn Leu Glu Ser His Gly Ser
                405                 410                 415

Trp Gln Lys Met Gly Ala Val Glu Pro Ser Trp Asn Val Pro Gly Ser
                420                 425                 430

Tyr Asp Glu Trp Glu Ala Ala Thr Leu Asp Arg Ala Arg Thr Asn Phe
            435                 440                 445

Glu Thr Phe Lys Asn His Val Ser Ile Leu Phe Trp Ser Leu Gly Asn
450                 455                 460

Glu Ser Tyr Ala Gly Ser Val Leu Glu Lys Met Asn Ala Tyr Tyr Lys
465                 470                 475                 480

Gln Gln Asp Pro Thr Arg Leu Val His Tyr Glu Gly Val Phe Arg Ala
                485                 490                 495

Pro Glu Tyr Lys Ala Thr Ile Ser Asp Val Glu Ser Arg Met Tyr Ala
                500                 505                 510

Thr Pro Ala Glu Ile Lys Ala Tyr Leu Asp Asn Ala Pro Gln Lys Pro
            515                 520                 525

Phe Ile Leu Cys Glu Tyr Met His Asp Met Gly Asn Ser Leu Gly Gly
530                 535                 540

Met Gln Ser Tyr Ile Asp Leu Leu Ser Gln Tyr Asp Met Tyr Gln Gly
545                 550                 555                 560

Gly Phe Ile Trp Asp Phe Ile Asp Gln Ala Leu Leu Val Thr Asp Pro
                565                 570                 575

Val Thr Gly Gln Arg Glu Leu Arg Tyr Gly Gly Asp Phe Asp Asp Arg
            580                 585                 590

Pro Ser Asp Tyr Glu Phe Ser Gly Asp Gly Leu Val Phe Ala Thr Arg
            595                 600                 605

Asp Glu Lys Pro Ala Met Gln Glu Val Arg Tyr Tyr Gly Glu His
            610                 615                 620

Lys
625

<210> SEQ ID NO 3
<211> LENGTH: 330
<212> TYPE: PRT
<213> ORGANISM: Lactobacillus sakei

<400> SEQUENCE: 3

Met Lys Asn Gln Gln Cys Arg Arg Leu Asp Thr Ile Met Ala Asn Thr
1               5                   10                  15

Asn Lys Arg Leu Ala Val Ile Phe Gly Asp Val Thr Leu Gly Leu Lys
            20                  25                  30

Gly Pro Asp Phe His Tyr Leu Phe Ser Tyr Gln Thr Gly Gly Pro Glu
        35                  40                  45

Ser Leu Arg Ile Gln Gly Lys Glu Trp Leu Tyr Arg Ser Pro Lys Pro
    50                  55                  60

Thr Phe Trp Arg Ala Thr Thr Asp Asn Asp Arg Gly Asn Gln Phe Pro
65                  70                  75                  80

Leu Lys Ser Gly Met Trp Leu Ala Ala Asp Gln Phe Ile Ala Cys Gln
                85                  90                  95

Ser Ile Thr Val Ala Ile Asp Gly Gln Thr Ile Pro Leu Pro Ile Ala
```

-continued

```
                100                 105                 110
Pro Glu Asn Asn Arg Tyr Ser Gly Gln Glu Thr Ala Gln Glu Val Thr
            115                 120                 125

Val Thr Tyr Thr Tyr Gln Thr Ile Thr Thr Pro Gln Thr Thr Val Glu
130                 135                 140

Val Ser Tyr Thr Ile Gln Ala Ser Gly Lys Ile Arg Val Ala Val Thr
145                 150                 155                 160

Tyr His Gly Gln Ala Gly Leu Pro Ser Leu Pro Val Phe Gly Leu Arg
                165                 170                 175

Phe Val Met Pro Thr Pro Ala Thr Arg Phe Ile Tyr Gln Gly Leu Ser
            180                 185                 190

Gly Glu Thr Tyr Pro Asp Arg Met Ala Gly Met Ala Gly Glu Tyr
            195                 200                 205

Glu Val Thr Gly Leu Pro Val Thr Pro Tyr Leu Val Pro Gln Asp Cys
210                 215                 220

Gly Val His Met Ala Thr Asp Trp Val Thr Ile Tyr Arg Gln Ala Val
225                 230                 235                 240

Leu Asp Asn Arg Leu Arg Glu Pro Val Glu Thr Gly Leu Lys Phe Lys
                245                 250                 255

Met Val Asp Gln Pro Phe Ala Phe Ser Cys Leu Pro Tyr Thr Ala Glu
            260                 265                 270

Glu Leu Glu Asn Ala Thr His His Ser Glu Leu Pro Ala Pro His Arg
            275                 280                 285

Thr Val Leu Ser Leu Leu Gly Ala Val Arg Gly Val Gly Gly Ile Asp
            290                 295                 300

Ser Trp Gly Ser Asp Val Glu Ala Ala Tyr Gln Ile Asp Ala Thr Gln
305                 310                 315                 320

Asp His His Leu Glu Phe Glu Ile Ser Phe
                325                 330
```

<210> SEQ ID NO 4
<211> LENGTH: 1049
<212> TYPE: PRT
<213> ORGANISM: Bifidobacterium adolescentis

<400> SEQUENCE: 4

```
Met Ala Asp Thr Ala Glu Leu Ala Ile Val His Ala Thr Thr Ala Ser
1               5                   10                  15

Ala Ser Trp Leu Thr Asp Pro Thr Val Phe Ala Ala Asn Arg Lys Pro
            20                  25                  30

Ala His Ser Ser His Arg Tyr Val Ile Gly Glu Thr Ser Glu Pro Lys
        35                  40                  45

Gln Ser Leu Asp Gly Glu Trp Lys Val Arg Ile Glu Gln Ala Arg Asn
    50                  55                  60

Val Asp Val Glu Ser Ala Pro Phe Ala Ala Val Asp Phe Glu Asp Gly
65                  70                  75                  80

Asp Phe Gly Ala Ile Glu Val Pro Gly His Leu Gln Met Ala Gly Tyr
                85                  90                  95

Leu Lys Asn Lys Tyr Val Asn Ile Gln Tyr Pro Trp Asp Gly His Glu
            100                 105                 110

Asp Pro Gln Ala Pro Asn Ile Pro Glu Asn Asn His Val Ala Ile Tyr
        115                 120                 125

Arg Arg Arg Phe Ala Leu Asp Ala Gln Leu Ala Arg Thr Leu Glu Asn
    130                 135                 140
```

-continued

```
Asp Gly Thr Val Ser Leu Thr Phe His Gly Ala Thr Ala Ile Tyr
145                 150                 155                 160

Val Trp Leu Asp Gly Thr Phe Val Gly Tyr Gly Glu Asp Gly Phe Thr
                165                 170                 175

Pro Ser Glu Phe Asp Val Thr Glu Ala Leu Arg Asn Gly Asn Gly Asn
            180                 185                 190

Ala Ala Asp Ser Pro Glu Ala Glu His Thr Leu Thr Val Ala Cys Tyr
        195                 200                 205

Glu Tyr Ser Ser Ala Ser Trp Leu Glu Asp Gln Asp Phe Trp Arg Leu
    210                 215                 220

His Gly Leu Phe Arg Thr Val Glu Leu Ala Ala Gln Pro His Thr His
225                 230                 235                 240

Val Glu Thr Val Gln Leu Glu Ala Asp Tyr Thr Ala Ala Asp Thr Ala
                245                 250                 255

Gly Thr Ala Asp Thr Ala Glu Leu Asn Ala Ala Leu Thr Leu Arg Asn
                260                 265                 270

Pro Ala Asp Ala Met Thr Ile Glu Ser Thr Leu Arg Asp Gly Asp Gly
            275                 280                 285

Asn Val Val Trp Glu Ser Thr Gln Ala Cys Asn Gly Glu Ile Ala Leu
290                 295                 300

Asn Ser Gly Lys Met Thr Asn Ile Ala Pro Trp Ser Ala Glu Ser Pro
305                 310                 315                 320

Thr Leu Tyr Thr Leu Thr Val Arg Val Val Gly His Asp Gly Ala Ile
                325                 330                 335

Ile Glu Thr Val Thr Gln Lys Ile Gly Phe Arg Thr Phe Arg Ile Glu
                340                 345                 350

Asn Gly Ile Met Thr Leu Asn Gly Lys Arg Ile Val Phe Lys Gly Ala
                355                 360                 365

Asp Arg His Glu Phe Asp Ala Lys Arg Gly Arg Ala Ile Thr Arg Glu
            370                 375                 380

Asp Met Leu Ser Asp Val Val Phe Cys Lys Arg His Asn Ile Asn Ala
385                 390                 395                 400

Ile Arg Thr Ser His Tyr Pro Asn Gln Glu Tyr Trp Tyr Asp Leu Cys
                405                 410                 415

Asp Glu Tyr Gly Leu Tyr Leu Ile Asp Glu Thr Asn Met Glu Thr His
            420                 425                 430

Gly Thr Trp Val Ala Asn Asn Val Glu Arg Pro Glu Asp Gly Ile Pro
        435                 440                 445

Gly Ser Arg Pro Glu Trp Glu Gly Ala Cys Val Asp Arg Ile Asn Ser
    450                 455                 460

Met Met Arg Arg Asp Tyr Asn His Pro Ser Val Leu Ile Trp Ser Leu
465                 470                 475                 480

Gly Asn Glu Ser Ser Ala Gly Glu Val Phe Arg Ala Met Tyr Arg His
                485                 490                 495

Ala His Thr Ile Asp Pro Asn Arg Pro Val His Tyr Glu Gly Ser Val
                500                 505                 510

His Met Arg Glu Phe Glu Asp Val Thr Asp Ile Glu Ser Arg Met Tyr
            515                 520                 525

Ala His Ala Asp Glu Ile Glu Arg Tyr Leu Asn Asp Gly Ser Pro Ala
        530                 535                 540

His Thr Asp Gly Pro Lys Lys Pro Tyr Ile Ser Cys Glu Tyr Met His
545                 550                 555                 560

Ala Met Gly Asn Ser Cys Gly Asn Met Asp Glu Tyr Thr Ala Leu Glu
```

```
            565                 570                 575
Arg Tyr Pro Met Tyr Gln Gly Gly Phe Ile Trp Asp Phe Ile Asp Gln
            580                 585                 590

Ala Ile Glu Thr Lys Leu Pro Asp Gly Thr Thr Arg Met Cys Tyr Gly
            595                 600                 605

Gly Asp Phe Gly Asp Arg Pro Ser Asp Tyr Glu Phe Ser Gly Asp Gly
            610                 615                 620

Leu Leu Phe Ala Asp Arg Thr Pro Ser Pro Lys Ala Gln Glu Val Lys
625                 630                 635                 640

Gln Leu Tyr Ala Asn Val Lys Ile Ala Val Ser Val Asp Glu Ala Arg
            645                 650                 655

Ile Thr Asn Asp Asn Leu Phe Val Ser Thr Gly Asp Tyr Arg Phe Val
            660                 665                 670

Leu Arg Ile Leu Ala Asp Gly Lys Pro Val Trp Ser Thr Thr Arg Arg
            675                 680                 685

Phe Asp Val Ala Ala Gly Glu Ser Ala Ser Phe Glu Val Asp Trp Pro
            690                 695                 700

Val Asp Tyr Arg Ser Asn Ala Glu Glu Leu Val Leu Glu Val Ser
705                 710                 715                 720

Gln Gln Leu Gly Asn Ala Cys Asp Trp Ala Pro Ala Gly Tyr Glu Leu
            725                 730                 735

Ala Phe Gly Gln Cys Val Val Ala Gly Lys Thr Thr Ala Asp Ala
            740                 745                 750

Val Asp Ala Ala Gly Ala Pro Ala Asp Gly Thr Val Thr Leu Gly Arg
            755                 760                 765

Trp Asn Ala Gly Val Arg Gly Gln Gly Arg Glu Ala Leu Phe Ser Arg
770                 775                 780

Thr Gln Gly Gly Met Val Ser Tyr Thr Phe Gly Glu Arg Glu Phe Val
785                 790                 795                 800

Leu Arg Arg Pro Ser Ile Thr Thr Phe Arg Pro Leu Thr Asp Asn Asp
            805                 810                 815

Arg Gly Ala Gly His Ala Phe Glu Arg Ala Ala Trp Ala Val Ala Gly
            820                 825                 830

Lys Tyr Ala Arg Cys Val Asp Cys Ala Ile Ala Asn Arg Gly Glu Asn
            835                 840                 845

Ala Val Glu Ala Thr Tyr Thr Tyr Glu Leu Ala Ile Pro Gln Arg Thr
850                 855                 860

Lys Val Thr Val Arg Tyr Val Ala Asp Thr Ala Gly Leu Val Ser Leu
865                 870                 875                 880

Asp Val Glu Tyr Pro Gly Glu Lys Asn Gly Asp Leu Pro Thr Ile Pro
            885                 890                 895

Ala Phe Gly Ile Glu Trp Ala Leu Pro Val Glu Tyr Ala Asn Leu Arg
            900                 905                 910

Phe Tyr Gly Ala Gly Pro Glu Glu Thr Tyr Ala Asp Arg Arg His Ala
            915                 920                 925

Lys Leu Gly Val Trp Ser Thr Thr Ala Gly Asp Asp Cys Ala Pro Tyr
            930                 935                 940

Leu Leu Pro Gln Glu Thr Gly Asn His Glu Asp Val Arg Trp Ala Glu
945                 950                 955                 960

Ile Thr Asp Asp Ser Gly His Gly Val Arg Val Lys Arg Gly Ala Gly
            965                 970                 975

Ala Lys Pro Phe Ala Met Ser Leu Leu Pro Tyr Ser Ser Thr Met Leu
            980                 985                 990
```

```
Glu Glu Ala Leu His Gln Asp Glu Leu Pro Lys Pro Arg His Met Phe
        995                 1000                1005

Leu Arg Leu Leu Ala Ala Gln Met Gly Val Gly Gly Asp Asp Ser Trp
    1010                1015                1020

Met Ser Pro Val His Glu Gln Tyr Gln Leu Pro Ala Asp Gln Pro Leu
1025                1030                1035                1040

Ser Leu Asn Val Gln Leu Lys Leu Phe
                1045

<210> SEQ ID NO 5
<211> LENGTH: 626
<212> TYPE: PRT
<213> ORGANISM: Lactobacillus amylovorus

<400> SEQUENCE: 5

Met Lys Ala Asn Ile Lys Trp Leu Asp Asp Pro Glu Val Phe Arg Ile
1               5                   10                  15

Asn Gln Leu Pro Ala His Ser Asp His Pro Phe Tyr Lys Asp Tyr Arg
                20                  25                  30

Glu Trp Gln Asn His Ser Ser Ser Phe Lys Gln Ser Leu Asn Gly Ala
            35                  40                  45

Trp Gln Phe His Phe Ser Lys Asp Pro Gln Ser Arg Pro Ile Asp Phe
    50                  55                  60

Tyr Lys Arg Ser Phe Asp Ser Ser Ser Phe Asp Thr Ile Pro Val Pro
65                  70                  75                  80

Ser Glu Ile Glu Leu Asn Gly Tyr Ala Gln Asn Gln Tyr Thr Asn Ile
                85                  90                  95

Leu Tyr Pro Trp Glu Ser Lys Ile Tyr Arg Lys Pro Ala Tyr Thr Leu
            100                 105                 110

Gly Arg Gly Ile Lys Asp Gly Asp Phe Ser Gln Gly Lys Asp Asn Thr
    115                 120                 125

Val Gly Ser Tyr Leu Lys His Phe Asp Leu Asn Pro Ala Leu Ala Gly
    130                 135                 140

His Asp Ile His Ile Gln Phe Glu Gly Val Glu Arg Ala Met Tyr Val
145                 150                 155                 160

Tyr Leu Asn Gly His Phe Ile Gly Tyr Ala Glu Asp Ser Phe Thr Pro
                165                 170                 175

Ser Glu Phe Asp Leu Thr Pro Tyr Ile Gln Ala Lys Asp Asn Ile Leu
            180                 185                 190

Ala Val Glu Val Phe Lys His Ser Thr Ala Ser Trp Leu Glu Asp Gln
    195                 200                 205

Asp Met Phe Arg Phe Ser Gly Ile Phe Arg Ser Val Glu Leu Leu Ala
    210                 215                 220

Leu Pro Arg Thr His Leu Met Asp Leu Asp Ile Lys Pro Thr Val Val
225                 230                 235                 240

Asn Asp Tyr His Asp Gly Val Phe Asn Ala Lys Leu His Phe Met Gly
                245                 250                 255

Lys Thr Ser Gly Asn Val His Val Leu Ile Glu Asp Ile Asp Gly Lys
            260                 265                 270

Thr Leu Leu Asn Lys Lys Leu Pro Leu Lys Ser Thr Val Glu Ile Glu
    275                 280                 285

Asn Glu Thr Phe Ala Asn Val His Leu Trp Asp Asn His Asp Pro Tyr
290                 295                 300

Leu Tyr Gln Leu Ile Ile Glu Val His Asp Gln Asp Gly Lys Leu Val
```

```
            305                 310                 315                 320
Glu Leu Ile Pro Tyr Gln Phe Gly Phe Arg Lys Ile Glu Ile Thr Lys
                325                 330                 335

Asp His Val Val Leu Asn Gly Lys Arg Leu Ile Ile Asn Gly Val
            340                 345                 350

Asn Arg His Glu Trp Asp Ala Lys Arg Gly Arg Ser Ile Thr Leu Ala
                355                 360                 365

Asp Met Lys Gln Asp Ile Ala Thr Phe Lys His Asn Asn Ile Asn Ala
        370                 375                 380

Val Arg Thr Cys His Tyr Pro Asn Gln Ile Pro Trp Tyr Tyr Leu Cys
385                 390                 395                 400

Asp Gln Asn Gly Ile Tyr Met Met Ala Glu Asn Asn Leu Glu Ser His
                405                 410                 415

Gly Thr Trp Gln Lys Leu Gly Gln Val Glu Ala Thr Ser Asn Val Pro
                420                 425                 430

Gly Ser Ile Pro Glu Trp Arg Glu Val Val Asp Arg Ala Arg Ser
            435                 440                 445

Asn Tyr Glu Thr Phe Lys Asn His Thr Ala Ile Leu Phe Trp Ser Leu
    450                 455                 460

Gly Asn Glu Ser Tyr Ala Gly Ser Asn Ile Ala Ala Met Asn Lys Leu
465                 470                 475                 480

Tyr Lys Asp His Asp Ser Ser Arg Leu Thr His Tyr Glu Gly Val Phe
                485                 490                 495

His Ala Pro Glu Phe Lys Lys Glu Ile Ser Asp Leu Glu Ser Cys Met
                500                 505                 510

Tyr Leu Pro Pro Lys Glu Ala Glu Glu Tyr Leu Gln Asn Pro Lys Lys
            515                 520                 525

Pro Leu Val Glu Cys Glu Tyr Met His Asp Met Gly Thr Pro Asp Gly
        530                 535                 540

Gly Met Gly Ser Tyr Ile Lys Leu Ile Asp Lys Tyr Pro Gln Tyr Met
545                 550                 555                 560

Gly Gly Phe Ile Trp Asp Phe Ile Asp Gln Ala Leu Leu Val His Asp
                565                 570                 575

Pro Val Ser Gly Gln Asp Val Leu Arg Tyr Gly Gly Asp Phe Asp Asp
            580                 585                 590

Arg His Ser Asp Tyr Glu Phe Ser Gly Asp Gly Leu Met Phe Ala Asp
        595                 600                 605

Arg Thr Pro Lys Pro Ala Met Gln Glu Val Arg Tyr Tyr Tyr Gly Leu
    610                 615                 620

His Lys
625

<210> SEQ ID NO 6
<211> LENGTH: 316
<212> TYPE: PRT
<213> ORGANISM: Lactobacillus amylovorus

<400> SEQUENCE: 6

Met Ala Tyr Thr Asn Asn Leu His Val Val Tyr Gly Glu Ala Ser Leu
1               5                   10                  15

Gly Val Asn Gly Gln Asp Phe Ala Tyr Leu Phe Ser Tyr Glu Arg Gly
            20                  25                  30

Gly Leu Glu Ser Leu Lys Ile Lys Asp Lys Glu Trp Leu Tyr Arg Thr
        35                  40                  45
```

```
Pro Thr Pro Thr Phe Trp Arg Ala Thr Thr Asp Asn Asp Arg Gly Ser
    50                  55                  60

Gly Phe Asn Gln Lys Ala Ala Gln Trp Leu Gly Ala Asp Met Phe Thr
 65                  70                  75                  80

Lys Cys Val Gly Ile His Val Gln Val Asp Asp His Arg Phe Asp Glu
                 85                  90                  95

Leu Pro Val Ala Pro Ile Asn Asn Gln Phe Ser Asn Gln Glu Phe Ala
                100                 105                 110

His Glu Val Lys Val Ala Phe Asp Tyr Glu Thr Leu Thr Thr Pro Ala
                115                 120                 125

Thr Lys Val Lys Ile Ile Tyr Asn Ile Asn Asp Phe Gly His Met Thr
    130                 135                 140

Ile Thr Met His Tyr Phe Gly Lys Lys Gly Leu Pro Pro Leu Pro Val
145                 150                 155                 160

Ile Gly Met Arg Phe Ile Met Pro Thr Lys Ala Lys Ser Phe Asp Tyr
                165                 170                 175

Thr Gly Leu Ser Gly Glu Thr Tyr Pro Asp Arg Met Ala Gly Ala Glu
                180                 185                 190

Arg Gly Thr Phe His Ile Asp Gly Leu Pro Val Thr Lys Tyr Leu Val
                195                 200                 205

Pro Gln Glu Asn Gly Met His Met Gln Thr Asn Glu Leu Val Ile Thr
    210                 215                 220

Arg Asn Ser Thr Gln Asn Ala Asp Lys Asp Gly Asp Phe Ser Leu
225                 230                 235                 240

Lys Ile Thr Gln Thr Lys Gln Pro Phe Asn Phe Ser Leu Leu Pro Tyr
                245                 250                 255

Thr Ala Glu Glu Leu Glu Asn Ala Thr His Ile Glu Glu Leu Pro Leu
                260                 265                 270

Ala Arg Arg Ser Val Leu Val Ile Ala Gly Ala Val Arg Gly Val Gly
            275                 280                 285

Gly Ile Asp Ser Trp Gly Ser Asp Val Glu Glu Gln Tyr His Ile Asp
    290                 295                 300

Pro Glu Gln Asp His Glu Phe Ser Phe Thr Leu Asn
305                 310                 315

<210> SEQ ID NO 7
<211> LENGTH: 1052
<212> TYPE: PRT
<213> ORGANISM: Bifidobacterium bifidum

<400> SEQUENCE: 7

Met Asn Thr Thr Asp Asp Gln Arg Lys Asn Gly Asp Pro Ile Val Ser
 1               5                  10                  15

Pro Ser Ile Pro Thr Thr Ala Trp Leu Ala Asp Pro Arg Val Tyr Ala
                20                  25                  30

Val His Arg Leu Asp Ala His Ser Asp His Ala Cys Trp Ser Arg Ser
                35                  40                  45

Pro Val Asp Gly Glu Ser Thr Asp Leu Arg Gln Ser Leu Asp Gly Glu
    50                  55                  60

Trp Arg Val Arg Val Glu Thr Ala Pro Thr Gly Arg Phe Pro Asp Gly
 65                  70                  75                  80

Thr Ser Asp Gly Pro Asp Trp Ile Ser Asp Val Ser Pro Leu Phe Ala
                 85                  90                  95

Ala Pro Gly Phe Asp Asp Ser Ser Phe Ser Arg Val Gln Val Pro Ser
                100                 105                 110
```

```
His Leu Glu Thr Ala Gly Leu Leu Ala Pro Gln Tyr Val Asn Val Gln
        115                 120                 125

Tyr Pro Trp Asp Gly His Glu Asp Pro Lys Ala Pro Ala Ile Pro Glu
130                 135                 140

His Gly His Val Ala Val Tyr Arg Arg Glu Phe Asp Ala Asp Gly Glu
145                 150                 155                 160

Val Ala Gln Ala Val Arg Glu Gly Arg Pro Val Thr Leu Thr Phe Gln
                165                 170                 175

Gly Ala Ala Thr Ala Ile Tyr Val Trp Leu Asn Gly Ser Phe Ile Gly
            180                 185                 190

Tyr Ala Glu Asp Ser Phe Thr Pro Ser Glu Phe Asp Val Thr Asp Ala
        195                 200                 205

Ile Lys Val Asp Gly Asn Val Leu Ala Val Ala Cys Tyr Glu Tyr Ser
    210                 215                 220

Ser Ala Ser Trp Leu Glu Asp Gln Asp Phe Trp Arg Leu His Gly Leu
225                 230                 235                 240

Phe Arg Ser Val Glu Leu Asn Ala Arg Pro Ala Ala His Val Ala Asp
                245                 250                 255

Leu His Ala Asp Ala Asp Trp Asp Leu Ala Thr Ser Arg Gly Ser Leu
            260                 265                 270

Ser Leu Asp Val Leu Ile Asp Gly Ala Ala Asn Ala Ala Thr Ala Asp
        275                 280                 285

Phe Ala Leu Arg Asp Lys Asn Gly Thr Ile Val Trp Arg Thr Ala Thr
    290                 295                 300

Lys Ala Asp Gly Thr Leu His Ala Glu Ala Ile Asp Ala Ala
305                 310                 315                 320

Pro Trp Ser Ala Glu Arg Pro Asp Leu Tyr Glu Leu Ser Val Thr Leu
                325                 330                 335

Leu Asp Ala Asp Gly Lys Val Leu Glu Thr Ala Arg Thr Arg Ile Gly
            340                 345                 350

Phe Arg His Val Ala Ile Glu Asp Gly Ile Leu Lys Leu Asn Gly Lys
        355                 360                 365

Arg Leu Val Phe Arg Gly Val Asn Arg His Glu Phe Asp Cys Arg Arg
    370                 375                 380

Gly Arg Ala Ile Thr Glu Glu Asp Met Leu Trp Asp Ile Arg Phe Met
385                 390                 395                 400

Lys Arg His Asn Ile Asn Ala Val Arg Thr Ser His Tyr Pro Asn Gln
                405                 410                 415

Ser Arg Trp Tyr Glu Leu Cys Asp Glu Tyr Gly Ile Tyr Leu Ile Asp
            420                 425                 430

Glu Thr Asn Leu Glu Thr His Gly Ser Trp Asn Ser Pro Gly Asp Ile
        435                 440                 445

Pro Val Gly Thr Ser Val Pro Gly Asp Asp Glu Ala Trp Leu Gly Ala
    450                 455                 460

Cys Ile Asp Arg Leu Asp Ser Met Ile Leu Arg Asp Arg Asn His Pro
465                 470                 475                 480

Ser Val Leu Val Trp Ser Leu Gly Asn Glu Ser Tyr Ala Gly Glu Val
                485                 490                 495

Leu Lys Ala Met Ser Ala His Ala His Gln Leu Asp Pro Gly Arg Pro
            500                 505                 510

Val His Tyr Glu Gly Val Asn Trp Asn His Ala Tyr Asp Gly Ile Ser
        515                 520                 525
```

-continued

```
Asp Phe Glu Ser Arg Met Tyr Ala Lys Pro Ala Glu Ile Gln Asp Trp
            530                 535                 540

Leu Glu His Gly Asp Glu Arg Gly Glu Ala Ser Lys Pro Phe Val Ser
545                 550                 555                 560

Cys Glu Tyr Met His Ala Met Gly Asn Ser Cys Gly Gly Leu Ser Glu
                565                 570                 575

Phe Ile Asp Leu Glu Arg Tyr Glu Arg Tyr Ser Gly Gly Phe Ile Trp
            580                 585                 590

Asp Tyr Ile Asp Gln Gly Leu Val Gln Arg Leu Pro Asp Gly Ser Glu
        595                 600                 605

Arg Leu Ser Val Gly Gly Glu Trp Gly Asp Arg Pro Thr Asp Tyr Glu
    610                 615                 620

Phe Val Gly Asn Gly Ile Val Phe Ala Asp Arg Thr Pro Ser Pro Lys
625                 630                 635                 640

Ala Gln Glu Val Lys Gln Leu Tyr Ser Pro Val Lys Leu Ala Pro Asp
                645                 650                 655

Gly His Gly Val Thr Ile Glu Asn Arg Asn Leu Phe Ala Gly Thr Asp
            660                 665                 670

Gly Tyr Val Phe Ala Ala Arg Leu Leu Glu Asp Gly His Glu Ile Trp
        675                 680                 685

His Ala Asp Tyr Arg Phe Asp Val Ala Ala Gly Asp Thr Gln His His
    690                 695                 700

Asp Ile Ala Phe Pro Asp Ile Asp Ala Asp Gly Asp Thr Arg Glu Val
705                 710                 715                 720

Thr Tyr Glu Val Asp Leu Leu Leu Ala Glu Ala Thr Trp Ala Pro
                725                 730                 735

Ala Gly Tyr Glu Leu Ala Phe Gly Gln Leu Thr Gly Thr Leu Asn Pro
            740                 745                 750

Glu Gln Asp Ile Thr Glu Thr Ser His Asp Asp Gly Arg Ala Thr
        755                 760                 765

Arg Thr Leu Ser Arg Trp Asn Ala Gly Ile Arg Arg Asp Asp Glu Glu
    770                 775                 780

Ile Leu Leu Ser Arg Thr Gln Gly Gly Ile Val Ser Trp Lys Arg Asp
785                 790                 795                 800

Asp Arg Glu Met Val Ile Arg Arg Pro Glu Leu Val Thr Phe Arg Pro
                805                 810                 815

Leu Thr Asp Asn Asp Arg Gly Asn His Ser Gly Phe Asp Arg Ala Ala
            820                 825                 830

Trp Phe Ala Ala Gly Arg Tyr Ala Ile Val Thr Glu Thr Lys Ile His
        835                 840                 845

Glu Ser Asp Asp Gly Leu Val Ala Glu Tyr Gln Tyr Glu Leu Ala Asp
    850                 855                 860

Pro Asn His Thr Pro Val Ser Val Thr Tyr His Val Asn Ser Asp Met
865                 870                 875                 880

Arg Met Gln Leu Thr Val Glu Tyr Pro Gly Asn Ala Thr Asp Met Ala
                885                 890                 895

Ser Leu Pro Ala Phe Gly Ile Glu Trp Glu Leu Pro Gly Glu Tyr Asp
            900                 905                 910

Arg Leu Arg Tyr Tyr Gly Pro Gly Pro Glu Glu Thr Tyr Arg Asp Arg
        915                 920                 925

Lys Gln Gly Gly Lys Leu Gly Ile Trp Asp Ala Thr Ala Lys Ala Ser
    930                 935                 940

Met Ala Pro Tyr Leu Met Val Gln Glu Thr Gly Ser His Glu Asp Val
```

```
                    945                 950                 955                 960
        Arg Trp Leu Glu Ala Thr Asp Ile Gln Gly His Gly Leu Arg Val Thr
                        965                 970                 975

Gln Arg Gly Asp Arg His Phe Thr Ala Ser Leu Leu Pro Trp Asn Thr
                        980                 985                 990

Tyr Thr Ile Glu Ala Ala Arg Arg His Glu Asp Leu Pro Lys Pro Arg
                        995                1000                1005

His Asn Tyr Leu Arg Leu Leu Ala Ala Gln Met Gly Val Gly Gly Asp
                       1010                1015                1020

Asp Ser Trp Gly Ala Pro Val His Thr Ala Tyr Gln Leu Pro Ala Gly
                       1025                1030                1035                1040

Arg Pro Leu Thr Leu Asp Val Asn Leu Glu Leu Ile
                       1045                1050

<210> SEQ ID NO 8
<211> LENGTH: 1052
<212> TYPE: PRT
<213> ORGANISM: Bifidobacterium bifidum

<400> SEQUENCE: 8

Met Asn Thr Thr Asp Asp Gln Arg Lys Asn Gly Asp Pro Ile Val Ser
        1               5                   10                  15

Pro Ser Ile Pro Thr Thr Ala Trp Leu Ala Asp Pro Arg Val Tyr Ala
                        20                  25                  30

Val His Arg Leu Asp Ala His Ser Asp His Ala Cys Trp Ser Arg Ser
                        35                  40                  45

Pro Val Asp Gly Glu Ser Thr Asp Leu Arg Gln Ser Leu Asp Gly Glu
            50                  55                  60

Trp Arg Val Arg Val Glu Thr Ala Pro Thr Gly Arg Phe Pro Asp Gly
        65                  70                  75                  80

Thr Ser Asp Gly Pro Asp Trp Ile Ser Asp Val Ser Pro Leu Phe Ala
                        85                  90                  95

Ala Pro Gly Phe Asp Asp Ser Ser Phe Ser Arg Val Gln Val Pro Ser
                        100                 105                 110

His Leu Glu Thr Ala Gly Leu Leu Ala Pro Gln Tyr Val Asn Val Gln
                        115                 120                 125

Tyr Pro Trp Asp Gly His Glu Asp Pro Lys Ala Pro Ala Ile Pro Glu
                        130                 135                 140

His Gly His Val Ala Val Tyr Arg Arg Glu Phe Asp Ala Asp Gly Glu
        145                 150                 155                 160

Val Ala Gln Ala Val Arg Glu Gly Arg Pro Val Thr Leu Thr Phe Gln
                        165                 170                 175

Gly Ala Ala Thr Ala Ile Tyr Val Trp Leu Asn Gly Ser Phe Ile Gly
                        180                 185                 190

Tyr Ala Glu Asp Ser Phe Thr Pro Ser Glu Phe Asp Val Thr Asp Ala
                        195                 200                 205

Ile Lys Val Asp Gly Asn Val Leu Ala Val Ala Cys Tyr Glu Tyr Ser
                        210                 215                 220

Ser Ala Ser Trp Leu Glu Asp Gln Asp Phe Trp Arg Leu His Gly Leu
        225                 230                 235                 240

Phe Arg Ser Val Glu Leu Asn Ala Arg Pro Ala Ala His Val Ala Asp
                        245                 250                 255

Leu His Ala Asp Ala Asp Trp Asp Leu Ala Thr Ser Arg Gly Ser Leu
                        260                 265                 270
```

```
Ser Leu Asp Val Leu Ile Asp Gly Ala Ala Asn Ala Thr Ala Asp
            275                 280                 285

Phe Ala Leu Trp Asp Lys Asn Gly Thr Ile Val Trp His Ile Val Thr
290                 295                 300

Lys Ala Asp Gly Thr Leu His Ala Glu Ala Glu Ile Asp Asp Ala Ala
305                 310                 315                 320

Pro Trp Ser Ala Glu Arg Pro Asp Leu Tyr Glu Leu Ser Val Thr Leu
                325                 330                 335

Leu Asp Ala Asp Gly Lys Val Leu Glu Thr Ala Arg Thr Arg Ile Gly
            340                 345                 350

Phe Arg His Val Ala Ile Glu Asp Gly Ile Leu Lys Leu Asn Gly Lys
        355                 360                 365

Arg Leu Val Phe Arg Gly Val Asn Arg His Glu Phe Asp Cys Arg Arg
370                 375                 380

Gly Arg Ala Ile Thr Glu Glu Asp Met Leu Trp Asp Ile Arg Phe Met
385                 390                 395                 400

Lys Arg His Asn Ile Asn Ala Val Arg Thr Ser His Tyr Pro Asn Gln
                405                 410                 415

Ser Arg Trp Tyr Glu Leu Cys Asp Glu Tyr Gly Ile Tyr Leu Ile Asp
            420                 425                 430

Glu Thr Asn Leu Glu Thr His Gly Ser Trp Asn Ser Pro Gly Asp Ile
        435                 440                 445

Pro Val Gly Thr Ser Val Pro Gly Asp Asp Glu Ala Trp Leu Gly Ala
450                 455                 460

Cys Ile Asp Arg Leu Asp Ser Met Ile Leu Arg Asp Arg Asn His Pro
465                 470                 475                 480

Ser Val Leu Val Trp Ser Leu Gly Asn Glu Ser Tyr Ala Gly Glu Val
                485                 490                 495

Leu Lys Ala Met Ser Ala His Ala His Arg Leu Asp Pro Gly Arg Pro
            500                 505                 510

Val His Tyr Glu Gly Val Asn Trp Asn His Ala Tyr Asp Gly Ile Ser
        515                 520                 525

Asp Phe Glu Ser Arg Met Tyr Ala Lys Pro Ala Glu Ile Gln Asp Trp
530                 535                 540

Leu Glu His Gly Asp Glu Arg Gly Glu Ala Ser Lys Pro Phe Val Ser
545                 550                 555                 560

Cys Glu Tyr Met His Ala Met Gly Asn Ser Cys Gly Gly Leu Ser Glu
                565                 570                 575

Phe Ile Asp Leu Glu Arg Tyr Glu Arg Tyr Ser Gly Gly Phe Ile Trp
            580                 585                 590

Asp Tyr Ile Asp Gln Gly Leu Val Gln Arg Leu Pro Asp Gly Ser Glu
        595                 600                 605

Arg Leu Ser Val Gly Gly Glu Trp Gly Asp Arg Pro Thr Asp Tyr Glu
610                 615                 620

Phe Val Gly Asn Gly Ile Val Phe Ala Asp Arg Thr Pro Ser Pro Lys
625                 630                 635                 640

Ala Gln Glu Val Lys Gln Leu Tyr Ser Pro Val Lys Leu Ala Pro Asp
                645                 650                 655

Gly His Gly Val Thr Ile Glu Asn Arg Asn Leu Phe Ala Gly Thr Asp
            660                 665                 670

Gly Tyr Val Phe Ala Ala Arg Leu Leu Glu Asp Gly His Glu Ile Trp
        675                 680                 685

His Ala Asp Tyr Arg Phe Asp Val Ala Ala Gly Asp Thr Gln His His
```

690             695                 700
Asp Ile Ala Phe Pro Asp Ile Asp Ala Asp Gly Asp Thr Arg Glu Val
705                 710                 715                 720

Thr Tyr Glu Val Asp Leu Leu Leu Ala Glu Ala Thr Trp Ala Pro
                725                 730                 735

Ala Gly Tyr Glu Leu Ala Phe Gly Gln Leu Thr Gly Thr Leu Asn Pro
                740                 745                 750

Glu Gln Asp Ile Thr Glu Thr Ser His Asp Asp Gly Arg Ala Thr
                755                 760                 765

Arg Thr Leu Ser Arg Trp Asn Ala Gly Ile Arg Arg Asp Lys Glu
                770                 775                 780

Ile Leu Leu Ser Arg Thr Gln Gly Gly Ile Val Ser Trp Lys Arg Asp
785                 790                 795                 800

Asp Arg Glu Met Val Ile Arg Arg Pro Glu Leu Val Thr Phe Arg Pro
                805                 810                 815

Leu Thr Asp Asn Asp Arg Gly Asn His Ser Gly Phe Asp Arg Ala Ala
                820                 825                 830

Trp Phe Ala Ala Gly Arg Tyr Ala Ile Val Thr Glu Thr Lys Ile His
                835                 840                 845

Glu Ser Asp Asp Gly Leu Val Ala Glu Tyr Gln Tyr Glu Leu Ala Asp
                850                 855                 860

Pro Asn His Thr Pro Val Ser Val Thr Tyr His Val Asn Ser Asp Met
865                 870                 875                 880

Arg Met Gln Leu Thr Val Glu Tyr Pro Gly Asn Ala Thr Asp Met Ala
                885                 890                 895

Ser Leu Pro Ala Phe Gly Ile Glu Trp Glu Leu Pro Gly Glu Tyr Asp
                900                 905                 910

Arg Leu Arg Tyr Gly Pro Gly Pro Glu Glu Thr Tyr Arg Asp Arg
                915                 920                 925

Lys Gln Gly Gly Lys Leu Gly Ile Trp Asp Ala Thr Ala Lys Ala Ser
                930                 935                 940

Met Ala Pro Tyr Leu Met Val Gln Glu Thr Gly Ser His Glu Asp Val
945                 950                 955                 960

Arg Trp Leu Glu Ala Thr Asp Ile Gln Gly His Gly Leu Arg Val Thr
                965                 970                 975

Gln Arg Gly Asp Arg His Phe Thr Ala Ser Leu Leu Pro Trp Asn Thr
                980                 985                 990

Tyr Met Ile Glu Ala Ala Arg Arg His Glu Asp Leu Pro Glu Pro Arg
                995                 1000                1005

His Asn Tyr Leu Arg Leu Leu Ala Ala Gln Met Gly Val Gly Gly Asp
                1010                1015                1020

Asp Ser Trp Gly Ala Pro Val His Thr Ala Tyr Gln Leu Pro Ala Gly
1025                1030                1035                1040

Arg Pro Leu Thr Leu Asp Val Asn Leu Glu Leu Ile
                1045                1050

<210> SEQ ID NO 9
<211> LENGTH: 1055
<212> TYPE: PRT
<213> ORGANISM: Bifidobacterium breve

<400> SEQUENCE: 9

Met Thr Asn Ser Met Gln Gly Lys Ala Lys Thr Ile Met Thr Asn Leu
1               5                   10                  15

-continued

```
Gln Ser Ala Gln Gln Phe Ser Gln Ala Trp Leu Thr Asp Pro Arg Val
         20                  25                  30
Phe Ala Val Asn Arg Leu Ala Ala His Ser Ser His Lys Phe Tyr Asp
             35                  40                  45
His Ser Pro Gln Cys Gly Glu Ala Met Asp Leu Lys Gln Ser Leu Asp
         50                  55                  60
Gly Gln Trp Arg Val Gln Met Leu Asp Leu Ala Asp Leu Ala Asp Asn
 65                  70                  75                  80
Glu Leu Ala Glu Ala Ala Phe Ala Gln Pro Gly Tyr Asp Ala Ala Gly
                 85                  90                  95
Phe Ser Pro Ile Glu Val Pro Ser Ala Leu Glu Thr Lys Gly Phe Leu
            100                 105                 110
Asn His Gln Tyr Val Asn Gln Gln Tyr Pro Trp Ser Gly His Glu Ser
            115                 120                 125
Pro Val Ala Pro Asp Val Pro Lys His Asn His Val Ala Leu Tyr Arg
            130                 135                 140
His Glu Phe Ser Leu Glu Pro Lys Ala Ala Ala Val Leu Glu Ala Asn
145                 150                 155                 160
Lys Thr Ala Ala Asp Asp Ala Ala Lys Arg Arg Val Thr Leu Thr Phe
                165                 170                 175
Gln Gly Ala Ala Thr Ala Ile Val Val Trp Leu Asn Gly Ala Phe Ile
            180                 185                 190
Gly Tyr Ala Glu Asp Ser Phe Thr Pro Ser Glu Phe Asp Val Thr Asp
            195                 200                 205
Val Leu Arg Asp Gly Val Asn Thr Leu Ala Val Ala Cys Phe Glu Phe
210                 215                 220
Ser Ser Ala Ser Trp Leu Glu Asp Gln Asp Phe Trp Arg Leu His Gly
225                 230                 235                 240
Ile Phe Arg Ser Val Glu Leu Glu Ala Gln Pro Leu Val His Val Asn
                245                 250                 255
Asp Leu Arg Val Leu Ala Asp Tyr Asp His Thr Thr Gly Glu Gly Ser
            260                 265                 270
Leu Asp Val Val Ala Leu Leu Arg Asn Ala Gly Thr Ala Ala Ala Val
            275                 280                 285
Ala Ala Thr Val Leu Asp Ala Ala Gly Asn Thr Val Trp His Ser Lys
            290                 295                 300
Leu Thr Ala Gly Ala Asp Ala Glu Thr Leu Thr Val Lys Ala Asn Val
305                 310                 315                 320
Gly Lys Val Asn Pro Trp Ser Ala Glu Glu Pro Thr Leu Tyr Thr Leu
                325                 330                 335
Gln Val Val Ala Thr Asp Ala Ala Gly Gln Val Ile Glu Ala Ala Leu
            340                 345                 350
Gln Arg Ile Gly Phe Arg His Phe Ala Ile Glu Asp Gly Leu Met Lys
            355                 360                 365
Leu Asn Gly Lys Arg Ile Val Phe Lys Gly Val Asp Arg His Glu Phe
            370                 375                 380
Asp Ala Arg Thr Gly Arg Thr Ile Ala Glu Ala Asp Met Ile Glu Asp
385                 390                 395                 400
Ile His Ser Phe Lys Arg Leu Asn Ile Asn Ala Val Arg Thr Ser His
                405                 410                 415
Tyr Pro Asn Glu Thr Arg Trp Tyr Glu Leu Cys Asp Glu Tyr Gly Ile
            420                 425                 430
Tyr Val Leu Asp Glu Thr Asn Leu Glu Thr His Gly Ser Trp Thr Asp
```

```
                435                 440                 445
Pro Gly Asp Val Phe Gln Pro Ala Arg Ala Ile Pro Gly Ser Lys Asp
450                 455                 460

Glu Trp Arg Ala Ala Cys Val Asp Arg Thr Ala Ser Met Val Arg Arg
465                 470                 475                 480

Asp Tyr Asn His Pro Ser Val Val Ile Trp Ser Leu Gly Asn Glu Ala
                485                 490                 495

Phe Gly Asp Val Phe Tyr Ser Met Arg Asp Phe Val His Glu Asn
                500                 505                 510

Asp Pro Phe Arg Pro Val His Tyr Glu Gly Thr Phe Asn Asp Pro Glu
                515                 520                 525

Phe Ser Ala Ala Thr Asp Ile Met Ser Arg Met Tyr Ala Lys Pro Asp
530                 535                 540

Glu Ile Val Lys Leu Tyr Leu Gly Glu Asp Gly Lys Lys Pro Tyr Ile
545                 550                 555                 560

Ser Cys Glu Tyr Ser His Ser Met Gly Asn Ser Thr Gly Gly Leu His
                565                 570                 575

Leu Tyr Thr Glu Leu Glu Arg Tyr Pro Leu Tyr Gln Gly Gly Phe Ile
                580                 585                 590

Trp Asp Tyr Val Asp Gln Ala Leu Trp Gln Asp Cys Gly Asn Gly Thr
                595                 600                 605

Glu Arg Leu Ala Tyr Gly Gly Asp Phe Glu Asp Arg Pro Asn Asp Tyr
610                 615                 620

Glu Phe Ser Gly Asp Gly Val Met Phe Ala Asp Arg Thr Pro Ser Pro
625                 630                 635                 640

Lys Ala Gln Glu Val Lys Gln Leu Tyr Ala Asn Val Lys Leu Val Pro
                645                 650                 655

Asp Glu Ser Gly Val Thr Ile Thr Asn Asp Asn Leu Phe Ile Ser Thr
                660                 665                 670

Ala Ser Ser Leu Phe Thr Ala Arg Val Leu Val Asp Gly Ala Glu Arg
                675                 680                 685

Trp His Ala Asn Tyr Arg Phe Asp Val Pro Ala Gly Glu Thr Val Arg
                690                 695                 700

Glu Pro Ile Ala Phe Pro Lys Val Thr Asp Leu Val Ala Leu Ser Gly
705                 710                 715                 720

Ser Ala Glu Val Thr Tyr Glu Val Asp Gln Arg Leu Ala Glu Ala Thr
                725                 730                 735

Asp Trp Ala Pro Ala Gly Tyr Glu Leu Thr Phe Gly Gln Tyr Val Ala
                740                 745                 750

Ala Val Ser Phe Asp Asp Gly Ala Ala Asp Ala Val Val Ala Gly Asp
                755                 760                 765

Ala Glu Val Ala Ala Asp Gly Phe Asn Ala Gly Ile His Thr Asp Phe
                770                 775                 780

Gly Glu Val Leu Leu Ser Lys Thr Gln Gly Gly Met Val Ser Phe Lys
785                 790                 795                 800

Arg Asp Gly Arg Glu Met Val Ile Arg Arg Pro Asn Leu Thr Thr Phe
                805                 810                 815

Arg Ala Leu Thr Asp Asn Asp Arg Gly Asn Gly Ser Gly Phe Glu Arg
                820                 825                 830

Ala Gln Trp Met Ala Ala Gly Arg Tyr Ala Arg Val Thr Gly Thr Ser
                835                 840                 845

Val Glu Glu Thr Ala Asp Gly Lys Gly Leu Lys Ala Thr Tyr Ser Tyr
850                 855                 860
```

Glu Leu Ala Asp Ala Lys His Thr Pro Val Thr Val His Tyr Glu Val
865                 870                 875                 880

Asp Ala Ala Leu Arg Val His Leu Thr Val Glu Tyr Pro Gly Glu Ala
                885                 890                 895

Asp Ala Ala Thr Leu Pro Ala Phe Gly Leu Glu Trp Ile Leu Pro Lys
            900                 905                 910

Gln Tyr Asp Arg Leu Arg Phe Tyr Gly Leu Gly Pro Glu Glu Thr Tyr
        915                 920                 925

Ala Asp Arg Leu His Gly Ala Lys Leu Gly Val Phe Ser Arg Thr Ala
930                 935                 940

Ala Glu Asp Cys Ala Pro Tyr Leu Leu Pro Gln Glu Thr Gly Asn His
945                 950                 955                 960

Glu Gln Val Arg Trp Ala Glu Ile Thr Asp Glu Tyr Gly His Gly Met
                965                 970                 975

Arg Val Thr Ala Ala Gly Gly Thr Arg Phe Ala Thr Ser Leu Leu Pro
            980                 985                 990

Tyr Ser Ser Leu Met Phe Glu Asp Ala Leu His Gln Asn Glu Leu Pro
        995                 1000                1005

Lys Pro Arg His Thr Phe Leu Arg Leu Leu Ala Ala Gln Met Gly Val
    1010                1015                1020

Gly Gly Asp Asp Thr Trp Gly Ala Pro Val His Asp Glu Phe Gln Val
1025                1030                1035                1040

Pro Ala Asp Gln Pro Leu Lys Leu Asp Val Thr Leu Glu Leu Ile
                1045                1050                1055

<210> SEQ ID NO 10
<211> LENGTH: 689
<212> TYPE: PRT
<213> ORGANISM: Bifidobacterium catenulatum

<400> SEQUENCE: 10

Met Thr Gln Arg Arg Ser Tyr Arg Trp Pro Gln Pro Leu Ala Gly Gln
1               5                   10                  15

Gln Ala Arg Ile Trp Tyr Gly Gly Asp Tyr Asn Pro Asp Gln Trp Pro
            20                  25                  30

Glu Glu Val Trp Asp Asp Val Arg Leu Met Lys Lys Ala Gly Val
        35                  40                  45

Asn Leu Val Ser Val Gly Ile Phe Ser Trp Ala Lys Ile Glu Thr Ser
    50                  55                  60

Glu Gly Val Tyr Asp Phe Asp Trp Leu Asp Arg Ile Ile Asp Lys Leu
65                  70                  75                  80

Gly Glu Ala Gly Ile Ala Val Asp Leu Ala Ser Ala Thr Ala Ser Pro
                85                  90                  95

Pro Met Trp Leu Thr Gln Ala His Pro Glu Val Leu Trp Lys Asp Tyr
            100                 105                 110

Arg Gly Asp Val Cys Gln Pro Gly Ala Arg Gln His Trp Arg Pro Thr
        115                 120                 125

Ser Pro Val Phe Arg Glu Tyr Ala Leu Lys Leu Cys Arg Ala Met Ala
130                 135                 140

Glu His Tyr Lys Gly Asn Pro Tyr Val Val Ala Trp His Val Ser Asn
145                 150                 155                 160

Glu Tyr Gly Cys His Asn Arg Phe Asp Tyr Ser Glu Asp Ala Glu Arg
                165                 170                 175

Ala Phe Arg Lys Trp Cys Glu Glu Arg Tyr Gly Thr Ile Asp Ala Val

-continued

```
                180             185             190
Asn Asp Ala Trp Gly Thr Ala Phe Trp Ala Gln Arg Met Asn Asp Phe
            195                 200                 205
Thr Glu Ile Val Pro Pro Arg Phe Ile Gly Asp Gly Asn Phe Met Asn
210                 215                 220
Pro Gly Lys Leu Leu Asp Phe Lys Arg Phe Ser Asp Ala Leu Lys
225                 230                 235                 240
Ala Phe Tyr Val Ala Glu Arg Asp Ala Leu Ala Glu Ile Thr Pro Asp
                245                 250                 255
Leu Pro Leu Thr Thr Asn Phe Met Val Ser Ala Gly Ser Val Leu
                260                 265                 270
Asp Tyr Asp Asp Trp Gly Arg Glu Val Asp Phe Val Ser Asn Asp His
            275                 280                 285
Tyr Phe Ile Pro Gly Glu Ala His Leu Asp Glu Leu Ala Phe Ser Ala
            290                 295                 300
Ser Leu Val Asp Gly Ile Ala Arg Lys Asp Pro Trp Phe Leu Met Glu
305                 310                 315                 320
His Ser Thr Ser Ala Val Asn Trp Arg Pro Val Asn Tyr Arg Lys Glu
                325                 330                 335
Pro Gly Gln Leu Val Arg Asp Ser Leu Ala His Val Ala Met Gly Ala
                340                 345                 350
Asp Ala Val Cys Tyr Phe Gln Trp Arg Gln Ser Lys Ala Gly Ala Glu
                355                 360                 365
Lys Phe His Ser Ala Met Val Pro His Thr Gly Glu Asp Ser Ala Val
            370                 375                 380
Phe Arg Asp Val Cys Glu Leu Gly Ala Asp Leu Asn Thr Leu Ala Asp
385                 390                 395                 400
Asn Gly Leu Leu Gly Thr Lys Leu Ala Lys Ser Lys Val Ala Val Val
                405                 410                 415
Phe Asp Tyr Glu Ser Glu Trp Ala Thr Glu His Thr Ala Thr Pro Thr
            420                 425                 430
Gln Lys Val His His Val Asp Glu Pro Leu Gln Trp Phe Arg Ala Leu
            435                 440                 445
Ala Asp His Gly Val Thr Ala Asp Val Val Pro Val Ser Ser Asn Trp
            450                 455                 460
Asp Glu Tyr Glu Val Val Leu Pro Ser Val Tyr Ile Leu Ser Glu
465                 470                 475                 480
Glu Thr Thr Arg Arg Val Arg Asp Tyr Val Val Asn Gly Gly Arg Leu
                485                 490                 495
Ile Val Thr Tyr Tyr Thr Gly Leu Ser Asp Glu Lys Asp His Val Trp
            500                 505                 510
Leu Gly Gly Tyr Pro Gly Ser Ile Arg Asp Val Val Gly Val Arg Val
            515                 520                 525
Glu Glu Phe Met Pro Met Gly Asp Asp Phe Pro Gly Val Pro Asp Cys
            530                 535                 540
Leu Gly Leu Ser Asn Gly Ala Val Ala His Asp Ile Ala Asp Val Ile
545                 550                 555                 560
Gly Ser Val Asp Gly Thr Ala Thr Val Leu Glu Thr Phe Arg Asp Asp
                565                 570                 575
Pro Trp Thr Gly Met Asp Gly Ala Pro Ala Ile Val Ala Asn Thr Phe
            580                 585                 590
Gly Glu Gly Arg Ser Val Tyr Val Gly Ala Arg Leu Gly Arg Asp Gly
            595                 600                 605
```

```
Ile Ala Lys Ser Leu Pro Glu Ile Phe Glu Ser Leu Gly Met Ala Glu
            610                 615                 620

Thr Gly Glu Asn Asp Ser Arg Val Leu Arg Val Arg Glu Gly Ser
625                 630                 635                 640

Asp Gly Ser Arg Phe Val Phe Ser Phe Asn Arg Thr His Glu Ala Val
                645                 650                 655

Gln Ile Pro Phe Glu Gly Lys Ile Val Val Ser Ser Phe Ala Glu Val
            660                 665                 670

Ser Gly Glu Asn Val Ser Ile Lys Pro Asn Gly Val Ile Val Thr Lys
                675                 680                 685

Gln
```

<210> SEQ ID NO 11
<211> LENGTH: 1023
<212> TYPE: PRT
<213> ORGANISM: Bifidobacterium catenulatum

<400> SEQUENCE: 11

```
Met Ala Asn Ser Asn Arg Val Glu His Ala Ser Glu Thr Trp Leu Thr
1               5                   10                  15

Asp Ala Thr Val Phe Glu Val Asn Arg Thr Pro Ala His Ser Asn His
                20                  25                  30

Lys Cys Phe Thr His Asp Pro Gln Ser Gly Glu His Ser Asp Leu Thr
            35                  40                  45

Gln Ser Leu Asp Gly Glu Trp Arg Val Glu Ile Val Gln Ala Ser Asp
        50                  55                  60

Ile Asp Phe Asn Glu Glu Pro Phe Val Ala Glu Asn Phe Asp Asp Ser
65              70                  75                  80

Ser Phe Cys Arg Ala Gln Val Pro Gly His Leu Gln Met Ala Gly Leu
                85                  90                  95

Leu Lys Asn Lys Tyr Val Asn Ile Gln Tyr Pro Trp Asp Gly His Glu
            100                 105                 110

Asn Pro Leu Glu Pro Asn Val Pro Glu Asn Asn His Val Ala Leu Tyr
        115                 120                 125

Arg Arg Lys Phe Val Val Ser Lys Arg Leu Ala Asp Thr Lys Glu Ser
130                 135                 140

Glu Gly Ser Val Ser Ile Val Phe His Gly Met Ala Thr Ala Ile Tyr
145                 150                 155                 160

Val Trp Val Asn Gly Leu Phe Ala Gly Tyr Gly Glu Asp Gly Phe Thr
                165                 170                 175

Pro Asn Glu Phe Asp Ile Thr Asp Leu Leu His Asp Gly Glu Asn Val
            180                 185                 190

Val Ala Val Ala Cys Tyr Glu Tyr Ser Ser Ala Ser Trp Leu Glu Asp
        195                 200                 205

Gln Asp Phe Trp Arg Leu His Gly Leu Phe Arg Ser Val Glu Leu Thr
    210                 215                 220

Ala Gln Pro His Val His Val Glu Asn Met Gln Leu Glu Ala Asp Trp
225                 230                 235                 240

Asp Ala Glu Ser Gly Thr Ala Ser Leu Asp Ala Leu Ser Val Arg
                245                 250                 255

Asn Ala Ser Asp Ala Ala Thr Ile Ser Ala Thr Leu Lys Asp Ser Glu
            260                 265                 270

Gly Asn Val Val Trp Glu Ala Ser Thr Asn Ala Asp Ala Asn Thr Thr
        275                 280                 285
```

```
Phe Ala Ser Gly Ser Leu Gln Gly Leu Glu Pro Trp Ser Ala Glu Ser
    290                 295                 300

Pro Ser Leu Tyr Glu Leu Glu Val Asn Val Ile Asp Gln Ala Gly Asn
305                 310                 315                 320

Ile Val Glu Ala Ala Val Gln Lys Val Gly Phe Arg Arg Phe Arg Ile
                325                 330                 335

Glu Asn Gly Ile Met Thr Leu Asn Gly Lys Arg Ile Val Phe Lys Gly
                340                 345                 350

Ala Asp Arg His Glu Phe Asp Ala Lys Arg Gly Arg Ser Ile Thr Glu
            355                 360                 365

Gln Asp Met Ile Asp Asp Val Ile Phe Cys Lys Arg His Asn Ile Asn
370                 375                 380

Ala Ile Arg Thr Ser His Tyr Pro Asn Gln Glu Arg Trp Tyr Asp Leu
385                 390                 395                 400

Cys Asp Glu Tyr Gly Ile Tyr Leu Ile Asp Glu Thr Asn Leu Glu Thr
                405                 410                 415

His Gly Ser Trp Cys Leu Pro Gly Asp Val Val Thr Ala Glu Thr Ala
                420                 425                 430

Val Pro Gly Ser Lys Ala His Trp Glu Gly Ala Cys Val Asp Arg Val
            435                 440                 445

Asn Ser Met Val Arg Arg Asp Tyr Asn His Pro Ser Val Val Ile Trp
450                 455                 460

Ser Leu Gly Asn Glu Ser Tyr Thr Gly Asp Val Phe Arg Ala Met Tyr
465                 470                 475                 480

Lys His Val His Asp Ile Asp Pro Asn Arg Pro Val His Tyr Glu Gly
                485                 490                 495

Val Thr Lys Asn Arg Asp Tyr Asp Asp Val Thr Asp Ile Glu Thr Arg
            500                 505                 510

Met Tyr Glu His Ala Asp Val Val Glu Glu Tyr Leu Lys Asn Asp Pro
            515                 520                 525

Gln Lys Pro Tyr Ile Ser Cys Glu Tyr Met His Ala Met Gly Asn Ser
            530                 535                 540

Val Gly Asn Leu Asp Glu Tyr Thr Ala Leu Glu Arg Tyr Pro His Tyr
545                 550                 555                 560

Gln Gly Gly Phe Ile Trp Asp Phe Ile Asp Gln Ala Ile Tyr Ala Thr
                565                 570                 575

Gln Pro Asp Gly Ser Thr Arg Leu Cys Tyr Gly Gly Asp Phe Gly Asp
                580                 585                 590

Arg Pro Ser Asp Tyr Glu Phe Ser Gly Asn Gly Leu Val Phe Ala Asp
                595                 600                 605

Arg Thr Pro Thr Pro Lys Ala Gln Glu Val Lys Gln Leu Tyr Ser Asn
            610                 615                 620

Val His Ile Asp Val Thr Asp Arg Ser Val Ser Ile Lys Asn Asp Asn
625                 630                 635                 640

Leu Phe Ile Ser Thr Gly Gly Tyr Gln Phe Val Leu Arg Ile Leu Ala
                645                 650                 655

Asp Gly Glu Pro Val Trp Gln Ser Glu Arg Arg Phe Asp Val Pro Ala
            660                 665                 670

Asp Ser Ala Cys Thr Phe Asp Val Glu Trp Pro Val Asp Leu Tyr Arg
            675                 680                 685

Ala Asn Ala Asp Glu Leu Val Leu Glu Val Ser Gln Arg Leu Ala Glu
            690                 695                 700
```

Ala Thr Asp Trp Ala Pro Ala Gly Tyr Glu Leu Ala Phe Gly Gln Thr
705                 710                 715                 720

Ile Val Ala Gly Thr Lys Ala Ala Glu Asp Ala Ala Leu Pro Ala Asp
            725                 730                 735

Gly Ile Val Thr Val Gly Arg Trp Asn Ala Gly Val Gln Gly Ser Gly
        740                 745                 750

Arg Glu Ile Leu Leu Ser Arg Thr Gln Gly Gly Leu Val Ser Tyr Thr
    755                 760                 765

Phe Asp Gly His Glu Phe Val Leu Arg Arg Pro Ala Ile Thr Thr Phe
770                 775                 780

Arg Ala Leu Thr Asp Asn Asp Arg Gly Ala Gly His Gly Phe Glu Arg
785                 790                 795                 800

Ala Gln Trp Met Val Ala Gly Arg Tyr Ala Arg Cys Val Asp Asn Val
            805                 810                 815

Ile Glu Gln Val Asp Glu Asp Thr Leu Lys Ala Val Tyr Thr Tyr Glu
        820                 825                 830

Leu Ala Thr Pro Gln Cys Thr Lys Val Thr Val Gly Tyr Thr Ala Asp
    835                 840                 845

Thr Thr Gly Arg Leu Asn Leu His Val Glu Tyr Pro Gly Glu Ser Gly
850                 855                 860

Glu Leu Pro Thr Ile Pro Ala Phe Gly Ile Glu Trp Thr Leu Pro Val
865                 870                 875                 880

Gln Tyr Ser Asn Leu Arg Phe Phe Gly Ala Gly Pro Glu Glu Thr Tyr
            885                 890                 895

Gln Asp Arg Lys His Ala Lys Leu Gly Val Trp Ser Thr Asp Ala Phe
        900                 905                 910

Lys Asp His Ala Pro Tyr Leu Met Pro Gln Glu Thr Gly Asn His Glu
    915                 920                 925

Glu Val Arg Trp Ala Glu Ile Thr Asp Glu Asn Gly His Gly Leu Arg
930                 935                 940

Val Ser Arg Ala Asn Gly Ala Ala Pro Phe Ala Val Ser Leu Gln Pro
945                 950                 955                 960

Tyr Ser Ser Phe Met Ile Glu Glu Ala Gln His Gln Asp Glu Leu Pro
            965                 970                 975

Ala Pro Lys His Met Phe Leu Arg Val Leu Ala Ala Gln Met Gly Val
        980                 985                 990

Gly Gly Asp Asp Ser Trp Met Ser Pro Val His Ser Gln Tyr His Ile
    995                 1000                1005

Thr Ala Asp Gln Pro Ile Ser Leu Asp Val Asn Leu Glu Leu Ile
    1010                1015                1020

<210> SEQ ID NO 12
<211> LENGTH: 1008
<212> TYPE: PRT
<213> ORGANISM: Lactobacillus delbrueckii subsp. bulgaricus

<400> SEQUENCE: 12

Met Ser Asn Lys Leu Val Lys Glu Lys Arg Val Asp Gln Ala Asp Leu
1               5                   10                  15

Ala Trp Leu Thr Asp Pro Glu Val Tyr Glu Val Asn Thr Ile Pro Pro
            20                  25                  30

His Ser Asp His Glu Ser Phe Gln Ser Gln Glu Glu Leu Glu Glu Gly
        35                  40                  45

Lys Ser Ser Leu Val Gln Ser Leu Asp Gly Asp Trp Leu Ile Asp Tyr
    50                  55                  60

```
Ala Glu Asn Gly Gln Gly Pro Val Asn Phe Tyr Ala Glu Asp Phe Asp
 65                  70                  75                  80

Asp Ser Asn Phe Lys Ser Val Lys Val Pro Gly Asn Leu Glu Leu Gln
                 85                  90                  95

Gly Phe Gly Gln Pro Gln Tyr Val Asn Val Gln Tyr Pro Trp Asp Gly
            100                 105                 110

Ser Glu Glu Ile Phe Pro Pro Gln Ile Pro Ser Lys Asn Pro Leu Ala
            115                 120                 125

Ser Tyr Val Arg Tyr Phe Asp Leu Asp Glu Ala Phe Trp Asp Lys Glu
            130                 135                 140

Val Ser Leu Lys Phe Asp Gly Ala Ala Thr Ala Ile Tyr Val Trp Leu
145                 150                 155                 160

Asn Gly His Phe Val Gly Tyr Gly Glu Asp Ser Phe Thr Pro Ser Glu
                165                 170                 175

Phe Met Val Thr Lys Phe Leu Lys Lys Glu Asn Asn Arg Leu Ala Val
            180                 185                 190

Ala Leu Tyr Lys Tyr Ser Ser Ala Ser Trp Leu Glu Asp Gln Asp Phe
            195                 200                 205

Trp Arg Met Ser Gly Leu Phe Arg Ser Val Thr Leu Gln Ala Lys Pro
210                 215                 220

Arg Leu His Leu Glu Asp Leu Lys Leu Thr Ala Ser Leu Thr Asp Asn
225                 230                 235                 240

Tyr Gln Lys Gly Lys Leu Glu Val Glu Ala Asn Ile Ala Tyr Arg Leu
                245                 250                 255

Pro Asn Ala Ser Phe Lys Leu Glu Val Arg Asp Ser Glu Gly Asp Leu
            260                 265                 270

Val Ala Glu Lys Leu Gly Pro Ile Arg Ser Glu Gln Leu Glu Phe Thr
            275                 280                 285

Leu Ala Asp Leu Pro Val Ala Ala Trp Ser Ala Glu Lys Pro Asn Leu
290                 295                 300

Tyr Gln Val Arg Leu Tyr Leu Tyr Gln Ala Gly Ser Leu Leu Glu Val
305                 310                 315                 320

Ser Arg Gln Glu Val Gly Phe Arg Asn Phe Glu Leu Lys Asp Gly Ile
            325                 330                 335

Met Tyr Leu Asn Gly Gln Arg Ile Val Phe Lys Gly Ala Asn Arg His
            340                 345                 350

Glu Phe Asp Ser Lys Leu Gly Arg Ala Ile Thr Glu Glu Asp Met Ile
            355                 360                 365

Trp Asp Ile Lys Thr Met Lys Arg Ser Asn Ile Asn Ala Val Arg Cys
            370                 375                 380

Ser His Tyr Pro Asn Gln Ser Leu Phe Tyr Arg Leu Cys Asp Lys Tyr
385                 390                 395                 400

Gly Leu Tyr Val Ile Asp Glu Ala Asn Leu Glu Ser His Gly Thr Trp
                405                 410                 415

Glu Lys Val Gly Gly His Glu Asp Pro Ser Phe Asn Val Pro Gly Asp
            420                 425                 430

Asp Gln His Trp Leu Gly Ala Ser Leu Ser Arg Val Lys Asn Met Met
            435                 440                 445

Ala Arg Asp Lys Asn His Ala Ser Ile Leu Ile Trp Ser Leu Gly Asn
            450                 455                 460

Glu Ser Tyr Ala Gly Thr Val Phe Ala Gln Met Ala Asp Tyr Val Arg
465                 470                 475                 480
```

-continued

Lys Ala Asp Pro Thr Arg Val Gln His Tyr Glu Gly Val Thr His Asn
            485                 490                 495

Arg Lys Phe Asp Asp Ala Thr Gln Ile Glu Ser Arg Met Tyr Ala Pro
            500                 505                 510

Ala Lys Val Ile Glu Glu Tyr Leu Thr Asn Lys Pro Ala Lys Pro Phe
            515                 520                 525

Ile Ser Val Glu Tyr Ala His Ala Met Gly Asn Ser Val Gly Asp Leu
            530                 535                 540

Ala Ala Tyr Thr Ala Leu Glu Lys Tyr Pro His Tyr Gln Gly Gly Phe
545                 550                 555                 560

Ile Trp Asp Trp Ile Asp Gln Gly Leu Glu Lys Asp Gly His Leu Leu
            565                 570                 575

Tyr Gly Gly Asp Phe Asp Asp Arg Pro Thr Asp Tyr Glu Phe Cys Gly
            580                 585                 590

Asn Gly Leu Val Phe Ala Asp Arg Thr Glu Ser Pro Lys Leu Ala Asn
            595                 600                 605

Val Lys Ala Leu Tyr Ala Asn Leu Lys Leu Glu Val Lys Asp Gly Gln
            610                 615                 620

Leu Phe Leu Lys Asn Asp Asn Leu Phe Thr Asn Ser Ser Ser Tyr Tyr
625                 630                 635                 640

Phe Leu Thr Ser Leu Leu Val Asp Gly Lys Leu Thr Tyr Gln Ser Arg
            645                 650                 655

Pro Leu Thr Phe Gly Leu Glu Pro Glu Ser Gly Thr Phe Ala Leu
            660                 665                 670

Pro Trp Pro Glu Val Ala Asp Glu Lys Gly Glu Val Val Tyr Arg Val
            675                 680                 685

Thr Ala His Leu Lys Glu Asp Leu Pro Trp Ala Asp Glu Gly Phe Thr
            690                 695                 700

Val Ala Glu Ala Glu Glu Val Ala Gln Lys Leu Pro Glu Phe Lys Pro
705                 710                 715                 720

Glu Gly Arg Pro Asp Leu Val Asp Ser Asp Tyr Asn Leu Gly Leu Lys
            725                 730                 735

Gly Asn Asn Phe Gln Ile Leu Phe Ser Lys Val Lys Gly Trp Pro Val
            740                 745                 750

Ser Leu Lys Tyr Ala Gly Arg Glu Tyr Leu Lys Arg Leu Pro Glu Phe
            755                 760                 765

Thr Phe Trp Arg Ala Leu Thr Asp Asn Asp Arg Gly Ala Gly Tyr Gly
            770                 775                 780

Tyr Asp Leu Ala Arg Trp Glu Asn Ala Gly Lys Tyr Ala Arg Leu Lys
785                 790                 795                 800

Asp Ile Ser Cys Glu Val Lys Glu Asp Ser Val Leu Val Lys Thr Ala
            805                 810                 815

Phe Thr Leu Pro Val Ala Leu Lys Gly Asp Leu Thr Val Thr Tyr Glu
            820                 825                 830

Val Asp Gly Arg Gly Lys Ile Ala Val Thr Ala Asp Phe Pro Gly Ala
            835                 840                 845

Glu Glu Ala Gly Leu Leu Pro Ala Phe Gly Leu Asn Leu Ala Leu Pro
850                 855                 860

Lys Glu Leu Thr Asp Tyr Arg Tyr Tyr Gly Leu Gly Pro Asn Glu Ser
865                 870                 875                 880

Tyr Pro Asp Arg Leu Glu Gly Asn Tyr Leu Gly Ile Tyr Gln Gly Ala
            885                 890                 895

Val Lys Lys Asn Phe Ser Pro Tyr Leu Arg Pro Gln Glu Thr Gly Asn

```
                 900              905              910
Arg Ser Lys Val Arg Trp Tyr Gln Leu Phe Asp Glu Lys Gly Gly Leu
        915              920              925

Glu Phe Thr Ala Asn Gly Ala Asp Leu Asn Leu Ser Ala Leu Pro Tyr
    930              935              940

Ser Ala Ala Gln Ile Glu Ala Ala Asp His Ala Phe Asp Leu Thr Asn
945              950              955              960

Asn Tyr Thr Trp Val Arg Ala Leu Ser Ala Gln Met Gly Val Gly Gly
                965              970              975

Asp Asp Ser Trp Gly Gln Lys Val His Pro Glu Phe Cys Leu Asp Ala
            980              985              990

Gln Lys Ala Arg Gln Leu Arg Leu Val Ile Gln Pro Leu Leu Leu Lys
        995              1000             1005

<210> SEQ ID NO 13
<211> LENGTH: 1007
<212> TYPE: PRT
<213> ORGANISM: Lactobacillus delbrueckii subsp. lactis

<400> SEQUENCE: 13

Met Ser Asn Lys Leu Val Lys Glu Lys Arg Val Asp Gln Ala Asp Leu
1               5                   10                  15

Ala Trp Leu Thr Asp Pro Glu Val Tyr Glu Val Asn Thr Ile Pro Pro
            20                  25                  30

His Ser Asp His Glu Ser Phe Gln Ser Gln Glu Glu Leu Glu Glu Gly
        35                  40                  45

Lys Ser Ser Leu Val Gln Ser Leu Asp Gly Asn Trp Leu Ile Asp Tyr
    50                  55                  60

Ala Glu Asn Gly Gln Gly Pro Ile Asn Phe Tyr Ala Glu Asp Phe Asp
65                  70                  75                  80

Asp Ser Asn Phe Lys Ser Val Lys Val Pro Gly Asn Leu Glu Leu Gln
                85                  90                  95

Gly Phe Gly Gln Pro Gln Tyr Val Asn Ile Gln Tyr Pro Trp Asp Gly
            100                 105                 110

Ser Glu Glu Ile Phe Pro Pro Gln Val Pro Ser Lys Asn Pro Leu Ala
        115                 120                 125

Ser Tyr Val Arg Tyr Phe Asp Leu Asp Glu Ala Leu Trp Asp Lys Glu
    130                 135                 140

Val Ser Leu Lys Phe Ala Gly Ala Ala Thr Ala Ile Tyr Val Trp Leu
145                 150                 155                 160

Asn Gly His Phe Val Gly Tyr Gly Glu Asp Ser Phe Thr Pro Ser Glu
                165                 170                 175

Phe Met Val Thr Lys Phe Leu Lys Lys Glu Gly Asn Arg Leu Ala Val
            180                 185                 190

Ala Leu Tyr Lys Tyr Ser Ser Ala Ser Trp Leu Glu Asp Gln Asp Phe
        195                 200                 205

Trp Arg Leu Ser Gly Leu Phe Arg Ser Val Thr Leu Glu Ala Lys Pro
    210                 215                 220

Leu Leu His Leu Glu Asp Leu Lys Leu Thr Ala Ser Leu Thr Asp Asn
225                 230                 235                 240

Tyr Gln Lys Gly Lys Leu Glu Val Glu Ala Asn Ile Ala Tyr Arg Leu
                245                 250                 255

Pro Asn Ala Ser Phe Lys Leu Glu Val Arg Asp Ser Glu Gly Asp Leu
            260                 265                 270
```

-continued

```
Val Ala Glu Lys Val Gly Pro Ile Arg Ser Glu Lys Leu Gly Phe Ser
            275                 280                 285
Leu Ala Asp Leu Pro Val Ala Ala Trp Ser Ala Glu Lys Pro Asn Leu
        290                 295                 300
Tyr Gln Val Arg Leu Tyr Leu Tyr Gln Ala Gly Ser Leu Leu Glu Val
305                 310                 315                 320
Ser Arg Gln Glu Val Gly Phe Arg Asn Phe Glu Leu Lys Asp Gly Ile
                325                 330                 335
Met Tyr Leu Asn Gly Gln Arg Ile Val Phe Lys Gly Val Asn Arg His
                340                 345                 350
Glu Phe Asp Ser Lys Leu Gly Arg Ala Ile Thr Glu Ala Asp Met Ile
            355                 360                 365
Trp Asp Ile Lys Thr Met Lys Gln Ser Asn Ile Asn Ala Val Arg Cys
        370                 375                 380
Ser His Tyr Pro Asn Gln Ser Leu Phe Tyr Arg Leu Cys Asp Lys Tyr
385                 390                 395                 400
Gly Leu Tyr Val Ile Asp Glu Ala Asn Leu Glu Ser His Gly Thr Trp
                405                 410                 415
Glu Lys Val Gly His Glu Asp Pro Ser Phe Asn Val Pro Gly Asp Asp
            420                 425                 430
Gln His Trp Leu Gly Ala Ser Leu Ser Arg Val Lys Asn Met Met Ala
        435                 440                 445
Arg Asp Lys Asn His Ala Ser Ile Leu Ile Trp Ser Leu Gly Asn Glu
    450                 455                 460
Ser Tyr Ala Gly Thr Val Phe Ala Gln Met Ala Asp Tyr Val Arg Lys
465                 470                 475                 480
Ala Asp Pro Thr Arg Val Gln His Tyr Glu Gly Val Thr His Asn Arg
                485                 490                 495
Lys Phe Asp Asp Ala Thr Gln Ile Glu Ser Arg Met Tyr Ala Pro Ala
            500                 505                 510
Lys Glu Ile Glu Glu Tyr Leu Thr Lys Lys Pro Ala Lys Pro Phe Ile
        515                 520                 525
Ser Val Glu Tyr Ala His Ala Met Gly Asn Ser Val Gly Asp Leu Ala
    530                 535                 540
Ala Tyr Thr Ala Leu Glu Lys Tyr Pro His Tyr Gln Gly Gly Phe Ile
545                 550                 555                 560
Trp Asp Trp Ile Asp Gln Gly Leu Glu Lys Asp Gly His Leu Leu Tyr
                565                 570                 575
Gly Gly Asp Phe Asp Asp Arg Pro Thr Asp Tyr Glu Phe Cys Gly Asp
            580                 585                 590
Gly Leu Val Phe Ala Asp Arg Thr Thr Ser Pro Lys Leu Ala Asn Val
        595                 600                 605
Lys Ala Leu Tyr Ser Asn Leu Lys Leu Glu Val Lys Asp Gly Gln Leu
    610                 615                 620
Phe Ile Lys Asn Asp Asn Leu Phe Thr Asn Ser Ser Ala Tyr Tyr Phe
625                 630                 635                 640
Leu Ala Ser Leu Leu Val Asp Gly Lys Leu Thr Tyr Gln Ser Gln Pro
                645                 650                 655
Leu Thr Phe Gly Leu Glu Pro Gly Glu Ser Gly Thr Phe Val Leu Pro
            660                 665                 670
Trp Pro Glu Val Glu Asp Glu Lys Gly Glu Ile Val Tyr Gln Val Thr
        675                 680                 685
Ala His Leu Lys Glu Asp Leu Pro Trp Ala Asp Glu Gly Phe Thr Val
```

```
                    690                 695                 700
Ala Glu Ala Glu Glu Ala Val Thr Lys Leu Pro Glu Phe Tyr Pro Ala
705                 710                 715                 720

Gly Arg Pro Glu Leu Val Asp Ser Asp Phe Asn Leu Gly Leu Lys Gly
                    725                 730                 735

Asn Gly Phe Arg Ile Leu Phe Ser Lys Ala Lys Gly Trp Pro Val Ser
                740                 745                 750

Ile Lys Tyr Ala Gly Arg Glu Tyr Leu Lys Arg Leu Pro Glu Phe Thr
            755                 760                 765

Phe Trp Arg Ala Leu Thr Asp Asn Asp Arg Gly Ala Gly Tyr Gly Tyr
        770                 775                 780

Asp Leu Ala Lys Trp Glu Asn Ala Gly Lys Tyr Ala Arg Leu Gln Asp
785                 790                 795                 800

Ile Ser Tyr Glu Ile Lys Glu Asn Ser Ala Leu Val Lys Thr Thr Phe
                    805                 810                 815

Thr Leu Pro Val Ala Leu Lys Gly Asp Leu Thr Ile Thr Tyr Glu Val
                820                 825                 830

Asp Ser Leu Gly Lys Ile Ala Val Thr Ala Asn Phe Pro Gly Ala Val
            835                 840                 845

Glu Asn Gly Leu Leu Pro Ala Phe Gly Leu Asn Phe Ala Leu Pro Lys
        850                 855                 860

Glu Leu Ser Asp Tyr Arg Tyr Tyr Gly Leu Gly Pro Asn Glu Ser Tyr
865                 870                 875                 880

Ala Asp Arg Leu Glu Gly Ser Tyr Leu Gly Ile Tyr Gln Gly Ala Val
                    885                 890                 895

Glu Lys Asn Phe Thr Pro Tyr Leu Arg Pro Gln Ala Gly Asn Arg
                900                 905                 910

Ser Lys Val Arg Tyr Tyr Gln Leu Phe Asp Glu Gly Gly Leu Glu
            915                 920                 925

Phe Thr Ala Asn Gly Ala Asp Leu Asn Leu Ser Ala Leu Pro Tyr Ser
        930                 935                 940

Ala Ala Gln Ile Glu Ala Ala Asp His Ala Phe Glu Leu Thr Asn Asn
945                 950                 955                 960

Tyr Thr Trp Val Arg Ala Leu Ala Ala Gln Met Gly Val Gly Gly Asp
                    965                 970                 975

Asp Ser Trp Gly Gln Lys Val His Pro Glu Phe Cys Leu Asp Ala Gln
                980                 985                 990

Glu Ala Arg Gln Leu Lys Leu Val Ile Gln Pro Leu Leu Leu Lys
            995                 1000                1005
```

<210> SEQ ID NO 14
<211> LENGTH: 1008
<212> TYPE: PRT
<213> ORGANISM: Lactobacillus delbrueckii subsp. bulgaricus

<400> SEQUENCE: 14

```
Met Ser Asn Lys Leu Val Lys Glu Lys Arg Val Asp Gln Ala Asp Leu
1               5                   10                  15

Ala Trp Leu Thr Asp Pro Glu Val Tyr Glu Val Asn Thr Ile Pro Pro
                20                  25                  30

His Phe Asp His Glu Ser Phe Gln Ser Gln Glu Glu Leu Glu Glu Gly
            35                  40                  45

Lys Ser Ser Leu Val Gln Ser Leu Asp Gly Asp Trp Leu Ile Asp Tyr
        50                  55                  60
```

```
Ala Glu Asn Gly Gln Gly Pro Val Asn Phe Tyr Ala Glu Asp Phe Asp
 65                  70                  75                  80

Asp Ser Asn Phe Lys Ser Val Lys Val Pro Gly Asn Leu Glu Leu Gln
                 85                  90                  95

Gly Phe Gly Gln Pro Gln Tyr Val Asn Val Gln Tyr Pro Trp Asp Gly
            100                 105                 110

Ser Glu Glu Ile Phe Pro Pro Gln Ile Pro Ser Lys Asn Pro Leu Ala
        115                 120                 125

Ser Tyr Val Arg Tyr Phe Asp Leu Asp Glu Ala Phe Trp Asp Lys Glu
    130                 135                 140

Val Ser Leu Lys Phe Asp Gly Ala Ala Thr Ala Ile Tyr Val Trp Leu
145                 150                 155                 160

Asn Gly His Phe Val Gly Tyr Gly Glu Asp Ser Phe Thr Pro Ser Glu
            165                 170                 175

Phe Met Val Thr Lys Phe Leu Lys Lys Glu Asn Asn Arg Leu Ala Val
        180                 185                 190

Ala Leu Tyr Lys Tyr Ser Ser Ala Ser Trp Leu Glu Asp Gln Asp Phe
    195                 200                 205

Trp Arg Met Ser Gly Leu Phe Arg Ser Val Thr Leu Gln Ala Lys Pro
210                 215                 220

Arg Leu His Leu Glu Asp Leu Lys Leu Thr Ala Ser Leu Thr Asp Asn
225                 230                 235                 240

Tyr Gln Lys Gly Lys Leu Glu Val Glu Ala Asn Ile Ala Tyr Arg Leu
            245                 250                 255

Pro Asn Ala Ser Phe Lys Leu Glu Val Arg Asp Ser Gly Asp Gly Asp Leu
        260                 265                 270

Val Ala Glu Lys Leu Gly Pro Ile Arg Ser Glu Gln Leu Glu Phe Thr
    275                 280                 285

Leu Ala Asp Leu Pro Val Ala Ala Trp Ser Ala Glu Lys Pro Asn Leu
290                 295                 300

Tyr Gln Val Arg Leu Tyr Leu Tyr Gln Ala Gly Ser Leu Leu Glu Val
305                 310                 315                 320

Ser Arg Gln Glu Val Gly Phe Arg Asn Phe Glu Leu Lys Asp Gly Ile
            325                 330                 335

Met Tyr Leu Asn Gly Gln Arg Ile Val Phe Lys Gly Ala Asn Arg His
        340                 345                 350

Glu Phe Asp Ser Lys Leu Gly Arg Ala Ile Thr Glu Glu Asp Met Ile
    355                 360                 365

Trp Asp Ile Lys Thr Met Lys Arg Ser Asn Ile Asn Ala Val Arg Cys
370                 375                 380

Ser His Tyr Pro Asn Gln Ser Leu Phe Tyr Arg Leu Cys Asp Lys Tyr
385                 390                 395                 400

Gly Leu Tyr Val Ile Asp Glu Ala Asn Leu Glu Ser His Gly Thr Trp
            405                 410                 415

Glu Lys Val Gly Gly His Glu Asp Pro Ser Phe Asn Val Pro Gly Asp
        420                 425                 430

Asp Gln His Trp Leu Gly Ala Ser Leu Ser Arg Val Lys Asn Met Met
    435                 440                 445

Ala Arg Asp Lys Asn His Ala Ser Ile Leu Ile Trp Ser Leu Gly Asn
450                 455                 460

Glu Ser Tyr Ala Gly Thr Val Phe Ala Gln Met Ala Asp Tyr Val Arg
465                 470                 475                 480

Lys Ala Asp Pro Thr Arg Val Gln His Tyr Glu Gly Val Thr His Asn
```

-continued

```
            485                 490                 495
Arg Lys Phe Asp Asp Ala Thr Gln Ile Glu Ser Arg Met Tyr Ala Pro
            500                 505                 510

Ala Lys Val Ile Glu Glu Tyr Leu Thr Asn Lys Pro Ala Lys Pro Phe
            515                 520                 525

Ile Ser Val Glu Tyr Ala His Ala Met Gly Asn Ser Val Gly Asp Leu
            530                 535                 540

Ala Ala Tyr Thr Ala Leu Glu Lys Tyr Pro His Tyr Gln Gly Gly Phe
545                 550                 555                 560

Ile Trp Asp Trp Ile Asp Gln Gly Leu Glu Lys Asp Gly His Leu Leu
                    565                 570                 575

Tyr Gly Gly Asp Phe Asp Asp Arg Pro Thr Asp Tyr Glu Phe Cys Gly
                    580                 585                 590

Asn Gly Leu Val Phe Ala Asp Arg Thr Glu Ser Pro Lys Leu Ala Asn
                    595                 600                 605

Val Lys Ala Leu Tyr Ala Asn Leu Lys Leu Glu Val Lys Asp Gly Gln
                    610                 615                 620

Leu Phe Leu Lys Asn Asp Asn Leu Phe Thr Asn Ser Ser Tyr Tyr
625                 630                 635                 640

Phe Leu Thr Ser Leu Leu Val Asp Gly Lys Leu Thr Tyr Gln Ser Arg
                    645                 650                 655

Pro Leu Thr Phe Gly Leu Glu Pro Gly Glu Ser Gly Thr Phe Ala Leu
                    660                 665                 670

Pro Trp Pro Glu Val Ala Asp Glu Lys Gly Glu Val Val Tyr Arg Val
                    675                 680                 685

Thr Ala His Leu Lys Glu Asp Leu Pro Trp Ala Asp Glu Gly Phe Thr
                    690                 695                 700

Val Ala Glu Ala Glu Val Ala Gln Lys Leu Pro Glu Phe Lys Pro
705                 710                 715                 720

Glu Gly Arg Pro Asp Leu Val Asp Ser Asp Tyr Asn Leu Gly Leu Lys
                    725                 730                 735

Gly Asn Asn Phe Gln Ile Leu Phe Ser Lys Val Lys Gly Trp Pro Val
                    740                 745                 750

Ser Leu Lys Tyr Ala Gly Arg Glu Tyr Leu Lys Arg Leu Pro Glu Phe
                    755                 760                 765

Thr Phe Trp Arg Ala Leu Thr Asp Asn Asp Arg Gly Ala Gly Tyr Gly
                    770                 775                 780

Tyr Asp Leu Ala Arg Trp Glu Asn Ala Gly Lys Tyr Ala Arg Leu Lys
785                 790                 795                 800

Asp Ile Ser Cys Glu Val Lys Glu Asp Ser Val Leu Val Lys Thr Ala
                    805                 810                 815

Phe Thr Leu Pro Val Ala Leu Lys Gly Asp Leu Thr Val Thr Tyr Glu
                    820                 825                 830

Val Asp Gly Arg Gly Lys Ile Ala Val Thr Ala Asp Phe Pro Gly Ala
                    835                 840                 845

Glu Glu Ala Gly Leu Leu Pro Ala Phe Gly Leu Asn Leu Ala Leu Pro
850                 855                 860

Lys Glu Leu Thr Asp Tyr Arg Tyr Tyr Gly Leu Gly Pro Asn Glu Ser
865                 870                 875                 880

Tyr Pro Asp Arg Leu Glu Gly Asn Tyr Leu Gly Ile Tyr Gln Gly Ala
                    885                 890                 895

Val Lys Lys Asn Phe Ser Pro Tyr Leu Arg Pro Gln Glu Thr Gly Asn
                    900                 905                 910
```

-continued

```
Arg Ser Lys Val Arg Trp Tyr Gln Leu Phe Asp Glu Lys Gly Gly Leu
        915                 920                 925

Glu Phe Thr Ala Asn Gly Ala Asp Leu Asn Leu Ser Ala Leu Pro Tyr
        930                 935                 940

Ser Ala Gln Ile Glu Ala Ala Asp His Ala Phe Glu Leu Thr Asn
945                 950                 955                 960

Asn Tyr Thr Trp Val Arg Ala Leu Ser Ala Gln Met Gly Val Gly Gly
                965                 970                 975

Asp Asp Ser Trp Gly Gln Lys Val His Pro Glu Phe Cys Leu Asp Ala
                980                 985                 990

Gln Lys Ala Arg Gln Leu Arg Leu Val Ile Gln Pro Leu Leu Leu Lys
                995                 1000                1005

<210> SEQ ID NO 15
<211> LENGTH: 1008
<212> TYPE: PRT
<213> ORGANISM: Lactobacillus delbrueckii subsp. bulgaricus

<400> SEQUENCE: 15

Met Ser Asn Lys Leu Val Lys Glu Lys Arg Val Asp Gln Ala Asp Leu
1               5                   10                  15

Ala Trp Leu Thr Asp Pro Glu Val Tyr Glu Val Asn Thr Ile Pro Pro
                20                  25                  30

His Ser Asp His Glu Ser Phe Gln Ser Gln Glu Leu Glu Glu Gly
            35                  40                  45

Lys Ser Ser Leu Val Gln Ser Leu Asp Gly Asp Trp Leu Ile Asp Tyr
    50                  55                  60

Ala Glu Asn Gly Gln Gly Pro Val Asn Phe Tyr Ala Glu Asp Phe Asp
65                  70                  75                  80

Asp Ser Asn Phe Lys Ser Val Lys Val Pro Gly Asn Leu Glu Leu Gln
                85                  90                  95

Gly Phe Gly Gln Pro Gln Tyr Val Asn Val Gln Tyr Pro Trp Asp Gly
                100                 105                 110

Ser Glu Glu Ile Phe Pro Pro Gln Ile Pro Ser Lys Asn Pro Leu Ala
            115                 120                 125

Ser Tyr Val Arg Tyr Phe Asp Leu Asp Glu Ala Phe Trp Asp Lys Glu
    130                 135                 140

Val Ser Leu Lys Phe Asp Gly Ala Ala Thr Ala Ile Tyr Val Trp Leu
145                 150                 155                 160

Asn Gly His Phe Val Gly Tyr Gly Glu Asp Ser Phe Thr Pro Ser Glu
                165                 170                 175

Phe Met Val Thr Lys Phe Leu Lys Lys Glu Asn Asn Arg Leu Ala Val
                180                 185                 190

Ala Leu Tyr Lys Tyr Ser Ser Ala Ser Trp Leu Glu Asp Gln Asp Phe
            195                 200                 205

Trp Arg Met Ser Gly Leu Phe Arg Ser Val Thr Leu Gln Ala Lys Pro
    210                 215                 220

Arg Leu His Leu Glu Asp Leu Lys Leu Thr Ala Ser Leu Thr Asp Asn
225                 230                 235                 240

Tyr Gln Lys Gly Lys Leu Glu Val Glu Ala Asn Ile Ala Tyr Arg Leu
                245                 250                 255

Pro Asn Ala Ser Phe Lys Leu Glu Val Arg Asp Ser Glu Gly Asp Leu
                260                 265                 270

Val Ala Glu Lys Leu Gly Pro Ile Arg Ser Glu Gln Leu Glu Phe Thr
```

-continued

```
            275                 280                 285
Leu Ala Asp Leu Pro Val Ala Ala Trp Ser Ala Glu Lys Pro Asn Leu
    290                 295                 300
Tyr Gln Val Arg Leu Tyr Leu Tyr Gln Ala Gly Ser Leu Leu Glu Val
305                 310                 315                 320
Ser Arg Gln Glu Val Gly Phe Arg Asn Phe Glu Leu Lys Asp Gly Ile
                325                 330                 335
Met Tyr Leu Asn Gly Gln Arg Ile Val Phe Lys Gly Ala Asn Arg His
                340                 345                 350
Glu Phe Asp Ser Lys Leu Gly Arg Ala Ile Thr Glu Glu Asp Met Ile
                355                 360                 365
Trp Asp Ile Lys Thr Met Lys Arg Ser Asn Ile Asn Ala Val Arg Cys
                370                 375                 380
Ser His Tyr Pro Asn Gln Ser Leu Phe Tyr Arg Leu Cys Asp Lys Tyr
385                 390                 395                 400
Gly Leu Tyr Val Ile Asp Glu Ala Asn Leu Glu Ser His Gly Thr Trp
                405                 410                 415
Glu Lys Val Gly Gly His Glu Asp Pro Ser Phe Asn Val Pro Gly Asp
                420                 425                 430
Asp Gln His Trp Leu Gly Ala Ser Leu Ser Arg Val Lys Asn Met Met
                435                 440                 445
Ala Arg Asp Lys Asn His Ala Ser Ile Leu Ile Trp Ser Leu Gly Asn
450                 455                 460
Glu Ser Tyr Ala Gly Thr Val Phe Ala Gln Met Ala Asp Tyr Val Arg
465                 470                 475                 480
Lys Ala Asp Pro Thr Arg Val Gln His Tyr Glu Gly Val Thr His Asn
                485                 490                 495
Arg Lys Phe Asp Asp Ala Thr Gln Ile Glu Ser Arg Met Tyr Ala Pro
                500                 505                 510
Ala Lys Val Ile Glu Glu Tyr Leu Thr Asn Lys Pro Ala Lys Pro Phe
                515                 520                 525
Ile Ser Val Glu Tyr Ala His Ala Met Gly Asn Ser Val Gly Asp Leu
530                 535                 540
Ala Ala Tyr Thr Ala Leu Glu Lys Tyr Pro His Tyr Gln Gly Gly Phe
545                 550                 555                 560
Ile Trp Asp Trp Ile Asp Gln Gly Leu Glu Lys Asp Gly His Leu Leu
                565                 570                 575
Tyr Gly Gly Asp Phe Asp Asp Arg Pro Thr Asp Tyr Glu Phe Cys Gly
                580                 585                 590
Asn Gly Leu Val Phe Ala Asp Arg Thr Glu Ser Pro Lys Leu Ala Asn
                595                 600                 605
Val Lys Ala Leu Tyr Ala Asn Leu Lys Leu Glu Val Lys Asp Gly Gln
                610                 615                 620
Leu Phe Leu Lys Asn Asp Asn Leu Phe Thr Asn Ser Ser Ser Tyr Tyr
625                 630                 635                 640
Phe Leu Thr Ser Leu Leu Val Asp Gly Lys Leu Thr Tyr Gln Ser Arg
                645                 650                 655
Pro Leu Thr Phe Gly Leu Glu Pro Gly Glu Ser Gly Thr Phe Ala Leu
                660                 665                 670
Pro Trp Pro Glu Val Ala Asp Glu Lys Gly Glu Val Val Tyr Arg Val
                675                 680                 685
Thr Ala His Leu Lys Glu Asp Leu Pro Trp Ala Asp Glu Gly Phe Thr
                690                 695                 700
```

Val Ala Glu Ala Glu Val Ala Gln Lys Leu Pro Glu Phe Lys Pro
705                 710                 715                 720

Glu Gly Arg Pro Asp Leu Val Asp Ser Asp Tyr Asn Leu Gly Leu Lys
            725                 730                 735

Gly Asn Asn Phe Gln Ile Leu Phe Ser Lys Val Lys Gly Trp Pro Val
        740                 745                 750

Ser Leu Lys Tyr Ala Gly Arg Glu Tyr Leu Lys Arg Leu Pro Glu Phe
    755                 760                 765

Thr Phe Trp Arg Ala Leu Thr Asp Asn Asp Arg Gly Ala Gly Tyr Gly
770                 775                 780

Tyr Asp Leu Ala Arg Trp Glu Asn Ala Gly Lys Tyr Ala Arg Leu Lys
785                 790                 795                 800

Asp Ile Ser Cys Glu Val Lys Glu Asp Ser Val Leu Val Lys Thr Ala
            805                 810                 815

Phe Thr Leu Pro Val Ala Leu Lys Gly Asp Leu Thr Val Thr Tyr Glu
        820                 825                 830

Val Asp Gly Arg Gly Lys Ile Ala Val Thr Ala Asp Phe Pro Gly Ala
    835                 840                 845

Glu Glu Ala Gly Leu Leu Pro Ala Phe Gly Leu Asn Leu Ala Leu Pro
850                 855                 860

Lys Glu Leu Thr Asp Tyr Arg Tyr Tyr Gly Leu Gly Pro Asn Glu Ser
865                 870                 875                 880

Tyr Pro Asp Arg Leu Glu Gly Asn Tyr Leu Gly Ile Tyr Gln Gly Ala
            885                 890                 895

Val Lys Lys Asn Phe Ser Pro Tyr Leu Arg Pro Gln Glu Thr Gly Asn
        900                 905                 910

Arg Ser Lys Val Arg Trp Tyr Gln Leu Phe Asp Glu Lys Gly Gly Leu
    915                 920                 925

Glu Phe Thr Ala Asn Gly Ala Asp Leu Asn Leu Ser Ala Leu Pro Tyr
930                 935                 940

Ser Ala Ala Gln Ile Glu Ala Asp His Ala Phe Glu Leu Thr Asn
945                 950                 955                 960

Asn Tyr Thr Trp Val Arg Ala Leu Ser Ala Gln Met Gly Val Gly Gly
            965                 970                 975

Asp Asp Ser Trp Gly Gln Lys Val His Pro Glu Phe Cys Leu Asp Ala
        980                 985                 990

Gln Lys Ala Arg Gln Leu Arg Leu Val Ile Gln Pro Leu Leu Leu Lys
    995                 1000                1005

<210> SEQ ID NO 16
<211> LENGTH: 1008
<212> TYPE: PRT
<213> ORGANISM: Lactobacillus delbrueckii subsp. lactis

<400> SEQUENCE: 16

Met Ser Asn Lys Leu Val Lys Glu Lys Arg Val Asp Gln Ala Asp Leu
1               5                   10                  15

Ala Trp Leu Thr Asp Pro Glu Val Tyr Glu Val Asn Thr Ile Pro Pro
            20                  25                  30

His Ser Asp His Glu Ser Phe Gln Ser Gln Glu Leu Glu Glu Gly
        35                  40                  45

Lys Ser Ser Leu Val Gln Ser Leu Asp Gly Asp Trp Leu Ile Asp Tyr
    50                  55                  60

Ala Glu Asn Gly Gln Gly Pro Val Asn Phe Tyr Ala Glu Asp Phe Asp

```
             65                  70                  75                  80
Asp Ser Asn Phe Lys Ser Val Lys Val Pro Gly Asn Leu Glu Leu Gln
                    85                  90                  95

Gly Phe Gly Gln Pro Gln Tyr Val Asn Ile Gln Tyr Pro Trp Asp Gly
                    100                 105                 110

Ser Glu Glu Ile Phe Pro Pro Gln Val Pro Ser Lys Asn Pro Leu Ala
                    115                 120                 125

Ser Tyr Val Arg Tyr Phe Asp Leu Asp Glu Ala Phe Trp Asp Lys Glu
            130                 135                 140

Val Ser Leu Lys Phe Ala Gly Ala Thr Ala Ile Tyr Val Trp Leu
145                 150                 155                 160

Asn Gly His Phe Val Gly Tyr Gly Glu Asp Ser Phe Thr Pro Ser Glu
                    165                 170                 175

Phe Met Val Thr Lys Phe Leu Lys Lys Glu Asn Asn Arg Leu Ala Val
                    180                 185                 190

Ala Leu Tyr Lys Tyr Ser Ser Ala Ser Trp Leu Glu Asp Gln Asp Phe
            195                 200                 205

Trp Arg Leu Ser Gly Leu Phe Arg Ser Val Thr Leu Gln Ala Lys Pro
        210                 215                 220

Leu Leu His Leu Glu Asp Leu Lys Leu Thr Ala Ser Leu Thr Asp Asn
225                 230                 235                 240

Tyr Gln Lys Gly Lys Leu Glu Val Glu Ala Asn Ile Ala Tyr Arg Leu
                    245                 250                 255

Pro Asn Ala Ser Phe Lys Leu Glu Val Arg Asp Ser Glu Gly Asp Leu
                    260                 265                 270

Val Ala Glu Lys Leu Gly Pro Ile Arg Ser Glu Gln Leu Glu Phe Thr
            275                 280                 285

Leu Ala Asp Leu Pro Val Ala Ala Trp Ser Ala Glu Lys Pro Asn Leu
        290                 295                 300

Tyr Gln Val Arg Leu Tyr Leu Tyr Gln Ala Gly Ser Leu Leu Glu Val
305                 310                 315                 320

Ser Arg Gln Glu Val Gly Phe Arg Asn Phe Glu Leu Lys Asp Gly Ile
                    325                 330                 335

Met Tyr Leu Asn Gly Gln Arg Ile Val Phe Lys Gly Val Asn Arg His
                    340                 345                 350

Glu Phe Asp Ser Lys Leu Gly Arg Ala Ile Thr Glu Glu Asp Met Ile
            355                 360                 365

Trp Asp Ile Lys Thr Met Lys Arg Ser Asn Ile Asn Ala Val Arg Cys
        370                 375                 380

Ser His Tyr Pro Asn Gln Ser Leu Phe Tyr Arg Leu Cys Asp Lys Tyr
385                 390                 395                 400

Gly Leu Tyr Val Ile Asp Glu Ala Asn Leu Glu Ser His Gly Thr Trp
                    405                 410                 415

Glu Lys Val Gly His Glu Asp Pro Ser Phe Asn Val Pro Gly Asp Asp
                    420                 425                 430

Gln His Trp Leu Gly Ala Ser Leu Ser Arg Val Lys Asn Met Met Ala
            435                 440                 445

Arg Asp Lys Asn His Ala Ser Ile Leu Ile Trp Ser Leu Gly Asn Glu
        450                 455                 460

Ser Tyr Ala Gly Thr Val Phe Ala Gln Met Ala Asp Tyr Val Arg Lys
465                 470                 475                 480

Ala Asp Pro Thr Arg Val Gln His Tyr Glu Gly Val Thr His Asn Arg
                    485                 490                 495
```

```
Lys Phe Asp Asp Ala Thr Gln Ile Glu Ser Arg Met Tyr Ala Pro Ala
                500                 505                 510

Lys Glu Ile Glu Glu Tyr Leu Thr Lys Lys Pro Ala Lys Pro Phe Ile
                515                 520                 525

Ser Val Glu Tyr Ala His Ala Met Gly Asn Ser Val Gly Asp Leu Ala
                530                 535                 540

Ala Tyr Thr Ala Leu Glu Lys Tyr Pro His Tyr Gln Gly Gly Phe Ile
545                 550                 555                 560

Trp Asp Trp Ile Asp Gln Gly Leu Glu Lys Asp Gly His Leu Leu Tyr
                565                 570                 575

Gly Gly Gly Asp Phe Asp Arg Pro Thr Asp Tyr Glu Phe Cys Gly
                580                 585                 590

Asn Gly Leu Val Phe Ala Asp Arg Thr Thr Ser Pro Lys Leu Ala Asn
                595                 600                 605

Val Lys Ala Leu Tyr Ser Asn Leu Lys Leu Glu Val Lys Asp Gly Gln
                610                 615                 620

Leu Phe Leu Lys Asn Asp Asn Leu Phe Thr Asn Ser Ser Ala Tyr Tyr
625                 630                 635                 640

Phe Leu Thr Ser Leu Leu Val Asp Gly Lys Leu Thr Tyr Gln Ser Gln
                645                 650                 655

Pro Leu Thr Phe Gly Leu Glu Pro Gly Glu Ser Gly Thr Phe Val Leu
                660                 665                 670

Pro Trp Pro Glu Val Glu Asp Glu Lys Gly Glu Ile Val Tyr Gln Val
                675                 680                 685

Thr Ala His Leu Lys Glu Asp Leu Pro Trp Ala Asp Glu Gly Phe Thr
                690                 695                 700

Val Ala Glu Ala Glu Glu Ala Val Thr Lys Leu Pro Glu Phe Tyr Pro
705                 710                 715                 720

Ala Gly Arg Pro Glu Leu Val Asp Ser Asp Phe Asn Leu Gly Leu Lys
                725                 730                 735

Gly Asn Gly Phe Arg Ile Leu Phe Ser Lys Ala Lys Gly Trp Pro Val
                740                 745                 750

Ser Ile Lys Tyr Ala Gly Arg Glu Tyr Leu Lys Arg Leu Pro Glu Phe
                755                 760                 765

Thr Phe Trp Arg Ala Leu Thr Asp Asn Asp Arg Gly Ala Gly Tyr Gly
770                 775                 780

Tyr Asp Leu Ala Lys Trp Glu Asn Ala Gly Lys Tyr Ala Arg Leu Gln
785                 790                 795                 800

Asp Ile Ser Tyr Glu Ile Lys Glu Asn Ser Val Leu Val Lys Thr Ala
                805                 810                 815

Phe Thr Leu Pro Val Ala Leu Lys Gly Asp Leu Thr Ile Thr Tyr Glu
                820                 825                 830

Val Asp Ser Leu Gly Lys Ile Ala Val Thr Ala Asn Phe Pro Gly Ala
                835                 840                 845

Val Glu Asn Gly Leu Leu Pro Ala Phe Gly Leu Asn Phe Ala Leu Pro
                850                 855                 860

Lys Glu Leu Ser Asp Tyr Arg Tyr Tyr Gly Leu Gly Pro Asn Glu Ser
865                 870                 875                 880

Tyr Ala Asp Arg Leu Glu Gly Ser Tyr Leu Gly Ile Tyr Gln Gly Ala
                885                 890                 895

Val Glu Lys Asn Phe Thr Pro Tyr Leu Arg Pro Gln Glu Ala Gly Asn
                900                 905                 910
```

```
Arg Ser Lys Val Arg Tyr Tyr Gln Leu Phe Asp Glu Glu Ser Gly Leu
            915                 920                 925

Glu Phe Thr Ala Asn Gly Ala Asp Leu Asn Leu Ser Ala Leu Pro Tyr
        930                 935                 940

Ser Ala Ala Gln Ile Glu Ala Ala Asp His Ala Phe Glu Leu Ser Asn
945                 950                 955                 960

Asn Tyr Thr Trp Val Arg Ala Leu Ala Ala Gln Met Gly Val Gly Gly
                965                 970                 975

Asp Asp Ser Trp Gly Gln Lys Val His Pro Glu Phe Cys Leu Asp Ala
            980                 985                 990

Gln Glu Ala Arg Gln Leu Lys Leu Val Ile Gln Pro Leu Leu Leu Lys
        995                 1000                1005

<210> SEQ ID NO 17
<211> LENGTH: 1008
<212> TYPE: PRT
<213> ORGANISM: Lactobacillus delbrueckii subsp. bulgaricus

<400> SEQUENCE: 17

Met Ser Asn Lys Leu Val Lys Glu Lys Arg Val Asp Gln Ala Asp Leu
1               5                   10                  15

Ala Trp Leu Thr Asp Pro Glu Val Tyr Glu Val Asn Thr Ile Pro Pro
            20                  25                  30

His Ser Asp His Glu Ser Phe Gln Ser Gln Glu Glu Leu Glu Glu Gly
        35                  40                  45

Lys Ser Ser Leu Val Gln Ser Leu Asp Gly Asp Trp Leu Ile Asp Tyr
    50                  55                  60

Ala Glu Asn Gly Gln Gly Pro Val Asn Phe Tyr Ala Glu Asp Phe Asp
65                  70                  75                  80

Asp Ser Asn Phe Lys Ser Val Lys Val Pro Gly Asn Leu Glu Leu Gln
                85                  90                  95

Gly Phe Gly Gln Pro Gln Tyr Val Asn Val Gln Tyr Pro Trp Asp Gly
            100                 105                 110

Ser Glu Glu Ile Phe Pro Pro Gln Ile Pro Ser Lys Asn Pro Leu Ala
        115                 120                 125

Ser Tyr Val Arg Tyr Phe Asp Leu Asp Glu Ala Phe Trp Asp Lys Glu
    130                 135                 140

Val Ser Leu Lys Phe Asp Gly Ala Ala Thr Ala Ile Tyr Val Trp Leu
145                 150                 155                 160

Asn Gly His Phe Val Gly Tyr Gly Glu Asp Ser Phe Thr Pro Ser Glu
                165                 170                 175

Phe Met Val Thr Lys Phe Leu Lys Lys Glu Asn Asn Arg Leu Ala Val
            180                 185                 190

Ala Leu Tyr Lys Tyr Ser Ser Ala Ser Trp Leu Glu Asp Gln Asp Phe
        195                 200                 205

Trp Arg Met Ser Gly Leu Phe Arg Ser Val Thr Leu Gln Ala Lys Pro
    210                 215                 220

Arg Leu His Leu Glu Asp Leu Lys Leu Thr Ala Ser Leu Thr Asp Asn
225                 230                 235                 240

Tyr Gln Lys Gly Lys Leu Glu Val Glu Ala Asn Ile Ala Tyr Arg Leu
                245                 250                 255

Pro Asn Ala Ser Phe Lys Leu Glu Val Arg Asp Ser Glu Gly Asp Leu
            260                 265                 270

Val Ala Glu Lys Leu Gly Pro Ile Arg Ser Glu Gln Leu Glu Phe Thr
        275                 280                 285
```

```
Leu Ala Asp Leu Pro Val Ala Ala Trp Ser Ala Glu Lys Pro Asn Leu
    290                 295                 300

Tyr Gln Val Arg Leu Tyr Leu Tyr Gln Ala Gly Ser Leu Leu Glu Val
305                 310                 315                 320

Ser Arg Gln Glu Val Gly Phe Arg Asn Phe Glu Leu Lys Asp Gly Ile
                325                 330                 335

Met Tyr Leu Asn Gly Gln Arg Ile Val Phe Lys Gly Val Asn Arg His
            340                 345                 350

Glu Phe Asp Ser Lys Leu Gly Arg Ala Ile Thr Glu Glu Asp Met Ile
        355                 360                 365

Trp Asp Ile Lys Thr Ile Lys Arg Ser Asn Ile Asn Ala Val Arg Cys
    370                 375                 380

Ser His Tyr Pro Asn Gln Ser Leu Phe Tyr Arg Leu Cys Asp Lys Tyr
385                 390                 395                 400

Gly Leu Tyr Val Ile Asp Glu Ala Asn Leu Glu Ser His Gly Thr Trp
                405                 410                 415

Glu Lys Val Gly Gly His Glu Asp Pro Ser Phe Asn Val Pro Gly Asp
            420                 425                 430

Asp Gln His Trp Leu Gly Ala Ser Leu Ser Arg Val Lys Asn Met Met
        435                 440                 445

Ala Arg Asp Lys Asn His Ala Ser Ile Leu Ile Trp Ser Leu Gly Asn
    450                 455                 460

Glu Ser Tyr Ala Gly Thr Val Phe Ala Gln Met Ala Asp Tyr Val Arg
465                 470                 475                 480

Lys Ala Asp Pro Thr Arg Val Gln His Tyr Glu Gly Val Thr His Asn
                485                 490                 495

Arg Lys Phe Asp Asp Ala Thr Gln Ile Glu Ser Arg Met Tyr Ala Pro
            500                 505                 510

Ala Lys Val Ile Glu Glu Tyr Leu Thr Asn Lys Pro Ala Lys Pro Phe
        515                 520                 525

Ile Ser Val Glu Tyr Ala His Ala Met Gly Asn Ser Val Gly Asp Leu
    530                 535                 540

Ala Ala Tyr Thr Ala Leu Glu Lys Tyr Pro His Tyr Gln Gly Gly Phe
545                 550                 555                 560

Ile Trp Asp Trp Ile Asp Gln Gly Leu Glu Lys Asp Gly His Leu Leu
                565                 570                 575

Tyr Gly Gly Asp Phe Asp Asp Arg Pro Thr Asp Tyr Glu Phe Cys Gly
            580                 585                 590

Asn Gly Leu Val Phe Ala Asp Arg Thr Glu Ser Pro Lys Leu Ala Asn
        595                 600                 605

Val Lys Ala Leu Tyr Ala Asn Leu Lys Leu Glu Val Lys Asp Gly Gln
    610                 615                 620

Leu Phe Leu Lys Asn Asp Asn Leu Phe Thr Asn Ser Ser Ser Tyr Tyr
625                 630                 635                 640

Phe Leu Thr Ser Leu Leu Val Asp Gly Lys Leu Thr Tyr Gln Ser Arg
                645                 650                 655

Pro Leu Thr Phe Gly Leu Glu Pro Gly Glu Ser Gly Thr Phe Ala Leu
            660                 665                 670

Pro Trp Pro Glu Val Ala Asp Glu Lys Gly Glu Val Val Tyr Arg Val
        675                 680                 685

Thr Ala His Leu Lys Glu Asp Leu Pro Trp Ala Asp Glu Gly Phe Thr
    690                 695                 700
```

```
Val Ala Glu Ala Glu Val Ala Gln Lys Leu Pro Glu Phe Lys Pro
705                 710                 715                 720

Glu Gly Arg Pro Asp Leu Val Asp Ser Asp Tyr Asn Leu Gly Leu Lys
            725                 730                 735

Gly Asn Asn Phe Gln Ile Leu Phe Ser Lys Val Lys Gly Trp Pro Val
                740                 745                 750

Ser Leu Lys Tyr Ala Gly Arg Glu Tyr Leu Lys Arg Leu Pro Glu Phe
            755                 760                 765

Thr Phe Trp Arg Ala Leu Thr Asp Asn Asp Arg Gly Ala Gly Tyr Gly
        770                 775                 780

Tyr Asp Leu Ala Arg Trp Glu Asn Ala Gly Lys Tyr Ala Arg Leu Lys
785                 790                 795                 800

Asp Ile Ser Cys Glu Val Lys Glu Asp Ser Val Leu Val Lys Thr Ala
                805                 810                 815

Phe Thr Leu Pro Val Ala Leu Lys Gly Asp Leu Thr Val Thr Tyr Glu
                820                 825                 830

Val Asp Gly Arg Gly Lys Ile Ala Val Thr Ala Asp Phe Pro Gly Ala
            835                 840                 845

Glu Glu Ala Gly Leu Leu Pro Ala Phe Gly Leu Asn Leu Ala Leu Pro
850                 855                 860

Lys Glu Leu Thr Asp Tyr Arg Tyr Tyr Gly Leu Gly Pro Asn Glu Ser
865                 870                 875                 880

Tyr Pro Asp Arg Leu Glu Gly Asn Tyr Leu Gly Ile Tyr Gln Gly Ala
            885                 890                 895

Val Lys Lys Asn Phe Ser Pro Tyr Leu Arg Pro Gln Glu Thr Gly Asn
            900                 905                 910

Arg Ser Lys Val Arg Trp Tyr Gln Leu Phe Asp Glu Lys Gly Gly Leu
            915                 920                 925

Glu Phe Thr Ala Asn Gly Ala Asp Leu Asn Leu Ser Ala Leu Pro Tyr
            930                 935                 940

Ser Ala Ala Gln Ile Glu Ala Ala Asp His Ala Phe Asp Leu Thr Asn
945                 950                 955                 960

Asn Tyr Thr Trp Val Arg Ala Leu Ser Ala Gln Met Gly Val Gly Gly
                965                 970                 975

Asp Asp Ser Trp Gly Gln Lys Val His Pro Glu Phe Cys Leu Asp Ala
            980                 985                 990

Gln Lys Ala Arg Gln Leu Arg Leu Val Ile Gln Pro Leu Leu Leu Lys
            995                 1000                1005

<210> SEQ ID NO 18
<211> LENGTH: 1008
<212> TYPE: PRT
<213> ORGANISM: Lactobacillus delbrueckii subsp. bulgaricus

<400> SEQUENCE: 18

Met Ser Asn Lys Leu Val Lys Glu Lys Arg Val Asp Gln Ala Asp Leu
1               5                   10                  15

Ala Trp Leu Thr Asp Pro Glu Val Tyr Glu Val Asn Thr Ile Pro Pro
            20                  25                  30

His Ser Asp His Glu Ser Phe Gln Ser Gln Glu Glu Leu Glu Glu Gly
        35                  40                  45

Lys Ser Ser Leu Val Gln Ser Leu Asp Gly Asp Trp Leu Ile Asp Tyr
    50                  55                  60

Ala Glu Asn Gly Gln Gly Pro Val Asn Phe Tyr Ala Glu Asp Phe Asp
65                  70                  75                  80
```

```
Asp Ser Asn Phe Lys Ser Val Lys Val Pro Gly Asn Leu Glu Leu Gln
                85                  90                  95

Gly Phe Gly Gln Pro Gln Tyr Val Asn Val Gln Tyr Pro Trp Asp Gly
            100                 105                 110

Ser Glu Glu Ile Phe Pro Pro Gln Ile Pro Ser Lys Asn Pro Leu Ala
            115                 120                 125

Ser Tyr Val Arg Tyr Phe Asp Leu Asp Glu Ala Phe Trp Asp Lys Glu
            130                 135                 140

Val Ser Leu Lys Phe Asp Gly Ala Ala Thr Ala Ile Tyr Val Trp Leu
145                 150                 155                 160

Asn Gly His Phe Val Gly Tyr Gly Glu Asp Ser Phe Thr Pro Ser Glu
                165                 170                 175

Phe Met Val Thr Lys Phe Leu Lys Lys Glu Asn Asn Arg Leu Ala Val
                180                 185                 190

Ala Leu Tyr Lys Tyr Ser Ser Ala Ser Trp Leu Glu Asp Gln Asp Phe
                195                 200                 205

Trp Arg Met Ser Gly Leu Phe Arg Ser Val Thr Leu Gln Ala Lys Pro
            210                 215                 220

Arg Leu His Leu Glu Asp Leu Lys Leu Thr Ala Ser Leu Thr Asp Asn
225                 230                 235                 240

Tyr Gln Lys Gly Lys Leu Glu Val Glu Ala Asn Ile Ala Tyr Arg Leu
                245                 250                 255

Pro Asn Ala Ser Phe Lys Leu Glu Val Arg Asp Ser Glu Gly Asp Leu
                260                 265                 270

Val Ala Glu Lys Leu Gly Pro Ile Gly Ser Glu Gln Leu Glu Phe Thr
            275                 280                 285

Leu Ala Asp Leu Pro Val Ala Ala Trp Ser Ala Glu Lys Pro Asn Leu
290                 295                 300

Tyr Gln Val Arg Leu Tyr Leu Tyr Gln Ala Gly Ser Leu Leu Glu Val
305                 310                 315                 320

Ser Arg Gln Glu Val Gly Phe Arg Asn Phe Glu Leu Lys Asp Gly Ile
                325                 330                 335

Met Tyr Leu Asn Gly Gln Arg Ile Val Phe Lys Gly Val Asn Arg His
            340                 345                 350

Glu Phe Asp Ser Lys Leu Gly Arg Ala Ile Thr Glu Glu Asp Met Ile
            355                 360                 365

Trp Asp Ile Lys Thr Ile Lys Arg Ser Asn Ile Asn Ala Val Arg Cys
370                 375                 380

Ser His Tyr Pro Asn Gln Ser Leu Phe Tyr Arg Leu Cys Asp Lys Tyr
385                 390                 395                 400

Gly Leu Tyr Val Ile Asp Glu Ala Asn Leu Glu Ser His Gly Thr Trp
            405                 410                 415

Glu Lys Val Gly Gly His Glu Asp Pro Ser Phe Asn Val Pro Gly Asp
            420                 425                 430

Asp Gln His Trp Leu Gly Ala Ser Leu Ser Arg Val Lys Asn Met Met
            435                 440                 445

Ala Arg Asp Lys Asn His Ala Ser Ile Leu Ile Trp Ser Leu Gly Asn
450                 455                 460

Glu Ser Tyr Ala Gly Thr Val Phe Ala Gln Met Ala Asp Tyr Val Arg
465                 470                 475                 480

Lys Ala Asp Pro Thr Arg Val Gln His Tyr Glu Gly Val Thr His Asn
                485                 490                 495
```

```
Arg Lys Phe Asp Asp Ala Thr Gln Ile Glu Ser Arg Met Tyr Ala Pro
            500                 505                 510

Ala Lys Val Ile Glu Glu Tyr Leu Thr Asn Lys Pro Ala Lys Pro Phe
        515                 520                 525

Ile Ser Val Glu Tyr Ala His Ala Met Gly Asn Ser Val Gly Asp Leu
    530                 535                 540

Ala Ala Tyr Thr Ala Leu Glu Lys Tyr Pro His Tyr Gln Gly Gly Phe
545                 550                 555                 560

Ile Trp Asp Trp Ile Asp Gln Gly Leu Glu Lys Asp Gly His Leu Leu
                565                 570                 575

Tyr Gly Gly Asp Phe Asp Asp Arg Pro Thr Asp Tyr Glu Phe Cys Gly
                580                 585                 590

Asn Gly Leu Val Phe Ala Asp Arg Thr Glu Ser Pro Lys Leu Ala Asn
            595                 600                 605

Val Lys Ala Leu Tyr Ala Asn Leu Lys Leu Glu Val Lys Asp Gly Gln
    610                 615                 620

Leu Phe Leu Lys Asn Asp Asn Leu Phe Thr Asn Ser Ser Ser Tyr Tyr
625                 630                 635                 640

Phe Leu Thr Ser Leu Leu Val Asp Gly Lys Leu Thr Tyr Gln Ser Arg
                645                 650                 655

Pro Leu Thr Phe Gly Leu Glu Pro Gly Glu Ser Gly Thr Phe Ala Leu
            660                 665                 670

Pro Trp Pro Glu Val Ala Asp Glu Lys Gly Glu Val Val Tyr Arg Val
        675                 680                 685

Thr Ala His Leu Lys Glu Asp Leu Pro Trp Ala Asp Glu Gly Phe Thr
690                 695                 700

Val Ala Glu Ala Glu Glu Val Ala Gln Lys Leu Pro Glu Phe Lys Pro
705                 710                 715                 720

Glu Gly Arg Pro Asp Leu Val Asp Ser Asp Tyr Asn Leu Gly Leu Lys
                725                 730                 735

Gly Asn Asn Phe Gln Ile Leu Phe Ser Lys Val Lys Gly Trp Pro Val
            740                 745                 750

Ser Leu Lys Tyr Ala Gly Arg Glu Tyr Leu Lys Arg Leu Pro Glu Phe
        755                 760                 765

Thr Phe Trp Arg Ala Leu Thr Asp Asn Asp Arg Gly Ala Gly Tyr Gly
    770                 775                 780

Tyr Asp Leu Ala Arg Trp Glu Asn Ala Gly Lys Tyr Ala Arg Leu Lys
785                 790                 795                 800

Asp Ile Ser Cys Glu Val Lys Glu Asp Ser Val Leu Val Lys Thr Ala
                805                 810                 815

Phe Thr Leu Pro Val Ala Leu Lys Gly Asp Leu Thr Val Thr Tyr Glu
            820                 825                 830

Val Asp Gly Arg Gly Lys Ile Ala Val Thr Ala Asp Phe Pro Gly Ala
        835                 840                 845

Glu Glu Ala Gly Leu Leu Pro Ala Phe Gly Leu Asn Leu Ala Leu Pro
850                 855                 860

Lys Glu Leu Thr Asp Tyr Arg Tyr Tyr Gly Leu Gly Pro Asn Glu Ser
865                 870                 875                 880

Tyr Pro Asp Arg Leu Glu Gly Asn Tyr Leu Gly Ile Tyr Gln Gly Ala
                885                 890                 895

Val Lys Lys Asn Phe Ser Pro Tyr Leu Arg Pro Gln Glu Thr Gly Asn
            900                 905                 910

Arg Ser Lys Val Arg Trp Tyr Gln Leu Phe Asp Glu Lys Gly Gly Leu
```

915                 920                 925
Glu Phe Thr Ala Asn Gly Ala Asp Leu Asn Leu Ser Ala Leu Pro Tyr
    930                 935                 940

Ser Ala Ala Gln Ile Glu Ala Ala Asp His Ala Phe Glu Leu Thr Asn
945                 950                 955                 960

Asn Tyr Thr Trp Val Arg Ala Leu Ser Ala Gln Met Gly Val Gly Gly
                965                 970                 975

Asp Asp Ser Trp Gly Gln Lys Val His Pro Glu Phe Cys Leu Asp Ala
                980                 985                 990

Gln Lys Ala Arg Gln Leu Arg Leu Val Ile Gln Pro Leu Leu Leu Lys
                995                 1000                1005

<210> SEQ ID NO 19
<211> LENGTH: 1007
<212> TYPE: PRT
<213> ORGANISM: Lactobacillus delbrueckii subsp. lactis

<400> SEQUENCE: 19

Met Ser Asn Lys Leu Val Lys Glu Lys Arg Val Asp Gln Ala Asp Leu
1               5                   10                  15

Ala Trp Leu Thr Asp Pro Glu Val Tyr Glu Val Asn Thr Ile Pro Pro
                20                  25                  30

His Ser Asp His Glu Ser Phe Gln Ser Gln Glu Glu Leu Glu Glu Gly
                35                  40                  45

Lys Ser Ser Leu Val Gln Ser Leu Asp Gly Asn Trp Leu Ile Asp Tyr
            50                  55                  60

Ala Glu Asn Gly Gln Gly Pro Ile Asn Phe Tyr Ala Glu Asp Phe Asp
65                  70                  75                  80

Asp Ser Asn Phe Lys Ser Val Lys Val Pro Gly Asn Leu Glu Leu Gln
                85                  90                  95

Gly Phe Gly Gln Pro Gln Tyr Val Asn Ile Gln Tyr Pro Trp Asp Gly
                100                 105                 110

Ser Glu Glu Ile Phe Pro Pro Gln Val Pro Ser Lys Asn Pro Leu Ala
            115                 120                 125

Ser Tyr Val Arg Tyr Phe Asp Leu Asp Glu Ala Leu Trp Asp Lys Glu
            130                 135                 140

Val Ser Leu Lys Phe Ala Gly Ala Ala Thr Ala Ile Tyr Val Trp Leu
145                 150                 155                 160

Asn Gly His Phe Val Gly Tyr Gly Glu Asp Ser Phe Thr Pro Ser Glu
                165                 170                 175

Phe Met Val Thr Lys Phe Leu Lys Lys Glu Gly Asn Arg Leu Ala Val
                180                 185                 190

Ala Leu Tyr Lys Tyr Ser Ser Ala Ser Trp Leu Glu Asp Gln Asp Phe
            195                 200                 205

Trp Arg Leu Ser Gly Leu Phe Arg Ser Val Thr Leu Glu Ala Lys Pro
    210                 215                 220

Leu Leu His Leu Glu Asp Leu Lys Leu Thr Ala Ser Leu Thr Asp Asn
225                 230                 235                 240

Tyr Gln Lys Gly Lys Leu Glu Val Glu Ala Asn Ile Ala Tyr Arg Leu
                245                 250                 255

Pro Asn Ala Ser Phe Lys Leu Glu Val Arg Asp Ser Glu Gly Asp Leu
                260                 265                 270

Val Ala Glu Lys Val Gly Pro Ile Arg Ser Glu Lys Leu Asp Phe Ser
            275                 280                 285

-continued

```
Leu Ala Asp Leu Pro Val Ala Ala Trp Ser Ala Glu Lys Pro Asn Leu
290                 295                 300
Tyr Gln Val Arg Leu Tyr Leu Tyr Gln Ala Gly Ser Leu Leu Glu Val
305                 310                 315                 320
Ser Arg Gln Glu Val Gly Phe Arg Asn Phe Glu Leu Lys Asp Gly Ile
                325                 330                 335
Met Tyr Leu Asn Gly Gln Arg Ile Val Phe Lys Gly Val Asn Arg His
            340                 345                 350
Glu Phe Asp Ser Lys Leu Gly Arg Ala Ile Thr Glu Ala Asp Met Ile
        355                 360                 365
Trp Asp Ile Lys Thr Met Lys Gln Ser Asn Ile Asn Ala Val Arg Cys
370                 375                 380
Ser His Tyr Pro Asn Gln Ser Leu Phe Tyr Arg Leu Cys Asp Lys Tyr
385                 390                 395                 400
Gly Leu Tyr Val Ile Asp Glu Ala Asn Leu Glu Ser His Gly Thr Trp
                405                 410                 415
Glu Lys Val Gly His Glu Asp Pro Ser Phe Asn Val Pro Gly Asp Asp
            420                 425                 430
Gln His Trp Leu Gly Ala Ser Leu Ser Arg Val Lys Asn Met Met Ala
        435                 440                 445
Arg Asp Lys Asn His Ala Ser Ile Leu Ile Trp Ser Leu Gly Asn Glu
450                 455                 460
Ser Tyr Ala Gly Thr Val Phe Ala Gln Met Ala Asp Tyr Val Arg Lys
465                 470                 475                 480
Ala Asp Pro Thr Arg Val Gln His Tyr Glu Gly Val Thr His Asn Arg
                485                 490                 495
Lys Phe Asp Asp Ala Thr Gln Ile Glu Ser Arg Met Tyr Ala Pro Ala
            500                 505                 510
Lys Glu Ile Glu Glu Tyr Leu Thr Lys Lys Pro Ala Lys Pro Phe Ile
        515                 520                 525
Ser Val Glu Tyr Ala His Ala Met Gly Asn Ser Val Gly Asp Leu Ala
530                 535                 540
Ala Tyr Thr Ala Leu Glu Lys Tyr Pro His Tyr Gln Gly Gly Phe Ile
545                 550                 555                 560
Trp Asp Trp Ile Asp Gln Gly Leu Glu Lys Asp Gly His Leu Leu Tyr
                565                 570                 575
Gly Gly Asp Phe Asp Asp Arg Pro Thr Asp Tyr Glu Phe Cys Gly Asp
            580                 585                 590
Gly Leu Val Phe Ala Asp Arg Thr Thr Ser Pro Lys Leu Ala Asn Val
        595                 600                 605
Lys Ala Leu Tyr Ser Asn Leu Lys Leu Glu Val Lys Asp Gly Gln Leu
610                 615                 620
Phe Ile Lys Asn Asp Asn Leu Phe Thr Asn Ser Ser Ala Tyr Tyr Phe
625                 630                 635                 640
Leu Thr Ser Leu Leu Val Asp Gly Lys Leu Thr Tyr Gln Ser Gln Pro
                645                 650                 655
Leu Thr Phe Gly Leu Glu Pro Gly Glu Ser Gly Thr Phe Ala Leu Pro
            660                 665                 670
Trp Pro Glu Val Glu Asp Glu Lys Gly Glu Ile Val Tyr Gln Val Thr
        675                 680                 685
Ala His Leu Lys Glu Asp Leu Pro Trp Ala Asp Glu Gly Phe Thr Val
690                 695                 700
Ala Glu Ala Glu Glu Ala Val Thr Lys Leu Pro Glu Phe Tyr Pro Ala
```

```
            705                 710                 715                 720
Gly Arg Pro Glu Leu Val Asp Ser Asp Phe Asn Leu Gly Leu Lys Gly
                725                 730                 735

Asn Gly Phe Arg Ile Leu Phe Ser Lys Ala Lys Gly Trp Pro Val Ser
                740                 745                 750

Ile Lys Tyr Ala Gly Arg Glu Tyr Leu Lys Arg Leu Pro Glu Phe Thr
                755                 760                 765

Phe Trp Arg Ala Leu Thr Asp Asn Asp Arg Gly Ala Gly Tyr Gly Tyr
                770                 775                 780

Asp Leu Ala Lys Trp Glu Asn Ala Gly Lys Tyr Ala Arg Leu Gln Asp
785                 790                 795                 800

Ile Ser Tyr Glu Ile Lys Glu Asn Ser Ala Leu Val Lys Thr Ala Phe
                805                 810                 815

Thr Leu Pro Val Ala Leu Lys Gly Asp Leu Thr Ile Thr Tyr Glu Val
                820                 825                 830

Asp Ser Leu Gly Lys Ile Ala Val Thr Ala Asn Phe Pro Gly Ala Val
                835                 840                 845

Glu Asn Gly Leu Leu Pro Ala Phe Gly Leu Asn Phe Ala Leu Pro Lys
850                 855                 860

Glu Leu Ser Asp Tyr Arg Tyr Tyr Gly Leu Gly Pro Asn Glu Ser Tyr
865                 870                 875                 880

Ala Asp Arg Leu Glu Gly Ser Tyr Leu Gly Ile Tyr Gln Gly Met Val
                885                 890                 895

Glu Lys Asn Phe Thr Pro Tyr Leu Arg Pro Gln Glu Ala Gly Asn Arg
                900                 905                 910

Ser Lys Val Arg Tyr Tyr Gln Leu Phe Asp Glu Glu Gly Gly Leu Glu
                915                 920                 925

Phe Thr Ala Asn Gly Ala Asp Leu Asn Leu Ser Ala Leu Pro Tyr Ser
                930                 935                 940

Ala Ala Gln Ile Glu Ala Ala Asp His Ala Phe Glu Leu Thr Asn Asn
945                 950                 955                 960

Tyr Thr Trp Val Arg Ala Leu Ala Ala Gln Met Gly Val Gly Gly Asp
                965                 970                 975

Asp Ser Trp Gly Gln Lys Val His Pro Glu Phe Cys Leu Asp Ala Gln
                980                 985                 990

Glu Ala Arg Gln Leu Lys Leu Val Ile Gln Pro Leu Leu Leu Lys
                995                 1000                1005

<210> SEQ ID NO 20
<211> LENGTH: 628
<212> TYPE: PRT
<213> ORGANISM: Lactobacillus helveticus

<400> SEQUENCE: 20

Met Gln Ala Asn Ile Asn Trp Leu Asp Asn Pro Glu Val Phe Arg Val
1               5                   10                  15

Asn Gln Leu Pro Ala His Ser Asp His Pro Phe Arg Asp Tyr Arg
                20                  25                  30

Glu Trp Gln Lys Gln His Ser Ser Tyr Gln Gln Ser Leu Asn Gly Lys
                35                  40                  45

Trp Lys Phe His Phe Ser Ala Asn Pro Met Asp Arg Pro Gln Asp Phe
                50                  55                  60

Tyr Gln Arg Asp Phe Asp Ser Ser Asn Phe Asp Ser Ile Pro Val Pro
65                  70                  75                  80
```

```
Ser Glu Ile Glu Leu Ser Asn Tyr Thr Gln Asn Gln Tyr Ile Asn Val
                85                  90                  95

Leu Phe Pro Trp Glu Gly Lys Ile Phe Arg Arg Pro Ala Tyr Ala Leu
            100                 105                 110

Asp Pro Asn Asp His Glu Glu Gly Ser Phe Ser Lys Gly Ala Asp Asn
            115                 120                 125

Thr Val Gly Ser Tyr Leu Lys Arg Phe Asp Leu Ser Ser Ala Leu Ile
130                 135                 140

Gly Lys Asp Val His Ile Lys Phe Glu Gly Val Glu Gln Ala Met Tyr
145                 150                 155                 160

Val Trp Leu Asn Gly His Phe Val Gly Tyr Ala Glu Asp Ser Phe Thr
                165                 170                 175

Pro Ser Glu Phe Asp Leu Thr Pro Tyr Ile Gln Asp Lys Asp Asn Leu
            180                 185                 190

Leu Ala Val Glu Val Phe Lys His Ser Thr Ala Ser Trp Leu Glu Asp
            195                 200                 205

Gln Asp Met Phe Arg Phe Ser Gly Ile Phe Arg Ser Val Glu Leu Leu
210                 215                 220

Gly Ile Pro Ala Thr His Leu Met Asp Met Asp Leu Lys Pro Arg Val
225                 230                 235                 240

Ala Asp Asn Tyr Gln Asp Gly Ile Phe Asn Leu Lys Leu His Phe Ile
                245                 250                 255

Gly Lys Lys Ala Gly Ser Phe His Leu Leu Val Lys Asp Ile Lys Gly
            260                 265                 270

His Thr Leu Leu Glu Lys Asn Glu Asp Ile Lys Glu Asn Val Gln Ile
            275                 280                 285

Asn Asn Glu Lys Phe Glu Asn Val His Leu Trp Asn Asn His Asp Pro
290                 295                 300

Tyr Leu Tyr Gln Leu Leu Ile Glu Val Tyr Asp Glu Gln Gln Asn Leu
305                 310                 315                 320

Leu Glu Leu Ile Pro Phe Gln Phe Gly Phe Arg Arg Ile Glu Ile Ser
                325                 330                 335

Pro Glu Lys Val Val Leu Leu Asn Gly Lys Arg Leu Ile Ile Asn Gly
            340                 345                 350

Val Asn Arg His Glu Trp Asp Ala Lys Arg Gly Arg Ser Ile Thr Met
            355                 360                 365

Ser Asp Met Thr Thr Asp Ile Asn Thr Phe Lys Glu Asn Asn Ile Asn
370                 375                 380

Ala Val Arg Thr Cys His Tyr Pro Asn Gln Ile Pro Trp Tyr Tyr Leu
385                 390                 395                 400

Cys Asp Gln Asn Gly Ile Tyr Val Met Ala Glu Asn Asn Leu Glu Ser
                405                 410                 415

His Gly Thr Trp Gln Lys Met Gly Glu Ile Glu Pro Ser Asp Asn Val
            420                 425                 430

Pro Gly Ser Ile Pro Gln Trp Lys Glu Ala Val Ile Asp Arg Ala Arg
            435                 440                 445

Asn Asn Tyr Glu Thr Phe Lys Asn His Thr Ser Ile Leu Phe Trp Ser
450                 455                 460

Leu Gly Asn Glu Ser Tyr Ala Gly Asp Asn Ile Ile Ala Met Asn Glu
465                 470                 475                 480

Phe Tyr Lys Ser His Asp Asp Thr Arg Leu Val His Tyr Glu Gly Val
                485                 490                 495

Val His Arg Pro Glu Leu Lys Asp Lys Ile Ser Asp Val Glu Ser Cys
```

```
                    500                 505                 510
Met Tyr Leu Pro Pro Lys Lys Val Glu Glu Tyr Leu Gln Asn Asp Pro
                515                 520                 525

Pro Lys Pro Phe Met Glu Cys Glu Tyr Met His Asp Met Gly Asn Ser
            530                 535                 540

Asp Gly Gly Met Gly Ser Tyr Ile Lys Leu Leu Asp Lys Tyr Pro Gln
545                 550                 555                 560

Tyr Phe Gly Gly Phe Ile Trp Asp Phe Ile Asp Gln Ala Leu Leu Val
                565                 570                 575

His Asp Glu Ile Ser Gly His Asp Val Leu Arg Tyr Gly Gly Asp Phe
            580                 585                 590

Asp Asp Arg His Ser Asp Tyr Glu Phe Ser Gly Asp Gly Leu Met Phe
        595                 600                 605

Ala Asp Arg Thr Pro Lys Pro Ala Met Gln Glu Val Arg Tyr Tyr Tyr
            610                 615                 620

Gly Leu His Lys
625

<210> SEQ ID NO 21
<211> LENGTH: 318
<212> TYPE: PRT
<213> ORGANISM: Lactobacillus helveticus

<400> SEQUENCE: 21

Met Asp Tyr Thr Asn Asn Gln Leu His Ile Ile Tyr Gly Asp Ala Thr
1               5                   10                  15

Phe Gly Val Asn Gly Lys Asp Phe Gln Tyr Ile Phe Ser Tyr Glu Arg
            20                  25                  30

Gly Gly Leu Glu Ser Leu Lys Val His Gly Lys Glu Trp Leu Tyr Arg
        35                  40                  45

Val Pro Thr Pro Thr Phe Trp Arg Ala Thr Asp Asn Asp Arg Gly
    50                  55                  60

Ser Gly Phe Asn Leu Lys Ala Ala Gln Trp Leu Gly Ala Asp Met Phe
65                  70                  75                  80

Thr Lys Cys Thr Asp Ile His Leu Lys Val Asp Arg His Asp Phe Ala
                85                  90                  95

Glu Leu Pro Ile Ala Pro Phe Asn Asn Lys Phe Ser Asn His Glu Tyr
            100                 105                 110

Ala Lys Ser Ala Glu Ile Ser Phe Thr Tyr Gln Thr Leu Thr Thr Pro
        115                 120                 125

Ala Thr Asn Ala Lys Ile Ile Tyr Asn Ile Asp Asp Val Gly His Ile
    130                 135                 140

Lys Val Thr Met Arg Tyr Tyr Gly Lys Lys Gly Leu Pro Pro Leu Pro
145                 150                 155                 160

Val Ile Gly Ile Arg Leu Ile Met Pro Thr Ala Ala Thr Gly Phe Asp
                165                 170                 175

Tyr Glu Gly Leu Ser Gly Glu Thr Tyr Pro Asp Arg Met Ala Gly Ala
            180                 185                 190

Lys Glu Gly Lys Phe His Ile Asp Gly Leu Pro Val Thr Glu Tyr Leu
        195                 200                 205

Val Pro Gln Glu Asn Gly Met His Met Gln Thr Lys Lys Leu Thr Ile
    210                 215                 220

Asn Arg Glu Thr Thr Gln Asn Asn Val Asp Arg Thr Asn Glu Lys Phe
225                 230                 235                 240
```

```
Ser Leu Ser Ile Gln Gln Ala Glu Lys Pro Phe Asn Phe Ser Cys Leu
            245                 250                 255

Pro Tyr Thr Ala Glu Glu Leu Glu Asn Ala Thr His Ile Glu Glu Leu
        260                 265                 270

Pro Leu Val Arg Arg Thr Val Leu Val Ile Ala Gly Ala Val Arg Gly
    275                 280                 285

Val Gly Gly Ile Asp Ser Trp Gly Thr Asp Val Glu Ser Ala Tyr His
290                 295                 300

Ile Asn Pro Glu Leu Asp His Glu Phe Ser Phe Ile Leu Asn
305                 310                 315

<210> SEQ ID NO 22
<211> LENGTH: 1023
<212> TYPE: PRT
<213> ORGANISM: Bifidobacterium longum

<400> SEQUENCE: 22

Met Thr Asp Val Thr His Val Asp Arg Ala Ser Gln Ala Trp Leu Thr
1               5                   10                  15

Asp Pro Thr Val Phe Glu Val Asn Arg Thr Pro Ala His Ser Ser His
            20                  25                  30

Lys Trp Tyr Ala Arg Asp Pro Gln Ser Gly Gln Trp Ser Asp Leu Lys
        35                  40                  45

Gln Ser Leu Asp Gly Glu Trp Arg Val Glu Val Gln Ala Ala Asp
    50                  55                  60

Ile Asn Leu Glu Glu Glu Pro Ala Thr Ala Glu Ser Phe Asp Asp Ser
65                  70                  75                  80

Ser Phe Glu Arg Ile Gln Val Pro Gly His Leu Gln Thr Ala Gly Leu
                85                  90                  95

Met Asn His Lys Tyr Val Asn Val Gln Tyr Pro Trp Asp Gly His Glu
            100                 105                 110

Asn Pro Leu Glu Pro Asn Ile Pro Glu Asn Asn His Val Ala Leu Tyr
        115                 120                 125

Arg Arg Lys Phe Thr Val Ser Ala Pro Val Ala Asn Ala Lys Gln Ala
    130                 135                 140

Gly Gly Ser Val Ser Ile Val Phe His Gly Met Ala Thr Ala Ile Tyr
145                 150                 155                 160

Val Trp Val Asn Gly Ala Phe Val Gly Tyr Gly Glu Asp Gly Phe Thr
                165                 170                 175

Pro Asn Glu Phe Asp Ile Thr Glu Leu Leu His Asp Gly Glu Asn Val
            180                 185                 190

Val Ala Val Ala Cys Tyr Glu Tyr Ser Ser Ala Ser Trp Leu Glu Asp
        195                 200                 205

Gln Asp Phe Trp Arg Leu His Gly Leu Phe Arg Ser Val Glu Leu Ala
    210                 215                 220

Ala Arg Pro His Val His Ile Glu Asn Thr Gln Ile Glu Ala Asp Trp
225                 230                 235                 240

Asp Pro Glu Ala Gly Thr Ala Ser Leu Asp Ala Ala Leu Thr Val Leu
                245                 250                 255

Asn Ala Ala Asp Ala Ala Thr Val Arg Ala Thr Leu Lys Asp Ala Asp
            260                 265                 270

Gly Asn Thr Val Trp Gln Thr Thr Gly Asp Ala Glu Ala Gln Thr Ala
        275                 280                 285

Ile Ser Ser Gly Pro Leu Gln Gly Ile Ala Pro Trp Ser Ala Glu Ser
    290                 295                 300
```

```
Pro Thr Leu Tyr Glu Leu Asp Val Asp Val Ile Asp Gln Ala Gly Asp
305                 310                 315                 320

Val Ile Glu Cys Thr Ser Gln Lys Val Gly Phe Arg Arg Phe Arg Ile
            325                 330                 335

Glu Asp Gly Ile Leu Thr Ile Asn Gly Lys Arg Ile Val Phe Lys Gly
                340                 345                 350

Ala Asp Arg His Glu Phe Asp Ala Glu Gln Gly Arg Ala Ile Thr Glu
            355                 360                 365

Gln Asp Met Ile Asp Asp Val Val Phe Cys Lys Arg His Asn Ile Asn
370                 375                 380

Ser Ile Arg Thr Ser His Tyr Pro Asn Gln Glu Arg Trp Tyr Glu Leu
385                 390                 395                 400

Cys Asp Glu Tyr Gly Ile Tyr Leu Ile Asp Glu Ala Asn Leu Glu Ala
                405                 410                 415

His Gly Ser Trp Ser Leu Pro Gly Asp Val Leu Thr Glu Asp Thr Ile
            420                 425                 430

Val Pro Gly Ser Lys Arg Glu Trp Glu Gly Ala Cys Val Asp Arg Val
            435                 440                 445

Asn Ser Met Met Arg Arg Asp Tyr Asn His Pro Ser Val Leu Ile Trp
450                 455                 460

Ser Leu Gly Asn Glu Ser Tyr Val Gly Asp Val Phe Arg Ala Met Tyr
465                 470                 475                 480

Lys His Val His Asp Ile Asp Pro Asn Arg Pro Val His Tyr Glu Gly
                485                 490                 495

Val Thr His Asn Arg Asp Tyr Asp Asp Val Thr Asp Ile Glu Thr Arg
            500                 505                 510

Met Tyr Ser His Ala Asp Glu Ile Glu Lys Tyr Leu Lys Asp Asp Pro
            515                 520                 525

Lys Lys Pro Tyr Leu Ser Cys Glu Tyr Met His Ala Met Gly Asn Ser
530                 535                 540

Val Gly Asn Met Asp Glu Tyr Thr Ala Leu Glu Arg Tyr Pro Lys Tyr
545                 550                 555                 560

Gln Gly Gly Phe Ile Trp Asp Phe Ile Asp Gln Ala Ile Tyr Ala Thr
                565                 570                 575

Gln Pro Asp Gly Thr Arg Ser Leu Arg Tyr Gly Gly Asp Phe Gly Asp
            580                 585                 590

Arg Pro Ser Asp Tyr Glu Phe Ser Gly Asp Gly Leu Leu Phe Ala Asn
            595                 600                 605

Arg Lys Pro Ser Pro Lys Ala Gln Glu Val Lys Gln Leu Tyr Ser Asn
            610                 615                 620

Val His Ile Asp Val Thr Lys Asp Ser Val Ser Val Lys Asn Asp Asn
625                 630                 635                 640

Leu Phe Thr Ala Thr Gly Asp Tyr Val Phe Val Leu Ser Val Leu Ala
                645                 650                 655

Asp Gly Lys Pro Val Trp Gln Ser Thr Arg Arg Phe Asp Val Pro Ala
            660                 665                 670

Gly Glu Thr Arg Thr Phe Asp Val Ala Trp Pro Val Ala Ala Tyr Arg
            675                 680                 685

Ala Asp Ala Arg Glu Leu Val Leu Gln Val Ser Gln Arg Leu Ala Lys
            690                 695                 700

Ala Thr Asp Trp Ala Glu Ser Gly Tyr Glu Leu Ala Phe Gly Gln Thr
705                 710                 715                 720
```

Val Val Pro Ala Asp Ala Thr Ala Thr Pro Asp Thr Lys Pro Ala Asp
                725                 730                 735

Gly Thr Ile Thr Val Gly Arg Trp Asn Ala Gly Val Arg Gly Ala Gly
            740                 745                 750

Arg Glu Val Leu Leu Ser Arg Thr Gln Gly Gly Met Val Ser Tyr Thr
        755                 760                 765

Phe Ala Gly Asn Glu Phe Val Leu Arg Arg Pro Ala Ile Thr Thr Phe
    770                 775                 780

Arg Pro Leu Thr Asp Asn Asp Arg Gly Ala His Gly Phe Glu Arg
785                 790                 795                 800

Val Gln Trp Leu Gly Ala Gly Arg Tyr Ala Arg Cys Val Asp Asn Val
            805                 810                 815

Leu Glu Gln Ile Asp Asp Ser Thr Leu Lys Gly Thr Tyr Thr Tyr Glu
        820                 825                 830

Leu Ala Thr Ala Gln Arg Thr Lys Val Thr Val Ser Tyr Thr Ala His
    835                 840                 845

Thr Asp Gly Arg Val Asn Leu His Val Glu Tyr Pro Gly Glu Gln Gly
850                 855                 860

Asp Leu Pro Thr Ile Pro Ala Phe Gly Ile Glu Trp Thr Leu Pro Val
865                 870                 875                 880

Gln Tyr Thr Asn Leu Arg Phe Phe Gly Thr Gly Pro Ala Glu Thr Tyr
            885                 890                 895

Leu Asp Arg Lys His Ala Lys Leu Gly Val Trp Ser Thr Asn Ala Phe
        900                 905                 910

Ala Asp His Ala Pro Tyr Leu Met Pro Gln Glu Thr Gly Asn His Glu
    915                 920                 925

Asp Val Arg Trp Ala Glu Ile Thr Asp Asp His Gly His Gly Met Arg
930                 935                 940

Val Ser Arg Ala Asp Gly Ala Ala Pro Phe Ala Val Ser Leu Leu Pro
945                 950                 955                 960

Tyr Ser Ser Phe Met Leu Glu Glu Ala Gln His Gln Asp Glu Leu Pro
            965                 970                 975

Lys Pro Lys His Met Phe Leu Arg Val Leu Ala Ala Gln Met Gly Val
        980                 985                 990

Gly Gly Asp Asp Ser Trp Met Ser Pro Val His Pro Gln Tyr His Ile
    995                 1000                1005

Pro Ala Asp Lys Pro Ile Ser Leu Asp Val Asp Leu Glu Leu Ile
    1010                1015                1020

<210> SEQ ID NO 23
<211> LENGTH: 628
<212> TYPE: PRT
<213> ORGANISM: Lactobacillus reuteri

<400> SEQUENCE: 23

Met Asp Ala Asp Ile Lys Trp Leu Asp Glu Pro Glu Thr Phe Arg Val
1               5                   10                  15

Asn Gln Leu Pro Ala His Ser Asp His Tyr Tyr Gly Asn Tyr Asp
            20                  25                  30

Glu Trp Arg His Asn Asn Ser Arg Phe Ala Gln Asn Leu Asp Gly Gln
        35                  40                  45

Trp Gln Phe Asn Phe Ala Glu Asn Leu Arg Glu Arg Glu Asn Asp Phe
    50                  55                  60

Tyr Lys Met Asp Tyr Asp Ser Ser Phe Gly Thr Ile Glu Val Pro
65                  70                  75                  80

```
Ser Glu Ile Glu Leu Asn Asn Tyr Ala Gln Asn Asn Tyr Ile Asn Thr
             85                  90                  95

Leu Ile Pro Trp Glu Gly Lys Ile Tyr Arg Arg Pro Ala Tyr Thr Leu
            100                 105                 110

Ser Pro Asp Asp Ala Gln Glu Gly Ser Phe Ser Asp Gly Asp Asp Asn
            115                 120                 125

Thr Ile Gly Glu Tyr Leu Lys His Phe Asp Leu Asp Pro Ser Leu Arg
130                 135                 140

Gly Lys Gln Val Arg Ile Arg Phe Asp Gly Val Glu Arg Ala Met Tyr
145                 150                 155                 160

Val Trp Leu Asn Gly His Phe Ile Gly Tyr Ala Glu Asp Ser Phe Thr
                165                 170                 175

Pro Ser Glu Phe Asp Leu Thr Pro Tyr Ile Gln Asp Glu Gly Asn Val
            180                 185                 190

Leu Ala Val Glu Val Phe Lys His Ser Thr Ala Ser Trp Ile Glu Asp
            195                 200                 205

Gln Asp Met Phe Arg Phe Ser Gly Ile Phe Arg Ser Val Asn Leu Leu
210                 215                 220

Ala Gln Pro Leu Val His Val Glu Asp Leu Asn Ile Arg Pro Ile Val
225                 230                 235                 240

Thr Asp Asn Tyr Gln Asp Gly Ile Phe Asn Val Glu Leu Gln Leu His
                245                 250                 255

Gly Glu Lys Thr Gly Asn Val Asn Val Arg Val Ile Asp Asn Asp Gly
            260                 265                 270

Asn Thr Leu Val Asn Glu Thr His Pro Val Asp Ser Thr Val Lys Val
            275                 280                 285

Gln Asp Gln Phe Leu Glu Asn Val His Leu Trp Asp Asn His Asp Pro
290                 295                 300

Tyr Leu Tyr Gln Leu Leu Ile Glu Ile Arg Asp Asp Glu Gly Asn Leu
305                 310                 315                 320

Val Glu Leu Val Pro Tyr Arg Phe Gly Phe Arg Arg Ile Glu Ile Asn
                325                 330                 335

Lys Asp His Val Val Leu Leu Asn Gly Gln Arg Leu Ile Ile Asn Gly
            340                 345                 350

Val Asn Arg His Glu Trp Asp Ala Arg Arg Gly Arg Ala Ile Thr Met
            355                 360                 365

Asp Asp Met Thr Ser Asp Ile His Thr Phe Lys Glu Asn Asn Ile Asn
370                 375                 380

Ala Val Arg Thr Cys His Tyr Pro Asp Gln Ile Pro Trp Tyr Tyr Leu
385                 390                 395                 400

Cys Asp Asp Asn Gly Ile Tyr Met Met Ala Glu Asn Asn Leu Glu Ser
                405                 410                 415

His Ala Thr Trp Gln Lys Met Gly Ala Ile Glu Pro Ser Tyr Asn Val
            420                 425                 430

Pro Gly Ser Val Pro Gln Trp Arg Asp Val Val Asp Arg Ala Arg
            435                 440                 445

Thr Asn Tyr Glu Thr Phe Lys Asn His Pro Ser Ile Leu Phe Trp Ser
450                 455                 460

Leu Gly Asn Glu Ser Tyr Ala Gly Asp Asn Ile Val Lys Met Asn Glu
465                 470                 475                 480

Phe Tyr Lys Lys His Asp Asp Ser Arg Leu Val His Tyr Glu Gly Val
                485                 490                 495
```

```
Cys His Thr Pro Glu Tyr Arg Asp Arg Ile Ser Asp Val Glu Ser Trp
                500                 505                 510

Met Tyr Leu Pro Pro Lys Glu Val Glu Tyr Leu Lys Asn Asn Pro
        515                 520                 525

Asp Lys Pro Phe Met Glu Cys Glu Tyr Met His Asp Met Gly Asn Ser
        530                 535                 540

Asp Gly Gly Met Gly Ser Tyr Ile Ser Leu Leu Asp Lys Tyr Pro Gln
545                 550                 555                 560

Tyr Phe Gly Gly Phe Ile Trp Asp Phe Ile Asp Gln Ala Leu Leu Val
                565                 570                 575

Lys Asp Pro Val Ser Gly Gln Glu Val Met Arg Tyr Gly Gly Asp Phe
        580                 585                 590

Asp Asp Arg His Ser Asp Tyr Glu Phe Ser Gly Asp Gly Leu Met Phe
        595                 600                 605

Ala Asp Arg Thr Pro Lys Pro Ala Met Gln Glu Val Arg Tyr Tyr Tyr
        610                 615                 620

Gly Leu His Lys
625

<210> SEQ ID NO 24
<211> LENGTH: 319
<212> TYPE: PRT
<213> ORGANISM: Lactobacillus reuteri

<400> SEQUENCE: 24

Met Ala Tyr Thr Asn Lys Leu Arg Val Ile Tyr Gly Asp Ala Thr Leu
1               5                   10                  15

Gly Leu Ser Gly Asp Gly Phe His Tyr Ile Phe Ser Tyr Glu Arg Gly
            20                  25                  30

Gly Leu Glu Ser Leu Lys Leu Asn Gly Lys Glu Trp Leu Tyr Arg Glu
        35                  40                  45

Pro Met Pro Thr Phe Trp Arg Ala Thr Asp Asn Asp Arg Gly Ser
    50                  55                  60

Gly Phe Asn Ile Arg Ser Ala Gln Trp Leu Ala Ala Asp Thr Phe His
65                  70                  75                  80

Lys Cys Val Gly Ile Asp Leu Thr Val Asp Asn Gln His Phe Ala Glu
                85                  90                  95

Leu Pro Ile Ala Pro Ile Thr Asn Glu Phe Ser Asp Pro Val Ser Ala
            100                 105                 110

Glu Ser Val Lys Ile Lys Tyr Thr Phe Ala Thr Leu Thr Val Pro Ala
        115                 120                 125

Thr Gln Val Thr Val Ile Tyr Glu Val Asn Gly Gln Gly Glu Ile Lys
    130                 135                 140

Val Thr Met His Tyr Tyr Gly His Glu Asp Leu Pro Gly Leu Pro Val
145                 150                 155                 160

Val Gly Met Arg Phe Ile Met Pro Thr Val Ala Thr Gly Phe Asp Tyr
                165                 170                 175

Gln Gly Leu Ser Gly Glu Thr Tyr Pro Asp Arg Met Ala Gly Ala Thr
            180                 185                 190

Glu Gly Thr Phe His Val Asp Gly Leu Pro Val Thr Lys Tyr Leu Val
        195                 200                 205

Pro Gln Glu Asn Gly Met His Met Ala Thr His Ala Leu Thr Ile Thr
    210                 215                 220

Arg Asp Ser Thr Gln Asn Asn Ala Asp His Ser Arg Glu Pro Phe Ser
225                 230                 235                 240
```

Leu Thr Val Lys Gln Asp Ala Gln Pro Phe Ala Phe Ser Cys Leu Pro
                    245                 250                 255

Tyr Thr Ala Glu Glu Leu Glu Asn Ala Thr His Ile Glu Glu Leu Pro
                260                 265                 270

Leu Ala Arg Arg Thr Val Leu Val Val Ala Gly Ala Val Arg Gly Val
                275                 280                 285

Gly Gly Ile Asp Ser Trp Gly Ala Asp Val Glu Glu Gln Tyr His Ile
            290                 295                 300

Pro Ala Asp Arg Asp Val Glu Phe Ser Phe Val Leu Asn Ala Lys
305                 310                 315

<210> SEQ ID NO 25
<211> LENGTH: 1007
<212> TYPE: PRT
<213> ORGANISM: Lactobacillus delbrueckii subsp. lactis

<400> SEQUENCE: 25

Met Ser Asn Lys Leu Val Lys Glu Lys Arg Val Asp Gln Ala Asp Leu
1               5                   10                  15

Ala Trp Leu Thr Asp Pro Glu Val Tyr Glu Val Asn Thr Ile Pro Pro
                20                  25                  30

His Ser Asp His Glu Ser Phe Gln Ser Gln Glu Glu Leu Glu Glu Gly
            35                  40                  45

Lys Ser Ser Leu Val Gln Ser Leu Asp Gly Asn Trp Leu Ile Asp Tyr
        50                  55                  60

Ala Glu Asn Gly Gln Gly Pro Ile Asn Phe Tyr Ala Glu Asp Phe Asp
65                  70                  75                  80

Asp Ser Asn Phe Lys Ser Val Lys Val Pro Gly Asn Leu Glu Leu Gln
                85                  90                  95

Gly Phe Gly Gln Pro Gln Tyr Val Asn Ile Gln Tyr Pro Trp Asp Gly
                100                 105                 110

Ser Glu Glu Ile Phe Pro Pro Gln Val Pro Ser Lys Ile Pro Leu Ala
            115                 120                 125

Ser Tyr Val Arg Tyr Phe Asp Leu Asp Glu Ala Leu Trp Asp Lys Glu
        130                 135                 140

Val Ser Leu Lys Phe Ala Gly Ala Ala Thr Ala Ile Tyr Val Trp Leu
145                 150                 155                 160

Asn Gly His Phe Val Gly Tyr Gly Glu Asp Ser Phe Thr Pro Ser Glu
                165                 170                 175

Phe Met Val Thr Lys Phe Leu Lys Lys Glu Gly Asn Arg Leu Ala Val
                180                 185                 190

Ala Leu Tyr Lys Tyr Ser Ser Ala Ser Trp Leu Glu Asp Gln Asp Phe
            195                 200                 205

Trp Arg Leu Ser Gly Leu Phe Arg Ser Val Thr Leu Glu Ala Lys Pro
        210                 215                 220

Leu Leu His Leu Glu Asp Leu Lys Leu Thr Ala Ser Leu Thr Asp Asn
225                 230                 235                 240

Tyr Gln Lys Gly Lys Leu Glu Val Glu Ala Asn Ile Ala Tyr Arg Leu
                245                 250                 255

Pro Asn Ala Ser Phe Lys Leu Glu Val Arg Asp Ser Glu Gly Asp Leu
                260                 265                 270

Val Ala Glu Lys Val Gly Pro Ile Arg Ser Glu Lys Leu Asp Phe Ser
            275                 280                 285

Leu Ala Asp Leu Pro Val Ala Ala Trp Ser Ala Glu Lys Pro Asn Leu

-continued

```
            290                 295                 300
Tyr Gln Val Arg Leu Tyr Leu Tyr Gln Ala Gly Ser Leu Leu Glu Val
305                 310                 315                 320

Ser Arg Gln Glu Val Gly Phe Arg Asn Phe Glu Leu Lys Asp Gly Ile
                325                 330                 335

Met Tyr Leu Asn Gly Gln Arg Ile Val Phe Lys Gly Val Asn Arg His
                340                 345                 350

Glu Phe Asp Ser Lys Leu Gly Arg Ala Ile Thr Glu Ala Asp Met Ile
                355                 360                 365

Trp Asp Ile Lys Thr Met Lys Gln Ser Asn Ile Asn Ala Val Arg Cys
                370                 375                 380

Ser His Tyr Pro Asn Gln Ser Leu Phe Tyr Arg Leu Cys Asp Lys Tyr
385                 390                 395                 400

Gly Leu Tyr Val Ile Asp Glu Ala Asn Leu Glu Ser His Gly Thr Trp
                405                 410                 415

Glu Lys Val Gly His Glu Asp Pro Ser Phe Asn Val Pro Gly Asp Asp
                420                 425                 430

Gln His Trp Leu Gly Ala Ser Leu Ser Arg Val Lys Asn Met Met Ala
                435                 440                 445

Arg Asp Lys Asn His Ala Ser Ile Leu Ile Trp Ser Leu Gly Asn Glu
450                 455                 460

Ser Tyr Ala Gly Thr Val Phe Ala Gln Met Ala Asp Tyr Val Arg Lys
465                 470                 475                 480

Ala Asp Pro Thr Arg Val Gln His Tyr Glu Gly Val Thr His Asn Arg
                485                 490                 495

Lys Phe Asp Asp Ala Thr Gln Ile Glu Ser Arg Met Tyr Ala Pro Ala
                500                 505                 510

Lys Glu Ile Glu Glu Tyr Leu Thr Lys Lys Pro Ala Lys Pro Phe Ile
                515                 520                 525

Ser Val Glu Tyr Ala His Ala Met Gly Asn Ser Val Gly Asp Leu Ala
530                 535                 540

Ala Tyr Thr Ala Leu Glu Lys Tyr Pro His Tyr Gln Gly Gly Phe Ile
545                 550                 555                 560

Trp Asp Trp Ile Asp Gln Gly Leu Glu Lys Asp Gly His Leu Leu Tyr
                565                 570                 575

Gly Gly Asp Phe Asp Asp Arg Pro Thr Asp Tyr Glu Phe Cys Gly Asp
                580                 585                 590

Gly Leu Val Phe Ala Asp Arg Thr Thr Ser Pro Lys Leu Ala Asn Val
                595                 600                 605

Lys Ala Leu Tyr Ser Asn Leu Lys Leu Glu Val Lys Asp Gly Gln Leu
610                 615                 620

Phe Ile Lys Asn Asp Asn Leu Phe Thr Asn Ser Ser Ala Tyr Tyr Phe
625                 630                 635                 640

Leu Thr Ser Leu Leu Val Asp Gly Lys Leu Thr Tyr Gln Ser Gln Pro
                645                 650                 655

Leu Thr Phe Gly Leu Glu Pro Gly Glu Ser Gly Thr Phe Ala Leu Pro
                660                 665                 670

Trp Pro Glu Val Glu Asp Glu Lys Gly Glu Ile Val Tyr Gln Val Thr
                675                 680                 685

Ala His Leu Lys Glu Asp Leu Pro Trp Ala Asp Glu Gly Phe Thr Val
                690                 695                 700

Ala Glu Ala Glu Glu Ala Val Thr Lys Leu Pro Glu Phe Tyr Pro Ala
705                 710                 715                 720
```

```
Gly Arg Pro Glu Leu Val Asp Ser Asp Phe Asn Leu Gly Leu Lys Gly
                725                 730                 735

Asn Gly Phe Arg Ile Leu Phe Ser Lys Ala Lys Gly Trp Pro Val Ser
            740                 745                 750

Ile Lys Tyr Ala Gly Arg Glu Tyr Leu Lys Arg Leu Pro Glu Phe Thr
        755                 760                 765

Phe Trp Arg Ala Leu Thr Asp Asn Asp Arg Gly Ala Gly Tyr Gly Tyr
    770                 775                 780

Asp Leu Ala Lys Trp Glu Asn Ala Gly Lys Tyr Ala Arg Leu Gln Asp
785                 790                 795                 800

Ile Ser Tyr Glu Ile Lys Glu Asn Ser Ala Leu Val Lys Thr Thr Phe
            805                 810                 815

Thr Leu Pro Val Ala Leu Lys Gly Asp Leu Thr Ile Thr Tyr Glu Val
        820                 825                 830

Asp Ser Leu Gly Lys Ile Ala Val Thr Ala Asn Phe Pro Gly Ala Val
    835                 840                 845

Glu Asn Gly Leu Leu Pro Ala Phe Gly Leu Asn Phe Ala Leu Pro Lys
850                 855                 860

Glu Leu Ser Asp Tyr Arg Tyr Tyr Gly Leu Gly Pro Asn Glu Ser Tyr
865                 870                 875                 880

Ala Asp Arg Leu Glu Gly Ser Tyr Leu Gly Ile Tyr Gln Gly Met Val
            885                 890                 895

Glu Lys Asn Phe Thr Pro Tyr Leu Arg Pro Gln Ala Gly Asn Arg
        900                 905                 910

Ser Lys Val Arg Tyr Tyr Gln Leu Phe Asp Glu Gly Gly Leu Glu
    915                 920                 925

Phe Thr Ala Asn Gly Ala Asp Leu Asn Leu Ser Ala Leu Pro Tyr Ser
930                 935                 940

Ala Ala Gln Ile Glu Ala Ala Asp His Ala Phe Glu Leu Thr Asn Asn
945                 950                 955                 960

Tyr Thr Trp Val Arg Ala Leu Ala Ala Gln Met Gly Val Gly Asp
            965                 970                 975

Asp Ser Trp Gly Gln Lys Val His Pro Glu Phe Cys Leu Asp Ala Gln
            980                 985                 990

Glu Ala Arg Gln Leu Lys Leu Val Ile Gln Pro Leu Leu Lys
        995                 1000                1005

<210> SEQ ID NO 26
<211> LENGTH: 628
<212> TYPE: PRT
<213> ORGANISM: Lactobacillus helveticus

<400> SEQUENCE: 26

Met Gln Ala Asn Ile Asn Trp Leu Asp Asn Pro Glu Val Phe Arg Val
1               5                   10                  15

Asn Gln Leu Pro Ala His Ser Asp His Pro Phe Phe Arg Asp Tyr Arg
            20                  25                  30

Glu Trp Gln Lys Gln His Ser Ser Tyr Gln Gln Ser Leu Asn Gly Lys
        35                  40                  45

Trp Lys Phe His Phe Ser Ala Asn Pro Met Asp Arg Pro Gln Asp Phe
    50                  55                  60

Tyr Gln Arg Asp Phe Asp Ser Ser Asn Phe Asp Ser Ile Pro Val Pro
65                  70                  75                  80

Ser Glu Ile Glu Leu Ser Asn Tyr Thr Gln Asn Gln Tyr Ile Asn Val
```

-continued

```
                85                  90                  95
Leu Phe Pro Trp Glu Gly Lys Ile Phe Arg Pro Ala Tyr Ala Leu
            100                 105                 110
Asp Pro Asn Asp His Glu Gly Ser Phe Ser Lys Gly Ala Asp Asn
            115                 120                 125
Thr Val Gly Ser Tyr Leu Lys Arg Phe Asp Leu Ser Ser Ala Leu Ile
130                 135                 140
Gly Lys Asp Val His Ile Lys Phe Glu Gly Val Glu Gln Ala Met Tyr
145                 150                 155                 160
Val Trp Leu Asn Gly His Phe Val Gly Tyr Ala Glu Asp Ser Phe Thr
                165                 170                 175
Pro Ser Glu Phe Asp Leu Thr Pro Tyr Ile Gln Glu Lys Asp Asn Leu
            180                 185                 190
Leu Ala Val Glu Val Phe Lys His Ser Thr Ala Ser Trp Leu Glu Asp
            195                 200                 205
Gln Asp Met Phe Arg Phe Ser Gly Ile Phe Arg Ser Val Glu Leu Leu
            210                 215                 220
Gly Ile Pro Ala Thr His Leu Met Asp Met Asp Leu Lys Pro Arg Val
225                 230                 235                 240
Ala Asp Asn Tyr Gln Asp Gly Ile Phe Asn Leu Lys Leu His Phe Ile
                245                 250                 255
Gly Lys Lys Ala Gly Ser Phe His Leu Leu Val Lys Asp Ile Lys Gly
            260                 265                 270
His Thr Leu Leu Glu Lys Asn Glu Asp Ile Lys Glu Asn Val Gln Ile
            275                 280                 285
Asn Asn Glu Lys Phe Glu Asn Val His Leu Trp Asn Asn His Asp Pro
            290                 295                 300
Tyr Leu Tyr Gln Leu Leu Ile Glu Val Tyr Asp Glu Gln Gln Asn Leu
305                 310                 315                 320
Leu Glu Leu Ile Pro Phe Gln Phe Gly Phe Arg Arg Ile Glu Ile Ser
                325                 330                 335
Pro Glu Lys Val Val Leu Leu Asn Gly Lys Arg Leu Ile Ile Asn Gly
            340                 345                 350
Val Asn Arg His Glu Trp Asp Ala Lys Arg Gly Arg Ser Ile Thr Met
            355                 360                 365
Ser Asp Met Thr Thr Asp Ile Asn Thr Phe Lys Glu Asn Asn Ile Asn
370                 375                 380
Ala Val Arg Thr Cys His Tyr Pro Asn Gln Ile Pro Trp Tyr Tyr Leu
385                 390                 395                 400
Cys Asp Gln Asn Gly Ile Tyr Val Met Ala Glu Asn Asn Leu Glu Ser
                405                 410                 415
His Gly Thr Trp Gln Lys Met Gly Glu Ile Glu Pro Ser Asp Asn Val
            420                 425                 430
Pro Gly Ser Ile Pro Gln Trp Lys Glu Ala Val Ile Asp Arg Ala Arg
            435                 440                 445
Asn Asn Tyr Glu Thr Phe Lys Asn His Thr Ser Ile Leu Phe Trp Ser
450                 455                 460
Leu Gly Asn Glu Ser Tyr Ala Gly Asp Asn Ile Ile Ala Met Asn Glu
465                 470                 475                 480
Phe Tyr Lys Ser His Asp Asp Thr Arg Leu Val His Tyr Glu Gly Val
                485                 490                 495
Val His Arg Pro Glu Leu Lys Asp Lys Ile Ser Asp Val Glu Ser Cys
            500                 505                 510
```

```
Met Tyr Leu Pro Pro Lys Lys Val Glu Glu Tyr Leu Gln Asn Asp Pro
            515                 520                 525

Pro Lys Pro Phe Met Glu Cys Glu Tyr Met His Asp Met Gly Asn Ser
            530                 535                 540

Asn Gly Gly Met Asp Ser Tyr Ile Lys Leu Leu Asp Lys Tyr Pro Gln
545                 550                 555                 560

Tyr Phe Gly Gly Phe Ile Trp Asp Phe Ile Asp Gln Ala Leu Leu Val
            565                 570                 575

His Asp Glu Ile Ser Gly His Asp Val Leu Arg Tyr Gly Gly Asp Phe
            580                 585                 590

Asp Asp Arg His Ser Asp Tyr Glu Phe Ser Gly Asp Gly Leu Met Phe
            595                 600                 605

Ala Asp Arg Lys Pro Lys Pro Ala Met Gln Glu Val Arg Tyr Tyr Tyr
            610                 615                 620

Gly Leu His Lys
625

<210> SEQ ID NO 27
<211> LENGTH: 318
<212> TYPE: PRT
<213> ORGANISM: Lactobacillus helveticus

<400> SEQUENCE: 27

Met Asp Tyr Thr Asn Asn Gln Leu His Ile Ile Tyr Gly Asp Ala Thr
1               5                   10                  15

Phe Gly Val Asn Gly Lys Asp Phe Gln Tyr Ile Phe Ser Tyr Glu Arg
            20                  25                  30

Gly Gly Leu Glu Ser Leu Lys Val His Gly Lys Glu Trp Leu Tyr Arg
            35                  40                  45

Val Pro Thr Pro Thr Phe Trp Arg Ala Thr Thr Asp Asn Asp Arg Gly
    50                  55                  60

Ser Gly Phe Asn Leu Lys Ala Ala Gln Trp Leu Gly Ala Asp Met Phe
65                  70                  75                  80

Thr Lys Cys Thr Asp Ile His Leu Lys Val Asp Arg His Asp Phe Ala
                85                  90                  95

Glu Leu Pro Ile Ala Pro Phe Asn Asn Lys Phe Ser Asn His Glu Tyr
            100                 105                 110

Ala Lys Ser Ala Glu Ile Ser Phe Thr Tyr Gln Thr Leu Thr Thr Pro
            115                 120                 125

Ala Thr Asn Ala Lys Ile Ile Tyr Asn Ile Asp Asp Gly Gly His Ile
        130                 135                 140

Lys Val Thr Met Arg Tyr Tyr Gly Lys Lys Gly Leu Pro Pro Leu Pro
145                 150                 155                 160

Val Ile Gly Ile Arg Leu Ile Met Pro Thr Ala Ala Thr Gly Phe Asp
                165                 170                 175

Tyr Glu Gly Leu Ser Gly Glu Thr Tyr Pro Asp Arg Met Ala Gly Ala
            180                 185                 190

Lys Glu Gly Lys Phe His Ile Asp Gly Leu Pro Val Thr Glu Tyr Leu
            195                 200                 205

Val Pro Gln Glu Asn Gly Met His Met Gln Thr Lys Lys Leu Thr Ile
        210                 215                 220

Asn Arg Glu Thr Thr Gln Asn Asn Val Asp Arg Thr Asn Glu Lys Phe
225                 230                 235                 240

Ser Leu Ser Ile Gln Gln Ala Glu Lys Pro Phe Asn Phe Ser Cys Leu
```

-continued

```
                245                 250                 255
Pro Tyr Thr Ala Glu Leu Glu Asn Ala Thr His Ile Glu Glu Leu
            260                 265                 270

Pro Leu Val Arg Arg Thr Val Leu Val Ile Ala Gly Ala Val Arg Gly
        275                 280                 285

Val Gly Gly Ile Asp Ser Trp Gly Thr Asp Val Glu Ser Ala Tyr His
    290                 295                 300

Ile Asn Pro Asp Leu Asp His Glu Phe Ser Phe Ile Leu Asn
305                 310                 315

<210> SEQ ID NO 28
<211> LENGTH: 626
<212> TYPE: PRT
<213> ORGANISM: Lactobacillus crispatus

<400> SEQUENCE: 28

Met Lys Ala Asn Ile Lys Trp Leu Asp Asp Pro Glu Val Phe Arg Ile
1               5                   10                  15

Asn Gln Leu Pro Ala His Ser Asp His Pro Phe Tyr Lys Asp Tyr Arg
            20                  25                  30

Glu Trp Gln Lys His Ser Ser Phe Lys Gln Ser Leu Asn Gly Ala
        35                  40                  45

Trp Gln Phe His Phe Ser Lys Asp Pro Gln Ser Arg Pro Ile Asp Phe
    50                  55                  60

Tyr Lys Leu Ser Phe Asp Ser Ser Phe Asp Thr Ile Pro Val Pro
65                  70                  75                  80

Ser Glu Ile Glu Leu Asn Gly Tyr Ala Gln Asn Gln Tyr Thr Asn Ile
            85                  90                  95

Leu Tyr Pro Trp Glu Ser Lys Ile Tyr Arg Lys Pro Ala Tyr Thr Leu
            100                 105                 110

Gly Arg Gly Ile Lys Asp Gly Asp Phe Ser Gln Gly Lys Asp Asn Thr
        115                 120                 125

Val Gly Ser Tyr Leu Lys His Phe Asp Leu Asn Pro Ala Leu Ala Gly
    130                 135                 140

His Asp Ile His Ile Gln Phe Glu Gly Val Glu Arg Ala Met Tyr Val
145                 150                 155                 160

Tyr Leu Asn Gly His Phe Ile Gly Tyr Ala Glu Asp Ser Phe Thr Pro
            165                 170                 175

Ser Glu Phe Asp Leu Thr Pro Tyr Ile Gln Ala Lys Asp Asn Ile Leu
            180                 185                 190

Ala Val Glu Val Phe Lys His Ser Thr Ala Ser Trp Leu Glu Asp Gln
        195                 200                 205

Asp Met Phe Arg Phe Ser Gly Ile Phe Arg Ser Val Glu Leu Leu Ala
    210                 215                 220

Leu Pro Arg Thr His Leu Met Asp Leu Asp Ile Lys Pro Thr Val Val
225                 230                 235                 240

Asn Asp Tyr His Asp Gly Val Phe Asn Ala Lys Leu His Phe Met Gly
            245                 250                 255

Lys Thr Ser Gly Asn Val His Val Leu Ile Glu Asp Ile Asp Gly Lys
            260                 265                 270

Thr Leu Leu Asn Lys Lys Leu Pro Leu Lys Ser Thr Val Glu Ile Glu
        275                 280                 285

Asn Glu Thr Phe Ala Asn Val His Leu Trp Asp Asn His Asp Pro Tyr
    290                 295                 300
```

```
Leu Tyr Gln Leu Ile Ile Glu Val His Asp Gln Asp Gly Lys Leu Val
305                 310                 315                 320

Glu Leu Ile Pro Tyr Gln Phe Gly Phe Arg Lys Ile Glu Ile Thr Lys
            325                 330                 335

Asp His Val Val Leu Leu Asn Gly Lys Arg Leu Ile Ile Asn Gly Val
            340                 345                 350

Asn Arg His Glu Trp Asp Ala Lys Arg Gly Arg Ser Ile Thr Leu Ala
        355                 360                 365

Asp Met Lys Gln Asp Ile Ala Thr Phe Lys His Asn Asn Ile Asn Ala
        370                 375                 380

Val Arg Thr Cys His Tyr Pro Asn Gln Ile Pro Trp Tyr Tyr Leu Cys
385                 390                 395                 400

Asp Gln Asn Gly Ile Tyr Met Met Ala Glu Asn Asn Leu Glu Ser His
                405                 410                 415

Gly Thr Trp Gln Lys Leu Gly Gln Val Glu Ala Thr Ser Asn Val Pro
                420                 425                 430

Gly Ser Ile Pro Glu Trp Arg Glu Val Val Asp Arg Ala Arg Ser
                435                 440                 445

Asn Tyr Glu Thr Phe Lys Asn His Thr Ala Ile Leu Phe Trp Ser Leu
    450                 455                 460

Gly Asn Glu Ser Tyr Ala Gly Ser Asn Ile Ala Ala Met Asn Lys Leu
465                 470                 475                 480

Tyr Lys Asp His Asp Ser Ser Arg Leu Thr His Tyr Glu Gly Val Phe
                485                 490                 495

His Ala Pro Glu Phe Lys Lys Glu Ile Ser Asp Leu Gly Ser Cys Met
                500                 505                 510

Tyr Leu Pro Pro Lys Glu Ala Glu Glu Tyr Leu Gln Asn Pro Lys Lys
                515                 520                 525

Pro Leu Val Glu Cys Glu Tyr Met His Asp Met Gly Asn Ser Asp Gly
530                 535                 540

Gly Ile Gly Ser Tyr Ile Lys Leu Ile Asp Lys Tyr Pro Gln Tyr Met
545                 550                 555                 560

Gly Gly Phe Ile Trp Asp Phe Ile Asp Gln Ala Leu Leu Val His Asp
                565                 570                 575

Pro Val Ser Gly Gln Asp Val Leu Arg Tyr Gly Gly Asp Phe Asp Asp
            580                 585                 590

Arg His Ser Asp Tyr Glu Phe Ser Gly Asp Gly Leu Met Phe Ala Asp
        595                 600                 605

Arg Thr Pro Lys Pro Ala Met Gln Glu Val Arg Tyr Tyr Gly Leu
610                 615                 620

His Lys
625

<210> SEQ ID NO 29
<211> LENGTH: 316
<212> TYPE: PRT
<213> ORGANISM: Lactobacillus crispatus

<400> SEQUENCE: 29

Met Ala Tyr Thr Asn Asn Leu His Val Val Tyr Gly Glu Ala Ser Leu
1               5                   10                  15

Gly Val Asn Gly Gln Asp Phe Ala Tyr Leu Phe Ser Tyr Glu Arg Gly
            20                  25                  30

Val Leu Glu Ser Leu Lys Ile Lys Asp Lys Glu Trp Leu Tyr Arg Thr
        35                  40                  45
```

```
Pro Thr Pro Thr Phe Trp Arg Ala Thr Thr Asp Asn Asp Arg Gly Ser
    50                  55                  60

Gly Phe Asn Gln Lys Ala Ala Gln Trp Leu Gly Ala Asp Met Phe Thr
65                  70                  75                  80

Lys Cys Val Gly Ile His Val Gln Val Asp Asp His Gln Phe Asp Glu
                85                  90                  95

Leu Pro Ile Ala Pro Ile Asn Asn Gln Phe Ser Asn Gln Glu Phe Ala
            100                 105                 110

His Glu Val Lys Val Ala Phe Asp Tyr Glu Thr Leu Thr Thr Pro Ala
        115                 120                 125

Thr Lys Val Lys Ile Ile Tyr Asn Ile Asn Asp Ala Gly His Met Thr
    130                 135                 140

Ile Thr Met His Tyr Phe Gly Lys Lys Gly Leu Pro Pro Leu Pro Val
145                 150                 155                 160

Ile Gly Met Arg Phe Ile Met Pro Thr Lys Ala Lys Ser Phe Asp Tyr
                165                 170                 175

Thr Gly Leu Ser Gly Glu Thr Tyr Pro Asp Arg Met Ala Gly Ala Glu
            180                 185                 190

Arg Gly Thr Phe His Ile Asp Gly Leu Pro Val Thr Lys Tyr Leu Val
        195                 200                 205

Pro Gln Glu Asn Gly Met His Met Gln Thr Asn Glu Leu Val Ile Thr
    210                 215                 220

Arg Asn Ser Thr Gln Asn Asn Ala Asp Lys Asp Gly Asp Phe Ser Leu
225                 230                 235                 240

Lys Ile Thr Gln Thr Lys Gln Pro Phe Asn Phe Ser Leu Leu Pro Tyr
                245                 250                 255

Thr Ala Glu Glu Leu Glu Asn Ala Thr His Ile Glu Glu Leu Pro Leu
            260                 265                 270

Ala Arg Arg Ser Val Leu Val Ile Ala Gly Ala Val Arg Gly Val Gly
        275                 280                 285

Gly Ile Asp Ser Trp Gly Ser Asp Val Glu Glu Gln Tyr His Ile Asp
    290                 295                 300

Pro Glu Gln Asp His Glu Phe Ser Phe Thr Leu Asn
305                 310                 315

<210> SEQ ID NO 30
<211> LENGTH: 1025
<212> TYPE: PRT
<213> ORGANISM: Streptococcus thermophilus

<400> SEQUENCE: 30

Met Asn Met Thr Lys Ile Gln Thr Tyr Leu Asn Asp Pro Lys Ile Val
1               5                   10                  15

Ser Val Asn Thr Val Asp Ala His Ser Asp His Lys Tyr Phe Glu Ser
                20                  25                  30

Leu Glu Glu Phe Ser Glu Gly Glu Met Lys Leu Arg Gln Ser Leu Asn
            35                  40                  45

Gly Lys Trp Lys Ile His Tyr Ala Gln Asn Thr Asn Gln Val Leu Lys
        50                  55                  60

Asp Phe Tyr Lys Thr Glu Phe Asp Glu Thr Asp Leu Asn Phe Ile Asn
65                  70                  75                  80

Val Pro Gly His Leu Glu Leu Gln Gly Phe Gly Ser Pro Gln Tyr Val
                85                  90                  95

Asn Thr Gln Tyr Pro Trp Asp Gly Lys Glu Phe Leu Arg Pro Pro Gln
```

-continued

```
                100                 105                 110
Val Pro Gln Glu Ser Asn Ala Val Ala Ser Tyr Val Lys His Phe Thr
            115                 120                 125
Leu Asn Asp Ala Leu Lys Asp Lys Val Phe Ile Ser Phe Gln Gly
        130                 135                 140
Val Ala Thr Ser Ile Phe Val Trp Val Asn Gly Asn Phe Val Gly Tyr
145                 150                 155                 160
Ser Glu Asp Ser Phe Thr Pro Ser Glu Phe Glu Ile Ser Asp Tyr Leu
                165                 170                 175
Val Glu Gly Asp Asn Lys Leu Ala Val Ala Val Tyr Arg Tyr Ser Thr
            180                 185                 190
Ala Ser Trp Leu Glu Asp Gln Asp Phe Trp Arg Leu Tyr Gly Ile Phe
        195                 200                 205
Arg Asp Val Tyr Leu Tyr Ala Ile Pro Lys Val His Val Gln Asp Leu
    210                 215                 220
Phe Val Lys Gly Asp Tyr Asp Tyr Gln Thr Lys Ala Gly Gln Leu Asp
225                 230                 235                 240
Ile Asp Leu Lys Thr Val Gly Asp Tyr Glu Asp Lys Lys Ile Lys Tyr
                245                 250                 255
Val Leu Ser Asp Tyr Glu Gly Ile Val Thr Glu Gly Asp Ala Ser Val
            260                 265                 270
Asn Gly Asp Gly Glu Leu Ser Val Ser Leu Glu Asn Leu Lys Ile Lys
        275                 280                 285
Pro Trp Ser Ala Glu Ser Pro Lys Leu Tyr Asp Leu Ile Leu His Val
    290                 295                 300
Leu Asp Asp Asp Gln Val Val Glu Val Val Pro Val Lys Val Gly Phe
305                 310                 315                 320
Arg Arg Phe Glu Ile Lys Asp Lys Leu Met Leu Leu Asn Gly Lys Arg
                325                 330                 335
Ile Val Phe Lys Gly Val Asn Arg His Glu Phe Asn Ala Arg Thr Gly
            340                 345                 350
Arg Cys Ile Thr Glu Glu Asp Met Leu Trp Asp Ile Lys Val Met Lys
        355                 360                 365
Gln His Asn Ile Asn Ala Val Arg Thr Ser His Tyr Pro Asn Gln Thr
    370                 375                 380
Arg Trp Tyr Glu Leu Cys Asp Glu Tyr Gly Leu Tyr Val Ile Asp Glu
385                 390                 395                 400
Ala Asn Leu Glu Thr His Gly Thr Trp Gln Lys Leu Gly Leu Cys Glu
                405                 410                 415
Pro Ser Trp Asn Ile Pro Ala Ser Glu Pro Glu Trp Leu Pro Ala Cys
            420                 425                 430
Leu Asp Arg Ala Asn Asn Met Phe Gln Arg Asp Lys Asn His Ala Ser
        435                 440                 445
Val Ile Ile Trp Ser Cys Gly Asn Glu Ser Tyr Ala Gly Lys Asp Ile
    450                 455                 460
Ala Asp Met Ala Asp Tyr Phe Arg Ser Val Asp Asn Thr Arg Pro Val
465                 470                 475                 480
His Tyr Glu Gly Val Ala Trp Cys Arg Glu Phe Asp Tyr Ile Thr Asp
                485                 490                 495
Ile Glu Ser Arg Met Tyr Ala Lys Pro Ala Asp Ile Glu Glu Tyr Leu
            500                 505                 510
Thr Thr Gly Lys Leu Val Asp Leu Ser Ser Val Ser Asp Lys His Phe
        515                 520                 525
```

-continued

```
Ala Ser Gly Asn Leu Thr Asn Lys Pro Gln Lys Pro Tyr Ile Ser Cys
    530                 535                 540
Glu Tyr Met His Thr Met Gly Asn Ser Gly Gly Leu Gln Leu Tyr
545                 550                 555                 560
Thr Asp Leu Glu Lys Tyr Pro Glu Tyr Gln Gly Gly Phe Ile Trp Asp
                565                 570                 575
Phe Ile Asp Gln Ala Ile Tyr Lys Thr Leu Pro Asn Gly Ser Glu Phe
            580                 585                 590
Leu Ser Tyr Gly Gly Asp Trp His Asp Arg Pro Ser Asp Tyr Glu Phe
        595                 600                 605
Cys Gly Asn Gly Ile Val Phe Ala Asp Arg Thr Leu Thr Pro Lys Leu
    610                 615                 620
Gln Thr Val Lys His Leu Tyr Ser Asn Ile Lys Ile Ala Val Asp Glu
625                 630                 635                 640
Lys Ser Val Thr Ile Lys Asn Asp Asn Leu Phe Glu Asp Leu Ser Ala
                645                 650                 655
Tyr Thr Phe Leu Ala Arg Val Tyr Glu Asp Gly Arg Lys Val Ser Glu
            660                 665                 670
Ser Glu Tyr His Phe Asp Val Lys Pro Gly Glu Glu Ala Thr Phe Pro
        675                 680                 685
Val Asn Phe Val Val Glu Ala Ser Asn Ser Gly Gln Ile Tyr Glu Val
    690                 695                 700
Ala Cys Val Leu Arg Glu Ala Thr Lys Trp Ala Pro Lys Gly His Glu
705                 710                 715                 720
Ile Val Arg Gly Gln Tyr Val Val Glu Lys Ile Ser Thr Glu Thr Pro
                725                 730                 735
Val Lys Ala Pro Leu Asn Val Val Glu Gly Asp Phe Asn Ile Gly Ile
            740                 745                 750
Gln Gly Gln Asn Phe Ser Ile Leu Leu Ser Arg Ala Gln Asn Thr Leu
        755                 760                 765
Val Ser Ala Lys Tyr Asn Gly Val Glu Phe Ile Glu Lys Gly Pro Lys
    770                 775                 780
Leu Ser Phe Thr Arg Ala Tyr Thr Asp Asn Asp Arg Gly Ala Gly Tyr
785                 790                 795                 800
Pro Phe Glu Met Ala Gly Trp Lys Val Ala Gly Asn Tyr Ser Lys Val
                805                 810                 815
Thr Asp Thr Gln Ile Gln Ile Glu Asp Asp Ser Val Lys Val Thr Tyr
            820                 825                 830
Val His Glu Leu Pro Gly Leu Ser Asp Val Glu Val Lys Val Thr Tyr
        835                 840                 845
Gln Val Asp Tyr Lys Gly Arg Ile Phe Val Thr Ala Asn Tyr Asp Gly
    850                 855                 860
Lys Ala Gly Leu Pro Asn Phe Pro Glu Phe Gly Leu Glu Phe Ala Ile
865                 870                 875                 880
Gly Ser Gln Phe Thr Asn Leu Ser Tyr Tyr Gly Tyr Gly Ala Glu Glu
                885                 890                 895
Ser Tyr Arg Asp Lys Leu Pro Gly Ala Tyr Leu Gly Arg Tyr Glu Thr
            900                 905                 910
Ser Val Glu Lys Thr Phe Ala Pro Tyr Leu Met Pro Gln Glu Ser Gly
        915                 920                 925
Asn His Tyr Gly Thr Arg Glu Phe Thr Val Ser Asp Asp Asn His Asn
    930                 935                 940
```

```
Gly Leu Lys Phe Thr Ala Leu Asn Lys Ala Phe Glu Phe Ser Ala Leu
945                 950                 955                 960

Arg Asn Ser Thr Glu Gln Ile Glu Asn Ala Arg His Gln Tyr Glu Leu
            965                 970                 975

Gln Glu Ser Asp Ala Thr Trp Ile Lys Val Leu Ala Ala Gln Met Gly
        980                 985                 990

Val Gly Gly Asp Asp Ser Trp Gly Ala Pro Val His Asp Glu Phe Leu
    995                 1000                1005

Leu Ser Ser Ala Asp Ser Tyr Gln Leu Ser Phe Met Ile Glu Pro Leu
    1010                1015                1020

Asn
1025

<210> SEQ ID NO 31
<211> LENGTH: 1008
<212> TYPE: PRT
<213> ORGANISM: Lactobacillus delbrueckii subsp. indicus

<400> SEQUENCE: 31

Met Asn Asn Lys Leu Ala Gln Val Lys Arg Val Asp Gln Ala Asp Leu
1               5                   10                  15

Ala Trp Leu Thr Asp Pro Glu Ile Tyr Glu Val Asn Thr Ile Pro Pro
            20                  25                  30

His Ser Asp His Glu Ser Phe Gln Ser Leu Glu Glu Leu Glu Glu Gly
        35                  40                  45

Lys Ser Ser Leu Val Gln Ser Leu Asp Gly Asp Trp Leu Ile Asp Tyr
    50                  55                  60

Ala Glu Asn Gly Glu Gly Pro Ala Asn Phe Tyr Glu Asn Phe Asp
65                  70                  75                  80

Asp Ser Ser Phe Lys Ser Val Lys Val Pro Gly Asn Leu Glu Leu Gln
                85                  90                  95

Gly Phe Gly Gln Pro Gln Tyr Val Asn Val Gln Tyr Pro Trp Asp Gly
            100                 105                 110

Ser Asp Glu Ile Phe Pro Pro Met Ile Pro Ser Lys Asn Pro Val Ala
        115                 120                 125

Ser Tyr Val Arg Tyr Phe Asp Leu Glu Glu Ala Phe Trp Asp Lys Glu
    130                 135                 140

Val Ser Leu Lys Phe Ala Gly Ala Ala Thr Ala Ile Tyr Val Trp Leu
145                 150                 155                 160

Asn Gly His Phe Val Gly Tyr Gly Glu Asp Ser Phe Thr Pro Ser Glu
                165                 170                 175

Phe Met Val Thr Lys Phe Leu Lys Lys Glu Gly Asn Arg Leu Ala Val
            180                 185                 190

Ala Leu Tyr Lys Tyr Ser Ser Ala Ser Trp Leu Glu Asp Gln Asp Phe
        195                 200                 205

Trp Arg Met Ser Gly Leu Phe Arg Ser Val Thr Leu Glu Ala Lys Pro
    210                 215                 220

Leu Leu His Leu Gln Asp Leu Lys Leu Thr Ala Ser Leu Thr Asn Asp
225                 230                 235                 240

Tyr Gln Lys Gly Ser Leu Gln Val Glu Ala Asp Ile Asp Tyr Arg Leu
                245                 250                 255

Pro Asn Ser Ser Phe Lys Leu Glu Leu Arg Asp Ser Ala Gly Glu Leu
            260                 265                 270

Val Ala Glu Lys Val Gly Pro Ile Arg Ser Glu Lys Leu Asp Phe Ser
        275                 280                 285
```

```
Leu Ala Asp Leu Pro Val Ala Ala Trp Ser Ala Glu Glu Pro Asn Leu
    290                 295                 300

Tyr Gln Val Arg Leu Ser Leu Tyr Gln Gln Gly Ser Leu Leu Glu Val
305                 310                 315                 320

Ser Arg Gln Glu Val Gly Phe Arg Asn Phe Glu Leu Lys Asp Gly Ile
                325                 330                 335

Met Tyr Leu Asn Gly Lys Arg Ile Val Phe Lys Gly Val Asn Arg His
            340                 345                 350

Glu Phe Asp Ser Lys Leu Gly Arg Ala Ile Thr Glu Ala Asp Met Ile
        355                 360                 365

Trp Asp Ile Lys Thr Met Lys Gln Ser Asn Ile Asn Ala Val Arg Cys
    370                 375                 380

Ser His Tyr Pro Asn Gln Ser Ile Phe Tyr His Leu Cys Asp Lys Tyr
385                 390                 395                 400

Gly Leu Tyr Val Ile Asp Glu Ala Asn Leu Glu Ser His Gly Thr Trp
                405                 410                 415

Glu Lys Val Gly Gly His Glu Asp Pro Ser Phe Asn Val Pro Gly Asp
            420                 425                 430

Asp Gln Arg Trp Leu Gly Ala Ser Leu Ser Arg Val Lys Asn Met Met
        435                 440                 445

Ala Arg Asp Lys Asn His Ala Ser Ile Leu Ile Trp Ser Leu Gly Asn
    450                 455                 460

Glu Ser Tyr Ala Gly Lys Val Phe Ala Gln Met Ala Asp Tyr Val Arg
465                 470                 475                 480

Gln Ala Asp Pro Thr Arg Val Gln His Tyr Glu Gly Val Thr His Asn
                485                 490                 495

Arg Lys Phe Asp Asp Ala Thr Gln Ile Glu Ser Arg Met Tyr Ala Pro
            500                 505                 510

Ala Lys Glu Ile Glu Glu Tyr Leu Thr Lys Lys Pro Ala Lys Pro Phe
        515                 520                 525

Val Ser Cys Glu Tyr Ala His Ala Met Gly Asn Ser Val Gly Asp Leu
    530                 535                 540

Ala Ala Tyr Thr Ala Leu Glu Lys Tyr Pro His Tyr Gln Gly Gly Phe
545                 550                 555                 560

Ile Trp Asp Trp Ile Asp Gln Gly Leu Glu Lys Glu Gly His Leu Leu
                565                 570                 575

Tyr Gly Gly Asp Phe Asp Asp Arg Pro Ser Asp Tyr Glu Phe Cys Gly
            580                 585                 590

Asp Gly Leu Val Phe Ala Asp Arg Thr Thr Ser Pro Lys Leu Ala Asn
        595                 600                 605

Val Lys Ala Leu Tyr Ser Asn Leu Lys Leu Glu Leu Lys Asp Gly Gln
    610                 615                 620

Leu Phe Leu Lys Asn Asp Asn Leu Phe Thr Asn Ser Ser Ala Tyr Tyr
625                 630                 635                 640

Phe Leu Thr Ser Leu Leu Val Asp Gly Lys Leu Thr Tyr Gln Ser Gln
                645                 650                 655

Pro Leu Thr Phe Ala Leu Glu Pro Gly Glu Ser Gly Thr Phe Ala Leu
            660                 665                 670

Pro Trp Pro Glu Val Glu Asp Glu Lys Gly Glu Ile Val Tyr Gln Val
        675                 680                 685

Thr Ala His Leu Lys Glu Asp Leu Pro Trp Ala Asp Glu Gly Phe Thr
    690                 695                 700
```

Val Ala Glu Ala Glu Ala Val Thr Lys Leu Pro Glu Phe Tyr Pro
705                 710                 715                 720

Ala Gly Arg Pro Glu Leu Val Asp Ser Asp Tyr Asn Leu Gly Ile Lys
            725                 730                 735

Gly Asn Gly Phe Arg Ile Leu Phe Ser Lys Ala Lys Gly Trp Pro Val
        740                 745                 750

Ser Ile Lys Tyr Ala Gly Arg Glu Tyr Leu Lys Arg Leu Pro Glu Phe
    755                 760                 765

Thr Phe Trp Arg Ala Leu Thr Asp Asn Asp Arg Gly Ala Gly Tyr Gly
770                 775                 780

Tyr Asp Leu Ala Lys Trp Glu Asn Ala Gly Lys Tyr Ala Arg Leu Gln
785                 790                 795                 800

Asp Ile Ser Tyr Glu Ile Lys Glu Asn Ser Val Leu Val Lys Thr Ala
            805                 810                 815

Phe Thr Leu Pro Val Ala Leu Lys Gly Asp Leu Thr Ile Thr Tyr Glu
        820                 825                 830

Val Asp Ser Leu Gly Lys Ile Ala Val Thr Ala Asn Phe Pro Gly Ala
    835                 840                 845

Val Glu Asn Gly Leu Leu Pro Ala Phe Gly Leu Asn Phe Ala Leu Pro
850                 855                 860

Lys Glu Leu Ser Asp Tyr Arg Tyr Tyr Gly Leu Gly Pro Asn Glu Ser
865                 870                 875                 880

Tyr Ala Asp Arg Leu Glu Gly Ser Tyr Leu Gly Ile Tyr Gln Gly Ala
            885                 890                 895

Val Glu Lys Asn Phe Thr Pro Tyr Leu Arg Pro Gln Glu Val Gly Asn
        900                 905                 910

Arg Ser Lys Val Arg Tyr Tyr Gln Leu Phe Asp Glu Glu Gly Gly Leu
    915                 920                 925

Glu Phe Thr Ala Asn Gly Ala Asn Leu Asn Leu Ser Ala Leu Pro Tyr
930                 935                 940

Ser Ala Ala Gln Ile Glu Ala Ala Asp His Ala Phe Glu Leu Thr Asn
945                 950                 955                 960

Asn Tyr Thr Trp Val Arg Ala Leu Ala Ala Gln Met Gly Val Gly Gly
            965                 970                 975

Asp Asp Ser Trp Gly Gln Lys Val His Pro Glu Phe Cys Leu Asp Ala
        980                 985                 990

Gln Glu Ala Arg Gln Leu Lys Leu Val Ile Gln Pro Leu Phe Thr Glu
    995                 1000                1005

<210> SEQ ID NO 32
<211> LENGTH: 1049
<212> TYPE: PRT
<213> ORGANISM: Bifidobacterium adolescentis

<400> SEQUENCE: 32

Met Ala Asp Thr Ala Glu Leu Ala Ile Val His Ala Thr Thr Ala Ser
1               5                   10                  15

Ala Ser Trp Leu Thr Asp Pro Thr Val Phe Ala Ala Asn Arg Lys Pro
            20                  25                  30

Ala His Ser Ser His Arg Tyr Val Ile Gly Glu Thr Ser Glu Pro Lys
        35                  40                  45

Gln Ser Leu Asp Gly Glu Trp Lys Val Arg Ile Glu Gln Ala Arg Asn
    50                  55                  60

Val Asp Val Glu Ser Ala Pro Phe Ala Ala Val Asp Phe Glu Asp Gly
65                  70                  75                  80

-continued

```
Asp Phe Gly Ala Ile Glu Val Pro Gly His Leu Gln Met Ala Gly Tyr
                85                  90                  95
Leu Lys Asn Lys Tyr Val Asn Ile Gln Tyr Pro Trp Asp Gly His Glu
            100                 105                 110
Asp Pro Gln Ala Pro Asn Ile Pro Glu Asn Asn His Val Ala Ile Tyr
        115                 120                 125
Arg Arg Arg Phe Ala Leu Asp Ala Gln Leu Ala Arg Thr Leu Glu Asn
130                 135                 140
Asp Gly Thr Val Ser Leu Thr Phe His Gly Ala Ala Thr Ala Ile Tyr
145                 150                 155                 160
Val Trp Leu Asp Gly Thr Phe Val Gly Tyr Gly Glu Asp Gly Phe Thr
                165                 170                 175
Pro Ser Glu Phe Asp Val Thr Glu Ala Leu Arg Asn Gly Asn Gly Asn
            180                 185                 190
Ala Ala Asp Ser Pro Glu Ala Glu His Thr Leu Thr Val Ala Cys Tyr
        195                 200                 205
Glu Tyr Ser Ser Ala Ser Trp Leu Glu Asp Gln Asp Phe Trp Arg Leu
        210                 215                 220
His Gly Leu Phe Arg Thr Val Glu Leu Ala Ala Gln Pro His Thr His
225                 230                 235                 240
Val Glu Thr Val Gln Leu Glu Ala Asp Tyr Thr Ala Ala Asp Thr Ala
                245                 250                 255
Gly Thr Ala Asp Thr Ala Glu Leu Asn Ala Ala Leu Thr Leu Arg Asn
            260                 265                 270
Pro Ala Asp Ala Met Thr Ile Glu Ser Thr Leu Arg Asp Gly Asp Gly
        275                 280                 285
Asn Val Val Trp Glu Ser Thr Gln Ala Cys Asn Gly Glu Ile Ala Leu
290                 295                 300
Asn Ser Gly Lys Met Thr Asn Ile Ala Pro Trp Ser Ala Glu Ser Pro
305                 310                 315                 320
Thr Leu Tyr Thr Leu Thr Val Arg Val Val Gly His Asp Gly Ala Ile
                325                 330                 335
Ile Glu Thr Val Thr Gln Lys Ile Gly Phe Arg Thr Phe Arg Ile Glu
            340                 345                 350
Asn Gly Ile Met Thr Leu Asn Gly Lys Arg Ile Val Phe Lys Gly Ala
        355                 360                 365
Asp Arg His Glu Phe Asp Ala Lys Arg Gly Arg Ala Ile Thr Arg Glu
370                 375                 380
Asp Met Leu Ser Asp Val Val Phe Cys Lys Arg His Asn Ile Asn Ala
385                 390                 395                 400
Ile Arg Thr Ser His Tyr Pro Asn Gln Glu Tyr Trp Tyr Asp Leu Cys
                405                 410                 415
Asp Glu Tyr Gly Leu Tyr Leu Ile Asp Glu Thr Asn Met Glu Thr His
            420                 425                 430
Gly Thr Trp Val Ala Asn Asn Val Glu Arg Pro Glu Asp Gly Ile Pro
        435                 440                 445
Gly Ser Arg Pro Glu Trp Glu Asp Ala Cys Val Asp Arg Ile Asn Ser
        450                 455                 460
Met Met Arg Arg Asp Tyr Asn His Pro Ser Val Leu Ile Trp Ser Leu
465                 470                 475                 480
Gly Asn Glu Ser Ser Ala Gly Glu Val Phe Arg Ala Met Tyr Arg His
                485                 490                 495
```

```
Ala His Thr Ile Asp Pro Asn Arg Pro Val His Tyr Glu Gly Ser Val
                500                 505                 510
His Met Arg Glu Phe Glu Asp Val Thr Asp Ile Glu Ser Arg Met Tyr
    515                 520                 525
Ala His Ala Asp Glu Ile Glu Arg Tyr Leu Asn Asp Gly Ser Pro Ala
530                 535                 540
His Thr Asp Gly Pro Lys Lys Pro Tyr Ile Ser Cys Glu Tyr Met His
545                 550                 555                 560
Ala Met Gly Asn Ser Cys Gly Asn Met Asp Glu Tyr Thr Ala Leu Glu
                565                 570                 575
Arg Tyr Pro Met Tyr Gln Gly Gly Phe Ile Trp Asp Phe Ile Asp Gln
            580                 585                 590
Ala Ile Glu Thr Lys Leu Pro Asp Gly Thr Thr Arg Met Cys Tyr Gly
        595                 600                 605
Gly Asp Phe Gly Asp Arg Pro Ser Asp Tyr Glu Phe Ser Gly Asp Gly
    610                 615                 620
Leu Leu Phe Ala Asp Arg Thr Pro Ser Pro Lys Ala Gln Glu Val Lys
625                 630                 635                 640
Gln Leu Tyr Ala Asn Val Lys Ile Ala Val Ser Val Asp Glu Ala Arg
                645                 650                 655
Ile Thr Asn Asp Asn Leu Phe Val Ser Thr Gly Asp Tyr Arg Phe Val
            660                 665                 670
Leu Arg Ile Leu Ala Asp Gly Lys Pro Val Trp Ser Thr Thr Arg Arg
        675                 680                 685
Phe Asp Val Ala Ala Gly Glu Ser Ala Ser Phe Glu Val Asp Trp Pro
    690                 695                 700
Val Asp Asp Tyr Arg Ser Asn Ala Glu Glu Leu Val Leu Glu Val Ser
705                 710                 715                 720
Gln Gln Leu Gly Asn Ala Cys Asp Trp Ala Pro Ala Gly Tyr Glu Leu
                725                 730                 735
Ala Phe Gly Gln Cys Val Val Ala Gly Ala Lys Thr Thr Ala Asp Ala
            740                 745                 750
Val Asp Ala Ala Gly Ala Pro Ala Asp Gly Thr Val Thr Leu Gly Arg
        755                 760                 765
Trp Asn Ala Gly Val Arg Gly Gln Gly Arg Glu Ala Leu Phe Ser Arg
    770                 775                 780
Thr Gln Gly Gly Met Val Ser Tyr Thr Phe Gly Glu Arg Glu Phe Val
785                 790                 795                 800
Leu Arg Arg Pro Ser Ile Thr Thr Phe Arg Pro Leu Thr Asp Asn Asp
                805                 810                 815
Arg Gly Ala Gly His Ala Phe Glu Arg Ala Ala Trp Ala Val Ala Gly
            820                 825                 830
Lys Tyr Ala Arg Cys Val Asp Cys Ala Ile Ala Asn Arg Gly Glu Asn
        835                 840                 845
Ala Val Glu Ala Thr Tyr Thr Tyr Glu Leu Ala Ile Pro Gln Arg Thr
    850                 855                 860
Lys Val Thr Val Arg Tyr Val Ala Asp Thr Ala Gly Leu Val Ser Leu
865                 870                 875                 880
Asp Val Glu Tyr Pro Gly Glu Lys Asn Gly Asp Leu Pro Thr Ile Pro
                885                 890                 895
Ala Phe Gly Ile Glu Trp Ala Leu Pro Val Glu Tyr Ala Asn Leu Arg
            900                 905                 910
Phe Tyr Gly Ala Gly Pro Glu Glu Thr Tyr Ala Asp Arg Arg His Ala
```

```
                915                 920                 925
Lys Leu Gly Val Trp Ser Thr Thr Ala Gly Asp Asp Cys Ala Pro Tyr
930                 935                 940

Leu Leu Pro Gln Glu Thr Gly Asn His Glu Asp Val Arg Trp Ala Glu
945                 950                 955                 960

Ile Thr Asp Asp Ser Gly His Gly Val Arg Val Lys Arg Gly Ala Gly
                965                 970                 975

Ala Lys Pro Phe Ala Met Ser Leu Leu Pro Tyr Ser Ser Thr Met Leu
                980                 985                 990

Glu Glu Ala Leu His Gln Asp Glu Leu Pro Lys Pro Arg His Met Phe
                995                1000                1005

Leu Arg Leu Leu Ala Ala Gln Met Gly Val Gly Gly Asp Asp Ser Trp
                1010                1015                1020

Met Ser Pro Val His Glu Gln Tyr Gln Leu Pro Ala Asp Gln Pro Leu
1025                1030                1035                1040

Ser Leu Asn Val Gln Leu Lys Leu Phe
                1045

<210> SEQ ID NO 33
<211> LENGTH: 1023
<212> TYPE: PRT
<213> ORGANISM: Bifidobacterium adolescentis

<400> SEQUENCE: 33

Met Ala Asn Glu Thr Arg Ile Glu His Ala Ser Glu Thr Trp Leu Ala
1               5                   10                  15

Asp Ser Thr Val Phe Glu Val Asn Arg Val Pro Ala His Ser Asp His
                20                  25                  30

Lys Cys Tyr Ala His Asp Ser Gln Thr Asn Glu Trp Ser Asp Leu Arg
                35                  40                  45

Gln Ser Leu Asp Gly Glu Trp Arg Val Glu Val Val Gln Ala Ser Asp
                50                  55                  60

Ile Glu Phe Asn Glu Glu Pro Phe Val Arg Glu Asn Phe Asp Asp Ser
65              70                  75                  80

Ala Phe Glu Arg Ile Gln Val Pro Gly His Leu Gln Met Ala Gly Leu
                85                  90                  95

Met Asn Asn Lys Tyr Val Asn Ile Gln Tyr Pro Trp Asp Gly His Glu
                100                 105                 110

Asn Pro Ala Glu Pro Asn Ile Pro Glu Asn Asn His Val Ala Leu Tyr
                115                 120                 125

Arg Lys Thr Phe Thr Met Ala Asn Arg Leu Ala Asp Thr Lys Asn Ala
                130                 135                 140

Gly Gly Thr Val Ser Ile Val Phe His Gly Met Ala Thr Ala Ile Tyr
145                 150                 155                 160

Val Trp Val Asn Gly Met Phe Val Gly Tyr Gly Glu Asp Gly Phe Thr
                165                 170                 175

Pro Asn Glu Phe Asp Ile Thr Glu Met Leu His Asp Gly Glu Asn Val
                180                 185                 190

Val Ala Val Ala Cys Tyr Glu Tyr Ser Ser Ala Ser Trp Leu Glu Asp
                195                 200                 205

Gln Asp Phe Trp Arg Leu His Gly Leu Phe Arg Ser Val Glu Leu Ala
                210                 215                 220

Ala Gln Pro His Val His Ile Glu Asn Met Gln Ile Glu Ser Asp Trp
225                 230                 235                 240
```

-continued

```
Asp Pro Glu Ser Gly Ser Ala Ser Leu Asp Ala Ala Leu Thr Val Arg
            245                 250                 255
Asn Ala Ala Asp Ala Ala Thr Ile Ser Ala Thr Leu Lys Asp Ser Asp
        260                 265                 270
Gly Asn Val Val Trp Glu Thr Ala Asn Cys Ala Asp Pro Asp Thr Ser
    275                 280                 285
Ile Ser Thr Gly Ser Leu Asn Gly Ile Arg Pro Trp Ser Ala Glu Asp
290                 295                 300
Pro Val Leu Tyr Glu Phe Glu Val Thr Val Ile Asp His Ala Gly Asn
305                 310                 315                 320
Ile Ala Glu Val Ala Val Gln Lys Val Gly Phe Arg Arg Phe Arg Ile
                325                 330                 335
Glu Asp Gly Ile Met Thr Ile Asn Gly Lys Arg Ile Val Phe Lys Gly
            340                 345                 350
Ala Asp Arg His Glu Phe Asp Pro Lys Arg Gly Arg Ala Ile Thr Glu
        355                 360                 365
Gln Asp Met Ile Asp Val Val Phe Cys Lys Arg His Asn Leu Asn
    370                 375                 380
Ala Ile Arg Thr Ser His Tyr Pro Asn Gln Glu Arg Trp Tyr Glu Leu
385                 390                 395                 400
Cys Asp Glu Tyr Gly Ile Tyr Leu Ile Asp Glu Thr Asn Leu Glu Thr
                405                 410                 415
His Gly Ser Trp Cys Leu Pro Gly Asp Val Leu Thr Glu Thr Ala
            420                 425                 430
Val Pro Gly Ser Lys Ala His Trp Glu Gly Ala Cys Val Asp Arg Val
        435                 440                 445
Asn Ser Met Val Arg Arg Asp Tyr Asn His Pro Ser Val Leu Ile Trp
    450                 455                 460
Ser Leu Gly Asn Glu Ser Tyr Thr Gly Asp Val Phe Arg Ala Met Tyr
465                 470                 475                 480
Lys Arg Val His Asp Ile Asp Pro Asn Arg Pro Val His Tyr Glu Gly
                485                 490                 495
Val Thr His Asn Arg Asp Tyr Asn Asp Val Thr Asp Ile Glu Thr Arg
            500                 505                 510
Met Tyr Ala His Ala Asp Ala Ile Glu Glu Tyr Leu Lys Asn Asp Pro
        515                 520                 525
Gln Lys Pro Tyr Ile Ser Cys Glu Tyr Met His Ala Met Gly Asn Ser
    530                 535                 540
Cys Gly Asn Met Asp Glu Tyr Thr Ala Leu Glu Arg Tyr Pro Lys Tyr
545                 550                 555                 560
Gln Gly Gly Phe Ile Trp Asp Phe Ile Asp Gln Ala Ile Tyr Ala Thr
                565                 570                 575
Gln Pro Asp Gly Thr Thr Ser Leu Arg Tyr Gly Gly Asp Phe Gly Asp
            580                 585                 590
Arg Pro Ser Asp Tyr Glu Phe Ser Gly Asn Gly Leu Val Phe Ala Asp
        595                 600                 605
Arg Lys Pro Thr Pro Lys Ala Gln Glu Val Lys Gln Leu Tyr Ser Asn
    610                 615                 620
Val His Ile Asp Val Ala Glu Asp Ser Val Thr Ile Lys Asn Asp Asn
625                 630                 635                 640
Leu Phe Thr Ser Thr Gly Glu Tyr Thr Phe Val Leu Arg Val Leu Ala
                645                 650                 655
Asp Gly Glu Pro Val Trp Gln Ser Glu Arg Arg Phe Asp Val Pro Ala
```

```
                660             665             670
Gly Ser Thr Glu Lys Leu Asp Val Asp Trp Pro Leu Asp Leu Tyr Arg
        675             680             685

Asp Gly Ala Ser Glu Leu Val Leu Glu Val Ser Gln Arg Leu Ala Lys
690             695             700

Ala Thr Asn Trp Ala Val Ala Gly Tyr Glu Leu Ala Phe Gly Gln Thr
705             710             715             720

Val Val Ala Gly Ser Lys Lys Ala Ser Ala Pro Val Lys Pro Val Asp
            725             730             735

Gly Ile Val Thr Val Gly Arg Trp Asn Val Gly Val Gln Gly Ser Gly
        740             745             750

Arg Glu Val Leu Leu Ser Arg Thr Gln Gly Gly Leu Val Ser Tyr Thr
    755             760             765

Phe Asn Asn Arg Glu Phe Val Leu Arg Arg Pro Ala Val Thr Thr Phe
    770             775             780

Arg Ala Leu Thr Asp Asn Asp Arg Gly Ala Gly His Gly Phe Glu Arg
785             790             795             800

Ala Gln Trp Leu Gly Ala Gly Arg Tyr Ala Arg Cys Ile Gly Asn Glu
            805             810             815

Ile Glu Gln Ile Asp Glu Asn Thr Val Lys Ala Ser Tyr Thr Tyr Glu
        820             825             830

Leu Ala Thr Pro Gln Arg Thr Lys Val Thr Val Ser Tyr Thr Ala Asp
            835             840             845

Thr Thr Gly Arg Val Asn Leu His Val Glu Tyr Pro Gly Glu Pro Gly
850             855             860

Asp Leu Pro Thr Ile Pro Ala Phe Gly Ile Glu Trp Thr Leu Pro Val
865             870             875             880

Gln Tyr Ser Asn Leu Arg Phe Phe Gly Ala Gly Pro Glu Glu Thr Tyr
            885             890             895

Gln Asp Arg Lys His Ala Lys Leu Gly Val Trp Ser Thr Asp Ala Phe
        900             905             910

Lys Asp His Ala Pro Tyr Leu Met Pro Gln Glu Thr Gly Asn His Glu
    915             920             925

Asp Val Arg Trp Ala Glu Ile Thr Asp Glu Lys Gly His Gly Leu Arg
    930             935             940

Ile Ser Arg Ala Glu Gly Ala Glu Pro Phe Ala Met Ser Leu Gln Pro
945             950             955             960

Tyr Ser Ser Phe Met Leu Glu Glu Ala Gln His Gln Asp Glu Leu Pro
            965             970             975

Ala Pro Lys His Met Phe Leu Arg Val Leu Ala Glu Gln Met Gly Val
        980             985             990

Gly Gly Asp Asp Ser Trp Met Ser Pro Val His Pro Gln Tyr His Ile
    995             1000            1005

Pro Ala Asp Gln Pro Ile Ser Leu Asp Val Asp Leu Asp Leu Ile
    1010            1015            1020

<210> SEQ ID NO 34
<211> LENGTH: 1008
<212> TYPE: PRT
<213> ORGANISM: Lactobacillus delbrueckii subsp. bulgaricus
<223> OTHER INFORMATION: CHCC10019
<220> FEATURE:
<223> OTHER INFORMATION: CHCC10019

<400> SEQUENCE: 34
```

Met Ser Asn Lys Leu Val Lys Glu Lys Arg Val Asp Gln Ala Asp Leu
1               5                   10                  15

Ala Trp Leu Thr Asp Pro Glu Val Tyr Glu Val Asn Thr Ile Pro Pro
            20                  25                  30

His Ser Asp His Glu Ser Phe Gln Ser Gln Glu Glu Leu Glu Glu Gly
        35                  40                  45

Lys Ser Ser Leu Val Gln Ser Leu Asp Gly Asp Trp Leu Ile Asp Tyr
50                  55                  60

Ala Glu Asn Gly Gln Gly Pro Val Asn Phe Tyr Ala Glu Asp Phe Asp
65                  70                  75                  80

Asp Ser Asn Phe Lys Ser Val Lys Val Pro Gly Asn Leu Glu Leu Gln
                85                  90                  95

Gly Phe Gly Gln Pro Gln Tyr Val Asn Val Gln Tyr Pro Trp Asp Gly
            100                 105                 110

Ser Glu Glu Ile Phe Pro Pro Gln Ile Pro Ser Lys Asn Pro Leu Ala
        115                 120                 125

Ser Tyr Val Arg Tyr Phe Asp Leu Asp Glu Ala Phe Trp Asp Lys Glu
    130                 135                 140

Val Ser Leu Lys Phe Asp Gly Ala Ala Thr Ala Ile Tyr Val Trp Leu
145                 150                 155                 160

Asn Gly His Phe Val Gly Tyr Gly Glu Asp Ser Phe Thr Pro Ser Glu
            165                 170                 175

Phe Met Val Thr Lys Phe Leu Lys Glu Asn Asn Arg Leu Ala Val
        180                 185                 190

Ala Leu Tyr Lys Tyr Ser Ser Ala Ser Trp Leu Glu Asp Gln Asp Phe
    195                 200                 205

Trp Arg Met Ser Gly Leu Phe Arg Ser Val Thr Leu Gln Ala Lys Pro
    210                 215                 220

Arg Leu His Leu Glu Asp Leu Lys Leu Thr Ala Ser Leu Thr Asp Asn
225                 230                 235                 240

Tyr Gln Lys Gly Lys Leu Glu Val Glu Ala Asn Ile Ala Tyr Arg Leu
            245                 250                 255

Pro Asn Ala Ser Phe Lys Leu Glu Val Arg Asp Ser Glu Gly Asp Leu
        260                 265                 270

Val Ala Glu Lys Leu Gly Pro Ile Arg Ser Glu Gln Leu Glu Phe Thr
    275                 280                 285

Leu Ala Asp Leu Pro Val Ala Ala Trp Ser Ala Glu Lys Pro Asn Leu
    290                 295                 300

Tyr Gln Val Arg Leu Tyr Leu Tyr Gln Ala Gly Ser Leu Leu Glu Val
305                 310                 315                 320

Ser Arg Gln Glu Val Gly Phe Arg Asn Phe Glu Leu Lys Asp Gly Ile
            325                 330                 335

Met Tyr Leu Asn Gly Gln Arg Ile Val Phe Lys Gly Ala Asn Arg His
        340                 345                 350

Glu Phe Asp Ser Lys Leu Gly Arg Ala Ile Thr Glu Glu Asp Met Ile
    355                 360                 365

Trp Asp Ile Lys Thr Met Lys Arg Ser Asn Ile Asn Ala Val Arg Cys
    370                 375                 380

Ser His Tyr Pro Asn Gln Ser Leu Phe Tyr Arg Leu Cys Asp Lys Tyr
385                 390                 395                 400

Gly Leu Tyr Val Ile Asp Glu Ala Asn Leu Glu Ser His Gly Thr Trp
            405                 410                 415

Glu Lys Val Gly Gly His Glu Asp Pro Ser Phe Asn Val Pro Gly Asp

```
                420              425              430
Asp Gln His Trp Leu Gly Ala Ser Leu Ser Arg Val Lys Asn Met Met
            435              440              445
Ala Arg Asp Lys Asn His Ala Ser Ile Leu Ile Trp Ser Leu Gly Asn
        450              455              460
Glu Ser Tyr Ala Gly Thr Val Phe Ala Gln Met Ala Asp Tyr Val Arg
465              470              475              480
Lys Ala Asp Pro Thr Arg Val Gln His Tyr Glu Gly Val Thr His Asn
                485              490              495
Arg Lys Phe Asp Asp Ala Thr Gln Ile Glu Ser Arg Met Tyr Ala Pro
            500              505              510
Ala Lys Val Ile Glu Glu Tyr Leu Thr Asn Lys Pro Ala Lys Pro Phe
        515              520              525
Ile Ser Val Glu Tyr Ala His Ala Met Gly Asn Ser Val Gly Asp Leu
    530              535              540
Ala Ala Tyr Thr Ala Leu Glu Lys Tyr Pro His Tyr Gln Gly Gly Phe
545              550              555              560
Ile Trp Asp Trp Ile Asp Gln Gly Leu Glu Lys Asp Gly His Leu Leu
                565              570              575
Tyr Gly Gly Asp Phe Asp Asp Arg Pro Thr Asp Tyr Glu Phe Cys Gly
            580              585              590
Asn Gly Leu Val Phe Ala Asp Arg Thr Glu Ser Pro Lys Leu Ala Asn
        595              600              605
Val Lys Ala Leu Tyr Ala Asn Leu Lys Leu Glu Val Lys Asp Gly Gln
    610              615              620
Leu Phe Leu Lys Asn Asp Asn Leu Phe Thr Asn Ser Ser Tyr Tyr
625              630              635              640
Phe Leu Thr Ser Leu Leu Val Asp Gly Lys Leu Thr Tyr Gln Ser Arg
                645              650              655
Pro Leu Thr Phe Gly Leu Glu Pro Gly Glu Ser Gly Thr Phe Ala Leu
            660              665              670
Pro Trp Pro Glu Val Ala Asp Glu Lys Gly Glu Val Val Tyr Arg Val
        675              680              685
Thr Ala His Leu Lys Glu Asp Leu Pro Trp Ala Asp Glu Gly Phe Thr
    690              695              700
Val Ala Glu Ala Glu Val Ala Gln Lys Leu Pro Glu Phe Lys Pro
705              710              715              720
Glu Gly Arg Pro Asp Leu Val Asp Ser Asp Tyr Asn Leu Gly Leu Lys
            725              730              735
Gly Asn Asn Phe Gln Ile Leu Phe Ser Lys Val Lys Gly Trp Pro Val
        740              745              750
Ser Leu Lys Tyr Ala Gly Arg Glu Tyr Leu Lys Arg Leu Pro Glu Phe
    755              760              765
Thr Phe Trp Arg Ala Leu Thr Asp Asn Asp Arg Gly Ala Gly Tyr Gly
    770              775              780
Tyr Asp Leu Ala Arg Trp Glu Asn Ala Gly Lys Tyr Ala Arg Leu Lys
785              790              795              800
Asp Ile Ser Cys Glu Val Lys Glu Asp Ser Val Leu Val Lys Thr Ala
            805              810              815
Phe Thr Leu Pro Val Ala Leu Lys Gly Asp Leu Thr Val Thr Tyr Glu
        820              825              830
Val Asp Gly Arg Gly Lys Ile Ala Val Thr Ala Asp Phe Pro Gly Ala
    835              840              845
```

```
Glu Gly Ala Gly Leu Leu Pro Ala Phe Gly Leu Asn Leu Ala Leu Pro
850                 855                 860

Lys Glu Leu Thr Asp Tyr Arg Tyr Tyr Gly Leu Gly Pro Asn Glu Ser
865                 870                 875                 880

Tyr Pro Asp Arg Leu Glu Gly Asn Tyr Leu Gly Ile Tyr Gln Gly Ala
                885                 890                 895

Val Lys Lys Asn Phe Ser Pro Tyr Leu Arg Pro Gln Glu Thr Gly Asn
            900                 905                 910

Arg Ser Lys Val Arg Trp Tyr Gln Leu Phe Asp Glu Lys Gly Gly Leu
        915                 920                 925

Glu Phe Thr Ala Asn Gly Ala Asp Leu Asn Leu Ser Ala Leu Pro Tyr
    930                 935                 940

Ser Ala Ala Gln Ile Glu Ala Ala Asp His Ala Phe Glu Leu Thr Asn
945                 950                 955                 960

Asn Tyr Thr Trp Val Arg Ala Leu Ser Ala Gln Met Gly Val Gly Gly
                965                 970                 975

Asp Asp Ser Trp Gly Gln Lys Val His Pro Glu Phe Cys Leu Asp Ala
            980                 985                 990

Gln Lys Ala Arg Gln Leu Arg Leu Val Ile Gln Pro Leu Leu Leu Lys
        995                 1000                1005

<210> SEQ ID NO 35
<211> LENGTH: 1008
<212> TYPE: PRT
<213> ORGANISM: Lactobacillus delbrueckii subsp. bulgaricus
<223> OTHER INFORMATION: CHCC16159
<220> FEATURE:
<223> OTHER INFORMATION: CHCC16159

<400> SEQUENCE: 35

Met Ser Asn Lys Leu Val Lys Glu Lys Arg Val Asp Gln Ala Asp Leu
1               5                   10                  15

Ala Trp Leu Thr Asp Pro Glu Val Tyr Glu Val Asn Thr Ile Pro Pro
                20                  25                  30

His Ser Asp His Glu Ser Phe Gln Ser Gln Glu Glu Leu Glu Glu Gly
            35                  40                  45

Lys Ser Ser Leu Val Gln Ser Leu Asp Gly Asp Trp Leu Ile Asp Tyr
50                  55                  60

Ala Glu Asn Gly Gln Gly Pro Val Asn Phe Tyr Ala Glu Asp Phe Asp
65                  70                  75                  80

Asp Ser Asn Phe Lys Ser Val Lys Val Pro Gly Asn Leu Glu Leu Gln
                85                  90                  95

Gly Phe Gly Gln Pro Gln Tyr Val Asn Val Gln Tyr Pro Trp Asp Gly
            100                 105                 110

Ser Glu Glu Ile Phe Pro Pro Gln Ile Pro Ser Lys Asn Pro Leu Ala
        115                 120                 125

Ser Tyr Val Arg Tyr Phe Asp Leu Asp Glu Ala Phe Trp Asp Lys Glu
    130                 135                 140

Val Ser Leu Lys Phe Asp Gly Ala Ala Thr Ala Ile Tyr Val Trp Leu
145                 150                 155                 160

Asn Gly His Phe Val Gly Tyr Gly Glu Asp Ser Phe Thr Pro Ser Glu
                165                 170                 175

Phe Met Val Thr Lys Phe Leu Lys Lys Glu Asn Asn Arg Leu Ala Val
            180                 185                 190

Ala Leu Tyr Lys Tyr Ser Ser Ala Ser Trp Leu Glu Asp Gln Asp Phe
```

```
            195                 200                 205

Trp Arg Met Ser Gly Leu Phe Arg Ser Val Thr Leu Gln Ala Lys Pro
210                 215                 220

Arg Leu His Leu Glu Asp Leu Lys Leu Thr Ala Ser Leu Thr Asp Asn
225                 230                 235                 240

Tyr Gln Lys Gly Lys Leu Glu Val Glu Ala Asn Ile Ala Tyr Arg Leu
                    245                 250                 255

Pro Asn Ala Ser Phe Lys Leu Glu Val Arg Asp Ser Glu Gly Asp Leu
                260                 265                 270

Val Ala Glu Lys Leu Gly Pro Ile Arg Ser Glu Gln Leu Glu Phe Thr
            275                 280                 285

Leu Ala Asp Leu Pro Val Ala Ala Trp Ser Ala Glu Lys Pro Asn Leu
290                 295                 300

Tyr Gln Val Arg Leu Tyr Leu Tyr Gln Ala Gly Ser Leu Leu Glu Val
305                 310                 315                 320

Ser Arg Gln Glu Val Gly Phe Arg Asn Phe Glu Leu Lys Asp Gly Ile
                    325                 330                 335

Met Tyr Leu Asn Gly Gln Arg Ile Val Phe Lys Gly Ala Asn Arg His
                340                 345                 350

Glu Phe Asp Ser Lys Leu Gly Arg Ala Ile Thr Glu Asp Met Ile
            355                 360                 365

Trp Asp Ile Lys Thr Met Lys Arg Ser Asn Ile Asn Ala Val Arg Cys
370                 375                 380

Ser His Tyr Pro Asn Gln Ser Leu Phe Tyr Arg Leu Cys Asp Lys Tyr
385                 390                 395                 400

Gly Leu Tyr Val Ile Asp Glu Ala Asn Leu Glu Ser His Gly Thr Trp
                    405                 410                 415

Glu Lys Val Gly Gly His Glu Asp Pro Ser Phe Asn Val Pro Gly Asp
                420                 425                 430

Asp Gln His Trp Leu Gly Ala Ser Leu Ser Arg Val Lys Asn Met Met
            435                 440                 445

Ala Arg Asp Lys Asn His Ala Ser Ile Leu Ile Trp Ser Leu Gly Asn
450                 455                 460

Glu Ser Tyr Ala Gly Thr Val Phe Ala Gln Met Ala Asp Tyr Val Arg
465                 470                 475                 480

Lys Ala Asp Pro Thr Arg Val Gln His Tyr Glu Gly Val Thr His Asn
                    485                 490                 495

Arg Lys Phe Asp Asp Ala Thr Gln Ile Glu Ser Arg Met Tyr Ala Pro
                500                 505                 510

Ala Lys Val Ile Glu Glu Tyr Leu Thr Asn Lys Pro Ala Lys Pro Phe
            515                 520                 525

Ile Ser Val Glu Tyr Ala His Ala Met Gly Asn Ser Val Gly Asp Leu
530                 535                 540

Ala Ala Tyr Thr Ala Leu Glu Lys Tyr Pro His Tyr Gln Gly Gly Phe
545                 550                 555                 560

Ile Trp Asp Trp Ile Asp Gln Gly Leu Glu Lys Asp Gly His Leu Leu
                    565                 570                 575

Tyr Gly Gly Asp Phe Asp Asp Arg Pro Thr Asp Tyr Glu Phe Cys Gly
                580                 585                 590

Asn Gly Leu Val Phe Ala Asp Arg Thr Glu Ser Pro Lys Leu Ala Asn
            595                 600                 605

Val Lys Ala Leu Tyr Ala Asn Leu Lys Leu Glu Val Lys Asp Gly Gln
610                 615                 620
```

Leu Phe Leu Lys Asn Asp Asn Leu Phe Thr Asn Ser Ser Tyr Tyr
625                 630                 635                 640

Phe Leu Thr Ser Leu Leu Val Asp Gly Lys Leu Thr Tyr Gln Ser Arg
            645                 650                 655

Pro Leu Thr Phe Gly Leu Glu Pro Gly Glu Ser Gly Thr Phe Ala Leu
        660                 665                 670

Pro Trp Pro Glu Val Ala Asp Glu Lys Gly Glu Val Val Tyr Arg Val
    675                 680                 685

Thr Ala His Leu Lys Glu Asp Leu Pro Trp Ala Asp Glu Gly Phe Thr
690                 695                 700

Val Ala Glu Ala Glu Val Ala Gln Lys Leu Pro Glu Phe Lys Pro
705                 710                 715                 720

Glu Gly Arg Pro Asp Leu Val Asp Ser Asp Tyr Asn Leu Gly Leu Lys
                725                 730                 735

Gly Asn Asn Phe Gln Ile Leu Phe Ser Lys Val Lys Gly Trp Pro Val
            740                 745                 750

Ser Leu Lys Tyr Ala Gly Arg Glu Tyr Leu Lys Arg Leu Pro Glu Phe
        755                 760                 765

Thr Phe Trp Arg Ala Leu Thr Asp Asn Asp Arg Gly Ala Gly Tyr Gly
    770                 775                 780

Tyr Asp Leu Ala Arg Trp Glu Asn Ala Gly Lys Tyr Ala Arg Leu Lys
785                 790                 795                 800

Asp Ile Ser Cys Glu Val Lys Glu Asp Ser Val Leu Val Lys Thr Ala
                805                 810                 815

Phe Thr Leu Pro Val Ala Leu Lys Gly Asp Leu Thr Val Thr Tyr Glu
            820                 825                 830

Val Asp Gly Arg Gly Lys Ile Ala Val Thr Ala Asp Phe Pro Gly Ala
        835                 840                 845

Glu Glu Ala Gly Leu Leu Pro Ala Phe Gly Leu Asn Leu Ala Leu Pro
    850                 855                 860

Lys Glu Leu Thr Asp Tyr Arg Tyr Tyr Gly Leu Gly Pro Asn Glu Ser
865                 870                 875                 880

Tyr Pro Asp Arg Leu Glu Gly Asn Tyr Leu Gly Ile Tyr Gln Gly Ala
                885                 890                 895

Val Lys Lys Asn Phe Ser Pro Tyr Leu Arg Pro Gln Glu Thr Gly Asn
            900                 905                 910

Arg Ser Lys Val Arg Trp Tyr Gln Leu Phe Asp Glu Lys Gly Gly Leu
        915                 920                 925

Glu Phe Thr Ala Asn Gly Ala Asp Leu Asn Leu Ser Ala Leu Pro Tyr
    930                 935                 940

Ser Ala Ala Gln Ile Glu Ala Ala Asp His Ala Phe Glu Leu Thr Asn
945                 950                 955                 960

Asn Tyr Thr Trp Val Arg Ala Leu Ser Ala Gln Met Gly Val Gly Gly
                965                 970                 975

Asp Asp Ser Trp Gly Gln Lys Val His Pro Glu Phe Cys Leu Asp Ala
            980                 985                 990

Gln Lys Ala Arg Gln Leu Arg Leu Val Ile Gln Pro Leu Leu Leu Lys
        995                 1000                1005

<210> SEQ ID NO 36
<211> LENGTH: 1026
<212> TYPE: PRT
<213> ORGANISM: Streptococcus thermophilus
<223> OTHER INFORMATION: CHCC6008

<220> FEATURE:
<223> OTHER INFORMATION: CHCC6008

<400> SEQUENCE: 36

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
            20                  25                  30

Ser Leu Glu Glu Phe Ser Glu Gly Glu Met Lys Leu Arg Gln Ser Leu
        35                  40                  45

Asn Gly Lys Trp Lys Ile His Tyr Ala Gln Asn Thr Asn Gln Val Leu
    50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Val Phe Ile Ser Phe Gln
130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
        195                 200                 205

Phe Arg Asp Val Tyr Leu Tyr Ala Ile Pro Lys Val His Val Gln Asp
    210                 215                 220

Leu Phe Val Lys Gly Asp Tyr Asp Tyr Gln Thr Lys Ala Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
            260                 265                 270

Val Asn Gly Asp Gly Glu Leu Ser Val Ser Leu Glu Asn Leu Lys Ile
        275                 280                 285

Lys Pro Trp Ser Ala Glu Ser Pro Lys Leu Tyr Asp Leu Ile Leu His
    290                 295                 300

Val Leu Asp Asp Asp Gln Val Val Glu Val Val Pro Lys Val Val Gly
305                 310                 315                 320

Phe Arg Arg Phe Glu Ile Lys Asp Lys Leu Met Leu Leu Asn Gly Lys
                325                 330                 335

Arg Ile Val Phe Lys Gly Val Asn Arg His Glu Phe Asn Ala Arg Thr
            340                 345                 350

Gly Arg Cys Ile Thr Glu Glu Asp Met Leu Trp Asp Ile Lys Val Met
        355                 360                 365

Lys Gln His Asn Ile Asn Ala Val Arg Thr Ser His Tyr Pro Asn Gln
    370                 375                 380

Thr Arg Trp Tyr Glu Leu Cys Asp Glu Tyr Gly Leu Tyr Val Ile Asp
385                 390                 395                 400

```
Glu Ala Asn Leu Glu Thr His Gly Thr Trp Gln Lys Leu Gly Leu Cys
                405                 410                 415
Glu Pro Ser Trp Asn Ile Pro Ala Ser Glu Pro Glu Trp Leu Pro Ala
                420                 425                 430
Cys Leu Asp Arg Ala Asn Asn Met Phe Gln Arg Asp Lys Asn His Ala
                435                 440                 445
Ser Val Ile Ile Trp Ser Cys Gly Asn Glu Ser Tyr Ala Gly Lys Asp
                450                 455                 460
Ile Ala Asp Met Ala Asp Tyr Phe Arg Ser Val Asp Asn Thr Arg Pro
465                 470                 475                 480
Val His Tyr Glu Gly Val Ala Trp Cys Arg Glu Phe Asp Tyr Ile Thr
                485                 490                 495
Asp Ile Glu Ser Arg Met Tyr Ala Lys Pro Ala Asp Ile Glu Glu Tyr
                500                 505                 510
Leu Thr Thr Gly Lys Leu Val Asp Leu Ser Ser Val Ser Asp Lys His
                515                 520                 525
Phe Ala Ser Gly Asn Leu Thr Asn Lys Pro Gln Lys Pro Tyr Ile Ser
                530                 535                 540
Cys Glu Tyr Met His Thr Met Gly Asn Ser Gly Gly Gly Leu Gln Leu
545                 550                 555                 560
Tyr Thr Asp Leu Glu Lys Tyr Pro Glu Tyr Gln Gly Gly Phe Ile Trp
                565                 570                 575
Asp Phe Ile Asp Gln Ala Ile Tyr Lys Thr Leu Pro Asn Gly Ser Glu
                580                 585                 590
Phe Leu Ser Tyr Gly Gly Asp Trp His Asp Arg Pro Ser Asp Tyr Glu
                595                 600                 605
Phe Cys Gly Asn Gly Ile Val Phe Ala Asp Arg Thr Leu Thr Pro Lys
                610                 615                 620
Leu Gln Thr Val Lys His Leu Tyr Ser Asn Ile Lys Ile Ala Val Asp
625                 630                 635                 640
Glu Lys Ser Val Thr Ile Lys Asn Asp Asn Leu Phe Glu Asp Leu Ser
                645                 650                 655
Ala Tyr Thr Phe Leu Ala Arg Val Tyr Glu Asp Gly Arg Lys Val Ser
                660                 665                 670
Glu Ser Glu Tyr His Phe Asp Val Lys Pro Gly Glu Glu Ala Thr Phe
                675                 680                 685
Pro Val Asn Phe Val Val Glu Ala Ser Asn Ser Glu Gln Ile Tyr Glu
                690                 695                 700
Val Ala Cys Val Leu Arg Glu Ala Thr Glu Trp Ala Pro Lys Gly His
705                 710                 715                 720
Glu Ile Val Arg Gly Gln Tyr Val Val Glu Lys Ile Ser Thr Glu Thr
                725                 730                 735
Pro Val Lys Ala Pro Leu Asn Val Val Glu Gly Asp Phe Asn Ile Gly
                740                 745                 750
Ile Gln Gly Gln Asn Phe Ser Ile Leu Leu Ser Arg Ala Gln Asn Thr
                755                 760                 765
Leu Val Ser Ala Lys Tyr Asn Gly Val Glu Phe Ile Glu Lys Gly Pro
                770                 775                 780
Lys Leu Ser Phe Thr Arg Ala Tyr Thr Asp Asn Asp Arg Gly Ala Gly
785                 790                 795                 800
Tyr Pro Phe Glu Met Ala Gly Trp Lys Val Ala Gly Asn Tyr Ser Lys
                805                 810                 815
```

```
Val Thr Asp Thr Gln Ile Gln Ile Glu Asp Asp Ser Val Lys Val Thr
            820                 825                 830

Tyr Val His Glu Leu Pro Gly Leu Ser Asp Val Glu Val Lys Val Thr
            835                 840                 845

Tyr Gln Val Asp Tyr Lys Gly Arg Ile Phe Val Thr Ala Asn Tyr Asp
            850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
            885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
            915                 920                 925

Gly Asn His Tyr Gly Thr Arg Glu Phe Thr Val Ser Asp Asp Asn His
            930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
            965                 970                 975

Leu Gln Glu Ser Asp Ala Thr Trp Ile Lys Val Leu Ala Ala Gln Met
            980                 985                 990

Gly Val Gly Gly Asp Asp Thr Trp Gly Ala Pro Val His Asp Glu Phe
            995                1000                1005

Leu Leu Ser Ser Ala Asp Ser Tyr Gln Leu Ser Phe Met Ile Glu Pro
           1010                1015                1020

Leu Asn
1025

<210> SEQ ID NO 37
<211> LENGTH: 1026
<212> TYPE: PRT
<213> ORGANISM: Streptococcus thermophilus
<223> OTHER INFORMATION: CHCC11976
<220> FEATURE:
<223> OTHER INFORMATION: CHCC11976

<400> SEQUENCE: 37

Met Asn Met Thr Glu Lys Ile Gln Thr Tyr Leu Asn Asp Pro Lys Ile
1               5                  10                  15

Val Ser Val Asn Thr Val Asp Ala His Ser Asp His Lys Tyr Phe Glu
            20                  25                  30

Ser Leu Glu Glu Phe Ser Glu Gly Glu Met Lys Leu Arg Gln Ser Leu
        35                  40                  45

Asn Gly Lys Trp Lys Ile His Tyr Ala Gln Asn Thr Asn Gln Val Leu
    50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Val Phe Ile Ser Phe Gln
    130                 135                 140
```

```
Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Ile Ser Asp Tyr
            165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
            195                 200                 205

Phe Arg Asp Val Tyr Leu Tyr Ala Ile Pro Lys Val His Val Gln Asp
210                 215                 220

Leu Phe Val Lys Gly Asp Tyr Asp Tyr Gln Thr Lys Ala Gly Gln Leu
225                 230                 235                 240

Asp Ile Asp Leu Lys Thr Val Gly Asp Tyr Glu Asp Lys Lys Ile Lys
            245                 250                 255

Tyr Val Leu Ser Asp Tyr Glu Gly Ile Val Thr Glu Gly Asp Ala Ser
            260                 265                 270

Val Asn Gly Asp Gly Glu Leu Ser Val Ser Leu Glu Asn Leu Lys Ile
            275                 280                 285

Lys Pro Trp Ser Ala Glu Ser Pro Lys Leu Tyr Asp Leu Ile Leu His
            290                 295                 300

Val Leu Asp Asp Gln Val Glu Val Val Pro Val Lys Val Gly
305                 310                 315                 320

Phe Arg Arg Phe Glu Ile Lys Asp Lys Leu Met Leu Leu Asn Gly Lys
                325                 330                 335

Arg Ile Val Phe Lys Gly Val Asn Arg His Glu Phe Asn Ala Arg Thr
            340                 345                 350

Gly Arg Cys Ile Thr Glu Glu Asp Met Leu Trp Asp Ile Lys Val Met
            355                 360                 365

Lys Gln His Asn Ile Asn Ala Val Arg Thr Ser His Tyr Pro Asn Gln
            370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
                405                 410                 415

Glu Pro Ser Trp Asn Ile Pro Ala Ser Glu Pro Glu Trp Leu Pro Ala
                420                 425                 430

Cys Leu Asp Arg Ala Asn Asn Met Phe Gln Arg Asp Lys Asn His Ala
            435                 440                 445

Ser Val Ile Ile Trp Ser Cys Gly Asn Glu Ser Tyr Ala Gly Lys Asp
            450                 455                 460

Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Asp Tyr Ile Thr
            485                 490                 495

Asp Ile Glu Ser Arg Met Tyr Ala Lys Pro Ala Asp Ile Glu Glu Tyr
            500                 505                 510

Leu Thr Thr Gly Lys Leu Val Asp Leu Ser Ser Val Ser Asp Lys His
            515                 520                 525

Phe Ala Ser Gly Asn Leu Thr Asn Lys Pro Gln Lys Pro Tyr Ile Ser
            530                 535                 540

Cys Glu Tyr Met His Thr Met Gly Asn Ser Gly Gly Gly Leu Gln Leu
545                 550                 555                 560
```

```
Tyr Thr Asp Leu Glu Lys Tyr Pro Glu Tyr Gln Gly Gly Phe Ile Trp
            565                 570                 575

Asp Phe Ile Asp Gln Ala Ile Tyr Lys Thr Leu Pro Asn Gly Ser Glu
        580                 585                 590

Phe Leu Ser Tyr Gly Gly Asp Trp His Asp Arg Pro Ser Asp Tyr Glu
            595                 600                 605

Phe Cys Gly Asn Gly Ile Val Phe Ala Asp Arg Thr Leu Thr Pro Lys
        610                 615                 620

Leu Gln Thr Val Lys His Leu Tyr Ser Asn Lys Ile Ala Val Asp
625                 630                 635                 640

Glu Lys Ser Val Thr Ile Lys Asn Asp Asn Leu Phe Glu Asp Leu Ser
                645                 650                 655

Ala Tyr Thr Phe Leu Ala Arg Val Tyr Glu Asp Gly Arg Lys Val Ser
            660                 665                 670

Glu Ser Glu Tyr His Phe Asp Val Lys Pro Gly Glu Ala Thr Phe
        675                 680                 685

Pro Val Asn Phe Val Val Glu Ala Ser Asn Ser Glu Gln Ile Tyr Glu
        690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
                725                 730                 735

Pro Val Lys Ala Pro Leu Asn Val Val Glu Gly Asp Phe Asn Ile Gly
                740                 745                 750

Ile Gln Gly Gln Asn Phe Ser Ile Leu Leu Ser Arg Ala Gln Asn Thr
        755                 760                 765

Leu Val Ser Ala Lys Tyr Asn Gly Val Glu Phe Ile Glu Lys Gly Pro
770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
            805                 810                 815

Val Thr Asp Thr Gln Ile Gln Ile Glu Asp Asp Ser Val Lys Val Thr
                820                 825                 830

Tyr Val His Glu Leu Pro Gly Leu Ser Asp Val Glu Val Lys Val Thr
            835                 840                 845

Tyr Gln Val Asp Tyr Lys Gly Arg Ile Phe Val Thr Ala Asn Tyr Asp
        850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
            885                 890                 895

Glu Ser Tyr Arg Asp Lys Leu Pro Gly Ala Tyr Leu Gly Arg Tyr Glu
                900                 905                 910

Thr Ser Val Glu Lys Thr Phe Ala Pro Tyr Leu Met Pro Gln Glu Ser
            915                 920                 925

Gly Asn His Tyr Gly Thr Arg Glu Phe Thr Val Ser Asp Asp Asn His
        930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
                965                 970                 975

Leu Gln Glu Ser Asp Ala Thr Trp Ile Lys Val Leu Ala Ala Gln Met
```

```
                980             985              990
Gly Val Gly Gly Asp Asp Thr Trp Gly Ala Pro Val His Asp Glu Phe
            995              1000             1005

Leu Leu Ser Ser Ala Asp Ser Tyr Gln Leu Ser Phe Met Ile Glu Pro
    1010             1015             1020

Leu Asn
1025

<210> SEQ ID NO 38
<211> LENGTH: 1026
<212> TYPE: PRT
<213> ORGANISM: Streptococcus thermophilus
<223> OTHER INFORMATION: CHCC16731
<220> FEATURE:
<223> OTHER INFORMATION: CHCC16731

<400> SEQUENCE: 38

Met Asn Met Thr Glu Lys Ile Gln Thr Tyr Leu Asn Asp Pro Lys Ile
1               5                   10                  15

Val Ser Val Asn Thr Val Asp Ala His Ser Asp His Lys Tyr Phe Glu
            20                  25                  30

Ser Leu Glu Glu Phe Ser Glu Gly Glu Met Lys Leu Arg Gln Ser Leu
        35                  40                  45

Asn Gly Lys Trp Lys Ile His Tyr Ala Gln Asn Thr Asn Gln Val Leu
50                  55                  60

Lys Asp Phe Tyr Lys Thr Glu Phe Asp Glu Thr Asp Leu Asn Phe Ile
65                  70                  75                  80

Asn Val Pro Gly His Leu Glu Leu Gln Gly Phe Gly Ser Pro Gln Tyr
                85                  90                  95

Val Asn Thr Gln Tyr Pro Trp Asp Gly Lys Glu Phe Leu Arg Pro Pro
            100                 105                 110

Gln Val Pro Gln Glu Ser Asn Ala Val Ala Ser Tyr Val Lys His Phe
        115                 120                 125

Thr Leu Asn Asp Ala Leu Lys Asp Lys Val Phe Ile Ser Phe Gln
130                 135                 140

Gly Val Ala Thr Ser Ile Phe Val Trp Val Asn Gly Asn Phe Val Gly
145                 150                 155                 160

Tyr Ser Glu Asp Ser Phe Thr Pro Ser Glu Phe Glu Ile Ser Asp Tyr
                165                 170                 175

Leu Val Glu Gly Asp Asn Lys Leu Ala Val Ala Val Tyr Arg Tyr Ser
            180                 185                 190

Thr Ala Ser Trp Leu Glu Asp Gln Asp Phe Trp Arg Leu Tyr Gly Ile
        195                 200                 205

Phe Arg Asp Val Tyr Leu Tyr Ala Ile Pro Lys Val His Val Gln Asp
210                 215                 220

Leu Phe Val Lys Gly Asp Tyr Asp Tyr Gln Thr Lys Ala Gly Gln Leu
225                 230                 235                 240

Asp Ile Asp Leu Lys Thr Val Gly Asp Tyr Glu Asp Lys Lys Ile Lys
                245                 250                 255

Tyr Val Leu Ser Asp Tyr Glu Gly Ile Val Thr Glu Gly Asp Ala Ser
            260                 265                 270

Val Asn Gly Asp Gly Glu Leu Ser Val Ser Leu Glu Asn Leu Lys Ile
        275                 280                 285

Lys Pro Trp Ser Ala Glu Ser Pro Lys Leu Tyr Asp Leu Ile Leu His
    290                 295                 300
```

```
Val Leu Asp Asp Asp Gln Val Val Glu Val Val Pro Val Lys Val Gly
305                 310                 315                 320

Phe Arg Arg Phe Glu Ile Lys Asp Lys Leu Met Leu Leu Asn Gly Lys
                325                 330                 335

Arg Ile Val Phe Lys Gly Val Asn Arg His Glu Phe Asn Ala Arg Thr
            340                 345                 350

Gly Arg Cys Ile Thr Glu Glu Asp Met Leu Trp Asp Ile Lys Val Met
        355                 360                 365

Lys Gln His Asn Ile Asn Ala Val Arg Thr Ser His Tyr Pro Asn Gln
    370                 375                 380

Thr Arg Trp Tyr Glu Leu Cys Asp Glu Tyr Gly Leu Tyr Val Ile Asp
385                 390                 395                 400

Glu Ala Asn Leu Glu Thr His Gly Thr Trp Gln Lys Leu Gly Leu Cys
                405                 410                 415

Glu Pro Ser Trp Asn Ile Pro Ala Ser Glu Pro Glu Trp Leu Pro Ala
            420                 425                 430

Cys Leu Asp Arg Ala Asn Asn Met Phe Gln Arg Asp Lys Asn His Ala
        435                 440                 445

Ser Val Ile Ile Trp Ser Cys Gly Asn Glu Ser Tyr Ala Gly Lys Asp
    450                 455                 460

Ile Ala Asp Met Ala Asp Tyr Phe Arg Ser Val Asp Asn Thr Arg Pro
465                 470                 475                 480

Val His Tyr Glu Gly Val Ala Trp Cys Arg Glu Phe Asp Tyr Ile Thr
                485                 490                 495

Asp Ile Glu Ser Arg Met Tyr Ala Lys Pro Ala Asp Ile Glu Glu Tyr
            500                 505                 510

Leu Thr Thr Gly Lys Leu Val Asp Leu Ser Ser Val Ser Asp Lys His
        515                 520                 525

Phe Ala Ser Gly Asn Leu Thr Asn Lys Pro Gln Lys Pro Tyr Ile Ser
    530                 535                 540

Cys Glu Tyr Met His Thr Met Gly Asn Ser Gly Gly Gly Leu Gln Leu
545                 550                 555                 560

Tyr Thr Asp Leu Glu Lys Tyr Pro Glu Tyr Gln Gly Gly Phe Ile Trp
                565                 570                 575

Asp Phe Ile Asp Gln Ala Ile Tyr Lys Thr Leu Pro Asn Gly Ser Glu
            580                 585                 590

Phe Leu Ser Tyr Gly Gly Asp Trp His Asp Arg Pro Ser Asp Tyr Glu
        595                 600                 605

Phe Cys Gly Asn Gly Ile Val Phe Ala Asp Arg Thr Leu Thr Pro Lys
    610                 615                 620

Leu Gln Thr Val Lys His Leu Tyr Ser Asn Ile Lys Ile Ala Val Asp
625                 630                 635                 640

Glu Lys Ser Val Thr Ile Lys Asn Asp Asn Leu Phe Glu Asp Leu Ser
                645                 650                 655

Ala Tyr Thr Phe Leu Ala Arg Val Tyr Glu Asp Gly Arg Lys Val Ser
            660                 665                 670

Glu Ser Glu Tyr His Phe Asp Val Lys Pro Gly Glu Glu Ala Thr Phe
        675                 680                 685

Pro Val Asn Phe Val Val Glu Ala Ser Asn Ser Glu Gln Ile Tyr Glu
    690                 695                 700

Val Ala Cys Val Leu Arg Glu Ala Thr Glu Trp Ala Pro Lys Gly His
705                 710                 715                 720

Glu Ile Val Arg Gly Gln Tyr Val Val Glu Lys Ile Ser Thr Glu Thr
```

-continued

```
                  725                 730                 735
Pro Val Lys Ala Pro Leu Asn Val Val Glu Gly Asp Phe Asn Ile Gly
            740                 745                 750

Ile Gln Gly Gln Asn Phe Ser Ile Leu Leu Ser Arg Ala Gln Asn Thr
            755                 760                 765

Leu Val Ser Ala Lys Tyr Asn Gly Val Glu Phe Ile Glu Lys Gly Pro
    770                 775                 780

Lys Leu Ser Phe Thr Arg Ala Tyr Thr Asp Asn Asp Arg Gly Ala Gly
785                 790                 795                 800

Tyr Pro Phe Glu Met Ala Gly Trp Lys Val Ala Gly Asn Tyr Ser Lys
            805                 810                 815

Val Thr Asp Thr Gln Ile Gln Ile Glu Asp Asp Ser Val Lys Val Thr
            820                 825                 830

Tyr Val His Glu Leu Pro Gly Leu Ser Asp Val Glu Val Lys Val Thr
            835                 840                 845

Tyr Gln Val Asp Tyr Lys Gly Arg Ile Phe Val Thr Ala Asn Tyr Asp
    850                 855                 860

Gly Lys Ala Gly Leu Pro Asn Phe Pro Glu Phe Gly Leu Glu Phe Ala
865                 870                 875                 880

Ile Gly Ser Gln Phe Thr Asn Leu Ser Tyr Tyr Gly Tyr Gly Ala Glu
            885                 890                 895

Glu Ser Tyr Arg Asp Lys Leu Pro Gly Ala Tyr Leu Gly Arg Tyr Glu
            900                 905                 910

Thr Ser Val Glu Lys Thr Phe Ala Pro Tyr Leu Met Pro Gln Glu Ser
            915                 920                 925

Gly Asn His Tyr Gly Thr Arg Glu Phe Thr Val Ser Asp Asp Asn His
    930                 935                 940

Asn Gly Leu Lys Phe Thr Ala Leu Asn Lys Ala Phe Glu Phe Ser Ala
945                 950                 955                 960

Leu Arg Asn Ser Thr Glu Gln Ile Glu Asn Ala Arg His Gln Tyr Glu
            965                 970                 975

Leu Gln Glu Ser Asp Ala Thr Trp Ile Lys Val Leu Ala Ala Gln Met
            980                 985                 990

Gly Val Gly Gly Asp Asp Thr Trp Gly Ala Pro Val His Asp Glu Phe
            995                 1000                1005

Leu Leu Ser Ser Ala Asp Ser Tyr Gln Leu Ser Phe Met Ile Glu Pro
    1010                1015                1020

Leu Asn
1025
```

PRODUCTION OF LACTASE ENZYMES USING ALTERED REGULATION STRAINS

CROSS-REFERENCE TO RELATED APPLICATIONS

The present application is the U.S. national stage of PCT/EP2020/073985, filed Aug. 27, 2020, which claims priority to European application EP 19194678.9, filed Aug. 30, 2019.

FIELD OF THE INVENTION

The present invention relates to new improved methods for expressing native lactases in their native hosts. Methods for homologous as well as heterologous expression of lactase in lactic acid bacteria with altered expression dynamics are described herein.

BACKGROUND OF THE INVENTION

In order to grow on milk, lactose hydrolysis is a good way for lactic acid bacteria to obtain glucose and galactose as carbon source. Lactase (beta-galactosidase; EC 3.2.1.23) is the enzyme that performs the hydrolysis step of the milk sugar lactose into monosaccharides. The commercial use of lactase is to break down lactose in dairy products. Lactose intolerant people have difficulties to digest dairy products with high lactose levels. It is estimated that about 70% of the world's population has a limited ability to digest lactose. Accordingly, there is a growing demand for dairy food products that contain no or only low levels of lactose.

Lactases have been isolated from a large variety of organisms, including microorganisms like *Kluyveromyces* and *Bacillus*. *Kluyveromyces*, especially *Kluyveromyces* (*K.*) *fragilis* and *K. lactis*, and other fungi such as those of the genera *Candida, Torula* and *Torulopsis*, are a common source of fungal lactases, whereas *Bacillus* (*B.*) *coagulans* and *B. circulans* are well known sources for bacterial lactases. Several commercial lactase preparations derived from these organisms are available such as Lactozym® (available from Novozymes, Denmark), HA-Lactase (available from Chr. Hansen, Denmark) and Maxilact® (available from DSM, the Netherlands), all from *K. lactis*. All these lactases are so-called neutral lactases having a pH optimum between pH 6 and pH 8, as well as a temperature optimum around 37° C. When such lactases are used in the production of, e.g. low-lactose yoghurt, the enzyme treatment will either be done in a separate step before fermentation or rather high enzyme dosages have to be used because their activity will drop as the pH decreases during fermentation. Also, these lactases are not suitable for hydrolysis of lactose in milk performed at high temperature, which would in some cases be beneficial in order to keep the microbial count low and thus ensure high milk quality. Furthermore, the known lactases would not be suitable for use in a desired process to produce ultra-heat treated (UHT) milk, wherein enzymes were added prior to the UHT treatment.

WO2010092057 and WO0104276 relates to cold-active beta-galactosidases. WO07110619 relates to beta-galactosidase with high transgalactosylating activity, whereas WO2009071539 relates to beta-galactosidase with lower transgalactosylating activity.

It has further been reported by Sørensen et al. (at Chr-Hansen, US2015/0086675 A1) that some strains of *Lactobacillus* (*L.*) *delbrueckii* subspecies *bulgaricus* (Lb) and *Streptococcus* (*S.*) *thermophilus* (ST) grow on the lactose and excrete the glucose part in the medium. The excreted glucose naturally sweetens the final products. To use lactose as carbon source, these strains produce lactase enzymes which hydrolyze the lactose into glucose and galactose.

Homologs expression of wild type enzymes in their native host is seldomly seen due to the relatively low titers produced.

SUMMARY OF THE INVENTION

The present invention relates to a method for producing an enzyme having lactase activity in a lactic acid bacterium, preferably in the presence of lactose and/or preferably wherein the lactic acid bacterium may be selected from a *Streptococcus* and/or *Lactobacillus* strains. More preferably the lactic acid bacterium may be selected from a *Streptococcus thermophilus* and/or *Lactobacillus delbrueckii* subspecies *bulgaricus*, as herein disclosed. Furthermore, this invention also relates to the use of lactic acid bacterium, such as *Streptococcus* and/or *Lactobacillus*, preferably *Streptococcus thermophilus* and/or *Lactobacillus delbrueckii* subspecies *bulgaricus*, as herein disclosed.

The bacterial strains herein disclosed, for example the *Streptococcus thermophilus* strains are galactose-fermenting further carrying a mutation in the DNA sequence of the glcK gene encoding a glucokinase protein, wherein the mutation inactivates the glucokinase protein or has a negative effect on expression of the gene. The mutation in the glucokinase gene leads to a mutant which, for example, is able to express the glucokinase protein, however said protein is inactivated or non-functional when comparing with the parent strain, resulting in the absence of (detectable) glucokinase activity in said mutant. Alternatively, the mutation may also lead to a negative effect on expression of the gene, meaning that some glucokinase activity is detectable, however the phenotypic profile of the strain resembles the phenotypic profile of a strain having the protein is inactivated.

Furthermore, the *Streptococcus thermophilus* strains may further comprise a mutation in a glucose transporter gene (manM). This mutation results in the inactivation of a glucose transporter protein responsible for transport of glucose into the cell. The mutation in the manM gene leads to a mutant which is, for example, able to express the glucose transporter protein, however said protein is inactivated or non-functional when comparing with the parent strain, resulting in the absence of (detectable) glucose transporter activity in said mutant. Surprisingly, these *Streptococcus thermophilus* strains alone are still fully capable of acidifying milk although acidification time to pH 5 is delayed by 2-5 hours. They are therefore as such useful in fermented milk applications.

The bacterial strains of a *Lactobacillus delbrueckii* subspecies *bulgaricus* herein disclosed have either lost the ability to grow on glucose as carbon source or exhibit an impaired ability to grow under such conditions, in comparison with their parental strain(s). The mutant strains of *Lactobacillus delbrueckii* subsp. *bulgaricus* not only do not consume glucose secreted into the milk by other microorganisms that might be present, they also excrete high amounts of glucose into the surrounding medium and are, surprisingly, still fully capable of acidifying milk although acidification time to pH 5 is delayed by 2-5 hours. They are therefore as such useful in fermented milk applications.

The inventors have discovered that altered regulation strains of *S. thermophilus* such as e.g. DSM 28889, DSM 25850, DSM 25851, DSM 26722, DSM 32227 and Lb *delbrueckii* subspecies *bulgaricus* such as e.g. DSM 26420, DSM 26421 produce 3-10 folds more lactase than is produced in their mother strains, when measured as mg produced enzyme in lab scale fermenters, thereby showing that these strains can be used for producing enzymes having lactase activity.

Therefore, the present invention provides altered regulation strains allowing homologous production of lactases in their mother hosts. The present invention allows the use of said strains as cell factories for homologous lactase production, with perspectives for use in industrial scale. The produced enzymes will be labeled as non-genetic modified (Non-GM) enzymes. Furthermore, these strains may also be used, simultaneously, to obtain low-lactose or free-lactose dairy products such as low-lactose milk, low-lactose yoghurt, low-lactose cheese, low-lactose fermented milk products, free-lactose milk, free-lactose yoghurt, free-lactose cheese and/or free-lactose fermented milk product.

DETAILED DISCLOSURE OF THE INVENTION

The strains herein disclosed have mutations in their glucokinase gene and cannot metabolize glucose, for example the *Streptococcus thermophilus* herein disclosed have mutations in their glucokinase gene thereby digesting lactose and galactose and excreting glucose to the environment when grown on a milk substrate. Additionally, these strains have mutation in the glucose transporter PTS gene, thus they cannot import glucose via this mechanism. The cells excrete the produced glucose into the medium and use the remaining galactose for growth. As galactose is less preferred than glucose by the microorganism, these cells respond to the lower glycolytic flux resulting from utilizing only galactose, by overexpressing the lac operon genes (i.e., lacS and lacZ), which is experimentally demonstrated herein.

Based on the examples as disclosed herein, the inventors of the present invention found that altered regulation strains can be used as production hosts for novel lactases in industrial scale could and serve as expression hosts for both heterologous and homologous expression of in particular lactases.

To confirm the idea and use of the strains herein disclosed, i.e. lactic acid bacteria with altered regulation and expression of lactases for an industrial scale expression of lactases, the inventors conducted a range of experiments as explained in detail below.

In a related embodiment the invention relates to new methods for producing lactases by expressing said enzymes in their native host. It is a further object of the invention to enable bacterial strains to confer a commercially and technically feasible production of lactases to be used in e.g. dairy products for the lowering of lactose in a product, such as lactose-free or low-lactose products.

To analyze the lactase production potential with these strains, controlled fermentation experiments with these strains and their wild type mother strains were conducted.

It was observed that these strains grow more slowly (data not shown), have a lower final optical density OD600 (Table 4) and produce less exopolysaccharides (EPS) or capsular polysaccharides (CPS) compared to their mother strains (data not shown here). After fermentation, the cells were harvested using high speed centrifugation. The samples were taken at Basemax (end of exponential growth phase) and end-of-base (EOB) end of growth. A portion of cells pellet was lysed using sonication and the cell debris was removed by centrifugation. The clear supernatant was used for the activity analysis and protein concentration measurement (Table 5).

The mutant of *Streptococcus thermophilus* showed about 3-10 folds higher lactase activity compared its mother strain. Similarly, the mutant of Lb *delbrueckii* showed highest lactase activity among the tested samples, 7700 U/L of fermentation medium (Table 5). Previously measured values of specific activity for the Lb *delbrueckii* subspecies *bulgaricus* and *S. thermophilus* lactases were used to calculate the amount of enzyme produced per liter of the fermentation medium. The mutants and wild type strains produce approximately 32 mg/L and 3-11 mg/L of lactase enzyme, respectively. The measured higher activities of the mutant strains were directly related to their higher expression of lactase enzymes.

Hence, the current results show that the strains herein disclosed produce high amount of lactase enzymes and can be explored as hosts for homologous (Non-GM) industrial production of lactases.

For heterologous expression of lactases, a wide range of lactases could be expressed by the technology disclosed herein. However, present inventors have found that certain peptides and dimeric peptides exhibiting beta-galactosidase enzyme activity are surprisingly stable at many different physical conditions giving a relatively high activity outside of the ranges normally seen to be optimal for this class of enzymes (Table 1). These enzymes may be particularly applicable in the context of present invention.

Accordingly, the present inventors identified enzymes that have a relatively high activity around 4° C. or 5° C. and may thus be used for lactose hydrolysis in the production of e.g. fresh milk. Moreover, the enzymes have also a relatively high activity in the range of 10° C.-25° C. and the exact same enzymes may thus be used for lactose hydrolysis in UHT milk. This feasibility of the enzymes even at broad ranges of temperatures is highly relevant since milk may be stored at room/ambient temperature which may be different in different parts of the world, also depending on the seasons. For the UHT treatment, the temperature is typically either around 135° C. or around 140° C. It is highly wanted that the enzymes may have activity in the range of a temperature up to 140° C. so that the enzyme may be added to raw milk before the UHT step. In the current practices the enzyme is added after the UHT step because the enzymes known in the art has a significant decrease in functional activity, such as to a value below measurable activity following the high heat treatment step. Also, the milk is stored at room temperature which may vary significantly in different parts of the world.

Further, these peptides exhibiting beta-galactosidase enzyme activity have been found to have activity in the temperature range normally used for pasteurization. Accordingly, these enzymes may be added to raw milk prior to pasteurization. It is to be understood that the enzymes known in the art have a significant decrease in functional activity, such as to a value below measurable activity following a pasteurization step. A further advantage of these peptides exhibiting beta-galactosidase enzyme activity is that they have a relatively low degree of galactose inhibition. The lower galactose inhibition of these novel enzymes is highly relevant for applications wherein very low lactose concentrations are desired. In terms of applicability for fermented products it is highly advantageous that the enzymes as described herein have a high beta-galactosidase enzymatic activity at a relatively broad temperature range of between 4° C.-43° C., such as around 37° C., where fermentation would normally be optimal, but also that this activity of the beta-galactosidase enzyme is present at low pH, such as down to 4.5, or down to 4.0, or down to 3.5, or even down to pH 3.

The beta-galactosidase activity may be determined by measuring the amount of released glucose after incubation with lactose at set conditions. Released glucose can be detected by a coloring reaction.

Definitions

The term "milk" or "milk-based substrate", as used herein and in the context of the present invention, is to be understood as the lacteal secretion obtained by milking any mammal, such as cow, sheep, goats, buffalo or camel. The terms in the context of the present invention, may be any raw and/or processed milk material. Useful milk-based substrates include, but are not limited to solutions/suspensions of any milk or milk like products comprising lactose, such as whole or low fat milk, skim milk, buttermilk, low-lactose milk, reconstituted milk powder, condensed milk, solutions of dried milk, UHT milk, whey, whey permeate, acid whey, cream, fermented milk products, such as yoghurt, cheese, dietary supplement and probiotic dietary products. Typically, the terms refer to a raw or processed milk material that is processed further in order to produce a dairy product.

The term "composition containing lactose" as used herein refers to any composition, such as any liquid that contain lactose in significant measurable degree, such as a lactose content higher than 0.002% (0.002 g/100 ml). Encompassed within this term are milk and milk-based substrates.

The term "mother strain" or "parent strain" or "parental strain" are synonyms, herein interchangeable and used to refer to the strain from which a mutant originates from.

The term "dairy product" as used herein may be any food product wherein one of the major constituents is milk-based. Usually the major constituent is milk-based and in some embodiments, the major constituent is a milk-based substrate which has been treated with an enzyme having beta-galactosidase activity according to a method of the present invention. A dairy product according to the invention may be, e.g., skim milk, low fat milk, whole milk, cream, UHT milk, milk having an extended shelf life, a fermented milk product, cheese, yoghurt, butter, dairy spread, butter milk, acidified milk drink, sour cream, whey based drink, ice cream, condensed milk, dulce de leche or a flavored milk drink. A dairy product may additionally comprise non-milk components, e.g. vegetable components such as, e.g., vegetable oil, vegetable protein, and/or vegetable carbohydrates. Dairy products may also comprise further additives such as, e.g., enzymes, flavoring agents, microbial cultures such as probiotic cultures, salts, sweeteners, sugars, acids, fruit, fruit prep, fruit juices, or any other component known in the art as a component of, or additive to, a dairy product.

The terms "fermented dairy product" or "fermented milk product" as used herein is to be understood as any dairy product wherein any type of fermentation forms part of the production process. Examples of fermented dairy products are products like yoghurt, buttermilk, creme fraiche, quark and fromage frais. A fermented dairy product may be produced by or include steps of any method known in the art.

The term "fermentation" as used herein refers to the conversion of carbohydrates into alcohols or acids through the action of a microorganism. In some embodiments fermentation according to the present invention comprises the conversion of lactose to lactic acid. In the context of the present invention, "microorganism" may include any bacterium or fungus being able to ferment the milk substrate.

The term "peptide exhibiting beta-galactosidase enzyme activity" or "enzyme having lactase activity" as used herein refers to any peptide or enzyme, which has enzymatic activity to catalyze the hydrolysis of the disaccharide lactose into its component monosaccharides glucose and galactose. This peptide or enzyme may also be referred to as a lactase or simply a beta-galactosidase (EC: 3.2.1.23).

The terms "peptide" and "oligopeptide" as used in the context of this present application are considered synonymous (as is commonly recognized) and each term can be used interchangeably as the context requires to indicate a chain of at least two amino acids coupled by peptidyl linkages. The word "polypeptide" is used herein for chains containing more than ten amino acid residues. All peptide and polypeptide formulas or sequences herein are written from left to right and in the direction from amino terminus to carboxy terminus. "Proteins" as used herein refers to peptide sequences as they are produced by some host organism and may include posttranslational modification, such as added glycans.

The terms "amino acid" or "amino acid sequence," as used herein, refer to an oligopeptide, peptide, polypeptide, or protein sequence, or a fragment of any of these, and to naturally occurring or synthetic molecules. In this context, "fragment" refers to fragments of a peptide exhibiting beta-galactosidase enzyme activity, which retain some enzymatic activity. Where "amino acid sequence" is recited herein to refer to an amino acid sequence of a naturally occurring protein molecule, "amino acid sequence" and like terms are not meant to limit the amino acid sequence to the complete native amino acid sequence associated with the recited peptide molecule. Exemplary peptides of the invention also include fragments of at least about 50,100,150, 200, 250, 300, 350, 400, 450, 500, 550, 600, 650, 700, 750, 800 or more residues in length, or over the full length of an enzyme. Accordingly, a "peptide fragment" or "enzymatically active fragment" of the invention are fragments that retain at least some functional enzymatic activity. Typically, a peptide fragment of the invention will still contain the functional catalytic domain or other essential active sites of the peptide exhibiting beta-galactosidase enzyme activity. Other domains may be deleted.

Typically, the specific beta-galactosidase enzyme activity will be measured and indicated as μmole of glucose formed per minute per mg of enzyme used. This specific value however will vary depending on conditions applied, such as temperature, and pH.

Unless otherwise stated the term "Sequence identity" for amino acids as used herein refers to the sequence identity calculated as $(n_{ref}-n_{dif}) \cdot 100/n_{ref}$, wherein $n_{dif}$ is the total number of non-identical residues in the two sequences when aligned and wherein $n_{ref}$ is the number of residues in one of the sequences.

In some embodiments the sequence identity is determined by conventional methods, e.g., Smith and Waterman, 1981, Adv. Appl. Math. 2:482, by the search for similarity method of Pearson & Lipman, 1988, Proc. Natl. Acad. Sci. USA 85:2444, using the CLUSTAL W algorithm of Thompson et al., 1994, Nucleic Acids Res 22:467380, by computerized implementations of these algorithms (GAP, BESTFIT, FASTA, and TFASTA in the Wisconsin Genetics Software Package, Genetics Computer Group). The BLAST algorithm (Altschul et al., 1990, Mol. Biol. 215:403-10) for which software may be obtained through the National Center for Biotechnology Information www.ncbi.nlm.nih.gov/) may also be used. When using any of the aforementioned algorithms, the default parameters for "Window" length, gap penalty, etc., are used.

PREFERRED EMBODIMENTS OF THE INVENTION

This invention relates to a method for producing an enzyme having lactase activity, wherein said enzyme is produced in a lactic acid bacterium, preferably wherein said bacterium carries a mutation in the DNA sequence of the glcK gene encoding a glucokinase protein, wherein the mutation inactivates the glucokinase protein, the method comprising the following steps:
  a) inoculating the lactic acid bacterium in a suitable growth medium, preferably in a suitable growth medium comprising lactose;
  b) growing the lactic acid bacterium of step a) to a desired density to obtain a first solution comprising the enzyme having lactase activity and bacterial cells from the lactic acid bacterium;
  c) inactivating and/or disrupting the bacterial cells of the lactic acid bacterium to obtain a second solution;
  d) optionally processing the second solution to obtain a third solution.

This invention also concerns a method for producing an enzyme having lactase activity, the method comprising the following steps:
  a) inoculating a lactic acid bacterium, preferably wherein said bacterium carries a mutation in the DNA sequence of the glcK gene encoding a glucokinase protein, wherein the mutation inactivates the glucokinase protein, in a suitable growth medium, preferably wherein the suitable growth medium comprises lactose;
  b) growing the lactic acid bacterium of step a) to a desired density to obtain a solution comprising the enzyme having lactase activity and bacterial cells of the lactic acid bacterium;
  c) purifying the enzyme having lactase activity from the solution;
  d) optionally formulating said enzyme in a suitable formulation.

This invention also relates to a method for producing an enzyme having lactase activity, the method comprising the following steps:
  a) introducing a DNA sequence encoding the enzyme having lactase activity into a lactic acid bacterium, preferably wherein said bacterium carries a mutation in the DNA sequence of the glcK gene encoding a glucokinase protein wherein the mutation inactivates the glucokinase protein;
  b) inoculating the lactic acid bacterium in a suitable growth medium, preferably wherein the suitable growth medium comprises actose;
  c) growing the lactic acid bacterium to a desired density to obtain a solution comprising the enzyme having lactase activity;
  d) purifying the enzyme having lactase activity from the solution;
  e) optionally formulating said enzyme in a suitable formulation.

A preferred aspect of the invention relates to a method for producing an enzyme having lactase activity in a galactose fermenting lactic acid bacterium that carries a mutation in the DNA sequence of the glcK gene encoding a glucokinase protein, wherein the mutation inactivates the glucokinase protein or has a negative effect on expression of the gene, the method comprising the following steps:
  a) inoculating the galactose fermenting lactic acid bacterium in a suitable growth medium
  b) growing the lactic acid bacterium of step a) to a desired density to obtain a solution comprising lactase and bacterial cells
  c) inactivating and/or disrupting the bacterial cells to obtain a second solution
  d) optionally processing the second solution to obtain a third solution.

In a related aspect, the invention relates to a method for producing an enzyme having lactase activity, the method comprising the following steps:
  a) inoculating a galactose fermenting lactic acid bacterium that carries a mutation in the DNA sequence of the glcK gene encoding a glucokinase protein, wherein the mutation inactivates the glucokinase protein or has a negative effect on expression of the gene in a suitable growth medium
  b) growing the lactic acid bacterium of step a) to a desired density to obtain a solution comprising lactase and bacterial cells
  c) purifying the enzyme having lactase activity from the solution
  d) optionally formulating said enzyme in a suitable formulation.

In yet a related aspect, the invention relates to a method for producing an enzyme having lactase activity, the method comprising the following steps:
  a) introducing the DNA-sequence encoding the enzyme having lactase activity into a galactose fermenting lactic acid bacterium that carries a mutation in the DNA sequence of the glcK gene encoding a glucokinase protein wherein the mutation inactivates the glucokinase protein or has a negative effect on expression of the glcK gene
  b) inoculating the galactose fermenting lactic acid bacterium in a suitable growth medium
  b) growing the galactose fermenting lactic acid bacterium to a desired density to obtain a solution comprising lactase
  c) purifying the enzyme having lactase activity from the solution
  d) optionally formulating said enzyme in a suitable formulation.

The DNA sequence introduced in the lactic acid bacterium, preferably in the galactose fermenting lactic acid bacterium, may be inserted under control of regulatory elements of the lac-operon, such as e.g. CcpA.

In a further aspect, the DNA sequence introduced in the lactic acid bacterium, preferably in the galactose fermenting lactic acid bacterium, encodes an amino acid sequence represented by SEQ ID NO: 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, or enzymatically active fragments thereof, or an amino acid sequence of any one thereof having not more than 1, 2, 3, 4, 5, 6, 7, 8, 9, 10, 11, 12, 13, 14, 15, 16, 17, 18, 19, 20, 21, or 22 amino acid substitutions, additions or deletions.

Further the DNA sequence introduced in the lactic acid bacterium, preferably in the galactose fermenting lactic acid bacterium, may encode an amino acid sequence encoding a dimeric peptide exhibiting beta-galactosidase enzyme activity, which dimeric peptide consist of two peptides having an amino acid sequence represented by SEQ ID NO: 2 and 3, 5 and 6, 20 and 21, 23 and 24, 26 and 27, or 28 and 29; or enzymatically active fragments thereof, or an amino acid sequence of any one thereof having not more than 1, 2, 3, 4, 5, 6, 7, 8, 9, 10, 11, 12, 13, 14, 15, 16, 17, 18, 19, 20, 21, or 22 amino acid substitutions, additions or deletions.

In a preferred aspect of the invention, the enzyme having lactase activity is expressed by the lactic acid bacterium encodes an amino acid sequence represented by SEQ ID NO: 34, 35, 36, 37 or 38 or an amino acid sequence of any one thereof having not more than 1, 2, 3, 4, 5, 6, 7, 8, 9, 10, 11, 12, 13, 14, 15, 16, 17, 18, 19, 20, 21, or 22 amino acid substitutions, additions or deletions, and preferably wherein said bacterium carries a mutation in the DNA sequence of the glcK gene.

In a preferred aspect of the invention, the bacterium is a *Lactobacillus delbrueckii* subspecies *bulgaricus* (Lb) optionally sharing the functional or genotypical characteristics of the *Lactobacillus delbrueckii* subspecies *bulgaricus* (Lb) deposited as DSM 26420 or DSM 26421.

In a preferred aspect of the invention, the lactic acid bacterium is a *Lactobacillus delbrueckii* subspecies *bulgaricus* (Lb), preferably is the *Lactobacillus delbrueckii* subspecies *bulgaricus* (Lb) is *Lactobacillus delbrueckii* subspecies *bulgaricus* (Lb) deposited as DSM 26420 or mutants thereof, or *Lactobacillus delbrueckii* subspecies *bulgaricus* (Lb) deposited as DSM 26421 or mutants thereof.

In yet a preferred aspect, the *Streptococcus thermophilus* (ST) of present invention share the functional or genotypical characteristics of the *Streptococcus thermophilus* (ST) deposited as DSM 28889, DSM 25850, DSM 25851, DSM 26722, or DSM 32227.

In a preferred embodiment, lactic acid bacterium is a galactose fermenting lactic acid bacterium, preferably wherein the galactose fermenting lactic acid bacterium is *Streptococcus thermophilus* (ST), more preferably wherein the *Streptococcus thermophilus* shares the functional characteristics of the *Streptococcus thermophilus* deposited as DSM 28889, DSM 25850, DSM 25851, DSM 26722 or DSM 32227, even more preferably wherein the lactic acid bacterium is *Streptococcus thermophilus* deposited as DSM 28889, *Streptococcus thermophilus* deposited as DSM 25850, *Streptococcus thermophilus* deposited as DSM 25851, *Streptococcus thermophilus* deposited as DSM 26722 or *Streptococcus thermophilus* deposited as DSM 32227.

A related aspect of present invention relates to an enzyme having lactase activity obtained by the method described herein and the use of said enzyme according for reducing the lactose content in a composition containing lactose, such as in a dairy products or milk, wherein the use comprise the step of adding said enzyme to a milk composition or dairy product at a pH ranging from 3-10 at a temperature ranging from 0° C.-140° C.

More specifically, the enzyme produced by any of the methods disclosed herein may be used at a pH within a range of 3-10, such as within a range of 3-9, such as within a range of 3-8, such as within a range of 3-7, such as within a range of 3-6, such as within a range of 3-5, such as within a range of 3-4, such as within a range of 4-10, such as within a range of 4-9, such as within a range of 4-8, such as within a range of 4-7, such as within a range of 4-6, such as within a range of 4-5, such as within a range of 5-10, such as within a range of 5-9, such as within a range of 5-8, such as within a range of 5-7, such as within a range of 5-6, such as within a range of 6-10, such as within a range of 6-9, such as within a range of 6-8, such as within a range of 6-7 and/or at a temperature not exceeding 45° C., such as not more than about 35° C., such as not more than about 18° C., such as not more than about 16° C., such as not more than about 14° C., such as not more than about 12° C., such as not more than about 10° C., such as not more than about 8° C., such as not more than about 7° C., such as not more than about 6° C., such as not more than about 5° C., such as not more than about 4° C., such as not more than about 3° C., such as not more than about 2° C.

As outlined herein, the dairy product may be a fermented milk product. Optionally the use of the enzyme as disclosed herein does not require the addition of further enzyme after fermentation.

As described above at part of the present invention relates to a method for producing a dairy product, the method comprising the steps of:
  a) providing a milk-based substrate comprising lactose;
  b) adding an peptide exhibiting beta-galactosidase activity, or enzyme having lactase activity, and having an amino acid sequence represented by SEQ ID NO:1-33 or a sequence with at least 80%, at least 90%, at least 95%, at least 96%, at least 97%, at least 98%, at least 99% or 100% sequence identity to any one of said sequences to said milk-based substrate comprising lactose; and
  c) treating said milk-based substrate with said peptide exhibiting beta-galactosidase activity, preferably wherein the peptide exhibiting beta-galactosidase activity or enzyme having lactase activity is produced by any of the strains selected from *Streptococcus thermophilus* deposited as DSM 28889, *Streptococcus thermophilus* deposited as DSM 25850, *Streptococcus thermophilus* deposited as DSM 25851, *Streptococcus thermophilus* deposited as DSM 26722, *Streptococcus thermophilus* DSM 32227, *Lactobacillus delbrueckii* subspecies *bulgaricus* deposited as DSM 26420, or *Lactobacillus delbrueckii* subspecies *bulgaricus* deposited as DSM 26421, or mutants thereof.

In some embodiments according to the present invention this peptide exhibiting beta-galactosidase activity, or enzyme having lactase activity, is derived from any one bacteria of the genus *Bifidobacterium*, such as *Bifidobacterium adolescentis*, *Bifidobacterium bifidum*, *Bifidobacterium breve*, *Bifidobacterium catenulatum*, *Bifidobacterium longum* or from the genus *Lactobacillus*, such as *L. sakei*, *L. amylovorus*, *L. delbrueckii* subsp. *bulgaricus*, *L. delbrueckii* subsp. *lactis*, *L. delbrueckii* subsp. *Indicus*, *L. crispatus*, *L. reuteri*, *L. helveticus* or from *Streptococcus thermophilus*.

In some embodiments according to the present invention step c) takes place at a pH within a range of 3-10, such as within a range of 3-9, such as within a range of 3-8, such as within a range of 3-7, such as within a range of 3-6, such as within a range of 3-5, such as within a range of 3-4, such as within a range of 4-10, such as within a range of 4-9, such as within a range of 4-8, such as within a range of 4-7, such as within a range of 4-6, such as within a range of 4-5, such as within a range of 5-10, such as within a range of 5-9, such as within a range of 5-8, such as within a range of 5-7, such as within a range of 5-6, such as within a range of 6-10, such as within a range of 6-9, such as within a range of 6-8, such as within a range of 6-7.

In some embodiments according to the present invention step c) or a part of step c) takes place at a temperature of not more than about 25° C., such as not more than about 20° C., such as not more than about 18° C., such as not more than about 16° C., such as not more than about 14° C., such as not more than about 12° C., such as not more than about 10° C., such as not more than about 8° C., such as not more than about 7° C., such as not more than about 6° C., such as not more than about 5° C., such as not more than about 4° C., such as not more than about 3° C., such as not more than about 2° C.

In some embodiments according to the present invention step c) or a part of step c) takes place at a temperature of at least about 25° C., such as at least about 30° C., such as at least about 35° C., such as at least about 40° C., such as at least about 45° C., such as at least about 50° C., such as at least about 55° C., such as at least about 60° C., such as at least about 65° C., such as at least about 70° C., such as at least about 75° C., such as at least about 80° C., such as at least about 85° C., such as at least about 90° C., such as at least about 95° C., such as at least about 100° C., such as at least about 110° C., such as at least about 120° C., such as at least about 130° C., such as at least about 120° C., such as at least about 130° C., such as at least about 135° C., such as at least about 140° C.

In some embodiments according to the present invention the dairy product is selected from the group consisting of lactose-free milk, low-lactose milk, yoghurt, cheese, fermented milk products, dietary supplement and probiotic dietary products.

In some embodiments according to the present invention the milk-based substrate is selected from fresh milk or raw milk obtained directly from a step of pasteurization, milk obtained directly after a step of ultra-heat treatment (UHT), or milk obtained directly after a step of fermentation.

In some embodiments according to the present invention the galactose inhibition of the peptide used is less than 60%, such as less than 55%, such as less than 50%, such as less than about 45%, such as less than about 40%.

In some embodiments according to the present invention the dairy product is fermented milk product and said step b) is performed during or prior to fermentation.

In some embodiments according to the present invention the method does not require the addition of further enzyme after fermentation.

In some embodiments according to the present invention the dairy product is fermented milk product and said step b) is performed immediately following fermentation.

In some embodiments according to the present invention the dairy product is fresh milk and said step b) is performed prior to, in conjunction with, or immediately following a step of pasteurization.

In some embodiments according to the present invention the dairy product is ultra-heat treatment (UHT) milk and said step b) is performed prior to, in conjunction with, or immediately following a step of ultra-heat treatment.

In some embodiments according to the present invention step c) is started at a temperature of between 40° C. and 100° C., such as at a temperature of between 50° C. and 100° C., such as at a temperature of between 60° C. and 100° C., such as at a temperature of between 70° C. and 100° C., such as at a temperature of between 80° C. and 100° C., such as at a temperature of between 40° C. and 90° C., such as at a temperature of between 40° C. and 80° C., such as at a temperature of between 40° C. and 70° C., such as at a temperature of between 40° C. and 60° C., such as at a temperature of between 40° C. and 50° C.

In some embodiments according to the present invention the peptide when hydrolyzing the lactose in the milk-based substrate has a ratio of lactase to transgalactosylase activity of more than 1:1.

In some embodiments according to the present invention less than 80% of the lactose has been hydrolyzed when step c) is completed, and wherein more than 90% of the lactose has been hydrolyzed after one week.

The present invention also relates to the use of *Streptococcus thermophilus* deposited as DSM 28889, *Streptococcus thermophilus* deposited as DSM 25850, *Streptococcus thermophilus* deposited as DSM 25851, *Streptococcus thermophilus* deposited as DSM 26722, *Streptococcus thermophilus* DSM 32227, *Lactobacillus delbrueckii* subspecies *bulgaricus* deposited as DSM 26420, or *Lactobacillus delbrueckii* subspecies *bulgaricus* deposited as DSM 26421, or mutants thereof, as a lactase producing organism or as an enzyme having lactase activity producing organism, preferably as a homologous lactase producing organism, or as a homologous enzyme having lactase activity producing organism, or as a heterologous lactase producing organism, or as a heterologous enzyme having lactase activity producing organism.

Further, this invention also concerns the use of *Streptococcus thermophilus* deposited as DSM 28889, *Streptococcus thermophilus* deposited as DSM 25850, *Streptococcus thermophilus* deposited as DSM 25851, *Streptococcus thermophilus* deposited as DSM 26722, *Streptococcus thermophilus* DSM 32227, *Lactobacillus delbrueckii* subspecies *bulgaricus* deposited as DSM 26420, or *Lactobacillus delbrueckii* subspecies *bulgaricus* deposited as DSM 26421, for producing a low-lactose product or a free-lactose product, preferably wherein the low-lactose product or a free-lactose product is selected from low-lactose milk, low-lactose yoghurt, low-lactose cheese, low-lactose fermented milk products, free-lactose milk, free-lactose yoghurt, free-lactose cheese and/or free-lactose fermented milk product.

LEGENDS TO FIGURES

FIG. 1. Growth curves and metabolite profiles of DSM 22934 and DSM 28889 in CDM. Larger circles denote transcriptome samples.

Figure 2:
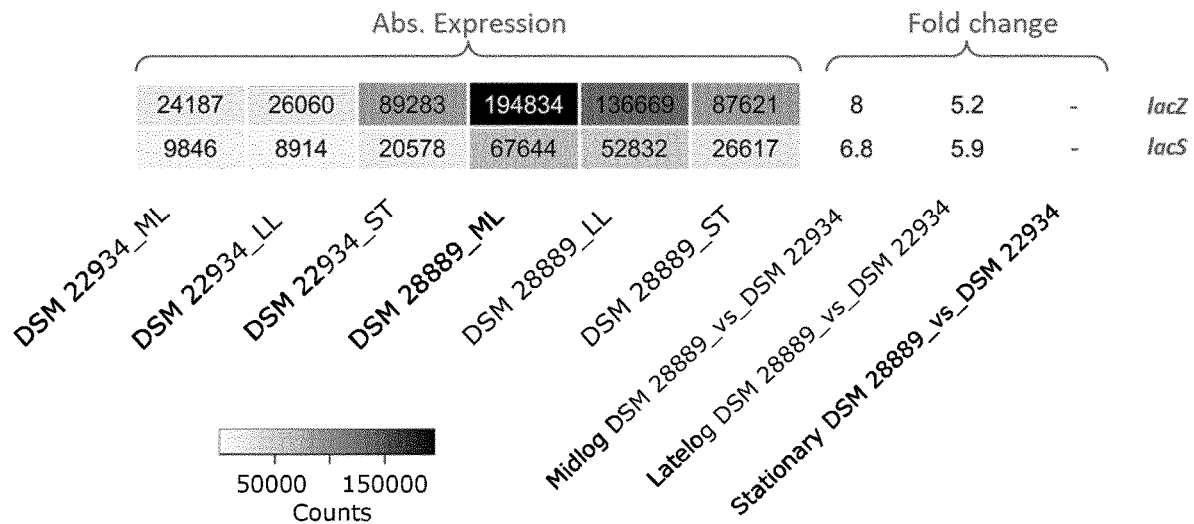

FIG. 2. Absolute expression levels of lacS and lacZ in midlog, latelog and stationary phases. Fold changes between DSM 28889 and DSM 22934 in each growth phase are also indicated.

Figure 3:
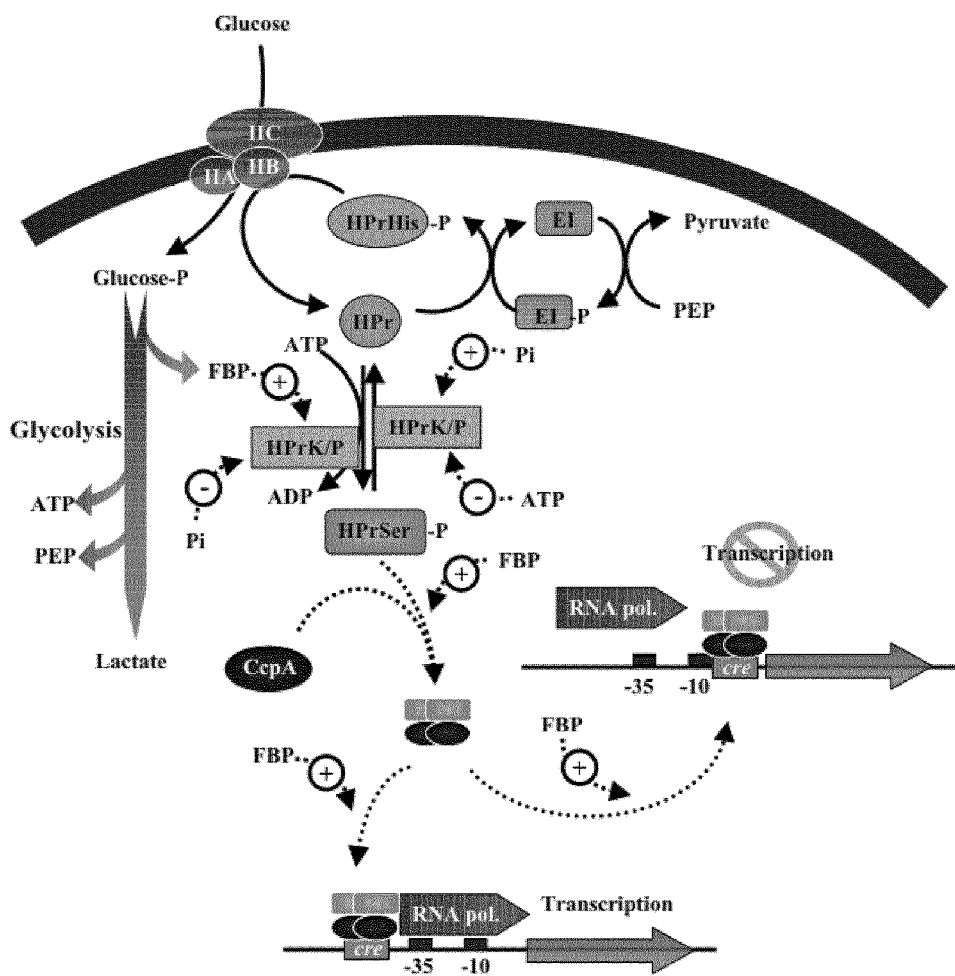

FIG. 3. CcpA and HPr regulatory network (Bogaard, 2004).

Figure 4:
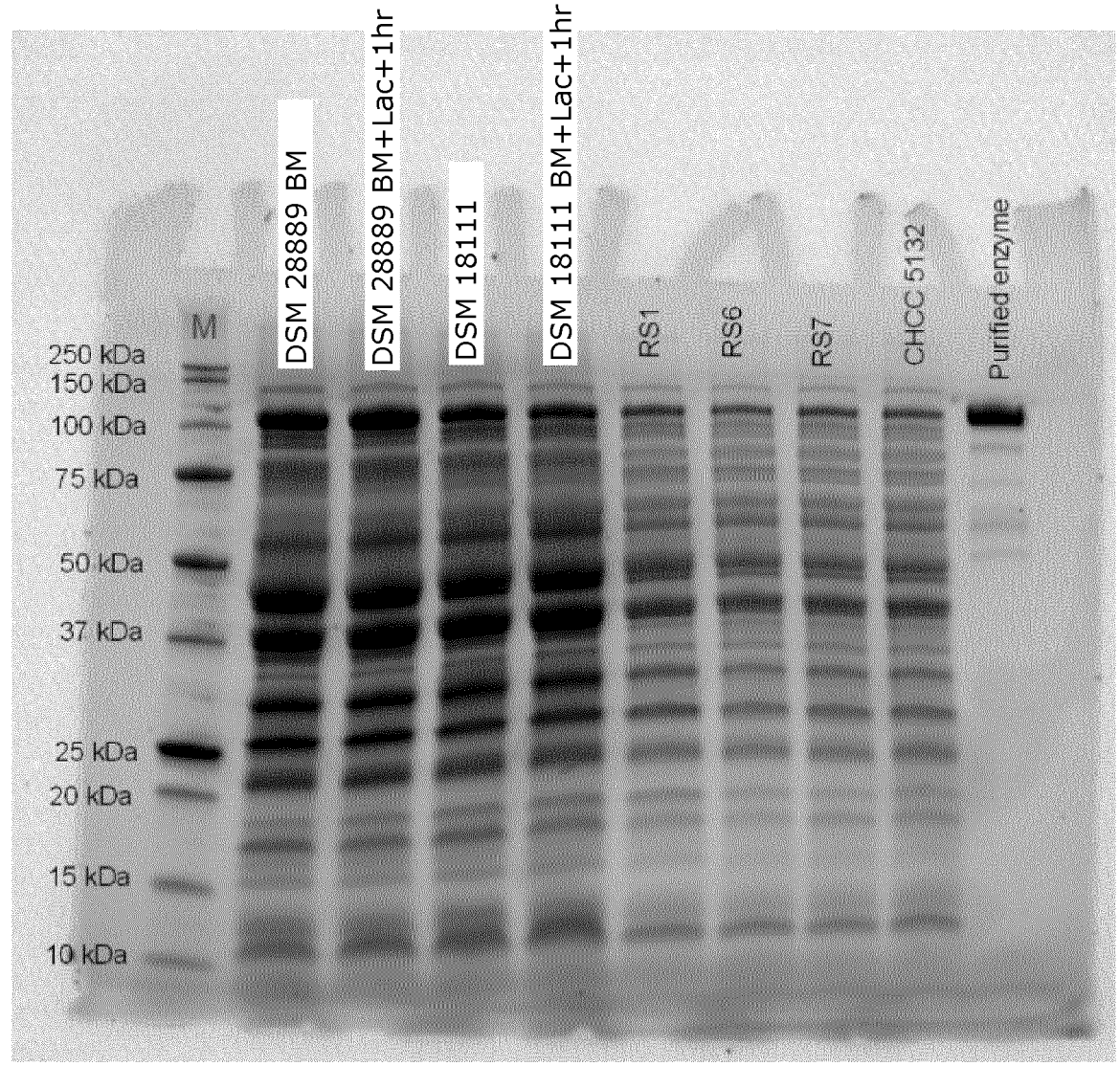

FIG. 4. Protein expression analysis under different fermentation conditions. The expression was analyzed by loading 10 µL of the cell-free extract on each lane. The RS1, RS6 and RS7 were used as controls to measure background level of protein expression from different *Streptococcus thermophilus* strains. The purified enzyme is a recombinantly produced LacZ from *Streptococcus thermophilus*, as positive control. Experimental setup details are described in example 3 and Table 2 and Table 3.

TABLE 1

The gene numbers with corresponding sequence identification number.

| Sequence Identity number | Species name |
|---|---|
| SEQ ID No 1 | *Bifidobacterium adolescentis* |
| SEQ ID No 2 (domain a) | *Lactobacillus sakei* |
| SEQ ID No 3 (domain b) | |
| SEQ ID No 4 | *Bifidobacterium adolescentis* |
| SEQ ID No 5 (domain a) | *Lactobacillus amylovorus* |
| SEQ ID No 6 (domain b) | |
| SEQ ID No 7 | *Bifidobacterium bifidum* |
| SEQ ID No 8 | *Bifidobacterium bifidum* |
| SEQ ID No 9 | *Bifidobacterium breve* |
| SEQ ID No 10 | *Bifidobacterium catenulatum* |
| SEQ ID No 11 | *Bifidobacterium catenulatum* |

TABLE 1-continued

The gene numbers with corresponding sequence identification number.

| Sequence Identity number | Species name |
|---|---|
| SEQ ID No 12 | *Lactobacillus delbrueckii* subsp. *bulgaricus* |
| SEQ ID No 13 | *Lactobacillus delbrueckii* subsp. *lactis* |
| SEQ ID No 14 | *Lactobacillus delbrueckii* subsp. *bulgaricus* |
| SEQ ID No 15 | *Lactobacillus delbrueckii* subsp. *bulgaricus* |
| SEQ ID No 16 | *Lactobacillus delbrueckii* subsp. *lactis* |
| SEQ ID No 17 | *Lactobacillus delbrueckii* subsp. *bulgaricus* |
| SEQ ID No 18 | *Lactobacillus delbrueckii* subsp. *bulgaricus* |
| SEQ ID No 19 | *Lactobacillus delbrueckii* subsp. *lactis* |
| SEQ ID No 20 (domain a) | *Lactobacillus helvaticus* |
| SEQ ID No 21 (domain b) | |
| SEQ ID No 22 | *Bifidobacterium longum* |
| SEQ ID No 23 (domain a) | *Lactobacillus reuteri* |
| SEQ ID No 24 (domain b) | |
| SEQ ID No 25 | *Lactobacillus delbrueckii* subsp. *lactis* |
| SEQ ID No 26 (domain a) | *Lactobacillus helvaticus* |
| SEQ ID No 27 (domain b) | |
| SEQ ID No 28 (domain a) | *Lactobacillus crispatus* |
| SEQ ID No 29 (domain b) | |
| SEQ ID No 30 | *Streptococcus thermophilus* |
| SEQ ID No 31 | *Lactobacillus delbrueckii* subsp. *indicus* |
| SEQ ID No 32 | *Bifidobacterium adolescentis* |
| SEQ ID No 33 | *Bifidobacterium adolescentis* |
| SEQ ID No 34 | *Lactobacillus delbrueckii* subsp. *bulgaricus* |
| SEQ ID No 35 | *Lactobacillus delbrueckii* subsp. *bulgaricus* |
| SEQ ID No 36 | *Streptococcus thermophilus* |
| SEQ ID No 37 | *Streptococcus thermophilus* |
| SEQ ID No 38 | *Streptococcus thermophilus* |

```
                                                              SEQ ID No. 1
MADTAELAIVHATTASASWLTDPTVFAANRKPAHSSHRYVIGETSEPKQSLDGEWKVRIEQARNVDVESAPFAAVDFEDGDFG

AIEVPGHLQMAGYLKNKYVNIQYPWDGHEDPQAPNIPENNHVAIYRRRFALDAQLARTLENDGTVSLTFHGAATAIYVWLDGT

FVGYGEDGFTPSEFDVTEALRNGNGNAADSPEAEHTLTVACYEYSSASWLEDQDFWRLHGLFRTVELAAQPHTHVETVQLEAD

YTAADTAGTADTAELNAALTLRNSADAMTIESTLRDGDGNVVWESTQACNGEIALNSGKMTNIAPWSAESPTLYTLTVRVVGH

DGAIIETVTQKIGFRTFRIENGIMTLNGKRIVFKGADRHEFDAKRGRAITREDMLSDVVFCKRHNINAIRTSHYPNQEYWYDL

CDEYGLYLIDETNMETHGTWVANNVERPEDGIPGSRPEWEGACVDRINSMMRRDYNHPSVLIWSLGNESSAGEVFRAMYRHAH

TIDPNRPVHYEGSVHMREFEDVTDIESRMYAHADEIERYLNDGSPAHTDGPKKPYISCEYMHAMGNSCGNMDEYTALERYPMY

QGGFIWDFIDQAIETKLPDGTTRMCYGGDFGDRPSDYEFSGDGLLFADRTPSPKAQEVKQLYANVKIVVSVDEARITNDNLFV

STGDYRFVLRILADGKPVWSTTRRFDVAAGESASFEVDWPVDDYRSNAEELVLEVSQQLGNACDWAPAGYELAFGQCVVAGAK

TTADAVDAAGAPADGTVTLGRWNAGVRGQGREALFSRTQGGMVSYTFGEREFVLRRPSITTFRPLTDNDRGAGHAFERAAWAV

AGKYARCVDCAIANRGENAVEATYTYELAIPQRTKVTVRYVADTAGLVSLDVEYPGEKNGDLPTIPAFGIEWALPVEYANLRF

YGAGPEETYADRRHAKLGVWSTTAGDDCAPYLLPQETGNHEDVRWAEITDDSGHGVRVKRGAGAKPFAMSLLPYSSTMLEEAL

HQDELPKPRHMFLRLLAAQMGVGGDDSWMSPVHEQYQLPADQPLSLNVQLKLF
                                                              SEQ ID No. 2
MQPNIQWLDTPAVFRVGQLPAHSDHRYYATLAEMAQQQSSFEQSLNGTWQFHYSVNAASRPKSFYELAFDAQDFEPITVPQHI

ELAGYEQLHYINTMYPWEGHYYRRPAFSTSDDKQHLGMFSEADYNPVGSYLHHFDLTPALRNQRVIIRFEGVEQAMYVWLNGQ

FIGYAEDSFTPSEFDLTPYLKETDNCLAVEVHKRSSAAFIEDQDFFRFFGIFRDVKLLAKPRTHLEDLWVIPEYDVVQQTGQV

KLRLQFSGDENRVHLRIRDQHQIILTADLTSAAQVNGLYKMPELVQAWSNQTPNLYTLELEVVDQAGETIEISQQPFGFRKIE

IKDKVMLLNGKRLVINGVNRHEWHPETGRTITAEDEAWDIACMQRNHINAVRTSHYPDRLSFYNGCDQAGIYMMAETNLESHG

SWQKMGAVEPSWNVPGSYDEWEAATLDRARTNFETFKNHVSILFWSLGNESYAGSVLEKMNAYYKQQDPTRLVHYEGVFRAPE

YKATISDVESRMYATPAEIKAYLDNAPQKPFILCEYMHDMGNSLGGMQSYIDLLSQYDMYQGGFIWDFIDQALLVTDPVTGQR

ELRYGGDFDDRPSDYEFSGDGLVFATRDEKPAMQEVRYYYGEHK
                                                              SEQ ID No. 3
MKNQQCRRLDTIMANTNKRLAVIFGDVTLGLKGPDFHYLFSYQTGGPESLRIQGKEWLYRSPKPTFWRATTDNDRGNQFPLKS

GMWLAADQFIACQSITVAIDGQTIPLPIAPENNRYSGQETAQEVTVTYTYQTITTPQTTVEVSYTIQASGKIRVAVTYHGQAG

LPSLPVFGLRFVMPTPATRFIYQGLSGETYPDRMAGGMAGEYEVTGLPVTPYLVPQDCGVHMATDWVTIYRQAVLDNRLREPV

ETGLKFKMVDQPFAFSCLPYTAEELENATHHSELPAPHRTVLSLLGAVRGVGGIDSWGSDVEAAYQIDATQDHHLEFEISF
                                                              SEQ ID No. 4
MADTAELAIVHATTASASWLTDPTVFAANRKPAHSSHRYVIGETSEPKQSLDGEWKVRIEQARNVDVESAPFAAVDFEDGDFG

AIEVPGHLQMAGYLKNKYVNIQYPWDGHEDPQAPNIPENNHVAIYRRRFALDAQLARTLENDGTVSLTFHGAATAIYVWLDGT
```

-continued

FVGYGEDGFTPSEFDVTEALRNGNGNAADSPEAEHTLTVACYEYSSASWLEDQDFWRLHGLFRTVELAAQPHTHVETVQLEAD

YTAADTAGTADTAELNAALTLRNPADAMTIESTLRDGDGNVVWESTQACNGEIALNSGKMTNIAPWSAESPTLYTLTVRVVGH

DGAIIETVTQKIGFRTFRIENGIMTLNGKRIVFKGADRHEFDAKRGRAITREDMLSDVVFCKRHNINAIRTSHYPNQEYWYDL

CDEYGLYLIDETNMETHGTWVANNVERPEDGIPGSRPEWEGACVDRINSMMRRDYNHPSVLIWSLGNESSAGEVFRAMYRHAH

TIDPNRPVHYEGSVHMREFEDVTDIESRMYAHADEIERYLNDGSPAHTDGPKKPYISCEYMHAMGNSCGNMDEYTALERYPMY

QGGFIWDFIDQAIETKLPDGTTRMCYGGDFGDRPSDYEFSGDGLLFADRTPSPKAQEVKQLYANVKIAVSVDEARITNDNLFV

STGDYRFVLRILADGKPVWSTTRRFDVAAGESASFEVDWPVDDYRSNAEELVLEVSQQLGNACDWAPAGYELAFGQCVVAGAK

TTADAVDAAGAPADGTVTLGRWNAGVRGQGREALFSRTQGGMVSYTFGEREFVLRRPSITTFRPLTDNDRGAGHAFERAAWAV

AGKYARCVDCAIANRGENAVEATYTYELAIPQRTKVTVRYVADTAGLVSLDVEYPGEKNGDLPTIPAFGIEWALPVEYANLRF

YGAGPEETYADRRHAKLGVWSTTAGDDCAPYLLPQETGNHEDVRWAEITDDSGHGVRVKRGAGAKPFAMSLLPYSSTMLEEAL

HQDELPKPRHMFLRLLAAQMGVGGDDSWMSPVHEQYQLPADQPLSLNVQLKLF (G40 Domaina)

SEQ ID No. 5

MKANIKWLDDPEVFRINQLPAHSDHPFYKDYREWQNHSSSFKQSLNGAWQFHFSKDPQSRPIDFYKRSFDSSSFDTIPVPSEI

ELNGYAQNQYTNILYPWESKIYRKPAYTLGRGIKDGDFSQGKDNTVGSYLKHFDLNPALAGHDIHIQFEGVERAMYVYLNGHF

IGYAEDSFTPSEFDLTPYIQAKDNILAVEVFKHSTASWLEDQDMFRFSGIFRSVELLALPRTHLMDLDIKPTVVNDYHDGVFN

AKLHFMGKTSGNVHVLIEDIDGKTLLNKKLPLKSTVEIENETFANVHLWDNHDPYLYQLIIEVHDQDGKLVELIPYQFGFRKI

EITKDHVVLLNGKRLIINGVNRHEWDAKRGRSITLADMKQDIATFKHNNINAVRTCHYPNQIPWYYLCDQNGIYMMAENNLES

HGTWQKLGQVEATSNVPGSIPEWREVVVDRARSNYETFKNHTAILFWSLGNESYAGSNIAAMNKLYKDHDSSRLTHYEGVFHA

PEFKKEISDLESCMYLPPKEAEEYLQNPKKPLVECEYMHDMGTPDGGMGSYIKLIDKYPQYMGGFIWDFIDQALLVHDPVSGQ

DVLRYGGDFDDRHSDYEFSGDGLMFADRTPKPAMQEVRYYYGLHK

SEQ ID No. 6

MAYTNNLHVVYGEASLGVNGQDFAYLFSYERGGLESLKIKDKEWLYRTPTPTFWRATTDNDRGSGFNQKAAQWLGADMFTKCV

GIHVQVDDHRFDELPVAPINNQFSNQEFAHEVKVAFDYETLTTPATKVKIIYNINDFGHMTITMHYFGKKGLPPLPVIGMRFI

MPTKAKSFDYTGLSGETYPDRMAGAERGTFHIDGLPVTKYLVPQENGMHMQTNELVITRNSTQNNADKDGDFSLKITQTKQPF

NFSLLPYTAEELENATHIEELPLARRSVLVIAGAVRGVGGIDSWGSDVEEQYHIDPEQDHEFSFTLN

SEQ ID No. 7

MNTTDDQRKNGDPIVSPSIPTTAWLADPRVYAVHRLDAHSDHACWSRSPVDGESTDLRQSLDGEWRVRVETAPTGRFPDGTSD

GPDWISDVSPLFAAPGFDDSSFSRVQVPSHLETAGLLAPQYVNVQYPWDGHEDPKAPAIPEHGHVAVYRREFDADGEVAQAVR

EGRPVTLTFQGAATAIYVWLNGSFIGYAEDSFTPSEFDVTDAIKVDGNVLAVACYEYSSASWLEDQDFWRLHGLFRSVELNAR

PAAHVADLHADADWDLATSRGSLSLDVLIDGAANAATADFALRDKNGTIVWRTATKADGTLHAEAEIDDAAPWSAERPDLYEL

SVTLLDADGKVLETARTRIGFRHVAIEDGILKLNGKRLVFRGVNRHEFDCRRGRAITEEDMLWDIRFMKRHNINAVRTSHYPN

QSRWYELCDEYGIYLIDETNLETHGSWNSPGDIPVGTSVPGDDEAWLGACIDRLDSMILRDNHPSVLVWSLGNESYAGEVLK

AMSAHAHQLDPGRPVHYEGVNWNHAYDGISDFESRMYAKPAEIQDWLEHGDERGEASKPFVSCEYMHAMGNSCGGLSEFIDLE

RYERYSGGFIWDYIDQGLVQRLPDGSERLSVGGEWGDRPTDYEFVGNGIVFADRTPSPKAQEVKQLYSPVKLAPDGHGVTIEN

RNLFAGTDGYVFAARLLEDGHEIWHADYRFDVAAGDTQHHDIAFPDIDADGDTREVTYEVDLLLAEATAWAPAGYELAFGQLT

GTLNPEQDITETSHDDDGRATRTLSRWNAGIRRDDEEILLSRTQGGIVSWKRDDREMVIRRPELVTFRPLTDNDRGNHSGFDR

AAWFAAGRYAIVTETKIHESDDGLVAEYQYELADPNHTPVSVTYHVNSDMRMQLTVEYPGNATDMASLPAFGIEWELPGEYDR

LRYYGPGPEETYRDRKQGGKLGIWDATAKASMAPYLMVQETGSHEDVRWLEATDIQGHGLRVTQRGDRHFTASLLPWNTYTIE

AARRHEDLPKPRHNYLRLLAAQMGVGGDDSWGAPVHTAYQLPAGRPLTLDVNLELI

SEQ ID No. 8

MNTTDDQRKNGDPIVSPSIPTTAWLADPRVYAVHRLDAHSDHACWSRSPVDGESTDLRQSLDGEWRVRVETAPTGRFPDGTSD
GPDWISDVSPLFAAPGFDDSSFSRVQVPSHLETAGLLAPQYVNVQYPWDGHEDPKAPAIPEHGHVAVYRREFDADGEVAQAVR
EGRPVTLTFQGAATAIYVWLNGSFIGYAEDSFTPSEFDVTDAIKVDGNVLAVACYEYSSASWLEDQDFWRLHGLFRSVELNAR
PAAHVADLHADADWDLATSRGSLSLDVLIDGAANAATADFALWDKNGTIVWHIVTKADGTLHAEAEIDDAAPWSAERPDLYEL
SVTLLDADGKVLETARTRIGFRHVAIEDGILKLNGKRLVFRGVNRHEFDCRRGRAITEEDMLWDIRFMKRHNINAVRTSHYPN
QSRWYELCDEYGIYLIDETNLETHGSWNSPGDIPVGTSVPGDDEAWLGACIDRLDSMILRDRNHPSVLVWSLGNESYAGEVLK
AMSAHAHRLDPGRPVHYEGVNWNHAYDGISDFESRMYAKPAEIQDWLEHGDERGEASKPFVSCEYMHAMGNSCGGLSEFIDLE
RYERYSGGFIWDYIDQGLVQRLPDGSERLSVGGEWGDRPTDYEFVGNGIVFADRTPSPKAQEVKQLYSPVKLAPDGHGVTIEN
RNLFAGTDGYVFAARLLEDGHEIWHADYRFDVAAGDTQHHDIAFPDIDADGDTREVTYEVDLLLAEATAWAPAGYELAFGQLT
GTLNPEQDITETSHDDDGRATRTLSRWNAGIRRDDKEILLSRTQGGIVSWKRDDREMVIRRPELVTFRPLTDNDRGNHSGFDR
AAWFAAGRYAIVTETKIHESDDGLVAEYQYELADPNHTPVSVTYHVNSDMRMQLTVEYPGNATDMASLPAFGIEWELPGEYDR
LRYYGPGPEETYRDRKQGGKLGIWDATAKASMAPYLMVQETGSHEDVRWLEATDIQGHGLRVTQRGDRHFTASLLPWNTYMIE
AARRHEDLPEPRHNYLRLLAAQMGVGGDDSWGAPVHTAYQLPAGRPLTLDVNLELI

SEQ ID No. 9

MTNSMQGKAKTIMTNLQSAQQFSQAWLTDPRVFAVNRLAAHSSHKFYDHSPQCGEAMDLKQSLDGQWRVQMLDLADLADNELA
EAAFAQPGYDAAGFSP1EVPSALETKGFLNHQYVNQQYPWSGHESPVAPDVPKHNHVALYRHEFSLEPKAAAVLEANKTAADD
AAKRRVTLTFQGAATAIVVWLNGAFIGYAEDSFTPSEFDVTDVLRDGVNTLAVACFEFSSASWLEDQDFWRLHGIFRSVELEA
QPLVHVNDLRVLADYDHTTGEGSLDVVALLRNAGTAAAVAATVLDAAGNTVWHSKLTAGADAETLTVKANVGKVNPWSAEEPT
LYTLQVVATDAAGQVIEAALQRIGFRHFAIEDGLMKLNGKRIVFKGVDRHEFDARTGRTIAEADMIEDIHSFKRLNINAVRTS
HYPNETRWYELCDEYGIYVLDETNLETHGSWTDPGDVFQPARAIPGSKDEWRAACVDRTASMVRRDYNHPSVVIWSLGNEAFG
GDVFYSMRDFVHENDPFRPVHYEGTFNDPEFSAATDIMSRMYAKPDEIVKLYLGEDGKKPYISCEYSHSMGNSTGGLHLYTEL
ERYPLYQGGFIWDYVDQALWQDCGNGTERLAYGGDFEDRPNDYEFSGDGVMFADRTPSPKAQEVKQLYANVKLVPDESGVTIT
NDNLFISTASSLFTARVLVDGAERWHANYRFDVPAGETVREPIAFPKVTDLVALSGSAEVTYEVDQRLAEATDWAPAGYELTF
GQYVAAVSFDDGAADAVVAGDAEVAADGFNAGIHTDFGEVLLSKTQGGMVSFKRDGREMVIRRPNLTTFRALTDNDRGNGSGF
ERAQWMAAGRYARVTGTSVEETADGKGLKATYSYELADAKHTPVTVHYEVDAALRVHLTVEYPGEADAATLPAFGLEWILPKQ
YDRLRFYGLGPEETYADRLHGAKLGVFSRTAAEDCAPYLLPQETGNHEQVRWAEITDEYGHGMRVTAAGGTRFATSLLPYSSL
MFEDALHQNELPKPRHTFLRLLAAQMGVGGDDTWGAPVHDEFQVPADQPLKLDVTLELI

SEQ ID No. 10

MTQRRSYRWPQPLAGQQARIWYGGDYNPDQWPEEVWDDDVRLMKKAGVNLVSVGIFSWAKIETSEGVYDFDWLDRIIDKLGEA
GIAVDLASATASPPMWLTQAHPEVLWKDYRGDVCQPGARQHWRPTSPVFREYALKLCRAMAEHYKGNPYVVAWHVSNEYGCHN
RFDYSEDAERAFRKWCEERYGTIDAVNDAWGTAFWAQRMNDFTEIVPPRFIGDGNFMNPGKLLDFKRFSSDALKAFYVAERDA
LAEITPDLPLTTNFMVSAAGSVLDYDDWGREVDFVSNDHYFIPGEAHLDELAFSASLVDGIARKDPWFLMEHSTSAVNWRPVN
YRKEPGQLVRDSLAHVAMGADAVCYFQWRQSKAGAEKFHSAMVPHTGEDSAVFRDVCELGADLNTLADNGLLGTKLAKSKVAV
VFDYESEWATEHTATPTQKVHHVDEPLQWFRALADHGVTADVVPVSSNWDEYEVVVLPSVYILSEETTRRVRDYVVNGGRLIV
TYYTGLSDEKDHVWLGGYPGSIRDVVGVRVEEFMPMGDDFPGVPDCLGLSNGAVAHDIADVIGSVDGTATVLETFRDDPWTGM
DGAPAIVANTFGEGRSVYVGARLGRDGIAKSLPEIFESLGMAETGENDSRVLRVEREGSDGSRFVFSFNRTHEAVQIPFEGKI
VVSSFAEVSGENVSIKPNGVIVTKQ

SEQ ID No. 11

MANSNRVEHASETWLTDATVFEVNRTPAHSNHKCFTHDPQSGEHSDLTQSLDGEWRVEIVQASDIDFNEEPFVAENFDDSSFC
RAQVPGHLQMAGLLKNKYVNIQYPWDGHENPLEPNVPENNHVALYRRKFVVSKRLADTKESEGSVSIVFHGMATAIYVWVNGL
FAGYGEDGFTPNEFDITDLLHDGENVVAVACYEYSSASWLEDQDFWRLHGLFRSVELTAQPHVHVENMQLEADWDAESGTASL

-continued

DAALSVRNASDAATISATLKDSEGNVVWEASTNADANTTFASGSLQGLEPWSAESPSLYELEVNVIDQAGNIVEAAVQKVGFR
RFRIENGIMTLNGKRIVFKGADRHEFDAKRGRSITEQDMIDDVIFCKRHNINAIRTSHYPNQERWYDLCDEYGIYLIDETNLE
THGSWCLPGDVVTAETAVPGSKAHWEGACVDRVNSMVRRDYNHPSVVIWSLGNESYTGDVFRAMYKHVHDIDPNRPVHYEGVT
KNRDYDDVTDIETRMYEHADVVEEYLKNDPQKPYISCEYMHAMGNSVGNLDEYTALERYPHYQGGFIWDFIDQAIYATQPDGS
TRLCYGGDFGDRPSDYEFSGNGLVFADRTPTPKAQEVKQLYSNVHIDVTDRSVSIKNDNLFISTGGYQFVLRILADGEPVWQS
ERRFDVPADSACTFDVEWPVDLYRANADELVLEVSQRLARATDWAPAGYELAFGQTIVAGTKAAEDAALPADGIVTVGRWNAG
VQGSGREILLSRTQGGLVSYTFDGHEFVLRRPAITTFRALTDNDRGAGHGFERAQWMVAGRYARCVDNVIEQVDEDTLKAVYT
YELATPQCTKVTVGYTADTTGRLNLHVEYPGESGELPTIPAFGIEWTLPVQYSNLRFFGAGPEETYQDRKHAKLGVWSTDAFK
DHAPYLMPQETGNHEEVRWAEITDENGHGLRVSRANGAAPFAVSLQPYSSFMIEEAQHQDELPAPKHMFLRVLAAQMGVGGDD
SWMSPVHSQYHITADQPISLDVNLELI

SEQ ID No. 12

MSNKLVKEKRVDQADLAWLTDPEVYEVNTIPPHSDHESFQSQEELEEGKSSLVQSLDGDWLIDYAENGQGPVNFYAEDFDDSN
FKSVKVPGNLELQGFGQPQYVNVQYPWDGSEEIFPPQIPSKNPLASYVRYFDLDEAFWDKEVSLKFDGAATAIYVWLNGHFVG
YGEDSFTPSEFMVTKFLKKENNRLAVALYKYSSASWLEDQDFWRMSGLFRSVTLQAKPRLHLEDLKLTASLTDNYQKGKLEVE
ANIAYRLPNASFKLEVRDSEGDLVAEKLGPIRSEQLEFTLADLPVAAWSAEKPNLYQVRLYLYQAGSLLEVSRQEVGFRNFEL
KDGIMYLNGQRIVFKGANRHEFDSKLGRAITEEDMIWDIKTMKRSNINAVRCSHYPNQSLFYRLCDKYGLYVIDEANLESHGT
WEKVGGHEDPSFNVPGDDQHWLGASLSRVKNMMARDKNHASILIWSLGNESYAGTVFAQMADYVRKADPTRVQHYEGVTHNRK
FDDATQIESRMYAPAKVIEEYLTNKPAKPFISVEYAHAMGNSVGDLAAYTALEKYPHYQGGFIWDWIDQGLEKDGHLLYGGDF
DDRPTDYEFCGNGLVFADRTESPKLANVKALYANLKLEVKDGQLFLKNDNLFTNSSSYYFLTSLLVDGKLTYQSRPLTFGLEP
GESGTFALPWPEVADEKGEVVYRVTAHLKEDLPWADEGFTVAEAEEVAQKLPEFKPEGRPDLVDSDYNLGLKGNNFQILFSKV
KGWPVSLKYAGREYLKRLPEFTFWRALTDNDRGAGYGYDLARWENAGKYARLKDISCEVKEDSVLVKTAFTLPVALKGDLTVT
YEVDGRGKIAVTADFPGAEEAGLLPAFGLNLALPKELTDYRYYGLGPNESYPDRLEGNYLGIYQGAVKKNFSPYLRPQETGNR
SKVRWYQLFDEKGGLEFTANGADLNLSALPYSAAQIEAADHAFDLTNNYTWVRALSAQMGVGGDDSWGQKVHPEFCLDAQKAR
QLRLVIQPLLLK

SEQ ID No. 13

MSNKLVKEKRVDQADLAWLTDPEVYEVNTIPPHSDHESFQSQEELEEGKSSLVQSLDGNWLIDYAENGQGPINFYAEDFDDSN
FKSVKVPGNLELQGFGQPQYVNIQYPWDGSEEIFPPQVPSKNPLASYVRYFDLDEALWDKEVSLKFAGAATAIYVWLNGHFVG
YGEDSFTPSEFMVTKFLKKEGNRLAVALYKYSSASWLEDQDFWRLSGLFRSVTLEAKPLLHLEDLKLTASLTDNYQKGKLEVE
ANIAYRLPNASFKLEVRDSEGDLVAEKVGPIRSEKLGFSLADLPVAAWSAEKPNLYQVRLYLYQAGSLLEVSRQEVGFRNFEL
KDGIMYLNGQRIVFKGVNRHEFDSKLGRAITEADMIWDIKTMKQSNINAVRCSHYPNQSLFYRLCDKYGLYVIDEANLESHGT
WEKVGHEDPSFNVPGDDQHWLGASLSRVKNMMARDKNHASILIWSLGNESYAGTVFAQMADYVRKADPTRVQHYEGVTHNRKF
DDATQIESRMYAPAKEIEEYLTKKPAKPFISVEYAHAMGNSVGDLAAYTALEKYPHYQGGFIWDWIDQGLEKDGHLLYGGDFD
DRPTDYEFCGDGLVFADRTTSPKLANVKALYSNLKLEVKDGQLFIKNDNLFTNSSAYYFLASLLVDGKLTYQSQPLTFGLEPG
ESGTFVLPWPEVEDEKGEIVYQVTAHLKEDLPWADEGFTVARAEEAVTKLPEFYPAGRPELVDSDFNLGLKGNGFRILFSKAK
GWPVSIKYAGREYLKRLPEFTFWRALTDNDRGAGYGYDLAKWENAGKYARLQDISYEIKENSALVKTTFTLPVALKGDLTITY
EVDSLGKIAVTANFPGAVENGLLPAFGLNFALPKELSDYRYYGLGPNESYADRLEGSYLGIYQGAVEKNFTPYLRPQEAGNRS
KVRYYQLFDEEGGLEFTANGADLNLSALPYSAAQIEAADHAFELTNNYTWVRALAAQMGVGGDDSWGQKVHPEFCLDAQEARQ
LKLVIQPLLLK

SEQ ID No. 14

MSNKLVKEKRVDQADLAWLTDPEVYEVNTIPPHFDHESFQSQEELEEGKSSLVQSLDGDWLIDYAENGQGPVNFYAEDFDDSN
FKSVKVPGNLELQGFGQPQYVNVQYPWDGSEEIFPPQIPSKNPLASYVRYFDLDEAFWDKEVSLKFDGAATAIYVWLNGHFVG
YGEDSFTPSEFMVTKFLKKENNRLAVALYKYSSASWLEDQDFWRMSGLFRSVTLQAKPRLHLEDLKLTASLTDNYQKGKLEVE

-continued

ANIAYRLPNASFKLEVRDSEGDLVAEKLGPIRSEQLEFTLADLPVAAWSAEKPNLYQVRLYLYQAGSLLEVSRQEVGFRNFEL

KDGIMYLNGQRIVFKGANRHEFDSKLGRAITEEDMIWDIKTMKRSNINAVRCSHYPNQSLFYRLCDKYGLYVIDEANLESHGT

WEKVGGHEDPSFNVPGDDQHWLGASLSRVKNMMARDKNHASILIWSLGNESYAGTVFAQMADYVRKADPTRVQHYEGVTHNRK

FDDATQIESRMYAPAKVIEEYLTNKPAKPFISVEYAHAMGNSVGDLAAYTALEKYPHYQGGFIWDWIDQGLEKDGHLLYGGDF

DDRPTDYEFCGNGLVFADRTESPKLANVKALYANLKLEVKDGQLFLKNDNLFTNSSSYYFLTSLLVDGKLTYQSRPLTFGLEP

GESGTFALPWPEVADEKGEVVYRVTAHLKEDLPWADEGFTVAEAEEVAQKLPEFKPEGRPDLVDSDYNLGLKGNNFQILFSKV

KGWPVSLKYAGREYLKRLPEFTFWRALTDNDRGAGYGYDLARWENAGKYARLKDISCEVKEDSVLVKTAFTLPVALKGDLTVT

YEVDGRGKIAVTADFPGAEEAGLLPAFGLNLALPKELTDYRYYGLGPNESYPDRLEGNYLGIYQGAVKKNFSPYLRPQETGNR

SKVRWYQLFDEKGGLEFTANGADLNLSALPYSAAQIEAADHAFELTNNYTWVRALSAQMGVGGDDSWGQKVHPEFCLDAQKAR

QLRLVIQPLLLK

SEQ ID No. 15

MSNKLVKEKRVDQADLAWLTDPEVYEVNTIPPHSDHESFQSQEELEEGKSSLVQSLDGDWLIDYAENGQGPVNFYAEDFDDSN

FKSVKVPGNLELQGFGQPQYVNVQYPWDGSEEIFPPQIPSKNPLASYVRYFDLDEAFWDKEVSLKFDGAATAIYVWLNGHFVG

YGEDSFTPSEFMVTKFLKKENNRLAVALYKYSSASWLEDQDFWRMSGLFRSVTLQAKPRLHLEDLKLTASLTDNYQKGKLEVE

ANIAYRLPNASFKLEVRDSEGDLVAEKLGPIRSEQLEFTLADLPVAAWSAEKPNLYQVRLYLYQAGSLLEVSRQEVGFRNFEL

KDGIMYLNGQRIVFKGANRHEFDSKLGRAITEEDMIWDIKTMKRSNINAVRCSHYPNQSLFYRLCDKYGLYVIDEANLESHGT

WEKVGGHEDPSFNVPGDDQHWLGASLSRVKNMMARDKNHASILIWSLGNESYAGTVFAQMADYVRKADPTRVQHYEGVTHNRK

FDDATQIESRMYAPAKVIEEYLTNKPAKPFISVEYAHAMGNSVGDLAAYTALEKYPHYQGGFIWDWIDQGLEKDGHLLYGGDF

DDRPTDYEFCGNGLVFADRTESPKLANVKALYANLKLEVKDGQLFLKNDNLFTNSSSYYFLTSLLVDGKLTYQSRPLTFGLEP

GESGTFALPWPEVADEKGEVVYRVTAHLKEDLPWADEGFTVAEAEEVAQKLPEFKPEGRPDLVDSDYNLGLKGNNFQILFSKV

KGWPVSLKYAGREYLKRLPEFTFWRALTDNDRGAGYGYDLARWENAGKYARLKDISCEVKEDSVLVKTAFTLPVALKGDLTVT

YEVDGRGKIAVTADFPGAEEAGLLPAFGLNLALPKELTDYRYYGLGPNESYPDRLEGNYLGIYQGAVKKNFSPYLRPQETGNR

SKVRWYQLFDEKGGLEFTANGADLNLSALPYSAAQIEAADHAFELTNNYTWVRALSAQMGVGGDDSWGQKVHPEFCLDAQKAR

QLRLVIQPLLLK

SEQ ID No. 16

MSNKLVKEKRVDQADLAWLTDPEVYEVNTIPPHSDHESFQSQEELEEGKSSLVQSLDGDWLIDYAENGQGPVNFYAEDFDDSN

FKSVKVPGNLELQGFGQPQYVNIQYPWDGSEEIFPPQVPSKNPLASYVRYFDLDEAFWDKEVSLKFAGAATAIYVWLNGHFVG

YGEDSFTPSEFMVTKFLKKENNRLAVALYKYSSASWLEDQDFWRLSGLFRSVTLQAKPLLHLEDLKLTASLTDNYQKGKLEVE

ANIAYRLPNASFKLEVRDSEGDLVAEKLGPIRSEQLEFTLADLPVAAWSAEKPNLYQVRLYLYQAGSLLEVSRQEVGFRNFEL

KDGIMYLNGQRIVFKGVNRHEFDSKLGRAITEEDMIWDIKTMKRSNINAVRCSHYPNQSLFYRLCDKYGLYVIDEANLESHGT

WEKVGHEDPSFNVPGDDQHWLGASLSRVKNMMARDKNHASILIWSLGNESYAGTVFAQMADYVRKADPTRVQHYEGVTHNRKF

DDATQIESRMYAPAKEIEEYLTKKPAKPFISVEYAHAMGNSVGDLAAYTALEKYPHYQGGFIWDWIDQGLEKDGHLLYGGDF

DDRPTDYEFCGNGLVFADRTTSPKLANVKALYSNLKLEVKDGQLFLKNDNLFTNSSAYYFLTSLLVDGKLTYQSQPLTFGLEP

GESGTFVLPWPEVEDEKGEIVYQVTAHLKEDLPWADEGFTVAEAEEAVTKLPEFYPAGRPELVDSDFNLGLKGNGFRILFSKA

KGWPVSIKYAGREYLKRLPEFTFWRALTDNDRGAGYGYDLAKWENAGKYARLQDISYEIKENSVLVKTAFTLPVALKGDLTIT

YEVDSLGKIAVTANFPGAVENGLLPAFGLNFALPKELSDYRYYGLGPNESYADRLEGSYLGIYQGAVEKNFTPYLRPQEAGNR

SKVRYYQLFDEESGLEFTANGADLNLSALPYSAAQIEAADHAFELSNNYTWVRALAAQMGVGGDDSWGQKVHPEFCLDAQEAR

QLKLVIQPLLLK

SEQ ID No. 17

MSNKLVKEKRVDQADLAWLTDPEVYEVNTIPPHSDHESFQSQEELEEGKSSLVQSLDGDWLIDYAENGQGPVNFYAEDFDDSN

FKSVKVPGNLELQGFGQPQYVNVQYPWDGSEEIFPPQIPSKNPLASYVRYFDLDEAFWDKEVSLKFDGAATAIYVWLNGHFVG

YGEDSFTPSEFMVTKFLKKENNRLAVALYKYSSASWLEDQDFWRMSGLFRSVTLQAKPRLHLEDLKLTASLTDNYQKGKLEVE

-continued

ANIAYRLPNASFKLEVRDSEGDLVAEKLGPIRSEQLEFTLADLPVAAWSAEKPNLYQVRLYLYQAGSLLEVSRQEVGFRNFEL

KDGIMYLNGQRIVFKGVNRHEFDSKLGRAITEEDMIWDIKTIKRSNINAVRCSHYPNQSLFYRLCDKYGLYVIDEANLESHGT

WEKVGGHEDPSFNVPGDDQHWLGASLSRVKNMMARDKNHASILIWSLGNESYAGTVFAQMADYVRKADPTRVQHYEGVTHNRK

FDDATQIESRMYAPAKVIEEYLTNKPAKPFISVEYAHAMGNSVGDLAAYTALEKYPHYQGGFIWDWIDQGLEKDGHLLYGGDF

DDRPTDYEFCGNGLVFADRTESPKLANVKALYANLKLEVKDGQLFLKNDNLFTNSSSYYFLTSLLVDGKLTYQSRPLTFGLEP

GESGTFALPWPEVADEKGEVVYRVTAHLKEDLPWADEGFTVAEAEEVAQKLPEFKPEGRPDLVDSDYNLGLKGNNFQILFSKV

KGWPVSLKYAGREYLKRLPEFTFWRALTDNDRGAGYGYDLARWENAGKYARLKDISCEVKEDSVLVKTAFTLPVALKGDLTVT

YEVDGRGKIAVTADFPGAEEAGLLPAFGLNLALPKELTDYRYYGLGPNESYPDRLEGNYLGIYQGAVKKNFSPYLRPQETGNR

SKVRWYQLFDEKGGLEFTANGADLNLSALPYSAAQIEAADHAFDLTNNYTWVRALSAQMGVGGDDSWGQKVHPEFCLDAQKAR

QLRLVIQPLLLK

SEQ ID No. 18
MSNKLVKEKRVDQADLAWLTDPEVYEVNTIPPHSDHESFQSQEELEEGKSSLVQSLDGDWLIDYAENGQGPVNFYAEDFDDSN

FKSVKVPGNLELQGFGQPQYVNVQYPWDGSEEIFPPQIPSKNPLASYVRYFDLDEAFWDKEVSLKFDGAATAIYVWLNGHFVG

YGEDSFTPSEFMVTKFLKKENNRLAVALYKYSSASWLEDQDFWRMSGLFRSVTLQAKPRLHLEDLKLTASLTDNYQKGKLEVE

ANIAYRLPNASFKLEVRDSEGDLVAEKLGPIGSEQLEFTLADLPVAAWSAEKPNLYQVRLYLYQAGSLLEVSRQEVGFRNFEL

KDGIMYLNGQRIVFKGVNRHEFDSKLGRAITEEDMIWDIKTIKRSNINAVRCSHYPNQSLFYRLCDKYGLYVIDEANLESHGT

WEKVGGHEDPSFNVPGDDQHWLGASLSRVKNMMARDKNHASILIWSLGNESYAGTVFAQMADYVRKADPTRVQHYEGVTHNRK

FDDATQIESRMYAPAKVIEEYLTNKPAKPFISVEYAHAMGNSVGDLAAYTALEKYPHYQGGFIWDWIDQGLEKDGHLLYGGDF

DDRPTDYEFCGNGLVFADRTESPKLANVKALYANLKLEVKDGQLFLKNDNLFTNSSSYYFLTSLLVDGKLTYQSRPLTFGLEP

GESGTFALPWPEVADEKGEVVYRVTAHLKEDLPWADEGFTVAEAEEVAQKLPEFKPEGRPDLVDSDYNLGLKGNNFQILFSKV

KGWPVSLKYAGREYLKRLPEFTFWRALTDNDRGAGYGYDLARWENAGKYARLKDISCEVKEDSVLVKTAFTLPVALKGDLTVT

YEVDGRGKIAVTADFPGAEEAGLLPAFGLNLALPKELTDYRYYGLGPNESYPDRLEGNYLGIYQGAVKKNFSPYLRPQETGNR

SKVRWYQLFDEKGGLEFTANGADLNLSALPYSAAQIEAADHAFELTNNYTWVRALSAQMGVGGDDSWGQKVHPEFCLDAQKAR

QLRLVIQPLLLK

SEQ ID No. 19
MSNKLVKEKRVDQADLAWLTDPEVYEVNTIPPHSDHESFQSQEELEEGKSSLVQSLDGNWLIDYAENGQGPINFYAEDFDDSN

FKSVKVPGNLELQGFGQPQYVNIQYPWDGSEEIFPPQVPSKNPLASYVRYFDLDEALWDKEVSLKFAGAATAIYVWLNGHFVG

YGEDSFTPSEFMVTKFLKKEGNRLAVALYKYSSASWLEDQDFWRLSGLFRSVTLEAKPLLHLEDLKLTASLTDNYQKGKLEVE

ANIAYRLPNASFKLEVRDSEGDLVAEKVGPIRSEKLDFSLADLPVAAWSAEKPNLYQVRLYLYQAGSLLEVSRQEVGFRNFEL

KDGIMYLNGQRIVFKGVNRHEFDSKLGRAITEADMIWDIKTMKQSNINAVRCSHYPNQSLFYRLCDKYGLYVIDEANLESHGT

WEKVGHEDPSFNVPGDDQHWLGASLSRVKNMMARDKNHASILIWSLGNESYAGTVFAQMADYVRKADPTRVQHYEGVTHNRKF

DDATQIESRMYAPAKEIEEYLTKKPAKPFISVEYAHAMGNSVGDLAAYTALEKYPHYQGGFIWDWIDQGLEKDGHLLYGGDFD

DRPTDYEFCGDGLVFADRTTSPKLANVKALYSNLKLEVKDGQLFIKNDNLFTNSSAYYFLTSLLVDGKLTYQSQPLTFGLEPG

ESGTFALPWPEVEDEKGEIVYQVTAHLKEDLPWADEGFTVARAEEAVTKLPEFYPAGRPELVDSDFNLGLKGNGFRILFSKAK

GWPVSIKYAGREYLKRLPEFTFWRALTDNDRGAGYGYDLAKWENAGKYARLQDISYEIKENSALVKTAFTLPVALKGDLTITY

EVDSLGKIAVTANFPGAVENGLLPAFGLNFALPKELSDYRYYGLGPNESYADRLEGSYLGIYQGMVEKNFTPYLRPQEAGNRS

KVRYYQLFDEEGGLEFTANGADLNLSALPYSAAQIEAADHAFELTNNYTWVRALAAQMGVGGDDSWGQKVHPEFCLDAQEARQ

LKLVIQPLLLK

SEQ ID No. 20
MQANINWLDNPEVFRVNQLPAHSDHPFFRDYREWQKQHSSYQQSLNGKWKFHFSANPMDRPQDFYQRDFDSSNFDSIPVPSEI

ELSNYTQNQYINVLFPWEGKIFRRPAYALDPNDHEEGSFSKGADNTVGSYLKRFDLSSALIGKDVHIKFEGVEQAMYVWLNGH

FVGYAEDSFTPSEFDLTPYIQDKDNLLAVEVFKHSTASWLEDQDMFRFSGIFRSVELLGIPATHLMDMDLKPRVADNYQDGIF

-continued

NLKLHFIGKKAGSFHLLVKDIKGHTLLEKNEDIKENVQINNEKFENVHLWNNHDPYLYQLLIEVYDEQQNLLELIPFQFGFRR

IEISPEKVVLLNGKRLIINGVNRHEWDAKRGRSITMSDMTTDINTFKENNINAVRTCHYPNQIPWYYLCDQNGIYVMAENNLE

SHGTWQKMGEIEPSDNVPGSIPQWKEAVIDRARNNYETFKNHTSILFWSLGNESYAGDNIIAMNEFYKSHDDTRLVHYEGVVH

RPELKDKISDVESCMYLPPKKVEEYLQNDPPKPFMECEYMHDMGNSDGGMGSYIKLLDKYPQYFGGFIWDFIDQALLVHDEIS

GHDVLRYGGDFDDRHSDYEFSGDGLMFADRTPKPAMQEVRYYYGLHK

SEQ ID No. 21

MDYTNNQLHIIYGDATFGVNGKDFQYIFSYERGGLESLKVHGKEWLYRVPTPTFWRATTDNDRGSGFNLKAAQWLGADMFTKC

TDIHLKVDRHDFAELPIAPFNNKFSNHEYAKSAEISFTYQTLTTPATNAKIIYNIDDVGHIKVTMRYYGKKGLPPLPVIGIRL

IMPTAATGFDYEGLSGETYPDRMAGAKEGKFHIDGLPVTEYLVPQENGMHMQTKKLTINRETTQNNVDRTNEKFSLSIQQAEK

PFNFSCLPYTAEELENATHIEELPLVRRTVLVIAGAVRGVGGIDSWGTDVESAYHINPELDHEFSFILN

SEQ ID No. 22

MTDVTHVDRASQAWLTDPTVFEVNRTPAHSSHKWYARDPQSGQWSDLKQSLDGEWRVEVVQAADINLEEEPATAESFDDSSFE

RIQVPGHLQTAGLMNHKYVNVQYPWDGHENPLEPNIPENNHVALYRRKFTVSAPVANAKQAGGSVSIVFHGMATAIYVWVNGA

FVGYGEDGFTPNEFDITELLHDGENVVAVACYEYSSASWLEDQDFWRLHGLFRSVELAARPHVHIENTQIEADWDPEAGTASL

DAALTVLNAADAATVRATLKDADGNTVWQTTGDAEAQTAISSGPLQGIAPWSAESPTLYELDVDVIDQAGDVIECTSQKVGFR

RFRIEDGILTINGKRIVFKGADRHEFDAEQGRAITEQDMIDDVVFCKRHNINSIRTSHYPNQERWYELCDEYGIYLIDEANLE

AHGSWSLPGDVLTEDTIVPGSKREWEGACVDRVNSMMRRDYNHPSVLIWSLGNESYVGDVFRAMYKHVHDIDPNRPVHYEGVT

HNRDYDDVTDIETRMYSHADEIEKYLKDDPKKPYLSCEYMHAMGNSVGNMDEYTALERYPKYQGGFIWDFIDQAIYATQPDGT

RSLRYGGDFGDRPSDYEFSGDGLLFANRKPSPKAQEVKQLYSNVHIDVTKDSVSVKNDNLFTATGDYVFVLSVLADGKPVWQS

TRRFDVPAGETRTFDVAWPVAAYRADARELVLQVSQRLAKATDWAESGYELAFGQTVVPADATATPDTKPADGTITVGRWNAG

VRGAGREVLLSRTQGGMVSYTFAGNEFVLRRPAITTFRPLTDNDRGAGHGFERVQWLGAGRYARCVDNVLEQIDDSTLKGTYT

YELATAQRTKVTVSYTAHTDGRVNLHVEYPGEQGDLPTIPAFGIEWTLPVQYTNLRFFGTGPAETYLDRKHAKLGVWSTNAFA

DHAPYLMPQETGNHEDVRWAEITDDHGHGMRVSRADGAAPFAVSLLPYSSFMLEEAQHQDELPKPKHMFLRVLAAQMGVGGDD

SWMSPVHPQYHIPADKPISLDVDLELI

SEQ ID No. 23

MDADIKWLDEPETFRVNQLPAHSDHYYYGNYDEWRHNNSRFAQNLDGQWQFNFAENLRERENDFYKMDYDSSSFGTIEVPSEI

ELNNYAQNNYINTLIPWEGKIYRRPAYTLSPDDAQEGSFSDGDDNTIGEYLKHFDLDPSLRGKQVRIRFDGVERAMYVWLNGH

FIGYAEDSFTPSEFDLTPYIQDEGNVLAVEVFKHSTASWIEDQDMFRFSGIFRSVNLLAQPLVHVEDLNIRPIVTDNYQDGIF

NVELQLHGEKTGNVNVRVIDNDGNTLVNETHPVDSTVKVQDQFLENVHLWDNHDPYLYQLLIEIRDDEGNLVELVPYRFGFRR

IEINKDHVVLLNGQRLIINGVNRHEWDARRGRAITMDDMTSDIHTFKENNINAVRTCHYPDQIPWYYLCDDNGIYMMAENNLE

SHATWQKMGAIEPSYNVPGSVPQWRDVVVDRARTNYETFKNHPSILFWSLGNESYAGDNIVKMNEFYKKHDDSRLVHYEGVCH

TPEYRDRISDVESWMYLPPKEVEEYLKNNPDKPFMECEYMHDMGNSDGGMGSYISLLDKYPQYFGGFIWDFIDQALLVKDPVS

GQEVMRYGGDFDDRHSDYEFSGDGLMFADRTPKPAMQEVRYYYGLHK

SEQ ID No. 24

MAYTNKLRVIYGDATLGLSGDGFHYIFSYERGGLESLKLNGKEWLYREPMPTFWRATTDNDRGSGFNIRSAQWLAADTFHKCV

GIDLTVDNQHFAELPIAPITNEFSDPVSAESVKIKYTFATLTVPATQVTVIYEVNGQGEIKVTMHYYGHEDLPGLPVVGMRFI

MPTVATGFDYQGLSGETYPDRMAGATEGTFHVDGLPVTKYLVPQENGMHMATHALTITRDSTQNNADHSREPFSLTVKQDAQP

FAFSCLPYTAEELENATHIEELPLARRTVLVVAGAVRGVGGIDSWGADVEEQYHIPADRDVEFSFVLNAK

SEQ ID No. 25

MSNKLVKEKRVDQADLAWLTDPEVYEVNTIPPHSDHESFQSQEELEEGKSSLVQSLDGNWLIDYAENGQGPINFYAEDFDDSN

FKSVKVPGNLELQGFGQPQYVNIQYPWDGSEEIFPPQVPSKIPLASYVRYFDLDEALWDKEVSLKFAGAATAIYVWLNGHFVG

YGEDSFTPSEFMVTKFLKKEGNRLAVALYKYSSASWLEDQDFWRLSGLFRSVTLEAKPLLHLEDLKLTASLTDNYQKGKLEVE

ANIAYRLPNASFKLEVRDSEGDLVAEKVGPIRSEKLDFSLADLPVAAWSAEKPNLYQVRLYLYQAGSLLEVSRQEVGFRNFEL

-continued

KDGIMYLNGQRIVFKGVNRHEFDSKLGRAITEADMIWDIKTMKQSNINAVRCSHYPNQSLFYRLCDKYGLYVIDEANLESHGT
WEKVGHEDPSFNVPGDDQHWLGASLSRVKNMMARDKNHASILIWSLGNESYAGTVFAQMADYVRKADPTRVQHYEGVTHNRKF
DDATQIESRMYAPAKEIEEYLTKKPAKPFISVEYAHAMGNSVGDLAAYTALEKYPHYQGGFIWDWIDQGLEKDGHLLYGGDFD
DRPTDYEFCGDGLVFADRTTSPKLANVKALYSNLKLEVKDGQLFIKNDNLFTNSSAYYFLTSLLVDGKLTYQSQPLTFGLEPG
ESGTFALPWPEVEDEKGEIVYQVTAHLKEDLPWADEGFTVARAEEAVTKLPEFYPAGRPELVDSDFNLGLKGNGFRILFSKAK
GWPVSIKYAGREYLKRLPEFTFWRALTDNDRGAGYGYDLAKWENAGKYARLQDISYEIKENSALVKTTFTLPVALKGDLTITY
EVDSLGKIAVTANFPGAVENGLLPAFGLNFALPKELSDYRYYGLGPNESYADRLEGSYLGIYQGMVEKNFTPYLRPQEAGNRS
KVRYYQLFDEEGGLEFTANGADLNLSALPYSAAQIEAADHAFELTNNYTWVRALAAQMGVGGDDSWGQKVHPEFCLDAQEARQ
LKLVIQPLLLK

SEQ ID No. 26
MQANINWLDNPEVFRVNQLPAHSDHPFFRDYREWQKQHSSYQQSLNGKWKFHFSANPMDRPQDFYQRDFDSSNFDSIPVPSEI
ELSNYTQNQYINVLFPWEGKIFRRPAYALDPNDHEEGSFSKGADNTVGSYLKRFDLSSALIGKDVHIKFEGVEQAMYVWLNGH
FVGYAEDSFTPSEFDLTPYIQEKDNLLAVEVFKHSTASWLEDQDMFRFSGIFRSVELLGIPATHLMDMDLKPRVADNYQDGIF
NLKLHFIGKKAGSFHLLVKDIKGHTLLEKNEDIKENVQINNEKFENVHLWNNHDPYLYQLLIEVYDEQQNLLELIPFQFGFRR
IEISPEKVVLLNGKRLIINGVNRHEWDAKRGRSITMSDMTTDINTFKENNINAVRTCHYPNQIPWYYLCDQNGIYVMAENNLE
SHGTWQKMGEIEPSDNVPGSIPQWKEAVIDRARNNYETFKNHTSILFWSLGNESYAGDNIIAMNEFYKSHDDTRLVHYEGVVH
RPELKDKISDVESCMYLPPKKVEEYLQNDPPKPFMECEYMHDMGNSNGGMDSYIKLLDKYPQYFGGFIWDFIDQALLVHDEIS
GHDVLRYGGDFDDRHSDYEFSGDGLMFADRKPKPAMQEVRYYYGLHK

SEQ ID No. 27
MDYTNNQLHIIYGDATFGVNGKDFQYIFSYERGGLESLKVHGKEWLYRVPTPTFWRATTDNDRGSGFNLKAAQWLGADMFTKC
TDIHLKVDRHDFAELPIAPFNNKFSNHEYAKSAEISFTYQTLTTPATNAKIIYNIDDGGHIKVTMRYYGKKGLPPLPVIGIRL
IMPTAATGFDYEGLSGETYPDRMAGAKEGKFHIDGLPVTEYLVPQENGMHMQTKKLTINRETTQNNVDRTNEKFSLSIQQAEK
PFNFSCLPYTAEELENATHIEELPLVRRTVLVIAGAVRGVGGIDSWGTDVESAYHINPDLDHEFSFILN

SEQ ID No. 28
MKANIKWLDDPEVFRINQLPAHSDHPFYKDYREWQKHSSSFKQSLNGAWQFHFSKDPQSRPIDFYKLSFDSSSFDTIPVPSEI
ELNGYAQNQYTNILYPWESKIYRKPAYTLGRGIKDGDFSQGKDNTVGSYLKHFDLNPALAGHDIHIQFEGVERAMYVYLNGHF
IGYAEDSFTPSEFDLTPYIQAKDNILAVEVFKHSTASWLEDQDMFRFSGIFRSVELLALPRTHLMDLDIKPTVVNDYHDGVFN
AKLHFMGKTSGNVHVLIEDIDGKTLLNKKLPLKSTVEIENETFANVHLWDNHDPYLYQLIIEVHDQDGKLVELIPYQFGFRKI
EITKDHVVLLNGKRLIINGVNRHEWDAKRGRSITLADMKQDIATFKHNNINAVRTCHYPNQIPWYYLCDQNGIYMMAENNLES
HGTWQKLGQVEATSNVPGSIPEWREVVVDRARSNYETFKNHTAILFWSLGNESYAGSNIAAMNKLYKDHDSSRLTHYEGVFHA
PEFKKEISDLESCMYLPPKEAEEYLQNPKKPLVECEYMHDMGNSDGGIGSYIKLIDKYPQYMGGFIWDFIDQALLVHDPVSGQ
DVLRYGGDFDDRHSDYEFSGDGLMFADRTPKPAMQEVRYYYGLHK

SEQ ID No. 29
MAYTNNLHVVYGEASLGVNGQDFAYLFSYERGVLESLKIKDKEWLYRTPTPTFWRATTDNDRGSGFNQKAAQWLGADMFTKCV
GIHVQVDDHQFDELPIAPINNQFSNQEFAHEVKVAFDYETLTTPATKVKIIYNINDAGHMTITMHYFGKKGLPPLPVIGMRFI
MPTKAKSFDYTGLSGETYPDRMAGAERGTFHIDGLPVTKYLVPQENGMHMQTNELVITRNSTQNNADKDGDFSLKITQTKQPF
NFSLLPYTAEELENATHIEELPLARRSVLVIAGAVRGVGGIDSWGSDVEEQYHIDPEQDHEFSFTLN

SEQ ID No 30
MNMTKIQTYLNDPKIVSVNTVDAHSDHKYFESLEEFSEGEMKLRQSLNGKWKIHYAQNTNQVLKDFYKTEFDETDLNFINVPG
HLELQGFGSPQYVNTQYPWDGKEFLRPPQVPQESNAVASYVKHFTLNDALKDKKVFISFQGVATSIFVWVNGNFVGYSEDSFT
PSEFEISDYLVEGDNKLAVAVYRYSTASWLEDQDFWRLYGIFRDVYLYAIPKVHVQDLFVKGDYDYQTKAGQLDIDLKTVGDY
EDKKIKYVLSDYEGIVTEGDASVNGDGELSVSLENLKIKPWSAESPKLYDLILHVLDDDQVVEVVPVKVGFRRFEIKDKLMLL
NGKRIVFKGVNRHEFNARTGRCITEEDMLWDIKVMKQHNINAVRTSHYPNQTRWYELCDEYGLYVIDEANLETHGTWQKLGLC

-continued

EPSWNIPASEPEWLPACLDRANNMFQRDKNHASVIIWSCGNESYAGKDIADMADYFRSVDNTRPVHYEGVAWCREFDYITDIE
SRMYAKPADIEEYLTTGKLVDLSSVSDKHFASGNLTNKPQKPYISCEYMHTMGNSGGGLQLYTDLEKYPEYQGGFIWDFIDQA
IYKTLPNGSEFLSYGGDWHDRPSDYEFCGNGIVFADRTLTPKLQTVKHLYSNIKIAVDEKSVTIKNDNLFEDLSAYTFLARVY
EDGRKVSESEYHFDVKPGEEATFPVNFVVEASNSEQIYEVACVLREATKWAPKGHEIVRGQYVVEKISTETPVKAPLNVVEGD
FNIGIQGQNFSILLSRAQNTLVSAKYNGVEFIEKGPKLSFTRAYTDNDRGAGYPFEMAGWKVAGNYSKVTDTQIQIEDDSVKV
TYVHELPGLSDVEVKVTYQVDYKGRIFVTANYDGKAGLPNFPEFGLEFAIGSQFTNLSYYGYGAEESYRDKLPGAYLGRYETS
VEKTFAPYLMPQESGNHYGTREFTVSDDNHNGLKFTALNKAFEFSALRNSTEQIENARHQYELQESDATWIKVLAAQMGVGGD
DSWGAPVHDEFLLSSADSYQLSFMIEPLN

SEQ ID No 31
MNNKLAQVKRVDQADLAWLTDPEIYEVNTIPPHSDHESFQSLEELEEGKSSLVQSLDGDWLIDYAENGEGPANFYEENFDDSS
FKSVKVPGNLELQGFGQPQYVNVQYPWDGSDEIFPPMIPSKNPVASYVRYFDLEEAFWDKEVSLKFAGAATAIYVWLNGHFVG
YGEDSFTPSEFMVTKFLKKEGNRLAVALYKYSSASWLEDQDFWRMSGLFRSVTLEAKPLLHLQDLKLTASLTNDYQKGSLQVE
ADIDYRLPNSSFKLELRDSAGELVAEKVGPIRSEKLDFSLADLPVAAWSAEEPNLYQVRLSLYQQGSLLEVSRQEVGFRNFEL
KDGIMYLNGKRIVFKGVNRHEFDSKLGRAITEADMIWDIKTMKQSNINAVRCSHYPNQSIFYHLCDKYGLYVIDEANLESHGT
WEKVGGHEDPSFNVPGDDQRWLGASLSRVKNMMARDKNHASILIWSLGNESYAGKVFAQMADYVRQADPTRVQHYEGVTHNRK
FDDATQIESRMYAPAKEIEEYLTKKPAKPFVSCEYAHAMGNSVGDLAAYTALEKYPHYQGGFIWDWIDQGLEKEGHLLYGGDF
DDRPSDYEFCGDGLVFADRTTSPKLANVKALYSNLKLELKDGQLFLKNDNLFTNSSAYYFLTSLLVDGKLTYQSQPLTFALEP
GESGTFALPWPEVEDEKGEIVYQVTAHLKEDLPWADEGFTVAEAEEAVTKLPEFYPAGRPELVDSDYNLGIKGNGFRILFSKA
KGWPVSIKYAGREYLKRLPEFTFWRALTDNDRGAGYGYDLAKWENAGKYARLQDISYEIKENSVLVKTAFTLPVALKGDLTIT
YEVDSLGKIAVTANFPGAVENGLLPAFGLNFALPKELSDYRYYGLGPNESYADRLEGSYLGIYQGAVEKNFTPYLRPQEVGNR
SKVRYYQLFDEEGGLEFTANGANLNLSALPYSAAQIEAADHAFELTNNYTWVRALAAQMGVGGDDSWGQKVHPEFCLDAQEAR
QLKLVIQPLFTE

SEQ ID NO: 32
MADTAELAIVHATTASASWLTDPTVFAANRKPAHSSHRYVIGETSEPKQSLDGEWKVRIEQARNVDVESAPFAAVDFEDGDFG
AIEVPGHLQMAGYLKNKYVNIQYPWDGHEDPQAPNIPENNHVAIYRRRFALDAQLARTLENDGTVSLTFHGAATAIYVWLDGT
FVGYGEDGFTPSEFDVTEALRNGNGNAADSPEAEHTLTVACYEYSSASWLEDQDFWRLHGLFRTVELAAQPHTHVETVQLEAD
YTAADTAGTADTAELNAALTLRNPADAMTIESTLRDGDGNVVWESTQACNGEIALNSGKMTNIAPWSAESPTLYTLTVRVVGH
DGAIIETVTQKIGFRTFRIENGIMTLNGKRIVFKGADRHEFDAKRGRAITREDMLSDVVFCKRHNINAIRTSHYPNQEYWYDL
CDEYGLYLIDETNMETHGTWVANNVERPEDGIPGSRPEWEDACVDRINSMMRRDYNHPSVLIWSLGNESSAGEVFRAMYRHAH
TIDPNRPVHYEGSVHMREFEDVTDIESRMYAHADEIERYLNDGSPAHTDGPKKPYISCEYMHAMGNSCGNMDEYTALERYPMY
QGGFIWDFIDQAIETKLPDGTTRMCYGGDFGDRPSDYEFSGDGLLFADRTPSPKAQEVKQLYANVKIAVSVDEARITNDNLFV
STGDYRFVLRILADGKPVWSTTRRFDVAAGESASFEVDWPVDDYRSNAEELVLEVSQQLGNACDWAPAGYELAFGQCVVAGAK
TTADAVDAAGAPADGTVTLGRWNAGVRGQREALFSRTQGGMVSYTFGEREFVLRRPSITTFRPLTDNDRGAGHAFERAAWAV
AGKYARCVDCAIANRGENAVEATYTYELAIPQRTKVTVRYVADTAGLVSLDVEYPGEKNGDLPTIPAFGIEWALPVEYANLRF
YGAGPEETYADRRHAKLGVWSTTAGDDCAPYLLPQETGNHEDVRWAEITDDSGHGVRVKRGAGAKPFAMSLLPYSSTMLEEAL
HQDELPKPRHMFLRLLAAQMGVGGDDSWMSPVHEQYQLPADQPLSLNVQLKLF

SEQ ID NO: 33
MANETRIERASETWLADSTVFEVNRVPAHSDHKCYAHDSQTNEWSDLRQSLDGEWRVEVVQASDIEFNEEPFVRENFDDSAFE
RIQVPGHLQMAGLMNNKYVNIQYPWDGHENPAEPNIPENNHVALYRKTFTMANRLADTKNAGGTVSIVFHGMATAIYVWVNGM
FVGYGEDGFTPNEFDITEMLHDGENVVAVACYEYSSASWLEDQDFWRLHGLFRSVELAAQPHVHIENMQIESDWDPESGSASL
DAALTVRNAADAATISATLKDSDGNVVWETANCADPDTSISTGSLNGIRPWSAEDPVLYEFEVTVIDHAGNIAEVAVQKVGFR
RFRIEDGIMTINGKRIVFKGADRHEFDPKRGRAITEQDMIDDVVFCKRHNLNAIRTSHYPNQERWYELCDEYGIYLIDETNLE

-continued

THGSWCLPGDVLTEETAVPGSKAHWEGACVDRVNSMVRRDYNHPSVLIWSLGNESYTGDVFRAMYKRVHDIDPNRPVHYEGVT

HNRDYNDVTDIETRMYAHADAIEEYLKNDPQKPYISCEYMHAMGNSCGNMDEYTALERYPKYQGGFIWDFIDQAIYATQPDGT

TSLRYGGDFGDRPSDYEFSGNGLVFADRKPTPKAQEVKQLYSNVHIDVAEDSVTIKNDNLFTSTGEYTFVLRVLADGEPVWQS

ERRFDVPAGSTEKLDVDWPLDLYRDGASELVLEVSQRLAKATNWAVAGYELAFGQTVVAGSKKASAPVKPVDGIVTVGRWNVG

VQQGSGREVLLSRTQGGLVSYTFNNREFVLRRPAVTTFRALTDNDRGAGHGFERAQWLGAGRYARCIGNEIEQIDENTVKASYT

YELATPQRTKVTVSYTADTTGRVNLHVEYPGEPGDLPTIPAFGIEWTLPVQYSNLRFFGAGPEETYQDRKHAKLGVWSTDAFK

DHAPYLMPQETGNHEDVRWAEITDEKGHGLRISRAEGAEPFAMSLQPYSSFMLEEAQHQDELPAPKHMFLRVLAEQMGVGGDD

SWMSPVHPQYHIPADQPISLDVDLDLI

SEQ ID NO: 34
MSNKLVKEKRVDQADLAWLTDPEVYEVNTIPPHSDHESFQSQEELEEGKSSLVQSLDGDWLIDYAENGQGPVNFYAEDFDDSN

FKSVKVPGNLELQGFGQPQYVNVQYPWDGSEEIFPPQIPSKNPLASYVRYFDLDEAFWDKEVSLKFDGAATAIYVWLNGHFVG

YGEDSFTPSEFMVTKFLKKENNRLAVALYKYSSASWLEDQDFWRMSGLFRSVTLQAKPRLHLEDLKLTASLTDNYQKGKLEVE

ANIAYRLPNASFKLEVRDSEGDLVAEKLGPIRSEQLEFTLADLPVAAWSAEKPNLYQVRLYLYQAGSLLEVSRQEVGFRNFEL

KDGIMYLNGQRIVFKGANRHEFDSKLGRAITEEDMIWDIKTMKRSNINAVRCSHYPNQSLFYRLCDKYGLYVIDEANLESHGT

WEKVGGHEDPSFNVPGDDQHWLGASLSRVKNMMARDKNHASILIWSLGNESYAGTVFAQMADYVRKADPTRVQHYEGVTHNRK

FDDATQIESRMYAPAKVIEEYLTNKPAKPFISVEYAHAMGNSVGDLAAYTALEKYPHYQGGFIWDWIDQGLEKDGHLLYGGDF

DDRPTDYEFCGNGLVFADRTESPKLANVKALYANLKLEVKDGQLFLKNDNLFTNSSSYYFLTSLLVDGKLTYQSRPLTFGLEP

GESGTFALPWPEVADEKGEVVYRVTAHLKEDLPWADEGFTVAEAEEVAQKLPEFKPEGRPDLVDSDYNLGLKGNNFQILFSKV

KGWPVSLKYAGREYLKRLPEFTFWRALTDNDRGAGYGYDLARWENAGKYARLKDISCEVKEDSVLVKTAFTLPVALKGDLTVT

YEVDGRGKIAVTADFPGAEEAGLLPAFGLNLALPKELTDYRYYGLGPNESYPDRLEGNYLGIYQGAVKKNFSPYLRPQETGNR

SKVRWYQLFDEKGGLEFTANGADLNLSALPYSAAQIEAADHAFELTNNYTWVRALSAQMGVGGDDSWGQKVHPEFCLDAQKAR

QLRLVIQPLLLK

SEQ ID NO: 35
MSNKLVKEKRVDQADLAWLTDPEVYEVNTIPPHSDHESFQSQEELEEGKSSLVQSLDGDWLIDYAENGQGPVNFYAEDFDDSN

FKSVKVPGNLELQGFGQPQYVNVQYPWDGSEEIFPPQIPSKNPLASYVRYFDLDEAFWDKEVSLKFDGAATAIYVWLNGHFVG

YGEDSFTPSEFMVTKFLKKENNRLAVALYKYSSASWLEDQDFWRMSGLFRSVTLQAKPRLHLEDLKLTASLTDNYQKGKLEVE

ANIAYRLPNASFKLEVRDSEGDLVAEKLGPIRSEQLEFTLADLPVAAWSAEKPNLYQVRLYLYQAGSLLEVSRQEVGFRNFEL

KDGIMYLNGQRIVFKGANRHEFDSKLGRAITEEDMIWDIKTMKRSNINAVRCSHYPNQSLFYRLCDKYGLYVIDEANLESHGT

WEKVGGHEDPSFNVPGDDQHWLGASLSRVKNMMARDKNHASILIWSLGNESYAGTVFAQMADYVRKADPTRVQHYEGVTHNRK

FDDATQIESRMYAPAKVIEEYLTNKPAKPFISVEYAHAMGNSVGDLAAYTALEKYPHYQGGFIWDWIDQGLEKDGHLLYGGDF

DDRPTDYEFCGNGLVFADRTESPKLANVKALYANLKLEVKDGQLFLKNDNLFTNSSSYYFLTSLLVDGKLTYQSRPLTFGLEP

GESGTFALPWPEVADEKGEVVYRVTAHLKEDLPWADEGFTVAEAEEVAQKLPEFKPEGRPDLVDSDYNLGLKGNNFQILFSKV

KGWPVSLKYAGREYLKRLPEFTFWRALTDNDRGAGYGYDLARWENAGKYARLKDISCEVKEDSVLVKTAFTLPVALKGDLTVT

YEVDGRGKIAVTADFPGAEEAGLLPAFGLNLALPKELTDYRYYGLGPNESYPDRLEGNYLGIYQGAVKKNFSPYLRPQETGNR

SKVRWYQLFDEKGGLEFTANGADLNLSALPYSAAQIEAADHAFELTNNYTWVRALSAQMGVGGDDSWGQKVHPEFCLDAQKAR

QLRLVIQPLLLK

SEQ ID NO: 36
MNMTEKIQTYLNDPKIVSVNTVDAHSDHKYFESLEEFSEGEMKLRQSLNGKWKIHYAQNTNQVLKDFYKTEFDETDLNFINVP

GHLELQGFGSPQYVNTQYPWDGKEFLRPPQVPQESNAVASYVKHFTLNDALKDKKVFISFQGVATSIFVWVNGNFVGYSEDSF

TPSEFEISDYLVEGDNKLAVAVYRYSTASWLEDQDFWRLYGIFRDVYLYAIPKVHVQDLFVKGDYDYQTKAGQLDIDLKTVGD

YEDKKIKYVLSDYEGIVTEGDASVNGDGELSVSLENLKIKPWSAESPKLYDLILHVLDDDQVVEVVPVKVGFRRFEIKDKLML

LNGKRIVFKGVNRHEFNARTGRCITEEDMLWDIKVMKQHNINAVRTSHYPNQTRWYELCDEYGLYVIDEANLETHGTWQKLGL

-continued

CEPSWNIPASEPEWLPACLDRANNMFQRDKNHASVIIWSCGNESYAGKDIADMADYFRSVDNTRPVHYEGVAWCREFDYITDI

ESRMYAKPADIEEYLTTGKLVDLSSVSDKHFASGNLTNKPQKPYISCEYMHTMGNSGGGLQLYTDLEKYPEYQGGFIWDFIDQ

AIYKTLPNGSEFLSYGGDWHDRPSDYEFCGNGIVFADRTLTPKLQTVKHLYSNIKIAVDEKSVTIKNDNLFEDLSAYTFLARV

YEDGRKVSESEYHFDVKPGEEATFPVNFVVEASNSEQIYEVACVLREATEWAPKGHEIVRGQYVVEKISTETPVKAPLNVVEG

DFNIGIQGQNFSILLSRAQNTLVSAKYNGVEFIEKGPKLSFTRAYTDNDRGAGYPFEMAGWKVAGNYSKVTDTQIQIEDDSVK

VTYVHELPGLSDVEVKVTYQVDYKGRIFVTANYDKAGLPNFPEFGLEFAIGSQFTNLSYYGYGAEESYRDKLPGAYLGRYET

SVEKTFAPYLMPQESGNHYGTREFTVSDDNHNGLKFTALNKAFEFSALRNSTEQIENARHQYELQESDATWIKVLAAQMGVGG

DDTWGAPVHDEFLLSSADSYQLSFMIEPLN

SEQ ID NO: 37

MNMTEKIQTYLNDPKIVSVNTVDAHSDHKYFESLEEFSEGEMKLRQSLNGKWKIHYAQNTNQVLKDFYKTEFDETDLNFINVP

GHLELQGFGSPQYVNTQYPWDGKEFLRPPQVPQESNAVASYVKHFTLNDALKDKKVFISFQGVATSIFVWVNGNFVGYSEDSF

TPSEFEISDYLVEGDNKLAVAVYRYSTASWLEDQDFWRLYGIFRDVYLYAIPKVHVQDLFVKGDYDYQTKAGQLDIDLKTVGD

YEDKKIKYVLSDYEGIVTEGDASVNGDGELSVSLENLKIKPWSAESPKLYDLILHVLDDDQVVEVVPVKVGFRRFEIKDKLML

LNGKRIVFKGVNRHEFNARTGRCITEEDMLWDIKVMKQHNINAVRTSHYPNQTRWYELCDEYGLYVIDEANLETHGTWQKLGL

CEPSWNIPASEPEWLPACLDRANNMFQRDKNHASVIIWSCGNESYAGKDIADMADYFRSVDNTRPVHYEGVAWCREFDYITDI

ESRMYAKPADIEEYLTTGKLVDLSSVSDKHFASGNLTNKPQKPYISCEYMHTMGNSGGGLQLYTDLEKYPEYQGGFIWDFIDQ

AIYKTLPNGSEFLSYGGDWHDRPSDYEFCGNGIVFADRTLTPKLQTVKHLYSNIKIAVDEKSVTIKNDNLFEDLSAYTFLARV

YEDGRKVSESEYHFDVKPGEEATFPVNFVVEASNSEQIYEVACVLREATEWAPKGHEIVRGQYVVEKISTETPVKAPLNVVEG

DFNIGIQGQNFSILLSRAQNTLVSAKYNGVEFIEKGPKLSFTRAYTDNDRGAGYPFEMAGWKVAGNYSKVTDTQIQIEDDSVK

VTYVHELPGLSDVEVKVTYQVDYKGRIFVTANYDKAGLPNFPEFGLEFAIGSQFTNLSYYGYGAEESYRDKLPGAYLGRYET

SVEKTFAPYLMPQESGNHYGTREFTVSDDNHNGLKFTALNKAFEFSALRNSTEQIENARHQYELQESDATWIKVLAAQMGVGG

DDTWGAPVHDEFLLSSADSYQLSFMIEPLN

SEQ ID NO: 38

MNMTEKIQTYLNDPKIVSVNTVDAHSDHKYFESLEEFSEGEMKLRQSLNGKWKIHYAQNTNQVLKDFYKTEFDETDLNFINVP

GHLELQGFGSPQYVNTQYPWDGKEFLRPPQVPQESNAVASYVKHFTLNDALKDKKVFISFQGVATSIFVWVNGNFVGYSEDSF

TPSEFEISDYLVEGDNKLAVAVYRYSTASWLEDQDFWRLYGIFRDVYLYAIPKVHVQDLFVKGDYDYQTKAGQLDIDLKTVGD

YEDKKIKYVLSDYEGIVTEGDASVNGDGELSVSLENLKIKPWSAESPKLYDLILHVLDDDQVVEVVPVKVGFRRFEIKDKLML

LNGKRIVFKGVNRHEFNARTGRCITEEDMLWDIKVMKQHNINAVRTSHYPNQTRWYELCDEYGLYVIDEANLETHGTWQKLGL

CEPSWNIPASEPEWLPACLDRANNMFQRDKNHASVIIWSCGNESYAGKDIADMADYFRSVDNTRPVHYEGVAWCREFDYITDI

ESRMYAKPADIEEYLTTGKLVDLSSVSDKHFASGNLTNKPQKPYISCEYMHTMGNSGGGLQLYTDLEKYPEYQGGFIWDFIDQ

AIYKTLPNGSEFLSYGGDWHDRPSDYEFCGNGIVFADRTLTPKLQTVKHLYSNIKIAVDEKSVTIKNDNLFEDLSAYTFLARV

YEDGRKVSESEYHFDVKPGEEATFPVNFVVEASNSEQIYEVACVLREATEWAPKGHEIVRGQYVVEKISTETPVKAPLNVVEG

DFNIGIQGQNFSILLSRAQNTLVSAKYNGVEFIEKGPKLSFTRAYTDNDRGAGYPFEMAGWKVAGNYSKVTDTQIQIEDDSVK

VTYVHELPGLSDVEVKVTYQVDYKGRIFVTANYDKAGLPNFPEFGLEFAIGSQFTNLSYYGYGAEESYRDKLPGAYLGRYET

SVEKTFAPYLMPQESGNHYGTREFTVSDDNHNGLKFTALNKAFEFSALRNSTEQIENARHQYELQESDATWIKVLAAQMGVGG

DDTWGAPVHDEFLLSSADSYQLSFMIEPLN

EXAMPLES

Example 1

Lactose Consumption of Strain DSM 28889

To study lactose consumption, strain DSM 28889 and ancestor DSM 22934 were grown anaerobically in a chemically defined medium (CDM) containing 20 g/L lactose, 1 g/L Na-acetate, 0.6 g/L $NH_4$-citrate, 3 g/L $KH_2PO_4$, 2.5 g/L $K_2HPO_4$, 0.24 g/L urea, 0.42 g/L $NaHCO_3$, 0.2 g/L $MgCl_2 \cdot 6 H_2O$, 0.05 g/L $CaCl_2 \cdot 2H_2O$, 0.028 g/L $MnSO_4H_2O$, 0.005 g/L $FeCl_2 \cdot 4H_2O$, as well as trace elements consisting of 7.7 µM HCl, 1.5 mg/L $FeCl_2 \cdot 4H_2O$, 70 µg/L $ZnCl_2$, 100 µg/L $MnCl_2 \cdot 4H_2O$, 6 µg/L $H_3BO_3$, 190 µg/L $CoCl_2 \cdot 6H_2O$, 2 µg/L $CuCl_2 \cdot 2H_2O$, 24 µg/L $NiCl_2 \cdot 6H_2O$ and vitamins consisting of 1 mg/L Pyridoxine-HCl, 0.5 mg/L p-Aminobenzoic acid, 0.5 mg/L Nicotinic acid, 4 mg/L Ca-DL-pantothenate, 0.5 mg/L Thiamine, 0.5 mg/L Lipoic acid, 0.5 mg/L Riboflavin, 0.2 mg/L Biotin, 0.2 mg/L Folic acid, 0.01 mg/L Vitamin B12, in addition to 0.01 mg/L of each of the four nucleobases adenine, guanine, uracil and xanthine, 0.5 g/L cysteine, 0.08 mg/L of each of the L-amino acids alanine, arginine, asparagine, aspartic acid, glutamine, glutamic acid, glycine, histidine, isoleucine, leucine, lysine, methionine, phenylalanine, proline, serine, threonine, tryptophan, tyrosine, valine. For strain DSM 28889 sucrose at a concentration of 0.05% w/v was also included. The procedure consisted of dissolving salts, adjusting pH to 6.6, flushing with a $N_2/CO_2$ mix (80/20) for 40 min, aliquoting into sterile serum bottles, flushing the head space for 5-10 minutes, sealing of bottles and autoclaving at 121° C. for 20 minutes. Lactose, cysteine, $MgCl_2 \cdot 6 H_2O$ and $CaCl_2 \cdot 2H_2O$ were dissolved in anoxic water in separate serum bottles, headspace flushed with $N_2$ for 10 minutes and autoclaved as described above (lactose only for 10 minutes). Vitamin solution, trace element solution, urea solution and nucleobase solution were sterile filtered into separate autoclaved $N_2$ flushed serum bottles. Amino acids were dissolved individually and mixed in a serum bottle, headspace flushed with $N_2$ for 10 min and autoclaved at 121° C. for 10 minutes. Just prior to experiment execution lactose, $MgCl_2 \cdot 6 H_2O$, $CaCl_2 \cdot 2H_2O$, urea, vitamin solution, amino acid mix and nucleobases were added sterile to anaerobic salt solution. Finally, cysteine was added sterile to lower the redox potential.

Pre-cultures for the growth experiment in CDM were grown overnight anaerobically in CDM in serum flasks at 40° C. in dilution series such that the bacteria were in exponential phase growth, i.e. at an $OD_{600}$ of 0.8-1.2, just prior to inoculation. From precultures bacteria were inoculated into anaerobic CDM containing serum flasks to an $OD_{600}$ of around 0.07 and incubated at 40° C. Samples were taken for $OD_{600}$ measurement and HPLC analysis of extracellular lactose, galactose and glucose concentrations along the growth curve (FIG. 1).

The ancestral strain, DSM 22934, consumes around 46% of the lactose over the course of just over 24 hours of fermentation, while DSM 28889 consumes all lactose before 10 hours has passed. The strain DSM 22934 utilizes glucose, the product of lactose hydrolysis, for growth while excreting the galactose, as can be seen from their extracellular concentrations. On the contrary DSM 28889, both galactose and glucose are secreted while a part of galactose is utilized for growth. Hence, the lactose uptake and beta-galactosidase activity are much higher for strain DSM 28889 than ancestral DSM 22934.

Strain DSM 28889 is herein used as an example of a lactic acid bacterium, in particular as an example of a *Streptococcus* strain or a *Streptococcus thermophilus* strain. Similar results can be also obtained for other *Streptococcus thermophilus* strains, such as DSM 25850, DSM 25851, DSM 26722 or DSM 32227 strains, and for *Lactobacillus delbrueckii* susp. *bulgaricus* strains, such as DSM 26420 or DSM 26421 strains.

Example 2

Beta-Galactosidase Gene Expression in DSM 28889

From the CDM-grown cultures described in Example 1 triplicate samples were taken for transcriptional profiling for both strains at three different time points, corresponding to mid-log, late-log and stationary growth phases. For DSM 22934 samples were harvested around $OD_{600}$ 1.1, 2.1 and 3.2, while for DSM 28889 samples were harvested around $OD_{600}$ 0.5, 1.0 and for the third time point 2.3-3.0 (FIG. 1). The $OD_{600}$ values at harvest differ between strains in order to harvest at similar growth phases as DSM 28889 displays a slower growth rate and final $OD_{600}$ value than DSM 22934. A 1:2 volume of cell culture to RNAprotect (Qiagen) was rigorously mixed at cell harvest, centrifuged at 10,000 g, liquid was aspirated, and cell pellets stored at −80° C. Cells pellet was dissolved in TE buffer containing lysozyme (15 mg/mL), proteinase K (20 mg/mL) and mutanolysin (250 U/λL) and incubated at 37° C. shaking at 1400 rpm for 10 minutes. The subsequent RNA extraction procedure was performed with the RNeasy Protect Bacteria Mini Kit (Qiagen) as per the manufacturer's instructions, including removal of DNA with DNAse I. Total RNA was evaluated with a Bioanalyzer (Agilent) and ribosomal RNA depletion and 50 bp sequencing (Illumina) thereafter performed at Genewiz (USA). Obtained raw reads were trimmed with Trimmomatic using default parameters, trimmed reads mapped using CLC Genomics Workbench (default parameters) and unique gene counts extracted. Differential gene expression was analyzed using DESeq2 within the SARTools framework with default parameters.

Comparison of expression data between growth phases and strains reveal very high expression of the two lac operon genes, lacZ and lacS, in DSM 28889 (FIG. 2). The lacZ gene is the highest expressed gene in both mid-log and late-log growth phases and the $7^{th}$ highest in stationary phase for DSM 28889. For all samples the median gene expression level is around 250 and the lacZ expression (normalized gene count, 194834) is therefore almost 1,000 times higher than the median gene expression during DSM 28889 mid-log phase. Compared to DSM 22934, the expression of lacZ is 8-folds and 5.2-fold higher in mid-log and late-log growth phases, while in the stationary phase no statistically significant fold change is observed. Similar fold changes are observed for lacS, part of the lac operon.

Strain DSM 28889 is herein used as an example of a lactic acid bacterium, in particular as an example of a *Streptococcus* strain or a *Streptococcus thermophilus* strain. Similar results can be also obtained for other *Streptococcus thermophilus* strains, such as DSM 25850, DSM 25851, DSM 26722 or DSM 32227 strains, and for *Lactobacillus delbrueckii* susp. *bulgaricus* strains, such as DSM 26420 or DSM 26421 strains.

Example 3

Pulse Feeding Fermentation in DASGIP System

Two rounds (R1, R2) of anaerobic fermentations, performed in different days, were carried out in 200 ml scale for strains e.g. two *Streptococcus thermophilus* (DSM 18111 and DSM 28889). The strains were grown at temperature 40° C. in a suitable media and online titrant consumption was monitored during fermentation to maintain a constant pH. Samples were taken at different time as mentioned in the Table 2 for R1 and Table 3 for R2. 50 ml of 20% (w/v) lactose sterile solution was pulsed into the reactor at exponential phase (BM) and was kept running for an hour before harvesting the cells. Similar procedure was followed for other reactor except the lactose pulse was made at the stationary phase (EOF). Samples from duplicates were pooled and all samples were kept at −50° C. for further analysis e.g. enzyme activity. Results shown in table 4 below.

TABLE 2

Sampling points during the fermentation (R1). Sample taken is marked with 'x'.

| Fermentation | DSM | No Replicates | BM | BM + lac + 1 h | EOF | EOF + lac + 1 h |
|---|---|---|---|---|---|---|
| 1 | 18111 | 2 | x | | | |
| 2 | 18111 | 1 | | | x | |
| 3 | 18111 | 1 | | | | x |
| 4 | 28889 | 2 | | x | | |
| 5 | 28889 | 2 | | | | x |
| 6 | 26420 | 2 | | x | | |
| 7 | 26420 | 2 | | | | x |

TABLE 3

Sampling points during the fermentation (R2). Sample taken is marked with 'x'.[1] Approximately, 50 ml samples were taken.

| Fermentation | DSM | No Replicates | BM[1] | BM + lac + 1 h |
|---|---|---|---|---|
| 1 | 18111 | 2 | x | |
| 2 | 18111 | 2 | | X |
| 3 | 28889 | 2 | x | |
| 4 | 28889 | 2 | | X |

TABLE 4

The measured biomass (OD600) at the end of fermentation (FM1-FM12) of different strains.

| Fermentation FM | DSM | BM OD600 | BM + lac + 1 h OD600 | EOF OD600 | EOF + lac + 1 h OD600 |
|---|---|---|---|---|---|
| 1 | 18111 | 17 | — | — | — |
| 2 | 18111 | 16.4 | — | — | — |
| 3 | 18111 | — | — | 18.3 | — |
| 4 | 18111 | — | — | 19.0 | — |
| 5 | 28889 | — | 10.4 | — | — |
| 6 | 28889 | — | 10.8 | — | — |
| 7 | 28889 | — | — | — | 10.5 |
| 8 | 28889 | — | — | — | 10.5 |
| 9 | 26420 | — | 12 | — | — |
| 10 | 26420 | — | 11.8 | — | — |
| 11 | 26420 | — | — | — | 12.8 |
| 12 | 26420 | — | — | — | 14.6 |

Herein, DSM 28889 is mutant of *S. thermophilus*, DSM 18111 is mother of *S. thermophilus* mutant, DSM 26420 is mutant of *Lb delbreuckii* subspecies *bulgaricus*.
BM is basemax and EOB is end of base.

Example 4

Cell Harvesting and Cell-Free Extract Preparation

After the fermentations, the cells were harvested by centrifugation at 6000 g or 15000 g for 20 min at 4° C. The lactose present in the growth medium was removed by washing the cells with 25 ml of lysis buffer (50 mM NaH$_2$PO$_4$ buffer pH 6.7 containing 10 mM KCl and 1 mM MgCl$_2$). The wet cells mass was measured, and cells were stored at −20° C. until further use. The frozen cells were thawed and resuspended the lysis buffer (50 mM NaH$_2$PO$_4$ buffer pH 6.7 containing 10 mM KCl and 1 mM MgCl$_2$). 1 g of cells was dissolved in 10 ml of the buffer on ice. The cells were broken with sonication using the following parameters: program 1: total duration: 10 min, pulse time: 30 s, off time 40 sec, amplitude: 60 for 50 ml volume or 40 for 20 ml volume. The cell-debris was removed by high speed centrifugation at 15000 g 45 min at 4° C. The clear supernatant was filtered through a filter having pore diameter of 0.2 μm and stored at 4° C. until further use.

Example 5

Protein Expression and Activity Analysis

Protein expression was analyzed by polyacrylamide gel electrophoresis (PAGE) under denaturing conditions using sodium dodecyl sulphate using Mini-PROTEAN® TGX™ Precast gel (Biorad) containing polyacrylamide (7.5-10%). Protein concentrations were also estimated from the SDS-PAGE by making a calibration curve using Precision Plus Protein™ Prestained Standard marker. To measure the beta-galactosidase activity, the clear supernatants were diluted up to 10-50× in buffer A (50 mM NaH$_2$PO$_4$ buffer pH 6.7 containing 10 mM of KCl and 1 mM MgCl$_2$). In a separate reaction, the diluted enzyme was incubated with lactose solution prepared in buffer B (140 mM of lactose prepared in 100 mM sodium-citrate buffer of pH 6.7, containing 100 μM of MgSO$_4$). The reaction mixture was prepared by mixing 13 μL of diluted enzyme and 37 μL of lactose solution in a PCR tube. The reaction mixture was incubated in a DNA thermal cycler with the following incubation parameters (reaction time; 10 min at 37° C., enzyme inactivation; 10 min at 95° C., cooling; 4° C.). The reaction mixtures were stored at −20° C. freezer until further use. To determine the amount of glucose formed during the reaction, 10 μL of the reaction mixture was transferred to one well of standard microtiter plate (Thermo Fischer Scientific, Denmark) containing 80 μL of buffer C (100 mM of NaH$_2$PO4 buffer, pH 7.0, containing glucose oxidase; 0.6 g/L (Sigma Aldrich), 2,2'-azino-bis(3-ethylbenzothiazoline-6-sulfonic acid diammonium salt); ABTS: 1.0 g/L (Sigma Aldrich), horseradish peroxidase; 0.02 g/L (Sigma Adrich)) and incubated at 30° C. for 40 min. After 40 min, the absorbance was determined at 610 nm using SpectroStar Omega UV-plate reader (BMG Labtech, Germany). The absorbance values between 0.1 and 1.5 were used for calculations, if the A610 nm value>1.5, the reaction mixture was diluted up to 10× with buffer A. The reactions were carried out in triplicate and the mean value of the triplicate measurement was used for calculation. Using a known concentration of glucose (0-500 μg/ml), a standard curve was drawn, and the slope of the curve was used to calculate the glucose formed during the reaction. The maximum absorbance value for each lactase was used to determine μmol of glucose formed per min, described as 1 Unit of Activity with Lactose at pH 6.7 at 37° C. (U). The U of activity per gram of wet cell mass or per liter of the fermentation medium was calculated. The amount of produced protein per gram of wet cell pellet was estimated. The results are shown in Table 5 and Table 6 below.

TABLE 5

The measured lactase activity and amount of protein produced per liter of fermentation different strains at basemax (BM) or at the end of base (EOB) conditions.

| Fermentation | DSM | BM + lac + 1 h Activity (U/L) | EOF + lac+ 1 h Activity (U/L) | BM + lac + 1 h Protein concentration (mg/L) | EOF + lac+ 1 h Protein concentration (mg/L) |
|---|---|---|---|---|---|
| 1 | 18111 | 110[#] | — | 3[#] | |
| 2 | 18111 | 379[□] | — | 11[□] | |

TABLE 5-continued

The measured lactase activity and amount of protein produced per liter of fermentation different strains at basemax (BM) or at the end of base (EOB) conditions.

| Fermen-tation | DSM | BM + lac + 1 h Activity (U/L) | EOF + lac+ 1 h Activity (U/L) | BM + lac + 1 h Protein concentration (mg/L) | EOF + lac+ 1 h Protein concentration (mg/L) |
|---|---|---|---|---|---|
| 3 | 18111 | — | 269 | | 8 |
| 4 | 28889 | 1116 | — | 32 | |
| 5 | 28889 | — | 259 | | 7 |
| 6 | 26420 | 7689 | — | 27 | |
| 7 | 26420 | — | 2144 | — | 8 |

1 U of activity is defined as micromoles of glucose formed per minute with 140 mM of lactose as substrate at pH 6.7 at 37 C. Herein, DSM 18111 is mother of S. thermophilus mutant, DSM 28889 is mutant of S. thermophilus, DSM 26420 is mutant of Lb delbreuckii bulgaricus.
BM is basemax and EOF is end of base.
stand for basemax (BM) conditions,
□stand for End of fermentation (EOF) conditions.

TABLE 6

The measured lactase activity and amount of protein produced per gram of cells pellet at basemax (BM) or at the end of base (EOB) conditions.

| Fermen-tation | DSM | BM Activity (U/g of cell pellet) at pH 6.7 | BM + lac + 1 h Activity (U/g of cell pellet) at pH 6.7 | BM Protein concentration (mg/g of cell pellet) | BM + lac + 1 h Protein concentration (mg/g of cell pellet) |
|---|---|---|---|---|---|
| 1 | 18111 | 38 | — | 1.1 | — |
| 2 | 18111 | — | 62 | — | 1.7 |
| 3 | 28889 | 80 | — | 2.3 | — |
| 4 | 28889 | — | 109 | — | 3.2 |

1 U of activity is defined as micromoles of glucose formed per minute with 140 mM of lactose as substrate at pH 6.7 at 37 C. Herein, DSM 18111 is mother of S. thermophilus mutant and DSM28889 is mutant of S. thermophilus.
BM is basemax and EOB is end of base.

Discussion of Results

The underlying regulatory mechanism for this phenotype is likely CcpA (Carbon control Protein A) mediated. CcpA acts as a repressor on the lac operon and supposedly in Streptococcus thermophilus high glycolytic flux leads to CcpA repression of lac operon transcription during midlog growth on lactose, while derepression occur at later growth stages (van den Bogaard et al., 2000). CcpA regulation is a function of certain glycolytic intermediates in many organisms (Deutscher et al., 1995) but is also subject to HPr regulation (FIG. 3). Phosphorylated HPr activates CcpA and its phosphorylation state is dependent on the energy state, e.g. in stationary phase the HPr phosphorylation state is low and thereby CcpA derepression and an increase in lac operon transcription occurs.

The strains herein disclosed are optimized for utilization of galactose only and during lactose growth glucose will be dispelled and galactose partially consumed through the Leloir pathway and the resulting glycolytic flux is thereby low and likely triggers CcpA de-repression and thereby the high observed lac operon expression. The described underlying regulatory mechanisms fits well with the expression pattern of the lac operon over time in the two strains. In DSM 22934 lac operon expression is (relatively) low in mid-log phase (CcpA repression) but increases in stationary phase (decreased CcpA activity mediated by HPr dephosphorylation). In DSM 28889 lac operon expression on the contrary is very high in mid-log phase, most likely due to low glycolytic flux and this effect then subsides in stationary phase where the DSM 22934 and DSM 28889 expression levels converge. Concludingly, as the lac operon expression patterns observed here, is a reflection of the CcpA regulatory network the high lacZ expression level should be general for the genotype of the strains herein disclosed.

REFERENCES

1. Bogaard, P. T. C. van den, 2002. Catabolite control of sugar metabolism in Streptococcus thermophilus. Ph. D. Thesis.
2. Deutscher, J., Küster, E., Bergstedt, U., Charrier, V., Hillen, W., 1995. Protein kinase-dependent HPr/CcpA interaction links glycolytic activity to carbon catabolite repression in gram-positive bacteria. Mol. Microbiol. 15, 1049-53.
3. van den Bogaard, P. T. C., Kleerebezem, M., Kuipers, O. P., de Vos, W. M., 2000. Control of Lactose Transport, beta-Galactosidase Activity, and Glycolysis by CcpA in Streptococcus thermophilus: Evidence for Carbon Catabolite Repression by a Non-Phosphoenolpyruvate-Dependent Phosphotransferase System Sugar. J. Bacteriol. 182, 5982-5989.

Strains

The strains of Streptococcus thermophilus have been deposited at Leibniz Institute DSMZ-German Collection of Microorganisms and Cell cultures Inhoffenstr. 7B 38124 Braunschweig Germany (Deutsche Sammlung von Mikroorganismen and Zellkulturen (DSMZ) GmbH1 Inhoffenstr. 7B, D-38124 Braunschweig, Germany) as follows:

| | | | |
|---|---|---|---|
| CHCC15757 | DSM 25850 | 3 Apr. 2012 | as part of W02013/160413 |
| CHCC15887 | DSM 25851 | 3 Apr. 2012 | as part of W02013/160413 |
| CHCC16404 | DSM 26722 | 12 Dec. 2012 | as part of W02013/160413 |
| CHCC16731 | DSM 28889 | 4 Jun. 2014 | as part of W02017/103051 |
| CHCC19216 | DSM 32227 | 8 Dec. 2015 | as part of W02017/103051 |
| CHCC11976 | DSM 22934 | 8 Sep. 2009 | |
| CHCC6008 | DSM 18111 | 23 Mar. 2006 | |

The strains of Lactobacillus delbrueckii subsp. bulgaricus have been deposited at Leibniz Institute DSMZ-German Collection of Microorganisms and Cell cultures Inhoffenstr. 7B 38124 Braunschweig Germany (Deutsche Sammlung von Mikroorganismen und Zellkulturen (DSMZ) GmbH1 Inhoffenstr. 7B, D-38124 Braunschweig, Germany) as follows:

| | | | |
|---|---|---|---|
| CHCC16159 | DSM 26420 | 6 Sep. 2012 | as part of W02013/160413 |
| CHCC16160 | DSM 26421 | 6 Sep. 2012 | as part of W02013/160413 |

Expert Solution

The applicant requests that a sample of the deposited microorganisms stated below may only be made available to an expert, subject to provisions governed by the Industrial Property Office, until the date on which the patent is granted.

STATEMENT REGARDING BIOLOGICAL DEPOSITS

The strain Streptococcus thermophilus CHCC15757 has been deposited at Deutsche Sammlung von Mikroorganismen und Zellkulturen (DSMZ) GmbH1 Inhoffenstr. 7B, D-38124 Braunschweig, Germany, on 3 Apr. 2012 under the accession No. DSM 25850 as part of WO2013/160413.

The strain *Streptococcus thermophilus* CHCC15887 has been deposited at Deutsche sammlung von Mikroorganismen und Zellkulturen (DSMZ) GmbH, Inhoffenstr. 7B, D-38124 Braunschweig, Germanyl on 3 Apr. 2012 under the accession No. DSM 25851 as part of WO2013/160413.

The strain *Streptococcus thermophilus* CHCC16404 has been deposited at Deutsche Sammlung von Mikroorganismen und Zellkulturen (DSMZ) GmbH, Inhoffenstr. 7B, D-38124 Braunschweig, Germany, on 12 Dec. 2012 under the accession No. DSM 26722 as part of WO2013/160413.

The strain *Streptococcus thermophilus* CHCC16731 has been deposited at Deutsche Sammlung von Mikroorganismen und Zellkulturen (DSMZ) GmbH, Inhoffenstr. 7B, D-38124 Braunschweig, Germany, on 4 Jun. 2014 under the accession No. DSM 28889 as part of WO2017/103051.

The strain *Streptococcus thermophilus* CHCC19216 has been deposited at Deutsche Sammlung von Mikroorganismen und Zellkulturen (DSMZ) GmbH, Inhoffenstr. 7B, D-38124 Braunschweig, Germany, on 8 Dec. 2015 under the accession No. DSM 32227 as part of WO2017/103051.

The strain *Lactobacillus delbrueckii* subsp. *bulgaricus* CHCC16159 has been deposited at Deutsche Sammlung von Mikroorganismen und Zellkulturen (DSMZ) GmbH, Inhoffenstr. 7B, D-38124 Braunschweig Germany, on 6 Sep. 2012 under the accession No. DSM 26420 as part of WO2013/160413.

The strain *Lactobacillus delbrueckii* subsp. *bulgaricus* CHCC16160 has been deposited at Deutsche Sammlung von Mikroorganismen und Zellkulturen (DSMZ) GmbH, Inhoffenstr. 7B, D-38124 Braunschweig Germany, on 6 Sep. 2012 under the accession No. DSM 26421 as part of WO2013/160413.

The bacterial strains described above have been deposited under conditions that access to the material will be available during the pendency of the present patent application to one determined by the Commissioner to be entitled thereto under 37 C.F.R. 1.14 and 35 U.S.C. § 122. All restrictions on the availability to the public of the deposited materials will be irrevocably removed upon the granting of a patent from the above-identified application. The deposited materials will be maintained with all the care necessary to keep the materials viable and uncontaminated for a period of at least five years after the most recent request for the furnishing of a sample of the deposited microorganism, and in any case, for a period of at least thirty (30) years after the date of deposit for the enforceable life of the patent, whichever period is longer.

The invention claimed is:

1. A method for producing an enzyme having lactase activity in a lactic acid bacterium, wherein the lactic acid bacterium carries a mutation in a glck DNA sequence encoding a glucokinase protein, wherein the mutation inactivates the glucokinase protein, comprising:
   (a) inoculating a lactic acid bacterium into a growth medium comprising lactose, wherein the lactic acid bacterium expresses an enzyme having lactase activity;
   (b) growing the lactic acid bacterium to a desired density to obtain a first solution comprising the enzyme having lactase activity and bacterial cells of the lactic acid bacterium;
   (c) inactivating and/or disrupting the bacterial cells of the lactic acid bacterium, such that the bacterial cells are broken;
   (d) removing cellula debris to obtain a second solution which comprises the enzyme having the lactase activity; and
   (e) optionally processing the second solution to obtain a third solution which comprises the enzyme having the lactase activity,
   wherein the lactase activity and amount of protein produced per liter of the first solution is higher from a lactic acid bacterium carrying a mutation in a glck DNA sequence encoding a glucokinase protein, wherein the mutation inactivates the glucokinase protein, compared to the lactase activity and amount of protein produced per liter from an otherwise identical strain which does not carry a mutation in a glck DNA sequence.

2. The method of claim 1, wherein the second solution of step (d) or the third solution of step (e) is further formulated to produce the purified enzyme in a suitable formulation.

3. A method for producing an enzyme having lactase activity in a lactic acid bacterium, wherein the lactic acid bacterium carries a mutation in a glck DNA sequence encoding a glucokinase protein, wherein the mutation inactivates the glucokinase protein, comprising:
   (a) introducing a DNA sequence encoding the enzyme having lactase activity into a lactic acid bacterium, wherein the DNA sequence encoding the enzyme is introduced into the lactic acid bacterium under control of a regulatory element of a lac-operon;
   (b) inoculating the lactic acid bacterium of step (a) into a growth medium comprising lactose, wherein the lactic acid bacterium expresses an enzyme having lactase activity;
   (c) growing the lactic acid bacterium to a desired density to obtain a first solution comprising the enzyme having lactase activity and bacterial cells of the lactic acid bacterium;
   (d) inactivating and/or disrupting the bacterial cells of the lactic acid bacterium, such that the bacterial cells are broken;
   (e) removing cellula debris to obtain a second solution which comprises the enzyme having the lactase activity; and
   (f) optionally processing the second solution to obtain a third solution which comprises the enzyme having the lactase activity,
   wherein the lactase activity and amount of protein produced per liter of the first solution is higher from a lactic acid bacterium carrying a mutation in a glck DNA sequence encoding a glucokinase protein, wherein the mutation inactivates the glucokinase protein, compared to the lactase activity and amount of protein produced per liter from an otherwise identical strain which does not carry a mutation in a glck DNA sequence.

4. The method of claim 3, wherein the second solution of step (d) or the third solution of step (e) is further formulated to produce the purified enzyme in a suitable formulation.

5. The method of claim 3, wherein the lac-operon is Carbon control Protein A (CcpA).

6. The method of claim 3, wherein the DNA sequence encoding the enzyme encodes a dimeric peptide exhibiting beta-galactosidase enzyme activity, wherein the dimeric peptide consist of two peptides having amino acid sequences selected from SEQ ID NOs. 2 and 3; SEQ ID NOs. 5 and 6; SEQ ID NOs. 20 and 21; SEQ ID NOs. 23 and 24; SEQ ID NOs. 26 and 27, and SEQ ID NOs. 28 and 29, and enzymatically active fragments thereof, and variants thereof having not more than 22 amino acid substitutions, additions or deletions.

7. The method of claim 3, wherein the DNA sequence encoding the enzyme encodes an amino acid sequence selected from any one of SEQ ID NOs. 1-33, and enzymatically active fragments thereof, and variants thereof having not more than 22 amino acid substitutions, additions or deletions.

8. The method of claim 1, wherein the enzyme having lactase activity expressed by the lactic acid bacterium has an amino acid sequence selected from any one of SEQ ID NOs. 34-38, and variants thereof having not more than 22 amino acid substitutions, additions or deletions.

9. The method of claim 1, wherein the lactic acid bacterium is a strain of *Lactobacillus delbreuckii* subspecies *bulgaricus*.

10. The method of claim 1, wherein the lactic acid bacterium is a strain of *Lactobacillus delbreuckii* subspecies *bulgaricus* selected from strain CHCC16159 deposited at Deutsche Sammlung von Mikroorganismen und Zellkulturen GmbH1 (DSMZ) (Braunschweig, Germany) under Accession Number DSM 26420 and mutants thereof, and strain CHCC16160 deposited at DSMZ under Accession Number DSM 26421 and mutants thereof.

11. The method of claim 1, wherein the lactic acid bacterium is a galactose fermenting strain of *Streptococcus thermophilus*.

12. The method of claim 1, wherein the lactic acid bacterium is a galactose fermenting strain of *Streptococcus thermophilus* selected from the strains deposited at DSMZ under Accession Numbers DSM 28889, DSM 25850, DSM 25851, DSM 26722 and DSM 32227, and *Streptococcus thermophilus* strains sharing the functional characteristics of said deposited strains.

* * * * *